US007160949B2

(12) United States Patent
Ota et al.

(10) Patent No.: US 7,160,949 B2
(45) Date of Patent: Jan. 9, 2007

(54) OLEFIN BLOCK COPOLYMERS, PROCESSES FOR PRODUCING THE SAME AND USES THEREOF

(75) Inventors: Seiji Ota, Kuga-gun (JP); Satoru Moriya, Ichihara (JP); Ryoji Mori, Kuga-gun (JP); Taku Koda, Kuga-gun (JP); Junji Tan, Kuga-gun (JP); Shinichi Kojoh, Sodegaura (JP); Hideyuki Kaneko, Sodegaura (JP); Shunichi Hama, Chiba (JP); Tadahito Nobori, Sodegaura (JP); Tomoaki Matsugi, Sodegaura (JP); Norio Kashiwa, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 393 days.

(21) Appl. No.: 10/181,553

(22) PCT Filed: Jan. 18, 2001

(86) PCT No.: PCT/JP01/00298

§ 371 (c)(1),
(2), (4) Date: Jul. 19, 2002

(87) PCT Pub. No.: WO01/53369

PCT Pub. Date: Jul. 26, 2001

(65) Prior Publication Data
US 2003/0055179 A1 Mar. 20, 2003

(30) Foreign Application Priority Data

| Jan. 21, 2000 | (JP) | 2000-017848 |
|---|---|---|
| Jan. 21, 2000 | (JP) | 2000-017849 |
| Jan. 21, 2000 | (JP) | 2000-017850 |
| Jan. 25, 2000 | (JP) | 2000-018053 |
| Jan. 25, 2000 | (JP) | 2000-018054 |
| Jan. 27, 2000 | (JP) | 2000-023333 |
| Jan. 28, 2000 | (JP) | 2000-024736 |
| Jan. 28, 2000 | (JP) | 2000-024737 |
| Feb. 1, 2000 | (JP) | 2000-028924 |
| Feb. 1, 2000 | (JP) | 2000-028925 |
| Feb. 1, 2000 | (JP) | 2000-028926 |
| Mar. 27, 2000 | (JP) | 2000-090716 |
| Apr. 7, 2000 | (JP) | 2000-111900 |
| Apr. 27, 2000 | (JP) | 2000-132859 |
| May 15, 2000 | (JP) | 2000-147500 |
| May 31, 2000 | (JP) | 2000-166470 |
| Sep. 22, 2000 | (JP) | 2000-288181 |

(51) Int. Cl.
*C08L 53/00* (2006.01)
(52) U.S. Cl. .......... 525/242; 525/242; 525/313; 525/326.1; 525/418; 525/420; 525/419
(58) Field of Classification Search ......... 525/326.1, 525/418, 419, 420, 101, 123, 154, 155, 165, 525/178, 185, 191, 242, 313
See application file for complete search history.

(56) References Cited

U.S. PATENT DOCUMENTS

| 4,180,528 | A | * | 12/1979 | Fagerburg | 525/90 |
|---|---|---|---|---|---|
| 4,258,144 | A | * | 3/1981 | Childers et al. | 525/91 |
| 4,385,164 | A | * | 5/1983 | Sinclair et al. | 526/201 |
| 5,210,338 | A | * | 5/1993 | Samsel | 568/911 |
| 5,276,220 | A | * | 1/1994 | Samsel et al. | 568/911 |
| 5,519,098 | A | * | 5/1996 | Brown et al. | 526/116 |
| 6,034,168 | A | * | 3/2000 | Wang | 524/505 |
| 6,294,616 | B1 | * | 9/2001 | Rhodes et al. | 525/332.1 |
| 2003/0078458 | A1 | * | 4/2003 | Britovsek et al. | 568/911 |

FOREIGN PATENT DOCUMENTS

| EP | 0 791 600 A1 | 8/1997 |
|---|---|---|
| JP | 60-252614 | 12/1985 |
| JP | 63-12651 | 1/1988 |
| JP | 04-149236 A | 5/1992 |
| JP | 05-125194 A | 5/1993 |
| JP | 08-259744 | * 10/1996 |
| JP | 2001-059007 A | 3/2001 |
| WO | WO 98/02472 | 1/1998 |
| WO | WO 98/02472 A1 | 1/1998 |

OTHER PUBLICATIONS

Hogan et al. CAPLUS AN 1974:450507, 1974.*
Barker et al. CAPLUS AN 1984:86207, 1984.*
Satokichi et al., electronic translation of JP 08-259744.*
Lynda K. Johnson et al.; J. Am. Chem. Soc., 1995, vol. 117, pp. 6414-6415.
Lynda K. Johnson et al.; J. Am. Cham. Soc., 1996, vol. 118, pp. 267-268.
John D. Scollard et al.; Macromolecules, 1996, vol. 29, pp. 5241-5243.

(Continued)

*Primary Examiner*—Jeffrey Mullis
(74) *Attorney, Agent, or Firm*—Birch, Stewart, Kolasch & Birch, LLP

(57) ABSTRACT

Olefin block copolymers (A-1) are disclosed represented by the formula (I) $PO^1\text{-}g^1\text{-}B^1 \ldots$ (I) wherein $PO^1$ is a segment comprised of repeating units derived from an olefin having 2 to 20 carbon atoms, $g^1$ is an ester, ether, amide, imide, urethane, urea, silylether or carbonyl linkage, and $B^1$ is a segment containing an unsaturated hydrocarbon or a hetero atom. The olefin block copolymers are suitable for uses in adhesives, various molded articles such as construction and civil engineering materials, automobile interior and exterior materials, gasoline tanks, electric and electronic parts, medical care and sanitation materials, materials of miscellaneous goods, resin materials having environmental degradation properties, films and sheets, modifiers and dispersions.

9 Claims, 5 Drawing Sheets

OTHER PUBLICATIONS

Xiaohong Bei et al.; Organometallics, 1997, vol. 16, pp. 3282-3302.
Chunming Wang et al.; Organometallics, 1998, vol. 17, pp. 3149-3151.
Rainer Vollmerhaus et al.; Organometallics, vol. 18, No. 15, Jul. 19, 1999, pp. 2731-2733.
Victoria Volkis et al.; Organometallics, 1998, vol. 17, pp. 3155-3157.
Claudia Averbuj et al.; J. Am. Chem. Soc., 1998, vol. 120, pp. 8640-8646.
Martyn P. Coles et al.; J. Am. Chem. Soc., 1997, vol. 119, pp. 8125-8126.
Kimmo Hakala et al.; Macromol. Rapid Commun., vol. 18, pp. 635-638, 1997.

* cited by examiner

Thermally stimulated current spectrum in Example 46

Thermally stimulated current spectrum in Comparative Example 8

OLEFIN BLOCK COPOLYMERS, PROCESSES FOR PRODUCING THE SAME AND USES THEREOF

This application is the national phase under 35 U.S.C. § 371 of PCT International Application No. PCT/JP01/00298 which has an International filing date of Jan. 18, 2001, which designated the United States of America.

TECHNICAL FIELD

The present invention relates to olefin block copolymers, processes for producing the same, and uses of the copolymers. More particularly, the invention relates to olefin block copolymers of a specific structure comprising a polyolefin segment and a functional segment, and to processes for producing such copolymers and to uses thereof.

RELATED BACKGROUND ART

Polyolefins are produced into extrusion molded articles, injection molded articles, blow molded articles, films or sheets for various purposes because of their excellent processability, chemical resistance, electrical properties and mechanical properties.

Polyolefins, however, are poor in affinity with various polar substances, such as metals, and hard to be bonded to polar substances or to be blended with polar resins because they do not have a polar group in the molecule, in other words, they are a non-polar resin. Molded articles of polyolefin have a hydrophobic surface, and therefore need to be compounded with, for example, a surface-active agent of low molecular weight for the applications requiring antifogging and antistatic properties. This can sometimes cause problems that, for example, the surface is contaminated by bleeding-out of the surface-active agent.

Polyolefins have been expected to have a variety of properties recently. For example, polyolefins are required to be excellent in heat resistance and, as soft polyvinyl chloride, to have a soft texture.

Various methods have been attempted to improve the properties of polyolefin. Examples of such methods include adjusting the monomer type and the molar ratio, changing the arrangement of monomers, for example, randomly or blockwise, and graft copolymerizing a polyolefin with a polar monomer.

When a polyolefin is graft copolymerized with a polar monomer, a method where the polyolefin is reacted with a radically polymerizable monomer in the presence of a radical initiator is commonly employed. The graft copolymer obtained by such a method often contains a homopolymer of the radically polymerizable monomer and an unreacted polyolefin, and is ununiform in graft structure. Additionally, the graft polymerization involves a crosslinking reaction and a decomposition reaction of polymer chains, thereby widely altering the properties of polyolefin in many cases.

International publication No. WO98/02472 refers to synthesis of a block polymer of a polyolefin and a polar polymer without involving the crosslinking and decomposition reactions by disclosing the method where a boron compound is added to a polyolefin having an unsaturated bond in the terminal position, oxidized by oxygen to form an active species for radical polymerization and thereafter radically polymerized.

The present inventors made an earnest study in light of the prior art and found that a specific block copolymer comprising a polyolefin segment and a functional segment can solve the above problems and also found a process for producing such a block copolymer.

With respect to the process for producing a block (co) polymer comprising two different polymer segments, JP-A-60(1985)/252614, JP-A-60(1985)/252623, JP-A-5(1993)/503546, JP-A-8(1996)/92338 and JP-A-9(1997)/87343 disclose the method involving living polymerization. JP-A-60(1985)/252614 discloses the process for producing a block copolymer comprising a polyolefin segment and a polymethacrylic ester segment by living polymerization. The process involving living polymerization produces only one polymer per catalyst active point, with the molecular weight distribution (Mw/Mn) of polyolefin being approximately 1. The more polymers are obtained per one catalyst active point, the more preferable costwise. It is preferable in view of molding and processing of polymers that the polyolefin segment have a large molecular weight distribution (Mw/Mn).

On the production of a block copolymer comprising a polyolefin segment and a polymethacrylic ester segment, International Publication No. WO98/02472 discloses the method of producing the polymethacrylic ester segment by radical polymerization. This method, however, has a problem that the polymerization, in particular, the stereoregularity and the copolymerizability of the polymethacrylic ester are hard to control because the methacrylic ester is radically polymerized.

The present inventors made an earnest study in light of the prior art and succeeded in converting the end of a specific polyolefin to a specific group and in anionically polymerizing a (meth)acrylic ester in the presence of the polyolefin containing a specific group in the terminal position. They also found that the polymerizability can be controlled easier in the anionic polymerization in comparison with the radical polymerization and that the stereoregularity and the copolymerizability of poly(meth)acrylic ester can be controlled as well.

The inventors additionally found that the block copolymer comprising a polyolefin segment and a functional segment is ideal for various uses, such as bonding; molded articles, e.g., construction and civil engineering materials, automobile interior and exterior parts, gasoline tanks, electric and electronic parts, medical and sanitary products, miscellaneous molded articles, environmentally degradable resin molded articles, films and sheets; modifiers and dispersions.

Compositions comprising a base polymer, such as ethylene/vinyl acetate copolymer or styrene block copolymer, and a tackifier resin have been conventionally used as a hot melt adhesive. However, such a resin is not sufficient in compatibility with a tackifier resin to make, in some cases, the adhesion inferior. The hot melt adhesives have been moreover commercially demanded to have excellent thermoresistant adhesion and thermoresistant creep characteristics. The present inventors made an earnest study in light of the prior art and, as a result, it has been found that the block copolymer comprising a polyolefin segment and a functional segment, and the composition comprising said copolymer and a tackifier resin have excellent thermoresistant adhesion and thermoresistant creep characteristics.

Various synthetic resins, such as polyolefin, have been used as a material of molded articles for construction and civil engineering, e.g., floor coverings, sheets, gaskets, sealants and asphalt modifiers. The floor coverings are required to have impact resistance and mar resistance. The sheets are required to be flexible and resistant to pinholes and penetration. The gaskets and the sealants are required to have flexibility. The asphalt modifiers are desired to be heat resistant and compatible with asphalt. The present inventors made an earnest study on the molded articles for construction and civil engineering which can satisfy the above requirements and, as a result, it has been found that the molded articles for construction and civil engineering, which comprises the block copolymer comprising a polyolefin segment and a functional segment, or the olefin polymer composition comprising said copolymer can meet the above requirements.

Thermoplastic resins, such as polyolefins, polyesters, polyamides and polyacetals, have been produced into injection molded articles, blow molded articles, films or sheets to be used for many purposes because they have excellent processability, chemical resistance, electrical properties and mechanical properties. However, thermoplastic resins are sometimes insufficient in the balance of properties, such as transparency, rigidity, impact resistance and moldability, depending on the use. In order to improve the molded articles comprising such thermoplastic resins in the balance of properties, such as transparency, heat resistance, impact resistance and moldability, a method where a thermoplastic resin is blended with a modifier, e.g., ethylene/α-olefin copolymer, to make a composition is known. However, thermoplastic resins blended with a conventional modifier are sometimes unsatisfactory in the balance between rigidity, surface hardness and impact resistance. As such, automobile interior and exterior parts and gasoline tanks, in which resins or resin compositions excellent in rigidity, impact resistance, oil resistance and heat resistance are used, have been desired. The present inventors made an earnest study in light of the prior art and, as a result, it has been found that the automobile interior and exterior parts and the gasoline tanks comprising the block copolymer comprising a polyolefin segment and a functional segment, or the composition comprising said copolymer can meet the above requirements.

Various synthetic resins, e.g., polyolefins, have been conventionally used as a material of electric and electronic parts, such as wire-coating materials, gaskets used in a refrigerator or the like, optical materials, e.g., optical disk substrate, magnetic recording materials, magnetic recording binders, binders for a plastic magnet, water-absorbing sealants, solid polyelectrolytes, electromagnetic wave shields and housings for electric and electronic parts. The wire-coating materials are required to be electrically insulating stably for a long period of time, flame retardant, extrudable at a high rate and of high breakdown voltage. The gaskets for home appliances are required to have profile extrudability, expansion moldability, small compression shrinkage and flexibility. The optical materials are required to have transparency, mechanical strength and heat resistance. The magnetic recording materials are required to have magneto-optical responsiveness. The magnetic recording binders are required to have fillability and small magnetostriction. The solid polyelectrolytes are required to have low water-absorption, high ionic conductance and chemical stability. The electromagnetic wave shields are required to be weatherable for a long period of time and to depress the deterioration of shielding properties. The present inventors made an earnest study on the electric and electronic parts satisfying such requirements and, as a result, it has been found that the electric and electronic parts, in which the block copolymer comprising a polyolefin segment and a functional segment or the composition comprising said copolymer is used, can meet the above requirements.

Many polymer materials have been used in medical and sanitary products. For example, nonwoven fabrics, represented by the spunbond nonwoven fabric, have been used for various purposes and been required to have improved properties according to the purpose. Particularly, nonwoven fabrics used in, for example, a gather on a paper diaper, a part of sanitary products, such as a sanitary napkin, and a base of compress, are required to have water resistance and to be excellent in water vapor permeability. Depending on the place they are applied to, nonwoven fabrics are further required to be excellent in stretching properties. The proper strength to go through molding processes in the industrial production is additionally needed. Electrets charging a polymer material can keep the electrical charge semipermanently while generating an electric field. Under favor of the electric field, the electrets have been used in medical and sanitary applications, such as a bandage and an adhesive plaster and in absorption of dust in the air. Polytetrafluoroethylene and polyvinylidene fluoride, although conventionally known as a polymer to be a material of electrets, have a problem that the moldability is inferior. There has been proposed a method of preparing electrets, where a polyethylene is compounded with a small amount of modified polyethylene which has been graft copolymerized with an unsaturated carboxylic acid to improve the electrical charge properties, thereby easing the electrical charge. This method achieves only low electrical charge properties, and the electrets produced are to be improved in its effects and durability. The present inventors made an earnest study on the medical and sanitary products that can satisfy the above requirements or solve the problems and, as a result, it has been found that the medical and sanitary products, in which the block copolymer comprising a polyolefin segment and a functional segment, or the composition comprising said copolymer is used, are able to satisfy the above requirements.

Thermoplastic resins, such as polyolefins, polyesters, polyamides and polyacetals, are often insufficient, depending on the uses as miscellaneous goods requiring good design, in the balance between properties, such as impact resistance, mar resistance, printability, coating properties, low-temperature flexibility and moldability. For improving molded articles comprising the thermoplastic resin in the balance between properties, such as impact resistance and moldability, a method where a thermoplastic resin is blended with a modifier, e.g., ethylene/α-olefin copolymer, to make a composition is known. Conventional modifiers, however, are unsatisfactory in improving the balance between rigidity, surface hardness and impact resistance in some cases depending on the use. The present inventors made an earnest study on the miscellaneous molded article satisfying the above requirements and, as a result, it has been found that the miscellaneous molded article comprising the block copolymer comprising a polyolefin segment and a functional segment, or the composition comprising said copolymer is superior in any of the properties of impact resistance, heat resistance, mar resistance, transparency, coating properties, printability, adhesion and low-temperature flexibility.

Resins, such as polyolefins, polystyrenes, polyvinyl chlorides, polyesters and polyamides, are chemically stable and remain in the natural environment semipermanently once they are disposed to cause waste problems, e.g., damage to the landscape. Resins which are environmentally degradable owning to the living metabolism have been developed in order to solve such problems. Examples of such resins include aliphatic polyesters, such as a polylactic acid, a polyglycol acid, a poly-β-hydroxy butyric acid, poly-ϵ-caprolactone, a polybutylene succinate and a polyethylene succinate; a polyvinyl alcohol and a polyethylene glycol. Of these, aliphatic polyesters have been practically used because of, for example, its moldability. These resins, however, are insufficient in heat resistance and mechanical strength, etc., for practical uses. For example, a polylactic acid has drawbacks in that the heat resistance is hard to be attained because of its low crystallization rate, and that uses as a container where a practical strength is required are not expected owing to inferior toughness. And, poly-ε-caprolactone has a low melting point and is not practical, although high in impact resistance. As a result of an earnest study made by the present inventors in light of the prior art, it has been found that the block copolymer comprising a polyolefin segment and a functional segment, and the composition comprising said copolymer can produce an environmentally degradable resin molded article having excellent practical properties, such as heat resistance and impact resistance.

Although polyolefins are excellent in moldability and molded articles thereof have heat resistance, such molded articles have drawbacks, when used as a packaging material, in that contents are scratched or look less beautiful than they really are because of poor flexibility and low transparency of the polyolefin. Therefore, attempts to improve the flexibility and the transparency of polyolefins have been made by, for example, laminating a soft composition, e.g., vulcanized rubber, on an outer surface of a multilayered plastic container, or laminating a vinyl acetate resin on an outer surface of a multilayered container. The above methods, however, can not attain sufficient properties and are required to achieve improved anti-fogging properties, tackiness or the like depending on the use of the molded article. The present inventors made an earnest study in light of the prior art and, as a result, it has been found that the films and the sheets comprising the block copolymer comprising a polyolefin segment and a functional segment, or the composition comprising said copolymer are excellent in any of flexibility, transparency, tackiness, anti-fogging properties and heat resistance.

Thermoplastic resins, such as polyolefins, polyesters, polyamides and polyacetals, are sometimes insufficient in the balance between properties, such as transparency, rigidity, impact resistance and moldability, depending on the use. For improving molded articles comprising the thermoplastic resin in the balance between properties, such as transparency, heat resistance, impact resistance and moldability, a method where the thermoplastic resin is blended with such a modifier as an ethylene/α-olefin copolymer to make a composition is known. Conventional modifiers, however, cause a problem that the resulting molded article is unsatisfactory in the balance between rigidity, surface hardness and impact resistance in some cases depending on the use. The blend of an olefin rubber, such as ethylene/propylene rubber or ethylene/propylene/non-conjugated diene rubber, with a natural rubber (NR) or a diene rubber, such as styrene/butadiene rubber (SBR), can improve the weathering resistance and the heat resistance of the natural rubber or the diene rubber. However, their compatibility is so bad that the co-crosslinkability is insufficient, resulting in inadequate effects of modification. Thermosetting resins, such as phenolic resins, epoxy resins, urea resins and melamine resins, have been processed through cast molding or the like for various purposes under the favor of their excellent heat resistance, chemical resistance, mechanical characteristics and electrical characteristics. These resins, however, are insufficient in the balance between moldability and impact resistance, etc. Therefore, development of a modifier which can improve the moldability and the impact resistance of the thermosetting resins, has been desired. Lubricating oils generally contain a viscosity index improver to allow operation unaffected by any temperatures low or high. Lubricating oils further contain, for example, an abrasion-resistance agent, an extreme pressure agent, an antioxidant, a corrosion inhibitor, a detergent-dispersant or an emulsifying agent for the purpose of improving the properties of the lubricating oils under severe conductions. These additives contain polar groups in so large amounts that the compatibility thereof with a base oil, e.g., hydrocarbon base oil, is bad. The present inventors made an earnest study in light of the prior art and, as a result, it has been found that the modifier comprising the block copolymer comprising a polyolefin segment and a functional segment, or the composition comprising said copolymer is excellent in properties of modifying any of impact resistance, heat resistance, weathering resistance, mar resistance, transparency, coating properties, adhesion, low-temperature flexibility, fluidity and dispersion properties.

Polyolefins, such as polypropylene and polyethylene, are occasionally insufficient in heat resistance, rigidity and strength depending on the use. In such a case, polyolefins are reinforced with a filler, e.g., talc and glass fiber. However, polyolefins are low in polarity and, contrarily, most fillers have polarity. Therefore, the filler is not sufficiently dispersed in a polyolefin and the adhesion in the interface of the filler and the polyolefin is low. This can frequently cause a problem that the effect of reinforcement with a filler is not fully attained. As such, a silane coupling agent or a titanate coupling agent is incorporated therein at the time of melt-compounding, or a filler is treated on the surface with a higher fatty acid or the like, which although does not produce satisfactory effects. Additionally, attempts have been made to obtain a composite material in which organic polymer materials are inserted between silicate layers constituting phyllosilicate. For example, phyllosilicate is treated with an amino acid or a nylon salt, and a monomer is incorporated therein and polymerized, thereby obtaining a clay mineral/polyamide resin composition (cf. JP-B-58 (1983)/35211 and JP-B-58(1983)/35542). Or, a polyamide-containing resin is incorporated in silicate layers constituting phyllosilicate, which have a thickness of 7 to 12 Å and an interlaminar distance of at least 30 Å, thereby obtaining a composite material wherein a part of polymer chains of the polyamide is ionically bonded to silicate layers, which is reported in JP-A-62(1987)/74957 as a composite material wherein a part of polymer chains of polyamide is ionically bonded to silicate layers. On the other hand, with respect to the polyolefins, it is now under consideration to use phyllosilicate as a filler, which is finely dispersed by melt-kneading the phyllosilicate treated with an alkylamine swelling agent together with a modified polyolefin and a polyolefin. This method, however, does not produce sufficient effects of reinforcement. As a result of an earnest study made by the present inventors in light of the prior art, it has been found that the block copolymer comprising a polyolefin segment and a functional segment, and the composition comprising said copolymer can produce excellent effects of improvements in reinforcement and dispersion properties.

Polyolefins, such as ethylene (co)polymers and propylene (co)polymers, are poor in affinity with other resins and metals. Therefore, it is hard to bond a polyolefin to other parts. As such, various adhesives have been studied to bond a polyolefin to other resins and metals. Preferably, these adhesives are aqueous to assure working environment. Aqueous resin dispersions of ionomer resins are conventionally known as the aqueous resin dispersions for the bonding of polyethylene. These dispersions, however, do not have sufficient adhesion. Recently, against the backdrop of increased attentions on the environmental problems, there has been a conversion from a polyvinyl chloride (PVC) to a polyolefin along with increased frequency of use of polyethylene or the like. Accordingly, adhesives for the bonding of polyolefin having excellent adhesion have been strongly desired. The present inventors made an earnest study in view of the prior art and, as a result, it has been found that the block copolymer comprising a polyolefin segment and a functional segment, and the composition comprising said copolymer can produce aqueous dispersions having excellent dispersion properties in an aqueous medium and exhibiting high adhesion to polyolefins, metals and polar resins.

A resin dispersion of a modified polyolefin has been proposed, for example, in JP-A-63(1988)/12651, as an adhesive comprising a dispersion in which a polyolefin is dispersed in an organic medium and which is used for bonding polypropylene to a metal, e.g., aluminum. The modified polyolefin, however, is insufficient in dispersion properties in an organic medium and can cause a problem that the dispersion agglomerates in a gel state during a long-term storage in some cases. The present inventors made an earnest study in light of the prior art and, as a result, it has been found that the block copolymer comprising a polyolefin segment and a functional segment, and the composition comprising said copolymer can give an organic-medium dispersion having good dispersion properties and dispersion stability in an organic medium and exhibiting high adhesion to polyolefins, metals and polar resins.

DISCLOSURE OF THE INVENTION

The olefin block copolymer (A-1) is represented by formula (I)

$$PO^1\text{-}g^1\text{-}B^1 \qquad (I)$$

wherein $PO^1$ is a segment composed of repeating units derived from an olefin having 2 to 20 carbon atoms, $g^1$ is an ester, ether, amide, imide, urethane, urea, silylether or carbonyl linkage, and $B^1$ is a segment containing an unsaturated hydrocarbon or a hetero atom.

Examples of the olefin block copolymer (A-1) include an olefin block copolymer (A-11) wherein the $PO^1$ segment of formula (I) is a polyolefin segment prepared by polymerizing at least one monomer selected from a branched olefin, a cycloolefin, a conjugated diene and a non-conjugated polyene, optionally with at least one α-olefin selected from linear α-olefins having 2 to 20 carbon atoms; and an olefin block copolymer (A-12) wherein the $PO^1$ segment is a polyolefin segment containing long-chain branches, which is prepared by polymerizing at least one olefin selected from olefins having 2 to 20 carbon atoms.

With respect to the olefin block copolymer (A-11), it is preferable that the $PO^1$ segment be a polyolefin segment having a weight-average molecular weight of 2000 or more, which is prepared by polymerizing at least one monomer selected from a branched olefin, a cycloolefin, a conjugated-diene and a non-conjugated polyene, optionally with at least one α-olefin selected from linear α-olefins having 2 to 20 carbon atoms; that the $g^1$ linkage be an ether, ester or amide linkage; and that the $B^1$ segment be a functional segment having a weight-average molecular weight of 500 or more, which is prepared by radical polymerization or ring-opening polymerization.

With respect to the olefin block copolymer (A-12), it is preferable that the $PO^1$ segment be a polyolefin segment containing long-chain branches and having a weight-average molecular weight of 2000 or more, which is prepared by polymerizing at least one olefin having 2 to 20 carbon atoms; that the $g^1$ linkage be an ether, ester or amide linkage; and that the $B^1$ segment be a functional segment having a weight-average molecular weight of 500 or more, which is prepared by radical polymerization or ring-opening polymerization.

Examples of the olefin block copolymer (A-1) further include an olefin block copolymer (A-13) wherein the $PO^1$ segment of formula (I) has a weight-average molecular weight of less than 2000.

With respect to the olefin block copolymer (A-13), it is preferable that the $PO^1$ segment be a polyolefin segment having a weight-average molecular weight of less than 2000, which comprises repeating units derived from an olefin of 2 to 20 carbon atoms; that the $g^1$ linkage be an ether, ester or amide linkage; and that the $B^1$ segment be a functional segment obtained by radical polymerization or ring-opening polymerization.

The $PO^1$ segment of the olefin block copolymer (A-13) is obtained by coordination-anionic polymerization or copolymerization of at least one olefin selected from olefins having 2 to 20 carbon atoms. Preferably, the $PO^1$ segment is obtained by polymerizing or copolymerizing at least one α-olefin selected from linear or branched α-olefins having 2 to 20 carbon atoms. The $PO^1$ segment preferably has a molecular-weight distribution (Mw/Mn) of not more than 2.5. The $B^1$ segment is preferably obtained by radical polymerization of at least one radically polymerizable monomer. Examples of the radically polymerizable monomer include unsaturated carboxylic acids, derivatives thereof, aromatic vinyl compounds, hydroxyl group-containing ethylenically unsaturated compounds, nitrogen-containing ethylenically unsaturated compounds, epoxy group-containing ethylenically unsaturated compounds, vinyl ester compounds and vinyl chloride. The $B^1$ segment is obtained, for example, by ring-opening polymerization of at least one cyclic monomer. Examples of the cyclic monomer include lactone, lactam, 2-oxazoline and cyclic ethers.

Examples of the olefin block copolymer (A-1) further include an olefin block copolymer (A-14) wherein the $B^1$ segment of formula (I) has a weight-average molecular weight of less than 500.

With respect to the olefin block copolymer (A-14), it is preferable that the $PO^1$ segment be a polyolefin segment comprising repeating units derived from an olefin of 2 to 20 carbon atoms; that the $g^1$ linkage be an ether, ester or amide linkage; and that the $B^1$ segment be a functional segment having a weight-average molecular weight of less than 500, which is obtained by radical polymerization or ring-opening polymerization. The $PO^1$ segment is preferably obtained by coordination-anionic polymerization or copolymerization of at least one olefin selected from olefins having 2 to 20 carbon atoms. Preferably, the $PO^1$ segment is obtained by polymerizing or copolymerizing at least one α-olefin selected from linear or branched α-olefins having 2 to 20 carbon atoms. The $B^1$ segment is preferably obtained by radical polymerization of at least one radically polymerizable monomer. Examples of the radically polymerizable monomer include unsaturated carboxylic acids, derivatives thereof, aromatic vinyl compounds, hydroxyl group-containing ethylenically unsaturated compounds, nitrogen-containing ethylenically unsaturated compounds, epoxy group-containing ethylenically unsaturated compounds, vinyl ester compounds and vinyl chloride. The $B^1$ segment is obtained, for example, by ring-opening polymerization of at least one cyclic monomer. Examples of the cyclic monomer include lactone, lactam, 2-oxazoline and cyclic ethers.

Examples of the olefin block copolymer (A-1) further include an olefin block copolymer of formula (I) wherein the $g^1$ linkage is an ether, ester or amide linkage and the $B^1$ segment is prepared by chain polymerization.

The olefin block copolymer (A-2) is represented by formula (II), $$PO^2\text{-}f^2\text{-}R^2\text{---}(X^2)n\text{-}h^2 \qquad (II)$$

wherein $PO^2$ is a polyolefin segment composed of repeating units derived from an olefin having 2 to 20 carbon atoms, $f^2$ is an ether, ester or amide linkage, $R^2$ is a functional segment prepared by chain polymerization, $X^2$ is an ester, ether, amide, imide, urethane, urea, silylether or carbonyl linkage, $h^2$ is a polar group selected from an amino group, a halogen atom, an isocyanate group, an aldehyde group, a hydroxyl group, a carboxyl group, an acid anhydride group, a silanol group, a sulfonic acid group and an epoxy group, and n is 0 or 1.

Examples of the chain polymerization include radical polymerization, ring-opening polymerization and ionic polymerization.

With respect to the olefin block copolymer (A-2), it is preferable that the $h^2$ polar group be an amino group, a halogen atom, an isocyanate group, an aldehyde group or a carboxyl group, and n be 0; that the $h^2$ polar group be a halogen atom, an isocyanate group or an aldehyde group, and n be 0; that the $R^2$ segment be a functional segment having a molecular weight of less than 500; and that n be 1. Preferably, the $R^2$ segment is a functional segment obtained by radical polymerization or ring-opening polymerization.

Examples of the olefin block copolymer (A-2) include an olefin block copolymer (A-21) wherein the $PO^2$ segment of formula (II) has a weight-average molecular weight of less than 2000.

The $PO^2$ segment of the olefin block copolymer (A-21) is obtained by coordination-anionic polymerization or copolymerization of at least one olefin selected from olefins having 2 to 20 carbon atoms. Preferably, the $PO^2$ segment is obtained by polymerizing or copolymerizing at least one α-olefin selected from linear or branched α-olefins having 2 to 20 carbon atoms. The $PO^2$ segment preferably has a molecular-weight distribution (Mw/Mn) of not more than 2.5. The $R^2$ segment is preferably obtained by radical polymerization of at least one radically polymerizable monomer. Examples of the radically polymerizable monomer include unsaturated carboxylic acids, derivatives thereof, aromatic vinyl compounds, hydroxyl group-containing ethylenically unsaturated compounds, nitrogen-containing ethylenically unsaturated compounds, epoxy group-containing ethylenically unsaturated compounds, vinyl ester compounds and vinyl chloride. The $R^2$ segment is obtained, for example, by ring-opening polymerization of at least one cyclic monomer. Examples of the cyclic monomer include lactone, lactam, 2-oxazoline and cyclic ethers.

The process for preparing the olefin block copolymer (A-2) comprises the steps of:

carrying out chain polymerization of a chain polymerizable monomer by generating an active species for chain polymerization in the presence of a polyolefin which links with a Group 13 element in the terminal position of one side, to prepare an olefin block copolymer (A-2b) having an active species for chain polymerization in the terminal position, which is represented by formula (IIb);

$$PO^2\text{-}f^2\text{-}R^2\text{---}O\text{-}Z \qquad (IIb)$$

wherein $PO^2$, $f^2$ and $R^2$ have the same meaning as given in formula (II), and Z is an active species for chain polymerization; and then replacing the active species for chain polymerization of the olefin block copolymer (A-2b) with a functional group containing an oxygen, nitrogen, silicon or halogen atom and optionally allowing the olefin block copolymer having in the terminal position a functional group containing an oxygen, nitrogen, silicon or halogen atom to react with a compound having, in its molecule, at least two functional groups capable of reacting with the above functional group, to prepare the olefin block copolymer (A-2).

Examples of the process for generating an active species for chain polymerization in the presence of a polyolefin which links with a Group 13 element in the terminal position of one side include a method where a polyolefin which links with boron in the terminal position of one side is brought into contact with oxygen to generate an active species for radical polymerization; a method where a polyolefin which links with aluminum in the terminal position of one side is brought into contact with oxygen to generate an active species for ring-opening polymerization; a method where a polyolefin which links with aluminum in the terminal position of one side is brought into contact with oxygen, subjected to alcoholysis and brought into contact with such an organophosphorus compound as phosphoranylidene aminophosphonium chloride to generate an active species for ring-opening polymerization or anionic polymerization; and a method where a polyolefin which links with aluminum in the terminal position of one side is brought into contact with oxygen, subjected to alcoholysis and brought into contact with such an organolithium compound as butyl lithium to generate an active species for anionic polymerization.

Examples of the chain polymerizable monomer include radically polymerizable monomers, ring-opening polymerizable monomers and ionically polymerizable monomers.

Examples of the active species for chain polymerization include active species for radical polymerization, ring-opening polymerization and ionic polymerization.

In formula (IIb), Z is a group containing an oxygen-Group 13 element bond represented by —O-$M^2$ (wherein O is an oxygen atom and $M^2$ is a Group 13 element).

The olefin block copolymer (A-3) is represented by formula (III):

$$PO^3\text{-}g^3\text{-}F^3 \qquad (III)$$

wherein $PO^3$ is a polyolefin segment composed of repeating units derived from an olefin having 2 to 20 carbon atoms, $g^3$ is an ester, ether, amide, imide, urethane, urea, silylether or carbonyl linkage, and $F^3$ is a polar segment containing an unsaturated hydrocarbon or a hetero atom, which is prepared by a condensation reaction, an ion reaction or an addition reaction.

With respect to the olefin block copolymer (A-3), it is preferable that the $g^3$ linkage be a urea, silylether or carbonyl linkage; that the $g^3$ linkage be an ether, ester, amide, imide or urethane linkage; that the bonding structures of monomer units in the $F^3$ segment be symmetrical about the center of the monomer units; that the $F^3$ be obtained by subjecting an amphoteric electrolyte monomer to a condensation reaction, an ion reaction or an addition reaction; that the $F^3$ segment comprise monomer units containing an aliphatic ring or an aromatic ring; and that the $PO^3$ segment have a molecular weight distribution (Mw/Mn) of not more than 2.5.

The process for preparing the olefin block copolymer (A-3) comprises the steps of:

replacing the terminal Group 13 element in a polyolefin which links with a Group 13 element in the terminal position of one side with a functional group containing an oxygen, nitrogen, silicon or halogen atom, to prepare a polyolefin having a functional group in the terminal position, and then, allowing the polyolefin having a functional group in the terminal position to react with a polar polymer having in the terminal position a functional group capable of reacting with the above terminal functional group, to prepare the olefin block copolymer (A-3).

The olefin block copolymer (A-4) is represented by formula (IV)

$$PO^4\text{-}g^4\text{-}F^4\text{-}g^{14}\text{-}PO^{14} \tag{IV}$$

wherein $PO^4$ and $PO^{14}$, which may be the same or different, are each a polyolefin segment composed of repeating units derived from an olefin having 2 to 20 carbon atoms, $g^4$ and $g^{14}$, which may be the same or different, are each an ester, ether, amide, imide, urethane, urea, silylether or carbonyl linkage, and $F^4$ is a polar segment containing an unsaturated hydrocarbon or a hetero atom, which is prepared by a condensation reaction, an ion reaction or an addition reaction.

With respect to the olefin block copolymer (A-4), it is preferable that the $g^4$ linkage and the $g^{14}$ linkage be each a urea, silylether or carbonyl linkage; that the $g^4$ linkage and the $g^{14}$ linkage be each an ether, ester, amide, imide or urethane linkage; that the bonding structures of monomer units in the $F^4$ segment be symmetrical about the center of the monomer units; that the $F^4$ segment be prepared by subjecting an amphoteric electrolyte monomer to a condensation reaction, an ion reaction or an addition reaction; that the $F^4$ segment comprise monomer units containing an aliphatic ring or an aromatic ring; and that the $PO^4$ segment and the $PO^{14}$ segment each have a molecular weight distribution (Mw/Mn) of not more than 2.5.

The process for preparing the olefin block copolymer (A-4) comprises the steps of:

replacing the terminal Group 13 element in a polyolefin which links with a Group 13 element in the terminal position of one side with a functional group containing an oxygen, nitrogen, silicon or halogen atom, to prepare a polyolefin having a functional group in the terminal position, and then, allowing the polyolefin having a functional group in the terminal position to react with a polar polymer having in the terminal position of both sides a functional group capable of reacting with the above terminal functional group, to prepare the olefin block copolymer (A-4).

The olefin block copolymer (A-5) is represented by formula (V)

$$POB^5\text{-}g^5\text{-}F^5 \tag{V}$$

wherein $POB^5$ is a di-block segment derived from the olefin block copolymer (A-2), $g^5$ is an ester, ether, amide, imide, urethane, urea, silylether or carbonyl linkage, and $F^5$ is a polar segment containing an unsaturated hydrocarbon or a hetero atom, which is prepared by a condensation reaction, an ion reaction or an addition reaction.

The process for preparing the olefin block copolymer (A-5) comprises the steps of:

preparing the olefin block copolymer (A-2) of formula (II) by the process for preparing the olefin block copolymer (A-2), $$PO^2\text{-}f^2\text{-}R^2\text{---}(X^2)n\text{-}h^2 \tag{II}$$

wherein $PO^2$, $f^2$, $R^2$, $X^2$, $h^2$ and n each have the same meaning as in formula (II), and then, allowing the olefin block copolymer (A-2) of formula (II) to react with a polar polymer having in the terminal position of one side a functional group capable of reacting with the terminal $h^2$ functional group of the copolymer (A-2), to prepare the olefin block copolymer (A-5).

The olefin block copolymer (A-6) is represented by formula (VI)

$$POB^6\text{-}g^6\text{-}F^6\text{-}g^{16}\text{-}POB^{16} \tag{VI}$$

wherein $POB^6$ and $POB^{16}$, which may be the same or different, are each a di-block segment derived from the olefin block copolymer (A-2), $g^6$ and $g^{16}$, which may be the same or different, are each an ester, ether, amide, imide, urethane, urea, silylether or carbonyl linkage, and $F^6$ is a polar segment composed of a hydrocarbon or a polar segment containing an unsaturated hydrocarbon or a hetero atom, which is prepared by a condensation reaction, an ion reaction or an addition reaction.

With respect to the olefin block copolymer (A-6), it is preferable that the $F^6$ segment be a polar segment containing an unsaturated hydrocarbon or a hetero atom, which is prepared by a condensation reaction, an ion reaction or an addition reaction.

The process for preparing the olefin block copolymer (A-6) comprises the steps of:

preparing the olefin block copolymer (A-2) of formula (II) by the process for preparing the olefin block copolymer (A-2), $$PO^2\text{-}f^2\text{-}R^2\text{---}(X^2)n\text{-}h^2 \tag{II}$$

wherein $PO^2$, $f^2$, $R^2$, $X^2$, $h^2$ and n each have the same meaning as in formula (II), and then, allowing the olefin block copolymer (A-2) of formula (II) to react with a polar polymer having in the terminal position of both sides a functional group capable of reacting with the terminal $h^2$ functional group of the copolymer (A-2), to prepare the olefin block copolymer (A-6).

The olefin block copolymer (A-7) is represented by formula (VII);

$$(POB^7_i\text{-}g^7_i)_k\text{-}G^7 \tag{VI}$$

wherein $POB^7_i$, which may be the same or different, are each a di-block segment derived from the olefin block copolymer (A-2) or a di-block segment derived from the olefin block copolymer (A-3), the $g^7_i$ linkage, which may be the same or different, are each an ester, ether, amide, imide, urethane, urea, silylether or carbonyl linkage, and the $G^7$ linkage group is a polyvalent group containing an unsaturated hydrocarbon or a hetero atom, i is an integer of 1 to 5 and k is an integer of 2 to 500.

The process for preparing the olefin block copolymer (A-7) comprises the steps of:

preparing the olefin block copolymer (A-2) of formula (II) by the process for preparing the olefin block copolymer (A-2), $$PO^2\text{-}f^2\text{-}R^2\text{---}(X^2)n\text{-}h^2 \tag{II}$$

wherein $PO^2$, $f^2$, $R^2$, $X^2$, $h^2$ and n each have the same meaning as in formula (II), and then, allowing the olefin block copolymer (A-2) of formula (II) to react with a polyfunctional compound or a polyfunctional polymer, to prepare the olefin block copolymer (A-7).

The process for preparing the olefin block copolymer (A-7), further, comprises the steps of:
preparing the olefin block copolymer (A-3) of formula (III) by the process for preparing the olefin block copolymer (A-3), $$PO^3\text{-}g^3\text{-}F^3 \tag{II}$$

wherein $PO^3$, $g^3$ and $F^3$ each have the same meaning as in formula (III), and then,
allowing the olefin block copolymer (A-3) of formula (III) to react with a polyfunctional compound or a polyfunctional polymer, to prepare the olefin block copolymer (A-7).

Other process for preparing the olefin block copolymer (A-7) comprises the steps of:
preparing the olefin block copolymer (A-2) of formula (II) by the process for preparing the olefin block copolymer (A-2), $$PO^2\text{-}f^2\text{-}R^2\text{—}(X^2)n\text{-}h^2 \tag{II}$$

wherein $PO^2$, $f^2$, $R^2$, $X^2$, $h^2$ and n each have the same meaning as in formula (II),
preparing the olefin block copolymer (A-3) of formula (III) by the process for preparing the olefin block copolymer (A-3), $$PO^3\text{-}g^3\text{-}F^3 \tag{III}$$

wherein $PO^3$, $g^3$ and $F^3$ each have the same meaning as in formula (III), and then,
allowing the olefin block copolymer (A-2) of formula (II) and the olefin block copolymer (A-3) of formula (III) to react with a polyfunctional compound or a polyfunctional polymer, to prepare the olefin block copolymer (A-7).

The process for preparing an olefin block copolymer (A-8) comprises the steps of:
allowing a polyolefin having a hydroxyl group in the terminal position to react with an organolithium compound or an organophosphorus compound to prepare a polyolefin having lithium in the terminal position, which is represented by formula (VIII)

$$PO^8\text{—}O\text{-}LP \tag{VIII}$$

wherein $PO^8$ is a polyolefin segment having a weight-average molecular weight of 1,000 to 10,000,000 and LP is lithium or a phosphorus-containing group, and then
subjecting a (meth)acrylate to anionic polymerization in the presence of the polyolefin having lithium or a phosphorus-containing group in the terminal position, to prepare an olefin block copolymer comprising a polyolefin segment and a poly(meth)acrylate segment.

Preferably, the polyolefin of formula (VIII) has a molecular-weight distribution (Mw/Mn) of at least 2. It is preferable in the invention that the poly(meth)acrylate segment have stereoregularity and that the poly (meth) acrylate segment be produced by copolymerizing at least two (meth)acrylates.

The resin for adhesion comprises the olefin block copolymer (A-1).
With respect to the resin for adhesion, it is preferable that the $B^1$ segment of the olefin block copolymer (A-1) represented by formula (I) have a weight-average molecular weight of less than 500.
Examples of the resin for adhesion include a hot melt adhesive.
The hot melt adhesive composition of the invention comprises the olefin block copolymer (A-1) in an amount of 10 to 90 parts by weight and a tackifier resin (B) in an amount of 90 to 10 parts by weight based on the total amount 100 parts by weight of the olefin block copolymer (A-1) and the tackifier resin (B).

The molded article comprises the olefin block copolymer (A-1) or an olefin polymer composition (D) containing the olefin block copolymer (A-1) and a thermoplastic resin (C) other than the copolymer (A-1).

Examples of the molded article include molded articles used in construction and civil engineering, automobile interior and exterior parts, gasoline tanks, electric and electronic parts, medical and sanitary molded articles, miscellaneous molded articles, environmentally degradable resin-molded articles, films or sheets, and sheets or films having a multi-layered structure.

The modifier of the invention comprises the olefin block copolymer (A-1).
Examples of the modifier include modifiers used for resins, rubbers, lubricating oils, waxes, cements, and ink and paints; and modifiers used for improving dispersion properties of fillers.

The filler-containing resin composition of the invention comprises the olefin block copolymer (A-1) and a filler.
The process for preparing the filler-containing resin composition comprises the steps of:
polymerizing or copolymerizing an olefin of 2 to 20 carbon atoms and
polymerizing or copolymerizing such a chain-polymerizable monomer as a radically polymerizable monomer, a ring-opening polymerizable monomer or an ionically polymerizable monomer in the presence of the polyolefin obtained by the above polymerization and a filler.

The dispersion of the invention is obtainable by dispersing the olefin block copolymer (A-1) or the olefin polymer composition (D) containing the olefin block copolymer (A-1) and a thermoplastic resin (C) other than the copolymer (A-1) in a liquid phase.

Examples of the dispersion include an aqueous resin dispersion wherein the olefin block copolymer (A-1) or the olefin polymer composition (D) is dispersed in water; and an oily resin dispersion wherein the olefin block copolymer (A-1) or the olefin polymer composition (D) is dispersed in an organic medium.

BRIEF DESCRIPTION OF THE DRAWINGS

In FIG. 2, 1 is a measurement room, 2 is a sample, 3 is a bismuth electrode, 4 is a bearing electrode, 5 is a grid electrode, 6 is a temperature recorder, 7 is a changeover switch, 8 is an electrometer, 9 is a ammeter and 10 and 11 are each a recorder.

BEST MODE TO CARRY OUT THE INVENTION

Figure 1:
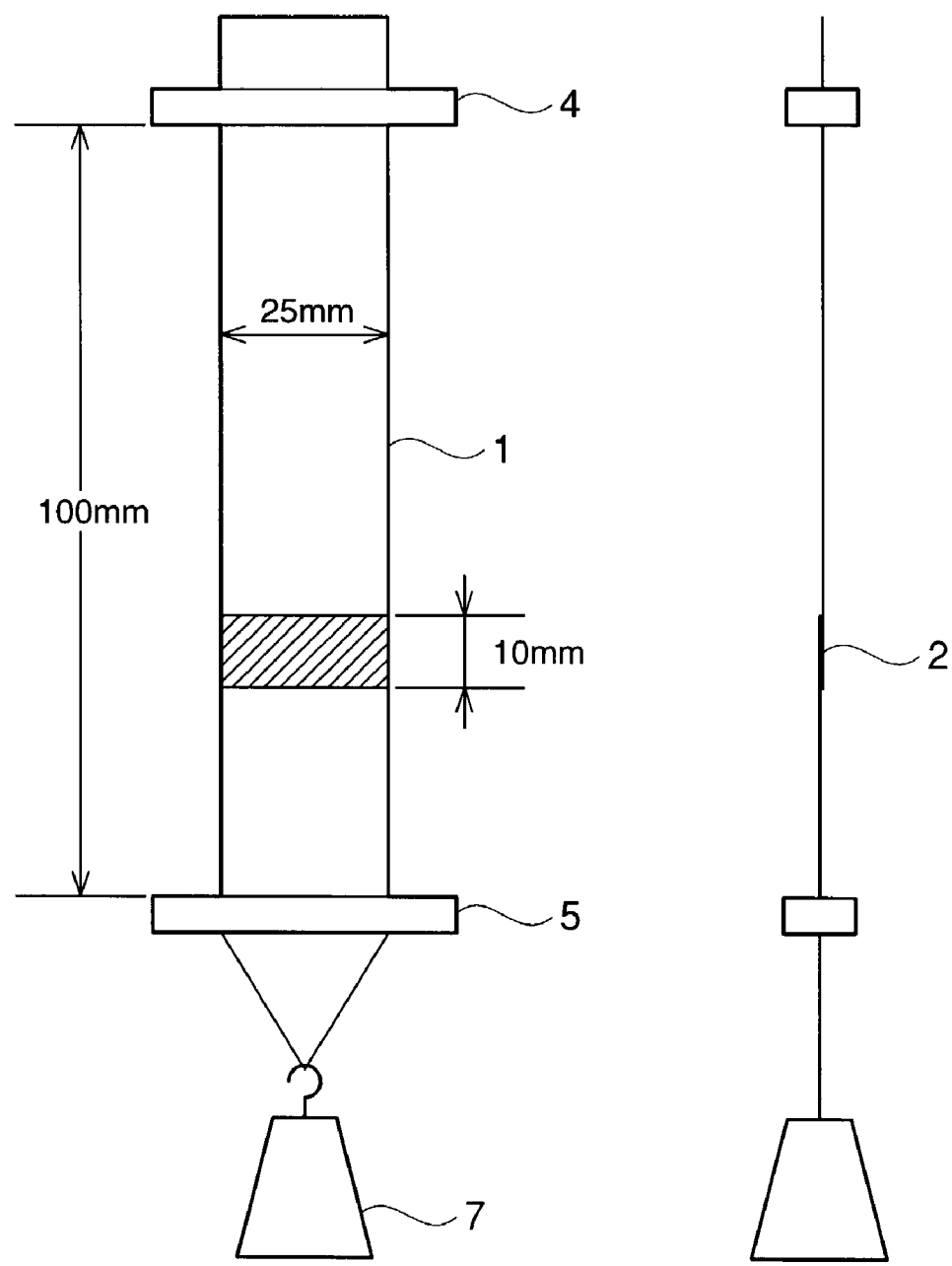
FIG. 1 is a set of schematic views for explaining a method for measuring heat-resistant creeping characteristics. FIG. (A) is a front view and FIG. (B) is a side view.

The olefin block copolymers, the processes for producing the same, and the uses of the copolymers will be described in detail thereinafter.

Olefin Block Copolymer (A-1)

The olefin block copolymer (A-1) comprises a polyolefin segment and a functional segment and is represented by following formula (I):

$$PO^1\text{-}g^1\text{-}B^1 \quad (I)$$

wherein $PO^1$ is a segment comprising repeating units derived from an olefin of 2 to 20 carbon atoms, specifically, $PO^1$ is a homopolymer or a copolymer of an olefin selected from olefins of 2 to 20 carbon atoms. When the polyolefin segment has stereoregularity, the polyolefin may be either an isotactic polyolefin or a syndiotactic polyolefin.

Examples of the olefins having 2 to 20 carbon atoms include linear or branched α-olefins, cycloolefins, aromatic vinyl compounds, conjugated dienes and non-conjugated polyenes.

Specific examples of the linear or branched α-olefins include linear α-olefins of 2 to 20, preferably 2 to 10 carbon atoms, such as ethylene, propylene, 1-butene, 1-pentene, 1-hexene, 1-octene, 1-decene, 1-dodecene, 1-tetradecene, 1-hexadecene, 1-octadecene and 1-eicosene; and branched α-olefins of preferably 5 to 20, more preferably 5 to 10 carbon atoms, such as 3-methyl-1-butene, 4-methyl-1-pentene, 3-methyl-1-pentene, 3-ethyl-1-pentene, 4,4-dimethyl-1-pentene, 4-methyl-1-hexene, 4,4-dimethyl-1-hexene, 4-ethyl-1-hexene and 3-ethyl-1-hexene.

Specific examples of the cycloolefins include those of 3 to 20, preferably 5 to 15 carbon atoms, such as cyclopentene, cycloheptene, norbornene, 5-methyl-2-norbornene, tetracyclododecene and vinylcyclohexane.

Specific examples of the aromatic vinyl compounds include styrene and mono- or poly-alkyl styrenes, such as α-methylstyrene, o-methylstyrene, m-methylstyrene, p-methylstyrene, o,p-dimethylstyrene, o-ethylstyrene, m-ethylstyrene and p-ethylstyrene.

Specific examples of the conjugated dienes include those of 4 to 20, preferably 4 to 10 carbon atoms, such as 1,3-butadiene, isoprene, chloroprene, 1,3-pentadiene, 2,3-dimethylbutadiene, 4-methyl-1,3-pentadiene, 1,3-pentadiene, 1,3-hexadiene and 1,3-octadiene.

Specific examples of the non-conjugated polyenes include those of 5 to 20, preferably 5 to 10 carbon atoms, such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylenenorbornene, 5-vinylnorbornene, 5-ethylidene-2-norbornene, 5-methylene-2-norbornene, 5-isopropyridene-2-norbornene, 6-chloromethyl-5-isopropenyl-2-norbornene, 2,3-diisopropyridene-5-norbornene, 2-ethylidene-3-isopropyridene-5-norbornene and 2-propenyl-2,2-norbornadiene.

The segment $PO^1$ has a weight-average molecular weight (Mw) of, although not particularly limited to, usually 500 to 1,000,000, preferably 5,000 to 500,000, more preferably 10,000 to 50,000.

Referring to formula (I), $g^1$ is an ester linkage, an ether linkage, an amide linkage, an imide linkage, a urethane linkage (—NHCOO—), a urea linkage (—NH—CO—NH—), a silylether linkage or a carbonyl linkage. Of these, an ether linkage, an ester linkage and an amide linkage are preferred. An ether linkage is particularly preferable. The linkage $g^1$ chemically bonds the segment $PO^1$ and the segment $B^1$ described below.

The linkage $g^1$ occasionally contains a part of the structure formed by such polymerization as radical polymerization, ring-opening polymerization or ionic polymerization.

Referring to formula (I), $B^1$ is a segment containing an unsaturated hydrocarbon or a hetero atom. Specifically, $B^1$ is a segment comprising repeating units derived from, for example, a radically polymerizable monomer, such as unsaturated carboxylic acids, derivatives thereof, aromatic vinyl compounds, vinyl compounds containing residues of heterocyclic compound, hydroxyl group-containing ethylenically unsaturated compounds, nitrogen-containing ethylenically unsaturated compounds, epoxy group-containing ethylenically unsaturated compounds, vinyl ester compounds and vinyl chloride; or a cyclic monomer, such as lactone, lactam, 2-oxazoline and cyclic ethers.

Examples of the unsaturated carboxylic acids include acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hept-2-ene-5,6-dicarboxylic acid. Examples of the derivatives of unsaturated carboxylic acids include acid anhydrides, acid halides, acid amides, acid imides and acid esters of the above unsaturated carboxylic acids.

Specific examples of such compounds include malenyl chloride, malenyl imide, maleic anhydride, itaconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, hydroxyethyl (meth)acrylate, hydroxypropyl (meth)acrylate, glycidyl (meth)acrylate, aminoethyl methacrylate and aminopropyl methacrylate. Of these, preferred are (meth)acrylic acids, maleic anhydride, hydroxyethyl (meth)acrylate, glycidyl methacrylate and aminopropyl methacrylate.

Examples of the aromatic vinyl compounds include compounds represented by the following formula:

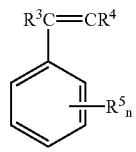

wherein $R^3$ and $R^4$, which may be the same or different, are each hydrogen or an alkyl group of 1 to 3 carbon atoms, specifically a methyl group, an ethyl group, a propyl group or an isopropyl group; $R^5$ denotes a hydrocarbon group of 1 to 3 carbon atoms or a halogen atom, specifically a methyl group, an ethyl group, a propyl group, an isopropyl group, a chlorine atom, a bromine atom or an iodine atom; and n is an integer of 0 to 5, preferably 1 to 5.

Specific examples of the aromatic vinyl compounds represented by the above formula include styrene, α-methylstyrene, o-methylstyrene, p-methylstyrene, m-methylstyrene, p-chlorostyrene, m-chlorostyrene and p-chloromethylstyrene.

Specific examples of the vinyl compounds containing residues of heterocyclic compound include 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

Examples of the vinyl ester compounds are vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-tert-butylbenzoate, vinyl salicylate and vinyl cyclohexanecarboxylate.

Examples of the hydroxyl group-containing ethylenically unsaturated compounds include (meth)acrylic acid esters, such as hydroxyethyl (meth)acrylate, 2-hydroxypropyl (meth)acrylate, 3-hydroxypropyl (meth)acrylate, 2-hydroxy-3-phenoxy-propyl (meth)acrylate, 3-chloro-2-hydroxypropyl (meth)acrylate, glycerol mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate and 2-(6-hydroxyhexanoyloxy)ethyl acrylate; and 10-undecene-1-ol, 1-octene-3-ol, 2-methanol norbornene, hydroxystyrene, hydroxyethyl vinyl ether, hydroxybutyl vinyl ether, N-methylolacrylamide, 2-(meth) acryloyloxyethyl acid phosphate, glycerol monoallyl ether, allyl alcohol, allyloxyethanol, 2-butene-1,4-diol and glycerol monoalcohol.

Examples of the nitrogen-containing ethylenically unsaturated compounds include amino group-containing ethylenically unsaturated compounds containing an ethylenic double bond and an amino group. Specific examples of such compounds include vinyl monomers having at least one amino group or substituted amino group of the following formula:

wherein $R^6$ denotes hydrogen, a methyl group or an ethyl group; $R^7$ is hydrogen, an alkyl group of 1 to 12, preferably 1 to 8 carbon atoms or a cycloalkyl group of 6 to 12, preferably 6 to 8 carbon atoms. The alkyl group and the cycloalkyl group may have a substituent group.

Specific examples of the amino group-containing ethylenically unsaturated compounds include alkyl ester derivatives of acrylic acid or methacrylic acid, such as aminoethyl (meth)acrylate, propylaminoethyl (meth)acrylate, dimethylaminoethylmethacrylate, aminopropyl (meth)acrylate, phenylaminoethyl methacrylate and cyclohexylaminoethyl methacrylate; derivatives of vinylamine, such as N-vinyldiethylamine and N-acetylvinylamine; derivatives of allylamine, such as allylamine, methacrylamine, N-methylacrylamine, N,N-dimethylacrylamide and N,N-dimethylaminopropylacrylamide; derivatives of acrylamide, such as acrylamide and N-methylacrylamide; aminostyrenes, such as p-aminostyrene; and 6-aminohexyl succinimide and 2-aminoethyl succinimide.

The epoxy group-containing ethylenically unsaturated compound is a monomer having at least one polymerizable unsaturated bond and at least one epoxy group in the molecule. Specific examples of the epoxy group-containing ethylenically unsaturated compounds include glycidyl acrylate, glycidyl methacrylate; mono- and di-glycidyl esters of dicarboxylic acid (number of carbon atoms of the alkyl group in the case of monoglycidyl ester: 1 to 12), such as monoglycidyl maleate, diglycidyl maleate, monoglycidyl fumarate, diglycidyl fumarate, monoglycidyl crotonate, diglycidyl crotonate, monoglycidyl tetrahydrophthalate, diglycidyl tetrahydrophthalate, monoglycidyl itaconate, diglycidyl itaconate, monoglycidyl butenetricarboxylate, diglycidyl butenetricarboxylate, monoglycidyl citraconate, diglycidyl citraconate, monoglycidyl ester of endo-cis-bicyclo[2.2.1]hept-5-ene-2,3-dicarboxylic acid (nadic acid™), diglycidyl ester thereof, monoglycidyl ester of endo-cis-bicyclo[2.2.1]hept-5-ene-2-methyl-2,3-dicarboxylic acid (methylnadic acid™), diglycidyl ester thereof, monoglycidyl allylsuccinate and diglycidyl allylsuccinate; and alkylglycidyl p-styrenecarboxylate, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

Of the above radically polymerizable monomers, preferred are aromatic vinyl derivatives, (meth)acrylic acid derivatives, maleic anhydride, vinyl acetate, acrylonitrile, 9-vinyl carbazole, N-vinyl pyrrolidone, N,N-dimethylacrylamide, isobutyl vinyl ether and isobutene. Even more preferred are styrene, maleic anhydride, methyl methacrylate, ethyl methacrylate, tert-butyl methacrylate, vinyl acetate, vinyl acrylate, butyl acrylate, acrylonitrile and vinyl chloride.

Specific examples of the cyclic monomers include β-propiolactone, β-butyrolactone, δ-valerolactone, glycolide, lactide, ε-caprolactone, α-pyrrolidone, γ-butyrolactam, ε-caprolactam, ethyleneoxide, propyleneoxide, epichlorohydrin, oxetane, tetrahydrofuran, aziridine and octamethylcyclotetrasiloxane.

The segment $B^1$, which is bonded in the terminal position of one side to the segment $PO^1$ via the linkage $g^1$, may be bonded in the terminal position of the other side to a polar group selected from an amino group, a halogen atom, an isocyanate group, an aldehyde group, a hydroxyl group, a carboxyl group, an acid anhydride group, a silanol group, a sulfonic group and an epoxy group. In such a case, the polar group may be bonded to the segment $B^1$ via an ester linkage, an ether linkage, an amide linkage, an imide linkage, a urethane linkage, a urea linkage, a silylether linkage or a carbonyl linkage.

The segment $B^1$ has a weight-average molecular weight of, although not particularly limited to, usually 50 to 1,000,000, preferably 100 to 500,000.

The proportion of the segment $B^1$ in the olefin block copolymer (A-1) is, although not particularly limited to, 0.01 to 99.99% by weight, preferably 1 to 99% by weight, more preferably 1 to 95% by weight based on the olefin block copolymer (A-1).

The olefin block copolymer (A-1) has a melt flow rate (MFR: ASTM D 1238, 230° C., 2.16 kg load) of usually 0.01 to 200 g/10 min, preferably 0.05 to 100 g/10 min, more preferably 0.05 to 80 g/10 min.

The olefin block copolymer (A-1) can be prepared, for example, by first producing a polyolefin which links with a Group 13 element in the terminal position, forming a polymerization active species for chain polymerization, e.g., radical polymerization, ring-opening polymerization or ionic polymerization, and performing such a reaction in the presence of the polyolefin, and, according to necessity, converting an end of the segment produced as a result of the chain polymerization, e.g., radical polymerization, ring-opening polymerization or ionic polymerization, to a polar group containing oxygen, nitrogen, silicone or a halogen.

With the blend of a thermoplastic resin, the olefin block copolymer (A-1) can be used for various purposes as the olefin polymer composition (D). The thermoplastic resin used herein is, for example, the thermoplastic resin (C) shown below.

(Thermoplastic Resin (C))

Examples of the thermoplastic resin (C) contained in the olefin polymer composition (D) include polyolefins, polyamides, polyesters, polyacetals, polystyrene, acrylonitrile/butadiene/styrene copolymer (ABS), polycarbonate, polyphenyleneoxide, polyacrylates and polyvinyl chloride.

Specific examples of polyolefins include ethylene polymers, such as ethylene homopolymer, ethylene/α-olefin copolymers and ethylene/polar group-containing vinyl copolymers; propylene polymers, such as propylene homopolymer and propylene/α-olefin copolymers; butene polymers, such as butene homopolymer; 4-methyl-1-pentene polymers, such as 4-methyl-1-pentene homopolymer; 3-methyl-1-butene polymers, such as 3-methyl-1-butene homopolymer; and hexene polymers, such as hexene homopolymer. Of these, ethylene polymers, propylene polymers and 4-methyl-1-pentene polymers are preferred. When the polyolefin is an ethylene polymer, an ethylene/polar group-containing vinyl copolymer is preferred.

Specific examples of the polyesters include aromatic polyesters, such as polyethylene terephthalate, polyethylene naphthalate and polybutylene terephthalate; and aliphatic polyesters, such as polylactic acid, polyglycolic acid, poly-β-hydroxy butyric acid, polycaprolactone, polybutylene succinate, polyethylene succinate and polyhydroxy butyrate. Of these, polyethylene terephthalate is particularly preferred.

Specific examples of the polyamides include aliphatic polyamides, such as nylon-6, nylon-66, nylon-10, nylon-12 and nylon-46; and aromatic polyamides produced from an aromatic dicarboxylic acid and an aliphatic diamine. Of these, nylon-6 is particularly preferred.

Specific examples of the polyacetals include polyformaldehyde (polyoxymethylene), polyacetaldehyde, polypropionaldehyde and polybutylaldehyde. Of these, polyformaldehyde is particularly preferred.

The polystyrene may be a styrene homopolymer or a binary copolymer of styrene and acrylonitrile, methyl methacrylate or α-methylstyrene.

The ABS preferred for use in the invention is one containing structural units derived from acrylonitrile in an amount of 20 to 35% by mol, those from butadiene in an amount of 20 to 30% by mol and those from styrene in an amount of 40 to 60% by mol.

Examples of the polycarbonates include polymers obtained from bis(4-hydroxyphenyl)methane, 1,1-bis(4-hydroxyphenyl)ethane, 2,2-bis(4-hydroxyphenyl)propane or 2,2-bis(4-hydroxyphenyl)butane. Of these, particularly preferred is the polycarbonate obtained from 2,2-bis(4-hydroxyphenyl)propane.

As the polyphenylene oxide, poly(2,6-dimethyl-1,4-phenyleneoxide) is preferable for use.

As the polyacrylate, polymethyl methacrylate and polybutyl acrylate are preferable for use.

These thermoplastic resins (C) can be used either individually or in combination.

The olefin polymer composition (D) ideally contains the olefin block copolymer (A-1) in an amount of 1 to 99% by weight, preferably 50 to 99% by weight, and the thermoplastic resin (C) in an amount of 99 to 1% by weight, preferably 50 to 1% by weight.

The olefin block copolymer (A-1) and the olefin polymer composition (D) may contain other additive, such as a crosslinking agent, a filler, a crosslinking accelerator, a crosslinking assistant, a softener, a tackifier, an anti-aging agent, a foaming agent, a processing assistant, an adhesion improver, an inorganic filler, an organic filler, a crystalline nucleating agent, a heat stabilizer, a weathering stabilizer, an antistatic agent, a colorant, a lubricant, a flame retardant and a blooming inhibitor.

(Crosslinking Agent)

The crosslinking agent can be, for example, sulfur, a sulfur compound or an organic peroxide.

Examples of the sulfur include powdered sulfur, precipitated sulfur, colloidal sulfur, surface-treated sulfur and insoluble sulfur.

Examples of the sulfur compounds include sulfur chloride, sulfur dichloride and high-molecular polysulfides. Also employable are sulfur compounds which release active sulfur at the crosslinking temperature to make crosslinking, such as morpholine disulfide, alkylphenol disulfide, tetramethylthiuram disulfide, dipentamethylenethiuram tetrasulfide and selenium dimethyldithiocarbamate. When the sulfur or the sulfur compound is used as the crosslinking agent, it is preferable to use a crosslinking accelerator in combination.

Examples of the organic peroxides include alkyl peroxides, such as dicumyl peroxide, di-tert-butyl peroxide, di-tert-butylperoxy-3,3,5-trimethylcyclohexane, tert-butylcumyl peroxide, di-tert-amyl peroxide, 2,5-dimethyl-2,5-di(tert-butylperoxy)hexyne-3, 2,5-dimethyl-2,5-di(benzoylperoxy)hexane, 2,5-dimethyl-2,5-di(tert-butylperoxy)hexane, α,α'-bis(tert-butylperoxy-m-isopropyl)benzene and tert-butyl hydroperoxide; peroxy esters, such as tert-butyl peroxyacetate, tert-butyl peroxyisobutyrate, tert-butyl peroxypivalate, tert-butyl peroxymaleate, tert-butyl peroxyneodecanoate, tert-butyl peroxybenzoate and di-tert-butyl peroxyphthalate; and ketone peroxides, such as dicyclohexanone peroxide. These organic peroxides can be used either individually or in combination.

Of these organic peroxides, preferable are those having a temperature, at which their half-life period corresponds to one minute, of 130 to 200° C. Specific examples of such organic peroxides include dicumyl peroxide, di-tert-butyl peroxide, di-tert-butylperoxy-3,3,5-trimethylcyclohexane, tert-butylcumyl peroxide, di-tert-amyl peroxide, tert-butyl hydroperoxide and 2,5-dimethyl-2,5-di-(tert-butylperoxy) hexane. When the organic peroxide is used as the crosslinking agent, it is preferable to use a crosslinking assistant in combination.

Of the above various crosslinking agents, the sulfur and the sulfur compound, particularly the sulfur, is preferable for use because a crosslinked product having excellent properties can be obtained. However, the organic peroxide is the more preferable because of its particularly excellent crosslinking efficiency.

When the crosslinking agent is the sulfur or the sulfur compound, it is used in an amount of usually 0.5 to 10 parts by weight, preferably 0.5 to 9 parts by weight, more preferably 0.5 to 8 parts by weight based on 100 parts by weight of the olefin block copolymer (A-1) or the olefin polymer composition (D). When other crosslinkable copolymer, e.g., an ethylene/triene copolymer, is blended, the crosslinking agent or the like is accordingly increased in weight. In such a case, the crosslinking agent is used in an amount of usually 0.5 to 10 parts by weight, preferably 0.5 to 9 parts by weight, more preferably 0.5 to 8 parts by weight based on 100 parts by weight of the total of the olefin block copolymer (A-1) or the olefin polymer composition (D) and other crosslinkable copolymer. It is the case for other components used in crosslinking, such as a crosslinking assistant and a crosslinking accelerator.

When the crosslinking agent is the organic peroxide, it is used in an amount of 0.05 to 3.0 parts by weight, preferably 0.1 to 1.5 parts by weight based on 100 parts by weight of the olefin block copolymer (A-1) or the olefin polymer composition (D).

The crosslinking agent is used in an amount of usually $1 \times 10^{-5}$ to $1 \times 10^{-1}$ mol, preferably $1 \times 10^{-5}$ to $1 \times 10^{-2}$ mol based on 100 g of the olefin block copolymer (A-1) or the olefin polymer composition (D).

When the crosslinking agent is used in such an amount as the above range, the crosslinking of the olefin block copolymer (A-1) or the olefin polymer composition (D) is appropriately achieved, and the resulting crosslinked product is excellent in rubber properties, such as strain recovery and impact resilience, and in mechanical strength, and can exhibit a good appearance with no surface roughness when extrusion molded into a sheet. And, there is little decrease in the molecular weight of the olefin block copolymer (A-1) or the olefin polymer composition (D), and a film or sheet obtained tends to have excellent mechanical strength.

The crosslinked composition exhibits the rubber characteristics that the tensile strength and the tear strength are high, the surface hardness is low and the elongation set is small, and is excellent in balance of properties as the elastomer in comparison with a conventional composition produced by melt kneading only.

Whether or not the composition has been crosslinked can be judged by boiling the composition in boiling xylene for at least four hours, and filtering it through a 400-mesh wire gauze to check if the residue can be obtained in an amount of 10 parts by weight or more based on 100 parts by weight of the composition.

(Crosslinking Accelerator)

Examples of the crosslinking accelerators include thiazole compounds, such as N-cyclohexyl-2-benzothiazole sulfenamide (CBZ), N-oxydiethylene-2-benzothiazole sulfenamide, N,N-diisopropyl-2-benzothiazole sulfenamide, 2-mercaptobenzothiazole, 2-(2,4-dinitrophenyl) mercaptobenzothiazole, 2-(2,6-diethyl-4-morpholinothio) benzothiazole and dibenzothiazyl disulfide; guanidine compounds, such as diphenylguanidine (DPG), triphenylguanidine, diorthonitrileguanidine, orthonitrile biguanide and diphenylguanidine phthalate; aldehyde amine compounds or aldehyde ammonia compounds, such as acetaldehyde-aniline reaction product, butylaldehyde-aniline condensate, hexamethylenetetramine and acetaldehyde ammonia; imidazoline compounds, such as 2-mercaptoimidazoline; thiourea compounds, such as thiocarbanilide, diethylthiourea, dibutylthiourea, trimethylthiourea and diorthotolylthiourea; thiuram compounds, such as tetramethylthiuram monosulfide, tetramethylthiuram disulfide, tetraethylthiuram disulfide, tetrabutylthiuram disulfide and pentamethylenethiuram tetrasulfide; dithioate compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthate compounds, such as zinc dibutylxanthogenate; and other compounds, such as zinc white.

The crosslinking accelerator is used in an amount of 1 to 20 parts by weight, preferably 2 to 10 parts by weight based on 100 parts by weight of the olefin block copolymer (A-1) or the olefin polymer composition (D).

(Crosslinking Assistant)

The crosslinking assistant is used in crosslinking an organic peroxide. Examples of the crosslinking assistant include sulfur; quinone dioxime compounds, such as p-quinone dioxime and p,p'-dibenzoyl quinone dioxime; polyfunctional monomers, such as, methacrylate compounds, e.g., trimethylolpropane triacrylate and polyethylene glycol dimethacrylate; allyl compounds, such as diallyl phthalate and triallyl cyanurate; maleimide compounds, such as N,N'-m-phenylenebismaleimide; and divinylbenzene.

The crosslinking assistant is used in an amount of 0.5 to 2 mol based on 1 mol of the organic peroxide, preferably in an amount approximately equimolar to that of the organic peroxide. When the crosslinking assistant is used in an amount exceeding the above range, the crosslinking reaction excessively proceeds to deteriorate the fluidity of the composition, in some cases lowering the moldability and yielding a large amount of unreacted monomers remaining in the composition.

(Softener)

As the softeners, those commonly compounded in rubbers can be widely employed. Examples of the softeners include petroleum softeners, such as process oil, lubricating oil, paraffin, liquid paraffin, petroleum asphalt and vaseline; coal tar softeners, such as coal tar and coal tar pitch; fatty oil softeners, such as castor oil, linseed oil, rapeseed oil and coconut oil; tall oil; factice; waxes, such as beeswax, carnauba wax and lanolin; fatty acids and fatty acid salts, such as ricinolic acid, palmitic acid, barium stearate, calcium stearate and zinc laurate; and synthetic polymer substances, such as petroleum resins, atactic polypropylene and coumarone-indene resin. Of these, petroleum softeners are preferably used, and process oil is particularly preferably used.

The softener is used in an amount of 200 parts by weight or less, preferably 5 to 200 parts by weight, more preferably 10 to 150 parts by weight, even more preferably 10 to 100 parts by weight, based on 100 parts by weight of the olefin block copolymer (A-1) or the olefin polymer composition (D).

(Foaming Agent)

As the foaming agent, those commonly used in expansion molding of rubbers can be widely employed. Examples of the foaming agents include inorganic foaming agents, such as sodium bicarbonate, sodium carbonate, ammonium bicarbonate, ammonium carbonate and ammonium nitrite; nitroso compounds, such as N,N'-dimethyl-N,N'-dinitrosoterephthalamide and N,N'-dinitrosopentamethyelnetetramine; azo compounds, such as azodicarbonamide, azobisisobutyronitrile, azocyclohexylnitrile, azodiaminobenzene and barium azodicarboxylate; sulfonylhydrazide compounds, such as benzenesulfonylhydrazide, toluenesulfonylhydrazide, p,p'-oxybis(benzenesulfonylhydrazide) and diphenylsulfone-3,3'-disulfonylhydrazide; and azide compounds, such as calcium azide, 4,4-diphenyldisulfonyl azide and p-toluenesulfonyl azide. Of these, preferable are nitroso compounds, azo compounds and azide compounds.

The foaming agent is used in an amount of 0.5 to 30 parts by weight, preferably 1 to 20 parts by weight, based on 100 parts by weight of the olefin block copolymer (A-1) or the olefin polymer composition (D). The olefin block copolymer (A-1) or the olefin polymer composition (D) containing the foaming agent in the above amount can give a foamed product having an apparent specific gravity of 0.03 to 0.8 g/cm$^3$.

(Foaming Assistant)

A foaming assistant can be used together with the foaming agent. The combined use of a foaming assistant can produce such effects as decrease in the decomposition temperature of the foaming agent, accelerated decomposition and uniformalization of bubbles. Examples of the foaming assistant include organic acids, such as salicylic acid, phthalic acid, stearic acid and oxalic acid; urea and derivatives thereof.

The foaming assistant is used in an amount of 0.01 to 10 parts by weight, preferably 0.1 to 5 parts by weight, based on 100 parts by weight of the olefin block copolymer (A-1) or the olefin polymer composition (D).

(Processing Assistant)

Examples of the processing assistant include higher fatty acids, such as ricinolic acid, stearic acid, palmitic acid and lauric acid; salts of these higher fatty acids, such as barium stearate, zinc stearate and calcium stearate; and esters of these higher fatty acids. The processing assistant is used in appropriate amounts of not more than 10 parts by weight, preferably not more than 5 parts by weight, based on 100 parts by weight of the olefin block copolymer (A-1) or the olefin polymer composition (D).

(Adhesion Improver)

The adhesion improver improves adhesion between a layer containing a crosslinked product and other layer (e.g., decorative layers, such as a coat). Examples of the adhesion improver include organotin compounds, tertiary amine compounds, hydroxyl group-containing (co)polymers and metallic hydroxides.

(Filler)

Fillers are classified into fillers exerting reinforcing effects and fillers exerting no reinforcing effects.

The reinforcing filler exerts effects of enhancing mechanical properties, such as tensile strength, tear strength and abrasion resistance, of the crosslinked product. Examples of such fillers include carbon blacks, such as SRF, GPF, FEF, MAF, HAF, ISAF, SAF, FT and MT; the corresponding carbon blacks which are treated on the surface with a silane coupling agent or the like; silica; activated calcium carbonate; and finely powdered talc. When the carbon black is used as the filler, any carbon black commonly used for rubbers can be used without specific limitation.

The non-reinforcing filler is used for the purpose of increasing hardness of rubber products without exerting a so much influence on the properties and of decreasing the cost. Examples of such fillers include talc, clay and calcium carbonate.

In the present invention, both inorganic fillers and organic fillers can be used.

Examples of the inorganic filler include silica, diatomaceous earth, alumina, titanium oxide, magnesium oxide, pumice powder, pumice balloon, aluminum hydroxide, magnesium hydroxide, basic magnesium carbonate, dolomite, calcium sulfate, calcium titanate, barium sulfate, calcium sulfite, talc, clay, mica, asbestos, glass fiber, glass flake, glass beads, calcium silicate, montmorillonite, bentonite, graphite, aluminum powder and molybdenum sulfide.

Of these, layered compounds are preferred. Particularly preferred are clay minerals that have swelling and cleavage properties in a dispersion medium. The clay minerals are generally classified into a type of two-layer structure wherein a tetrahedral layer of silica carries an octahedral layer having a central metal of, for example, aluminum or magnesium; and a type of three-layer structure wherein an octahedral layer having a central metal of, for example, aluminum or magnesium, is interposed between tetrahedral layers of silica. Exemplary clay minerals of the two-layer structure are kaolinite and antigolite group minerals, and those of the three-layer structure are smectite, vermiculite and mica group minerals, which are classified in terms of the number of cations present between layers.

Specific examples of the clay minerals include kaolinite, dickite, nacrite, halloysite, antigolite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite and chlorite.

Clay minerals treated with an organic matter (such clay minerals will sometimes be referred to as "organically modified clay minerals") may be used as the inorganic layered compound (for information on the clay minerals treated with an organic matter, see CLAY DICTIONARY published by ASAKURA Book Store).

Of the clay minerals, smectite, vermiculite and mica group minerals are preferred from the viewpoint of swelling and cleavage. Smectite group minerals are particularly preferred. Examples of the smectite group minerals include montmorillonite, beidellite, nontronite, saponite, sauconite, stevensite and hectorite.

In the case where a natural-swellable clay mineral is used, the dispersion medium which allows the inorganic layered compound to swell or cleave can be, for example, water; alcohols, such as methanol, ethanol, propanol, isopropanol, ethylene glycol and diethylene glycol; dimethylformaldehyde, dimethylsulfoxide and acetone. Of these, preferred are water and alcohols, such as methanol.

Examples of the dispersion employed in the case where an organically modified clay mineral is used include aromatic hydrocarbons, such as benzene, toluene and xylene; ethers, such as ethyl ether and tetrahydrofuran; ketons, such as aceton, methyl ethyl ketone and methyl isobutyl ketone; aliphatic hydrocarbons, such as n-pentane, n-hexane and n-octane; halogenated hydrocarbons, such as chlorobenzene, carbon tetrachloride, chloroform, dichloromethane, 1,2-dichloroethane and perchloroethylene; ethyl acetate, methyl methacrylate (MMA), dioctyl phthalate (DOP), dimethylformamide, dimethyl sulfoxide, methyl cellosolve and silicone oil.

(Crystalline Nucleating Agent)

Various conventional and known nucleating agents can be used as the crystalline nucleating agent without limitations. Examples of such crystalline nucleating agents include the aromatic phosphates, the benzylidene sorbitols, the aromatic carboxylic acids and the rosin nucleating agents described below.

Examples of the aromatic phosphates include compounds represented by following formula (1):

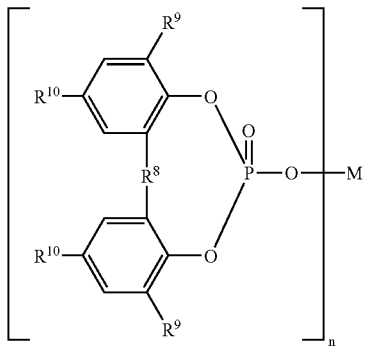

(1)

wherein $R^8$ is an oxygen atom, a sulfur atom or a hydrocarbon group of 1 to 10 carbon atoms; $R^9$ and $R^{10}$, which may be the same or different, are each hydrogen or a hydrocarbon group of 1 to 10 carbon atoms; $R^9$'s, $R^{10}$'s or $R^9$'s and $R^{10}$'s may be bonded to each other to form a ring; M is a metallic atom having a valence of 1 to 3; and n is an integer of 1 to 3.

Specific examples of the compounds represented by formula (1) include sodium-2,2'-methylene-bis(4,6-di-tert-butylphenyl)phosphate, sodium-2,2'-ethylidene-bis(4,6-di-tert-butylphenyl)phosphate, lithium-2,2'-methylene-bis(4,6-di-tert-butylphenyl)phosphate, lithium-2,2'-ethylidene-bis(4,6-di-tert-butylphenyl)phosphate, sodium-2,2'-ethylidene-bis(4-i-propyl-6-tert-butylphenyl)phosphate, lithium-2,2'-methylene-bis(4-methyl-6-tert-butylphenyl)phosphate, lithium-2,2'-methylene-bis(4-ethyl-6-tert-butylphenyl)phosphate, calcium-bis[2,2'-thiobis(4-methyl-6-tert-butylphenyl)phosphate], calcium-bis[2,2'-thiobis(4-ethyl-6-tert-butylphenyl)phosphate], calcium-bis[2,2'-thiobis(4,6-di-tert-butylphenyl)phosphate], magnesium-bis[2,2'-thiobis(4,6-di-tert-butylphenyl)phosphate], magnesium-bis[2,2'-thiobis-(4-tert-octylphenyl)phosphate], sodium-2,2'-butylidene-bis(4,6-di-methylphenyl)phosphate, sodium-2,2'-butylidene-bis(4,6-di-tert-butylphenyl)phosphate, sodium-2,2'-tert-octylmethylene-bis(4,6-di-methylphenyl)phosphate, sodium-2,2'-tert-octylmethylene-bis(4,6-di-tert-butylphenyl)phosphate, calcium-bis-(2,2'-methylene-bis(4,6-di-tert-butylphenyl)phosphate), magnesium-bis[2,2'-methylene-bis (4,6-di-tert-butylphenyl)phosphate], barium-bis[(2,2'-methylene-bis (4,6-di-tert-butylphenyl)phosphate], sodium-2,2'-methylene-bis(4-methyl-6-tert-butylphenyl)phosphate, sodium-2,2'-methylene-bis(4-ethyl-6-tert-butylphenyl) phosphate, sodium(4,4'-dimethyl-5,6'-di-tert-butyl-2,2'-biphenyl)phosphate, calcium-bis[(4,4'-dimethyl-6,6'-di-tert-butyl-2,2'-biphenyl)phosphate], sodium-2,2'-ethylidene-bis (4-m-butyl-6-tert-butylphenyl)phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4,6-di-tert-butylphenyl)phosphate, calcium-bis[2,2'-ethylidene-bis(4,6-di-tert-butylphenyl) phosphate], magnesium-bis[2,2'-ethylidene-bis(4,6-di-tert-butylphenyl)phosphate], barium-bis[2,2'-ethylidene-bis(4,6-di-tert-butylphenyl)phosphate], aluminum-tris[2,2'-methylene-bis(4,6-di-tert-butylphenyl)phosphate], aluminum-tris[2,2'-ethylidene-bis(4,6-di-tert-butylphenyl) phosphate and mixtures thereof. Of these, sodium-2,2'-methylene-bis(4,6-di-tert-butylphenyl)phosphate is preferred.

Examples of the aromatic phosphates include compounds represented by following formula (2):

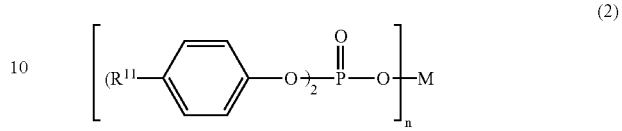

(2)

wherein $R^{11}$ is hydrogen or a hydrocarbon group of 1 to 10 carbon atoms, M is a metallic atom having a valence of 1 to 3, and n is an integer of 1 to 3.

Specific examples of the compounds represented by formula (2) include sodium-bis (4-tert-butylphenyl)phosphate, sodium-bis(4-methylphenyl)phosphate, sodium-bis(4-ethylphenyl)phosphate, sodium-bis(4-i-propylphenyl)phosphate, sodium-bis(4-tert-octylphenyl)phosphate, potassium-bis(4-tert-butylphenyl)phosphate, calcium-bis(4-tert-butylphenyl)phosphate, magnesium-bis(4-tert-butylphenyl) phosphate, lithium-bis(4-tert-butylphenyl)phosphate, aluminum-bis(4-tert-butylphenyl)phosphate and mixtures thereof. Of these, sodium-bis(4-tert-butylphenyl)phosphate is preferred.

Examples of the benzylidene sorbitols include compounds represented by following formula (3):

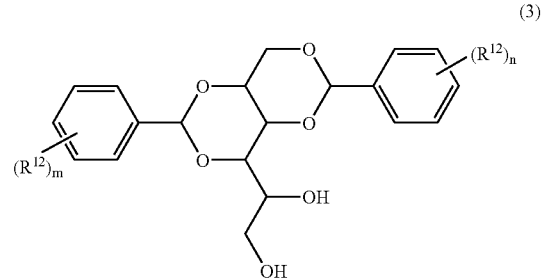

(3)

wherein $R^{12}$, which may be the same or different, are each hydrogen or a hydrocarbon group of 1 to 10 carbon atoms, m and n are each an integer of 0 to 5.

Specific examples of the compounds represented by formula (3) include 1,3,2,4-dibenzylidene sorbitol, 1,3-benzylidene-2,4-p-methylbenzylidene sorbitol, 1,3-benzylidene-2,4-p-ethylbenzylidene sorbitol, 1,3-p-methylbenzylidene-2,4-benzylidene sorbitol, 1,3-p-ethylbenzylidene-2,4-benzylidene sorbitol, 1,3-p-methylbenzylidene-2,4-p-ethylbenzylidene sorbitol, 1,3-p-ethylbenzylidene-2,4-p-methylbenzylidene sorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-tert-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2-4-p-chlorobenzylidene sorbitol, 1,3-p-chlorobenzylidene-2,4-benzylidene sorbitol, 1,3-p-chlorobenzylidene-2,4-p- methylbenzylidene sorbitol, 1,3-p-chlorobenzylidene-2,4-p-ethylbenzylidene sorbitol, 1,3-p-methylbenzylidene-2,4-p-chlorobenzylidene sorbitol, 1,3-p-ethylbenzylidene-2,4-p-chlorobenzylidene sorbitol, 1,3,2,4-di(p-chlorobenzylidene) sorbitol and mixtures thereof. Of these, 1,3,2,4-dibenzylidene sorbitol, 1,3,2,4-di(p-methylbenzylidene)sorbitol, 1,3,2,4-di(p-ethylbenzylidene)sorbitol, 1,3-p-chlorobenzylidene-2,4-p-methylbenzylidene sorbitol, 1,3,2,4-di(p-chlorobenzylidene) sorbitol and mixtures thereof are preferred.

Of the above benzylidene sorbitols, preferred are compounds represented by following formula (4):

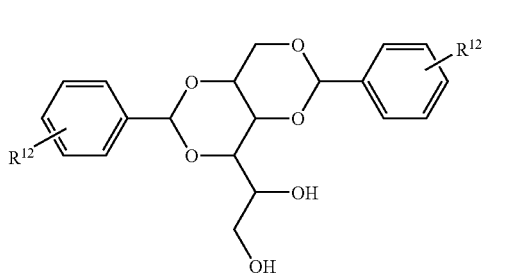

wherein $R^{12}$, which may be the same of different, are each a methyl group or an ethyl group.

Examples of the aromatic carboxylic acids include aluminum hydroxydipara-tert-butyl benzoate represented by following formula (5).

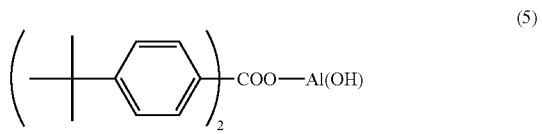

Examples of the rosin crystalline nucleating agents include metallic salts of rosin acid. The metallic salts of rosin acid are the reaction products of rosin acid and a metallic compound. Examples of the rosin acid include natural rosins, such as gum rosin, toll oil rosin and wood rosin; various modified rosins, such as disproportionated rosin, hydrogenated rosin, dehydrogenated rosin, polymerized rosin and rosins modified with an α-β-ethylenically unsaturated carboxylic acid; and purified products of the natural rosins and of the modified rosins. Examples of the unsaturated carboxylic acid used in preparation of the rosins modified with an α,β-ethylenically unsaturated carboxylic acid include maleic acid, maleic anhydride, fumaric acid, itaconic acid, itaconic anhydride, citraconic acid, acrylic acid and methacrylic acid. The rosin acid is preferably at least one rosin acid selected from the group consisting of the natural rosins, the modified rosins, the purified products of the natural rosins and the purified products of the modified rosins. The rosin acids comprehend resin acids selected from pimaric acid, sandaracopimaric acid, parastric acid, isopimaric acid, abietic acid, dehydroabietic acid, neoabietic acid, dihydropimaric acid, dihydroabietic acid and tetrahydroabietic acid.

Examples of the metallic compounds which react with the rosin acid to form a metallic salt include compounds which have such a metallic element as sodium, potassium or magnesium and which can form a salt with the rosin acid. Specific examples include chlorides, nitrates, acetates, sulfates, carbonates, oxides and hydroxides of the above metals.

Other crystalline nucleating agents include high-melting point polymers, metallic salts of aromatic carboxylic acids or aliphatic carboxylic acids and inorganic compounds.

Examples of the high-melting point polymers include polyvinyl cycloalkanes, such as polyvinyl cyclohexane and polyvinyl cyclopentane; poly 3-methyl-1-pentene, poly 3-methyl-1-butene and polyalkenylsilane.

Examples of the metallic salts of aromatic carboxylic acids or aliphatic carboxylic acids include aluminum benzoate, aluminum p-tert-butyl benzoate, sodium adipate, sodium thiophenecarboxylate and sodium pyrolecarboxylate.

The olefin polymer composition (D) can be prepared by a method wherein the components are mixed by a Henschel mixer, a V-type blender, a ribbon blender or a Tumbler mixer, or a method wherein the mixture resulting from the above mixing is melt-kneaded with a single screw extruder, a twin-screw extruder, a kneader or a Banbury mixer, and the kneadate is granulated or pulverized.

(Process for Producing Molded Articles)

The olefin block copolymer (A-1) and the olefin polymer composition (D) can be produced into various molded articles by calendering, extrusion molding, injection molding, blow molding, press molding or stamping molding.

Extrusion molding of the olefin block copolymer (A-1) or the olefin polymer composition (D) can be made by use of conventional extrusion equipments under conventional conditions. For example, the molten olefin block copolymer (A-1) or the molten olefin polymer composition (D) is extruded from a T-die by, for example, a single screw extruder, a kneader, a ram extruder or a gear extruder, and thereby molded into a sheet or a film (unoriented).

An oriented film can be obtained by orientating the extruded sheet or film (unoriented) by a method involving, for example, tentering (lengthwise-crosswise orientation, crosswise-lengthwise orientation), simultaneous-biaxially orientating or uniaxially orientating. The olefin block copolymer (A-1) and the olefin polymer composition (D) can be produced into an inflation film.

Filament can be prepared by extruding the molten polymer or composition through a spinneret. The filament thus prepared may be oriented. The orientation is carried out to such an extent that the molecular orientation can be achieved in at least one direction of the filament. The magnification is preferably about 5 to 10 times. The filament can also be prepared by a melt-blown method.

The olefin block copolymer (A-1) and the olefin polymer composition (D) can be injection-molded into various shapes to provide injection molded articles by use of conventional injection molding equipments under conventional conditions.

The olefin block copolymer (A-1) and the olefin polymer composition (D) can be molded into a blow molded article by use of conventional blow molding equipments under conventional conditions.

In the injection blow molding, the olefin block copolymer (A-1) or the olefin polymer composition (D) is injected into a parison mold at resin temperatures of 100 to 300° C., preferably 100 to 250° C. to form a parison and, after the parison is stored in another mold of a desired shape, air is blown into the parison to firmly fit the parison into the mold, thereby preparing a blow molded article.

It is desirable that the orientation (blow) ratio is 1.1 to 1.8 times in the longitudinal direction and 1.3 to 2.5 times in the transverse direction.

Stamping mold-forming can be named as an example of stamping molding. For example, the olefin block copolymer (A-1) or the olefin polymer composition (D) can be used as a substrate in composite-material integral molding by simultaneous press molding of the substrate with a skin material (stamping mold-forming).

(Uses)

The olefin block copolymer (A-1) and the olefin polymer composition (D) can be used for various purposes. For example, they have the following applications.

(Films and Sheets)

The films and the sheets comprising the olefin block copolymer (A-1) or the olefin polymer composition (D) are excellent in any of softness, transparency, tackiness, antifogging properties, heat resistance and peelability.

(Laminates)

Examples of the laminates containing at least one layer comprising the olefin block copolymer (A-1) or the olefin polymer composition (D) include agricultural films, wrapping films, shrink films, protective films, such separation membranes as plasma component-separation membranes and water-selective pervaporation membranes, and selective separation membranes, such as ion-exchange membranes, battery separators and optical separation membranes.

(Modifiers)

The use of the olefin block copolymer (A-1) or the olefin polymer composition (D) as a modifier for resins can produce effects of improving impact resistance, fluidity, coating properties, crystallizability, adhesion and transparency.

The use of the olefin block copolymer (A-1) or the olefin polymer composition (D) as a modifier for rubbers can produce effects of improving weathering resistance, heat resistance, adhesion and oil resistance.

Examples of these rubbers include crosslinked rubbers, such as natural rubber (NR), isoprene rubber (IR), butadiene rubber (BR), styrene/butadiene rubber (SBR), chloroprene rubber (CR), acrylonitrile/butadiene rubber (NBR), butyl rubber (IIR), ethylene/propylene rubber (EPM, EPDM), chlorosulfonated polyethylene (CSM), acrylic rubber (ACM, ANM and the like), epichlorohydrin rubber (CO, ECO and the like), silicone rubber (Q) and fluororubber (FKM and the like); and thermoplastic rubbers, such as styrene rubbers, olefin rubbers, urethane rubbers, ester rubbers, amide rubbers and vinyl chloride rubbers.

The olefin block copolymer (A-1) and the olefin polymer composition (D) can be used as a modifier for lubricating oils, such as gasoline engine oil, diesel engine oil, engine oil for ships, gear oil, machinery oil, metal processing oil, motor oil, machine oil, spindle oil and insulating oil; and as a viscosity modifier and a freezing-point depressant for the above oils.

The use of the olefin block copolymer (A-1) or the olefin polymer composition (D) as a modifier for waxes can produce effects of improving adhesion, fluidity and strength. Examples of these waxes includes mineral waxes, such as montan wax, peat wax, ozokerite-ceresin wax and petroleum wax; synthetic waxes, such as polyethylene, Fischer-Tropsch wax, chemically modified hydrocarbon wax and substituted amide wax; vegetable wax and animal wax.

The use of the olefin block copolymer (A-1) or the olefin polymer composition (D) as a modifier for cements can produce effects of improving moldability and strength.

Examples of these cements include air setting cements, such as lime, plaster and magnesia cement; hydraulic cements, such as roman cement, natural cement, Portland cement, alumina cement and high sulfate slag cement; and specialty cements, such as acidproof cement, refractory cement, water-glass cement and dental cement.

(Viscosity Modifier and Moldability Improver)

The olefin block copolymer (A-1) and the olefin polymer composition (D) can be used as a viscosity modifier or a moldability improver for inks and paints, such as letterpress ink, litho printing ink, flexograqphic ink, gravure ink, oil paint, cellulose-derivative paint, synthetic resin paint, aqueous baking paint, powdered aqueous paint and Japanese lacquer.

(Materials for Building and Civil Engineering)

The olefin block copolymer (A-1) and the olefin polymer composition (D) can be used for resins and molded articles utilized in building and civil engineering, such as flooring materials, floor tiles, floor sheets, sound-insulating sheets, heat-insulating panels, vibration insulators, decorative sheets, skirts, asphalt modifiers, gaskets, sealants, roofing sheets and waterstops.

(Automobile Interior and Exterior Parts and Gasoline Tanks)

The automobile interior and exterior parts and the gasoline tanks comprising the olefin block copolymer (A-1) or the olefin polymer composition (D) have excellent rigidity, impact resistance, oil resistance and heat resistance.

(Electric and Electronic Parts)

The olefin block copolymer (A-1) and the olefin polymer composition (D) can be used for electric and electronic parts. Examples of such electric and electronic parts include electric insulation materials, apparatuses for handling electronic parts, magnetic recording medium, binders in magnetic recording medium, sealants in electric circuit, materials for home electric appliances, containers, such as microwavable containers, microwavable films, polyelectrolyte substrates and electroconductive alloy substrates. Other exemplary electric and electronic parts are such electric and electronic parts as represented by connecters, sockets, resistors, coil bobbins in relay case switch , condensers, variable condenser cases, optical pickups, optical connectors, oscillators, various terminal blocks, transformers, plugs, printed wiring boards, tuners, loudspeakers, microphones, headphones, miniature motors, magnetic head bases, power modules, housings, semiconductors, liquid crystal display parts, FDD carriages, FDD chassises, HDD parts, motor blush holders, parabolic antennas and computer components; such domestic and office electrical-appliance components as represented by VTR components, television components, irons, hair driers, rice cooker components, microwave oven components, acoustic components, sound apparatus components, such as audio laser discs and compact discs, light fitment components, refrigerator components, air conditioner components, type writer components and word processor components; office computer components, telephone components, facsimile components, copying machine components, magnetic shielding materials, loudspeaker cone materials and oscillators for loudspeaker.

(Aqueous Emulsion)

The aqueous emulsion (aqueous resin dispersion) comprising the olefin block copolymer (A-1) or the olefin polymer composition (D) may be used as an adhesive for bonding polyolefins, which has excellent heat-sealing properties.

(Coating Base)

The solvent dispersion (oily resin dispersion) comprising the olefin block copolymer (A-1) or the olefin polymer composition (D) is excellent in dispersion stability in a solvent and exhibits good adhesion in bonding metals or polar resins with polyolefins.

(Medical and Sanitary Materials)

The olefin block copolymer (A-1) and the olefin polymer composition (D) may be used for medical goods and materials, such as nonwoven fabrics, nonwoven fabric laminates, electrets, medical tubes, medical containers, infusion solution bags, prefill syringes and syringes; artificial organs, artificial muscles, filtration films, food sanitation goods, health appliances, retort bags and freshness-keeping packaging films.

(Miscellaneous Goods)

The olefin block copolymer (A-1) and the olefin polymer composition (D) can be used for stationery products, such as desk mats, cutting mats, rulers, pen barrels, pen grips, pen caps, grips of scissors and paper cutter, magnet sheets, pencil cases, paper dispensers, binders, label seals, tapes and whiteboards; convenience goods for daily use, such as clothes, curtains, bed sheets, carpets, doormats, bathmats, buckets, hoses, bags, planters, filters of air conditioner or exhaust fan, dishes, trays, cups, lunch boxes, funnels for siphon coffee maker, eyeglass frames, containers, storage cases, clothes hangers, ropes and wash nets; sporting goods, such as shoes, goggles, skis, rackets, balls, tents, water glasses, flippers, fishing poles, coolers, leisure sheets and nets for sporting activities; playthings, such as blocks and cards; containers, such as kerosene tanks, drums and bottles of detergent or shampoo; and indicators, such as advertising displays, pylons and plastic chains.

(Environmentally Degradable Resin)

The environmentally degradable resins comprising the olefin block copolymer (A-1), and the environmentally degradable resin compositions containing the copolymer (A-1) are excellent in practical properties, such as heat resistance and impact resistance.

The environmentally degradable resins (resin compositions) can be used for packages for such fresh food as fishes, vegetables and eggs offered in supermarkets; packages for such takeout food as cold meal and prepared food; beverage cups; packages for noodles (e.g. Chinese noodle); disposable packages for outdoor activities; agricultural films, such as gardening houses and tunnel houses; fishery items, such as fish nets, fish lines and fish hooks; cloth for outdoor activities, such as raincoats and tents; water-retentive materials and films easily degradable in environment; and films, sheets and packages imparted with biodegradability.

(Modifier for Filler)

The olefin block copolymer (A-1) and the olefin polymer composition (D) can be suitably used as a dispersion improver for fillers and as an additive for preparing a filler improved in dispersion properties.

(Compatibilizer)

The olefin block copolymer (A-1) and the olefin polymer composition (D) can be used as a compatibilizer. When the olefin block copolymer (A-1) or the olefin polymer composition (D) is used as a compatibilizer, a polyolefin and a thermoplastic resin containing a polar group can be mixed in an arbitrary proportion. Since the olefin block copolymer (A-1) comprises a polyolefin segment and a functional segment, components which are normally incompatible with each other can be incorporated and the elongation at break can be significantly improved in comparison with the nonuse of the olefin block copolymer.

(Others)

In addition to the above uses, the olefin block copolymer (A-1) and the olefin polymer composition (D) can be used for microcapsules, PTP packages, chemical valves and drug delivery system.

Examples of the olefin block copolymer (A-1) include an olefin block copolymer (A-11) wherein the segment $PO^1$ is a polyolefin segment obtained by polymerizing at least one monomer selected from branched olefins, cycloolefins, conjugated dienes and non-conjugated polyenes, optionally together with at least one α-olefin selected from linear α-olefins of 2 to 20 carbon atoms; an olefin block copolymer (A-12) wherein the segment $PO^1$ is a polyolefin segment containing long-chain branches, which is obtained by polymerizing at least one olefin selected from olefins of 2 to 20 carbon atoms; an olefin block copolymer (A-13) wherein the segment $PO^1$ has a weight-average molecular weight of less than 2000; an olefin block copolymer (A-14) wherein the segment $B^1$ has a weight-average molecular weight of less than 500; and an olefin block copolymer wherein the linkage $g^1$ is an ether linkage, an ester linkage or an amide linkage, and the segment $B^1$ is obtained by chain polymerization.

The olefin block copolymers (A-11) to (A-14) will be described in detail thereinafter.

Olefin Block Copolymers (A-11) and (A-12)

In the olefin block copolymer (A-11), the segment $PO^1$ is a polyolefin segment obtained by polymerization, preferably coordination anionic polymerization of at least one monomer selected from branched olefins, cycloolefins, conjugated dienes and non-conjugated polyenes, optionally together with at least one α-olefin selected from linear α-olefins of 2 to 20 carbon atoms. Specifically, the segment $PO^1$ of the olefin block copolymer (A-11) is a homopolymer or a copolymer of at least one monomer selected from branched olefins, cycloolefins, conjugated dienes and non-conjugated polyenes, optionally together with at least one α-olefin selected from linear α-olefins of 2 to 20 carbon atoms.

Examples of the branched olefins, the cycloolefins, the conjugated dienes, the non-conjugated polyenes and the linear α-olefins of 2 to 20 carbon atoms are as described above. When the polyolefin segment has stereoregularity, the polyolefin may be either an isotactic polyolefin or a syndiotactic polyolefin.

When the segment $PO^1$ is obtained from a branched olefin, such as poly 4-methyl-1-pentene or poly 3-methyl-1-butene, the olefin block copolymer (A-11) can be of high-melting point and of high performance.

When the segment $PO^1$ is a polycycloolefin, a high glass transition temperature can be attained even without crystals so that the olefin block copolymer (A-11) has high heat resistance. The combination of ethylene, a cycloolefin and other α-olefin makes it possible to control the glass transition temperature, which results in obtaining the olefin block copolymer (A-11) having such soft touch at room temperature as a flexible polyvinyl chloride has.

When the segment $PO^1$ contains repeating units derived from a conjugated diene or a non-conjugated polyene, the olefin block copolymer (A-11) can be suitably used for such uses as crosslinking and foaming.

In the olefin block copolymer (A-11), the segment PO$^1$ is preferably obtained by polymerizing or copolymerizing at least one olefin selected from branched olefins. Specifically, the segment PO$^1$ is preferably composed of a 4-methyl-1-pentene polymer, such as 4-methyl-1-pentene homopolymer, or a 3-methyl-1-butene polymer, such as 3-methyl-1-butene homopolymer.

In the olefin block copolymer (A-12), the segment PO$^1$ is a polyolefin segment containing long-chain branches, which is obtained by polymerization, preferably coordination anionic polymerization of at least one olefin selected from olefins of 2 to 20 carbon atoms.

Examples of the olefins having 2 to 20 carbon atoms include the linear α-olefins of 2 to 20 carbon atoms, the branched olefins, the cycloolefins, the conjugated dienes and the non-conjugated polyenes described above.

Preferably, the segment PO$^1$ of the olefin block copolymer (A-12) is obtained from ethylene and a linear α-olefin of 3 to 20 carbon atoms or a branched olefin.

The fact that the segment PO$^1$ contains long-chain branches can be confirmed based on the criterion formula disclosed in JP-A-7(1995)/500622.

$$I_{10}/I_2 \geq (Mw/Mn)+4.63 \qquad (6)$$

wherein $I_{10}$ denotes a melt index measured at 190° C. under 10 kg load; $I_2$ denotes a melt index measured at 190° C. under 2.14 kg load; and Mw and Mn denote a weight-average molecular weight (Mw) and a number-average molecular weight (Mn), respectively, determined according to GPC in a solvent of orthodichlorobenzene at 140° C.

The segment PO$^1$ contains long-chain branches when it satisfies formula (6).

Whether or not the segment PO$^1$ satisfies formula (6) may be judged based on the polyolefin constituting the segment PO$^1$. Otherwise, the linkage g$^1$ of the olefin block copolymer (A-12) is cut by use of, for example, light, oxygen, acid or alkali to separate components derived from the segment PO$^1$ and components derived from the segment B$^1$. Whether formula (6) is satisfied can be judged based on the results of measurement of $I_{10}$, $I_2$, Mw and Mn of the components derived from the segment PO$^1$.

When the segment PO$^1$ contains long-chain branches, the olefin block copolymer (A-12) is excellent in melt tension and exhibits excellent moldability in molding of films, sheets and blow molded articles. In the injection molding, the surface smoothness can be attained, and molded articles having excellent appearance can be obtained.

Referring to the olefin block copolymers (A-11) and (A-12), the segment PO$^1$ has a weight-average molecular weight of preferably 2,000 or more, still preferably from 2,000 to 5,000,000, particularly preferably 2,000 to 1,000,000, even more preferably 10,000 to 800,000.

In the olefin block copolymers (A-11) and (A-12), the segment PO$^1$ preferably has a molecular weight distribution (Mw/Mn) determined by a gel permeation chromatography of 2.5 or less.

In the olefin block copolymers (A-11) and (A-12), the linkage g$^1$ is an ether linkage, an ester linkage or an amide linkage, preferably an ether linkage.

In the olefin block copolymers (A-11) and (A-12), the segment B$^1$ is a functional segment obtained by chain polymerization, preferably containing repeating units containing an unsaturated hydrocarbon and/or repeating units containing a hetero atom. More preferably, the segment B$^1$ is a functional segment obtained by radical polymerization, ring-opening polymerization or ionic polymerization. Particularly preferably, it is a functional segment obtained by radical polymerization or ring-opening polymerization.

The functional segment is obtained by chain-polymerizing at least one chain-polymerizable monomer. For example, it can be prepared by radical polymerization of at least one radically polymerizable monomer, ring-opening polymerization of at least one cyclic monomer, or ionic polymerization of at least one ionically polymerizable monomer.

Examples of the radically polymerizable monomer used in the radical polymerization include the unsaturated carboxylic acids, the derivatives thereof, the aromatic vinyl compounds, the vinyl compounds containing residues of heterocyclic compound, the hydroxyl group-containing ethylenically unsaturated compounds, the nitrogen-containing ethylenically unsaturated compounds, the epoxy group-containing ethylenically unsaturated compounds, the vinyl ester compounds and the vinyl chloride described above.

Examples of the cyclic monomer used in the ring-opening polymerization include the lactone, the lactam, the 2-oxazoline and the cyclic ethers described above.

Specific examples of the ionically polymerizable monomer used in the ionic polymerization include anionically polymerizable monomers, such as (meth)acrylic esters, acrylonitrile and acrylamide.

Of these, preferred are ε-caprolactone, ε-caprolactam and ethyleneoxide.

In the olefin block copolymers (A-11) and (A-12), the segment B$^1$ is preferably composed of a styrene polymer, a vinyl acetate polymer, an acrylic ester polymer, a methacrylic ester polymer, a vinylformamide polymer, an acrylamide polymer, a cyclic ester polymer, a cyclic amide polymer, a cyclic ether polymer, an oxazoline polymer or a fluorine-containing polymer.

Polymers obtained by radical polymerization or ring-opening polymerization are also preferable.

In the olefin block copolymers (A-11) an (A-12), the segment B$^1$ ideally has a weight-average molecular weight of usually 500 or more, preferably from 500 to 5,000,000, more preferably 5,000 to 1,000,000, even more preferably 5,000 to 800,000.

The segment B$^1$ is ideally contained in the olefin block copolymer (A-11) or (A-12) in an amount of, although not particularly limited to, 0.01 to 99.99% by weight, preferably 1 to 99% by weight, more preferably 1 to 95% by weight based on the weight of the olefin block copolymer (A-11) or (A-12).

The olefin block copolymers (A-11) and (A-12) ideally have a melt flow rate (MFR: ASTM D 1238, 230° C., 2.16 kg load) of usually 0.01 to 200 g/10 min, preferably 0.05 to 100 g/10 min, more preferably 0.05 to 80 g/10 min.

Specific examples of the olefin block copolymers (A-11) and (A-12) include the following.

(1) A block copolymer in which the segment PO$^1$ is a copolymer comprising ethylene, a cycloolefin, and optionally an α-olefin of 3 to 20 carbon atoms (preferably propylene or butene) (ethylene content: 1 to 99 mol %, cycloolefin content: 1 to 50 mol %, α-olefin content: 0 to 50 mol %, Mw: 10,000 to 1,000,000); the linkage g$^1$ is an ether linkage; and the segment B$^1$ is a (meth)acrylic ester polymer, such as polymethyl methacrylate (Mw: 500 to 1,000,000) or a polymer of aromatic vinyl compound, such as polystyrene (Mw: 500 to 1,000,000).

When the segment PO$^1$ is an ethylene/propylene/cycloolefin copolymer, the copolymer is excellent in moldability so that wire-coating materials excellent in shape memory properties can be obtained. When the segment B$^1$ is polymethyl methacrylate or polystyrene, wire-coating materials obtained are excellent in elongation at break because the copolymer has excellent heat resistance and adhesion to inorganic fillers as well as excellent moldability. Although the olefin block copolymer can be used as a wire-coating material without incorporation of a filler or the like, addition of an inorganic filler, such as magnesium hydroxide, or a crosslinking agent, such as vinyl trimethoxysilane, is preferred.

(2) A block copolymer in which the segment $PO^1$ is an α-olefin/conjugated polyene copolymer or an α-olefin/non-conjugated polyene, such as a copolymer of ethylene, an α-olefin of 3 to 20 carbon atoms and a non-conjugated polyene (ethylene content/α-olefin content=95/5 to 55/45 (molar ratio)); the linkage $g^1$ is an ether linkage or an amide linkage; and the segment $B^1$ is a polymer obtained from an aromatic vinyl compound or a vinyl compound containing residues of heterocyclic compound, or a copolymer thereof.

Such olefin block copolymers are suitable to use as a modifier for rubbers.

(Production Process)

The olefin block copolymers (A-11) and (A-12) can be prepared by, for example, first producing a polyolefin which links with a Group 13 element in the terminal position, then forming in the presence of the polyolefin a polymerization active species for such chain polymerization as radical polymerization, ring-opening polymerization or ionic polymerization, and performing such a reaction.

The polyolefin which links with a Group 13 element in the terminal position can be prepared by coordination polymerization of transition metals. For example, it can be prepared by homopolymerizing or copolymerizing the above olefin of 2 to 20 carbon atoms in the presence of a conventional olefin polymerization catalyst. The resulting polyolefin can be the segment $PO^1$ of the olefin block copolymer (A-11) or (A-12).

The polyolefin constituting the segment $PO^1$ of the olefin block copolymer (A-11) can be produced as follows.

The conventional olefin polymerization catalyst used in producing the polyolefin constituting the segment $PO^1$ can be, for example, a $TiCl_3$ catalyst, an $MgCl_2$-supported $TiCl_4$ catalyst, a metallocene catalyst or a post-metallocene catalyst. Of these, a metallocene catalyst is preferred.

Conventional metallocene catalysts can suitably be used. Examples of the metallocene catalysts include metallocene compounds of such a transition metal as titanium, vanadium, chromium, zirconium or hafnium. The metallocene compounds used can be either liquid or solid under use conditions. The metallocene compounds do not need to be a single compound, and may be supported on other compound, be a uniform mixture with other compound or be a complex compound or a composite compound with other compound.

Of the conventional metallocene catalysts, the metallocene compounds having a chiral structure with C2 symmetry or C1 symmetry are suitably used in preparing the polyolefin.

Examples of the preferred metallocene compounds having a chiral structure with C2 symmetry include
rac-ethylene-bis(indenyl)zirconium dichloride,
rac-ethylene-bis(tetrahydroindenyl)zirconium dichloride,
rac-dimethylsilylene-bis(2,3,5-trimethylcyclopentadienyl) zirconium dichloride,
rac-dimethylsilylene-bis[1-(4-phenylindenyl)]zirconium dichloride,
rac-dimethylsilylene-bis[1-(2-methyl-4-phenylindenyl)]zirconium dichloride,
rac-dimethylsilylene-bis{1-[2-methyl-4-(1-naphthyl)indenyl]}zirconium dichloride,
rac-dimethylsilylene-bis{1-[2-methyl-4-(2-naphthyl)indenyl]}zirconium dichloride,
rac-dimethylsilylene-bis{1-[2-methyl-4-(1-anthracenyl)indenyl]}zirconium dichloride,
rac-dimethylsilylene-bis{1-[2-methyl-4-(9-anthryl)indenyl]}zirconium dichloride,
rac-dimethylsilylene-bis{1-[2-methyl-4-(9-phenanthryl)indenyl]}zirconium dichloride,
rac-dimethylsilylene-bis{1-[2-methyl-4-(o-chlorophenyl) indenyl]}zirconium dichloride,
rac-dimethylsilylene-bis{1-[2-methyl-4-(pentafluorophenyl)indenyl]}zirconium dichloride,
rac-dimethylsilylene-bis[1-(2-ethyl-4-phenylindenyl)]zirconium dichloride,
rac-dimethylsilylene-bis{1-[2-ethyl-4-(1-naphthyl)indenyl]}zirconium dichloride,
rac-dimethylsilylene-bis{1-[2-ethyl-4-(9-phenanthryl)indenyl]}zirconium dichloride,
rac-dimethylsilylene-bis[1-(2-n-propyl-4-phenylindenyl)] zirconium dichloride,
rac-dimethylsilylene-bis{1-[2-n-propyl-4-(1-naphthyl)indenyl]}zirconium dichloride and
rac-dimethylsilylene-bis{1-[2-n-propyl-4-(9-phenanthryl) indenyl]}zirconium dichloride.

Examples of the preferred metallocene compounds having a chiral structure with C1 symmetry include
ethylene [2-methyl-4-(9-phenanthryl)-1-indenyl](9-fluorenyl)zirconium dichloride,
ethylene[2-methyl-4-(9-phenanthryl)-1-indenyl](2,7-dimethyl-9-fluorenyl)zirconium dichloride,
dimethylsilylene(9-fluorenyl)(3-tert-butylcyclopentadienyl) zirconium dichloride and
diphenylsilylene(9-fluorenyl)(3-tert-butylcyclopentadienyl) zirconium dichloride.

Examples of the conventional metallocene compounds suitably used include metallocene compounds having only one substituted cyclopentadienyl group, such as
(tert-butylamido)(tetramethyl-$\eta^5$-cyclopentadienyl)-1,2-ethanediyl zirconium dichloride,
(tert-butylamido)(tetramethyl-$\eta^5$-cyclopentadienyl)-1,2-ethanediyl titanium dichloride,
(methylamido)(tetramethyl-$\eta^5$-cyclopentadienyl)-1,2-ethanediyl zirconium dichloride,
(methylamido)(tetramethyl-$\eta^5$-cyclopentadienyl)-1,2-ethanediyl titanium dichloride,
(ethylamido)(tetramethyl-$\eta^5$-cyclopentadienyl)methylene titanium dichloride,
(tert-butylamido)dimethyl(tetramethyl-$\eta^5$-cyclopentadienyl)silane titanium dichloride,
(tert-butylamido)dimethyl(tetramethyl-$\eta^5$-cyclopentadienyl)silane zirconium dibenzyl,
(benzylamido)dimethyl(tetramethyl-$\eta^5$-cyclopentadienyl) silane titanium dichloride and
(phenylphosphido)dimethyl(tetramethyl-$\eta^5$-cyclopentadienyl)silane zirconium dibenzyl.

Examples of the conventional metallocene compounds suitably used further include metallocene compounds having two substituted cyclopentadienyl groups which are not bonded via such a bonding group as a (substituted) alkylene or a (substituted) silylene.

Such metallocene compounds include
bis(methylcyclopentadienyl)zirconium dichloride,
bis(dimethylcyclopentadienyl)zirconium dichloride,
bis(dimethylcyclopentadienyl)zirconium ethoxychloride, bis(dimethylcyclopentadienyl)zirconium bis(trifluoromethane sulfonate),
bis(ethylcyclopentadienyl)zirconium dichloride,
bis(methylethylcyclopentadienyl)zirconium dichloride,
bis(propylcyclopentadienyl)zirconium dichloride,
bis(methylpropylcyclopentadienyl)zirconium dichloride,
bis(butylcyclopentadienyl)zirconium dichloride,
bis(methylbutylcyclopentadienyl)zirconium dichloride,
bis(methylbutylcyclopentadienyl)zirconium bis(methanesulfonate),
bis(trimethylcyclopentadienyl)zirconium dichloride,
bis(tetramethylcyclopentadienyl)zirconium dichloride,
bis(pentamethylcyclopentadienyl)zirconium dichloride,
bis(hexylcyclopentadienyl)zirconium dichloride and
bis(trimethylsilylcyclopentadienyl)zirconium dichloride.

The metallocene compounds may be used either individually, in combination or together with other olefin polymerization catalyst, such as a $TiCl_3$ catalyst, an $MgCl_2$-supported $TiCl_4$ catalyst or a post-metallocene catalyst.

In production of the polyolefin, the metallocene compound is used in combination with the following organometallic catalyst component. The metallocene compound is used in combination with the organometallic catalyst compound even when a $TiCl_3$ catalyst, an $MgCl_2$-supported $TiCl_4$ catalyst or a post-metallocene catalyst is used.

The post-metallocene catalyst is a transition-metal complex containing a nitrogen atom or an oxygen atom in the ligand. Conventional transition-metal complexes are suitably used. Examples of the post-metallocene catalyst include the transition-metal complexes described in the following literature.

(1) M. Brookhart et al., J. Am. Chem. Soc. 1995, 117, 6414–6415
(2) M. Brookhart et al., J. Am. Chem. Soc. 1996, 118, 267–268
(3) D. H. McConville et al., Macromolecules 1996, 29, 5241–5243
(4) R. F. Jordan et al., Organometallics 1997, 16, 3282–3302
(5) R. H. Grubbs et al., Organometallics 1998, 17, 3149–3151
(6) S. Collins et al., Organometallics 1999, 18, 2731–2733
(7) M. S. Eisen et al., Organometallics 1998, 17, 3155–3157
(8) M. S. Eisen et al., J. Am. Chem. Soc. 1998, 120, 8640–8646
(9) R. F. Jordan et al., J. Am. Chem. Soc. 1997, 119, 8125–8126
(10) K. Hakala et al., Macromol. Rapid Commun. 18, 635–638 (1997)

The organometallic catalyst component preferably contains an element selected from Group 13 of the Periodic Table. Examples of the preferred organometallic catalyst component include organoaluminum compounds, organoboron compounds and alkyl complex compounds of a Group 1 element of the Periodic Table and aluminum or boron.

Examples of the organoaluminum compounds include compounds represented by following formula:

$$R^a{}_n AlX_{3-n}$$

wherein $R^a$ denotes a hydrocarbon group of 1 to 12 carbon atoms, X denotes a halogen or hydrogen, and n ranges 0 to 3.

In the formula, $R^a$ is a hydrocarbon group of 1 to 12 carbon atoms, such as an alkyl group, a cycloalkyl group or an aryl group. Specific examples include methyl, ethyl, n-propyl, isopropyl, isobutyl, pentyl, hexyl, octyl, cyclopentyl, cyclohexyl, phenyl and tolyl.

Examples of the organoaluminum compounds include trialkylaluminums, such as trimethylaluminum, triethylaluminum, triisopropylaluminum, triisobutylaluminum, trioctylaluminum and tri 2-ethylhexylaluminum;
trialkenylaluminums, such as triisoprenylaluminum;
dialkylaluminum halides, such as dimethylaluminum chloride, diethylaluminum chloride, diisopropylaluminum chloride, diisobutylaluminum chloride and dimethylaluminum bromide;
alkylaluminum sesquihalides, such as methylaluminum sesquichloride, ethylaluminum sesquichloride, isopropylaluminum sesquichloride, butylaluminum sesquichloride and ethylaluminum sesquibromide;
alkylaluminum dihalides, such as methylaluminum dichloride, ethylaluminum dichloride, isopropylaluminum dichloride and ethylaluminum dibromide; and
alkylaluminum hydrides, such as diethylaluminum hydride, diisobutylaluminum hydride and ethylaluminum dihydride.

Compounds represented by the following formula also may be employed as the organoaluminum compound:

$$R^a{}_n AlY_{3-n}$$

wherein $R^a$ is as described above,
Y is $-OR^b$, $-OSiR^c{}_3$, $-OAlR^d{}_2$, $-NR^e{}_2$, $-SiR^f{}_3$ or $-N(R^g)AlR^h{}_2$,
n is 1 or 2,
$R^b$, $R^c$, $R^d$ and $R^h$ are each methyl, ethyl, isopropyl, isobutyl, cyclohexyl or phenyl,
$R^e$ is hydrogen, methyl, ethyl, isopropyl, phenyl or trimethylsilyl, and
$R^f$ and $R^g$ are each methyl or ethyl.

Examples of such organoaluminum compounds include the following compounds.

(i) Compounds represented by $R^a{}_n Al(OR^b)_{3-n}$, such as dimethylaluminum methoxide, diethylaluminum ethoxide and diisobutylaluminum methoxide.

(ii) Compounds represented by $R^a{}_n Al(OSiR^c)_{3-n}$, such as $Et_2Al(OSiMe_3)$, $(iso-Bu)_2Al(OSiMe_3)$ and $(iso-Bu)_2Al(OSiEt_3)$.

(iii) Compounds represented by $R^a{}_n Al(OAlR^d{}_2)_{3-n}$, such as $Et_2AlOAlEt_2$ and $(iso-Bu)_2AlOAl(iso-Bu)_2$.

(iv) Compounds represented by $R^a{}_n Al(NR^e{}_2)_{3-n}$, such as $Me_2AlNEt_2$, $Et_2AlNHMe$, $Me_2AlNHEt$, $Et_2AlN(Me_3Si)_2$ and $(iso-Bu)_2AlN(Me_3Si)_2$.

(v) Compounds represented by $R^a{}_n Al(SiR^f{}_3)_{3-n}$, such as $(iso-Bu)_2AlSiMe_3$.

(vi) Compounds represented by $R^a{}_n Al[N(R^g)-AlR^h{}_2]_{3-n}$, such as $Et_2AlN(Me)-AlEt_2(iso-Bu)_2$ and $AlN(Et)Al(iso-Bu)_2$.

Examples further include compounds analogous to the above compounds, such as organoaluminum compounds in which at least two aluminums are bonded via an oxygen atom or a nitrogen atom. Specific examples thereof include $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$.

Examples further include aluminoxanes, such as methylaluminoxane, ethylaluminoxane, propylaluminoxane and butylaluminoxane.

Organoaluminum compounds represented by the following formula are also employable:

$$R^a AlXY$$

wherein $R^a$, X and Y are as mentioned above.

Examples of the organoboron compounds include triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, tris(3, 5-dimethylphenyl)boron, thexylborane, dicyclohexylborane, dicyamylborane, diisopinocamphenylborane, 9-borabicyclo[3,3,1]nonane, dimethylborane, dichloroborane, catecholborane, B-bromo-9-borabicyclo[3,3,1]nonane, borane-triethylamine complex and borane-methylsulfide complex.

Ionic boron compounds may be used as the organoboron compound. Examples of such compounds include triethylammonium tetra(phenyl)boron, tripropylammonium tetra(phenyl)boron, trimethylammonium tetra(p-tolyl)boron, trimethylammonium tetra(o-tolyl)boron, tri(n-butyl) ammonium tetra(pentafluorophenyl)boron, tripropylammonium tetra(o,p-dimethylphenyl)boron, tri(n-butyl)ammonium tetra(p-trifluoromethylphenyl)boron, N,N-dimethylanilinium tetra(phenyl)boron, dicyclohexylammonium tetra(phenyl)boron, triphenylcarbenium tetrakis(pentafluorophenyl)borate, N,N-dimethylanilinium tetrakis(pentafluorophenyl)borate, bis[tri(n-butyl)ammonium]nonaborate and bis[tri(n-butyl)ammonium]decaborate.

Examples of the alkyl complex compound of a Group 1 element of the Periodic Table and aluminum include compounds represented by the following formula;

wherein $M^1$ denotes Li, Na or K, and $R^j$ denotes a hydrocarbon group of 1 to 15 carbon atoms.

Specific examples thereof include $LiAl(C_2H_5)_4$ and $LiAl(C_7H_{15})_4$.

Examples of the organoboron compound and those of the alkyl complex compound of a Group 1 element of the Periodic Table and boron include corresponding compounds to the organoaluminum compounds and to the alkyl complex compounds of a Group 1 element of the Periodic Table and aluminum wherein the aluminum is substituted with boron, respectively.

These organometallic catalyst components can be used either individually or in combination.

With respect to the organometallic catalyst component, a compound having a bond of hydrogen and a Group 13 element is preferably used in combination with a trialkylaluminum, an aluminoxane or an ionic boron compound. The compound having a bond of hydrogen and a Group 13 element preferably has a bond of hydrogen and boron. Preferably, these compounds are used in the polymerization after having been mixed with each other, or a trialkylaluminum, an aluminoxane or an ionic boron compound is first individually used to initiate the polymerization and the compound having a bond of hydrogen and a Group 13 element is added into the polymerization system.

Examples of the compound having a bond of hydrogen and a Group 13 element include such organoaluminum compounds as diethylaluminum hydride, diisobutylaluminum hydride and ethylaluminum dihydride; and such organoboron compounds as 9-borabicyclo[3,3,1]nonane, dimethylborane, dichloroborane and catecholborane.

The olefin polymerization catalyst may be pre-polymerized. There is no limitation on the process for conducting the pre-polymerization. For example, the pre-polymerization is preferably carried out in the presence of an inert solvent and under relatively mild conditions by adding an olefin and the catalyst components to the inert solvent. The pre-polymerization may be carried out under either conditions such that the resulting pre-polymer is dissolved in the polymer medium or conditions such that it is not dissolved therein. Preferably, the pre-polymerization is carried out under conditions such that the resulting pre-polymer is not dissolved in the polymer medium.

Examples of olefins used in the pre-polymerization include α-olefins of 2 or more carbon atoms. Specific examples include ethylene, propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. They may be used in combination. The α-olefin used in the pre-polymerization may be the same as or different from that used in the olefin polymerization mentioned later. Preferably, the α-olefin is the same as that used in the olefin polymerization.

Examples of the inert solvent include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride and chlorobenzene. They may be used in combination.

Of the above inert solvents, the aliphatic hydrocarbons are particularly suitable to use. The pre-polymerization may be carried out in a state where the α-olefin is liquid, or under gas-phase conditions. The pre-polymerization may be carried out batchwise, semi-continuously or continuously. The pre-polymerization preferably uses a catalyst having a higher concentration than that of the catalyst used in the polymerization in the system.

The polyolefin constituting the segment $PO^1$ of the olefin block copolymer (A-11) may be obtained by homopolymerizing or copolymerizing the olefin having 2 to 20 carbon atoms in the presence of the olefin polymerization catalyst (such a polymerization will be sometimes referred to as simply "olefin polymerization" hereinafter).

Olefin polymerization may be carried out by a liquid-phase polymerization process, such as solution polymerization and suspension polymerization, or a gas-phase polymerization process. The reaction solvent used in the suspension polymerization may be the inert solvent or an olefin which is liquid at the reaction temperature. The reaction temperature is usually −50° C. to 200° C., preferably 0° C. to 150° C. The polymerization pressure is usually 0.1 to 100 atm, preferably 1 to 50 atm. The olefin polymerization may be carries out batchwise, semi-continuously or continuously. Where the polymerization is performed over 2 or more steps, the reaction conditions may be the same or different.

The olefin polymerization produces a polyolefin having a weight-average molecular weight of 2000 or more. It is preferable in the olefin polymerization that no molecular hydrogen, which is a conventional molecular weight modifier, be allowed its presence in the polymerization system. The molecular weight is preferably adjusted by controlling at least one of the concentration of the organometallic catalyst components, the polymerization temperature and the concentration of the olefin (polymerization pressure). Specifically, the molecular weight can be adjusted as follows. For example, in the suspension polymerization wherein the molecular hydrogen is substantially absent, the molecular weight of the resulting polyolefin may be lowered by increasing the concentration of the organometallic catalyst components. Otherwise, in the suspension polymerization wherein the molecular hydrogen is substantially absent, the molecular weight of the resulting polyolefin can be lowered by raising the polymerization temperature.

The polyolefin thus obtained links with a Group 13 element in the terminal position of one side or has an unsaturated bond in the terminal position of one side.

Whether the polyolefin links with a Group 13 element in the terminal position of one side or has an unsaturated bond in the terminal position of one side depends upon the type and/or the quantity of the organometallic catalyst components used and the polymerization conditions, such as polymerization temperature.

Where the polyolefin has an unsaturated bond in the terminal position of one side, the polyolefin is reacted with a compound containing a Group 13 element to convert it to the end which links with a Group 13 element. In the case where the resulting polyolefin is a mixture of a polyolefin which links with a Group 13 element in the terminal position of one side and a polyolefin which has an unsaturated bond in the terminal position of one side, the end of the polyolefin which has an unsaturated bond in the terminal position of one side is according to necessity converted to an end which links with a Group 13 element.

The compound containing a Group 13 element, which is used in the reaction, is selected from the compounds exemplified with respect to the organic compound catalyst component. Of these, preferable for use are the compounds exemplified as the organoaluminum compound or the organoboron compound. More preferably, the compound is trialkylaluminum, dialkylaluminumhydride or a boron compound having at least one hydrogen-boron bond. The boron compound having at least one hydrogen-boron bond is particularly preferred. The most preferred compounds include 9-borabicyclo[3,3,1]nonane, which may be a monomer or a dimer.

For example, the reaction of the polyolefin which has an unsaturated bond in the terminal position of one side with the compound containing a Group 13 element is carried out as follows.

(1) Polypropylene, 0.1 to 50 g, which has a vinylidene group in the terminal position is mixed with 5 to 1000 ml of an octane solution containing 0.01 to 5 mol/LTR of diisobutylaluminumhydride. Then the mixture is refluxed for 0.5 to 6 hours.

(2) Polypropylene, 0.1 to 50 g, which has a vinylidene group in the terminal position is mixed with 5 to 1000 ml of tetrahydrofuran anhydride and with 0.1 to 50 ml of a tetrahydrofuran solution containing 0.05 to 10 mol/LTR of 9-borabicyclo[3,3,1]nonane. Then the mixture is stirred at 20 to 65° C. for 0.5 to 24 hours.

The polyolefin constituting the segment $PO^1$ of the olefin block copolymer (A-11) is produced as described above. The polyolefin obtained links with a Group 13 element in the terminal position of one side. The Group 13 element is preferably boron.

For example, the polyolefin containing long-chain branches, which constitutes the polyolefin segment $PO^1$ of the olefin block copolymer (A-12), is produced as follows.

The polyolefin containing long-chain branches may be produced by copolymerizing ethylene and an α-olefin of 3 to 20 carbon atoms in such a way that the resulting copolymer may have a density of 0.86 to 0.95 g/cm³ in the presence of a catalyst comprising;

(i) a catalyst component obtained as a result of the reaction between (i-1) a bidentate compound wherein two groups selected from anionized indenyl groups and derivatives thereof are bonded to each other via a lower alkylene group and (i-2) a halide of Group 4 transition metal of the Periodic Table, (ii) an organoaluminum oxy-compound, (iii) an organoaluminum compound and (iv) a carrier.

The bidentate compound (i-1), which is used in synthesis of the catalyst component (i), wherein two groups selected from anionized indenyl groups and derivatives thereof are bonded to each other via a lower alkylene group is represented by the formula $$MR^{13}\text{—}R^{14}\text{—}R^{15}M$$

wherein $R^{13}$ and $R^{15}$, which may be the same or different, are each an indenyl anion, a substituted indenyl anion or a partially-hydrogenated anion thereof, $R^{14}$ is a lower alkylene group and M is an alkali metal cation.

Specific examples include ethylenebisindenyldilithium, ethylenebisindenyldisodium, ethylenebis(4,5,6,7-tetrahydro-1-indenyl)dilithium, ethylenebis(4-methyl-1-indenyl)dilithium, ethylenebis(5-methyl-1-indenyl)dilithium, ethylenebis(6-methyl-1-indenyl)dilithium and ethylenebis(7-methyl-1-indenyl)dilithium.

Specific examples of the halide (i-2) of Group 4 transition metal of the Periodic Table include zirconium tetrachloride, hafnium tetrachloride, titanium tetrachloride and titanium tetrabromide.

The catalyst component (i), which is used in production of the segment $PO^1$ of the olefin block copolymer (A-12), can be obtained by bringing the bidentate compound (i-1) into contact with the transition-metal halide (i-2) by mixing in an organic solvent, such as ether, tetrahydrofuran, benzene, toluene or methylene dichloride. The bidentate compound (i-1) and the transition-metal halide (i-2) are mixed in a molar ratio ($MR^{13}\text{—}R^{14}\text{—}R^{15}M$/transition metal) of 0.5 to 2, preferably 0.75 to 1.25. The concentration of the transition-metal halide (i-2) ranges in terms of transition metal usually from 0.03 to 0.5 mol/LTR, preferably from 0.05 to 0.3 mol/LTR.

A conventional and known aluminoxane is preferable as the organoaluminum oxy-compound (ii).

The conventional and known aluminoxane may be prepared by the following processes.

(1) A process comprising adding such an organoaluminum compound as trialkylaluminum to a hydrocarbon medium suspension of a compound containing absorbed water or a salt containing water of crystallization, such as magnesium chloride hydrate, copper sulfate hydrate, aluminum sulfate hydrate, nickel sulfate hydrate or cerous chloride hydrate, and reacting them to recover the aluminoxane as a hydrocarbon solution.

(2) A process comprising allowing water, ice or water vapor to directly act on such an organoaluminum compound as trialkylaluminum in a medium, such as benzene, toluene, ethyl ether or tetrahydrofuran, to recover the aluminoxane as a hydrocarbon solution.

(3) A process comprising allowing an organotin oxide, such as dimethyltin oxide or dibutyltin oxide, to react with such an organoaluminum compound as trialkylaluminum in a medium, such as decane, benzene or toluene.

The aluminoxane may contain a small amount of an organometallic component. The solvent or the unreacted organoaluminum compound is removed from the recovered solution of aluminoxane by distillation and the remainder may be redissolved in a solvent.

Examples of the organoaluminum compound, which is used in preparing a solution of aluminoxane, include the same ones as previously exemplified with respect to the organometallic catalyst component (with the proviso that the aluminoxanes are excluded).

Also employable as the organoaluminum compound is isoprenylaluminum represented by formula $(i-C_4H_9)_xAl_y(C_5H_{10})_z$ wherein x, y, z are each independently a positive number, and $z \geqq 2x$.

The organoaluminum compounds may be used either individually or in combination.

Examples of the solvent used in preparing the solution of aluminoxane include hydrocarbon solvents, such as aromatic hydrocarbons, e.g., benzene, toluene, xylene, cumene and cymene; aliphatic hydrocarbons, e.g., pentane, hexane, heptane, octane, decane, dodecane, hexadecane and octadecane; alicyclic hydrocarbons, e.g., cyclopentane, cyclohexane, cyclooctane and methylcyclopentane; petroleum fractions, e.g., gasoline, kerosine and gas oil; and halides of these aromatic, aliphatic and alicyclic hydrocarbons, e.g., chlorides or bromides thereof.

Also employable are ethers, such as ethyl ether and tetrahydrofuran. Of the solvents, aromatic hydrocarbons are particularly preferable.

Examples of the organoaluminum compound (iii) include the organoaluminum compounds previously exemplified as the organometallic catalyst component (with the proviso that the aluminoxanes are excluded).

Examples of the preferable organoaluminum compound include compounds represented by $R^a{}_3Al$, $R^a{}_nAl(OR^b)_{3-n}$ or $R^a{}_nAl(OAlR^d{}_2)_{3-n}$. Particularly, those of the above formulae wherein $R^a$ is an isoalkyl group and n is 2 are preferred. These organoaluminum compounds may be used either individually or in combination.

The carrier (iv) is an inorganic or organic solid compound of granular or finely divided particle state, which has a particle diameter of 10 to 300 μm, preferably 20 to 200 μm.

A porous oxide is preferred as the inorganic carrier. Examples of the porous oxide include $SiO_2$, $Al_2O_3$, MgO, $ZrO_2$, $TiO_2$, $B_2O_3$, CaO, ZnO, BaO, $ThO_2$, mixtures thereof and mixtures containing them, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. It is preferable that the carrier contain at least one of $SiO_2$ and $Al_2O_3$ as a major component.

The inorganic oxide may contain a small amount of a carbonate component, a sulfate component, a nitrate component or an oxide component, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ or $Li_2O$.

Although the carrier (iv) is variable in properties depending on the type and the process for production thereof, the carrier is desired to have a specific surface area of 50 to 1000 m²/g, preferably 100 to 700 m²/g and a pore volume of 0.3 to 2.5 cm³/g. The carrier (iv) is according to necessity calcined at 150 to 1000° C., preferably at 200 to 800° C.

Examples of the carrier additionally include organic compounds, which are a solid of granular or finely divided particle state, having a particle diameter of 10 to 300 μm. Examples of such organic compounds include (co)polymers containing, as a main component, an α-olefin of 2 to 14 carbon atoms, such as ethylene, propylene, 1-butene or 4-methyl-1-pentene, and (co)polymers containing, as a main component, vinylcyclohexane or styrene.

In the present invention, the catalyst obtained by pre-polymerizing an olefin with the catalyst components (i), (ii), (iii) and (iv) is preferably used in preparation of the segment $PO^1$ containing long-chain branches.

Prior to the pre-polymerization, the catalyst component (i), the catalyst components (i) and (ii) or the catalyst components (i), (ii) and (iii) may be supported on the catalyst component (iv), i.e. the carrier. Otherwise, the catalyst components may be subjected to the pre-polymerization after they are arbitrarily mixed and brought into contact with each other. In this case, when a transition-metal compound (vi) containing ligands which have a cycloalkadienyl skeleton and are not bonded to each other is used in combination with the catalyst component (i), a spherical olefin copolymer excellent in particle shape can be obtained.

Examples of the transition-metal compound (vi), which is used according to necessity, containing ligands which have a cycloalkadienyl skeleton and are not bonded to each other include bis(cyclopentadienyl)zirconium dichloride, bis(methylcyclopentadienyl)zirconium dichloride, bis(dimethylcyclopentadienyl)zirconium dichloride, bis(ethylcyclopentadienyl)zirconium dichloride, bis(n-butylcyclopentadienyl)zirconium dichloride and bis(indenyl)zirconium dichloride.

The catalyst component (i) and the transition-metal compound (vi) are used in such a proportion that the component (vi) is used in an amount of 0 to 50% by mol, preferably 5 to 40% by mol, more preferably 10 to 30% by mol based on the total amount 100% by mol of the component (i) and the component (vi).

In carrying out the pre-polymerization, an olefin polymer is pre-polymerized in an amount of 0.05 to 100 g, preferably 0.1 to 50 g, more preferably 0.2 to 30 g based on 1 g of the carrier (iv).

Examples of the olefin include α-olefins having 2 to 20 carbon atoms, such as ethylene, propylene, 1-butene, 1-pentene, 4-methyl-1-pentene, 1-hexene, 1-octene, 1-decene, 1-dodecene and 1-tetradecene. Of these, ethylene is preferred.

The pre-polymerization is carried out without a solvent or in an inert hydrocarbon medium.

In carrying out the pre-polymerization, the organoaluminum compound (iii) is used in an amount of 0.2 to 20 mmol, preferably 0.5 to 10 mmol, and the organoaluminum oxy-compound (ii) is used in terms of aluminum atom in an amount of 1 to 50 mg, preferably 2 to 20 mg, and the catalyst component (i) is used in terms of transition metal atom in an amount of 0.02 to 2 mg, preferably 0.05 to 1 mg, all based on 1 g of the carrier (iv).

The molar ratio [Al(iii)/Al(ii)] of the aluminum atom (Al) in the organoaluminum compound (iii) to the aluminum atom (Al) in the organoaluminum oxy-compound (ii) is usually 0.02 to 3, preferably 0.05 to 1.5. The molar ratio [Al(ii)/M] of the aluminum atom (Al) in the organoaluminum oxy-compound (ii) to the transition metal atom (M) in the catalyst component (i) is usually 5 to 250, preferably 10 to 150. The concentration of the catalyst component (i) in carrying out the polymerization in the inert hydrocarbon medium is, in terms of transition metal atom, 0.1 to 10 mg/LTR, preferably 0.5 to 5 mg/LTR.

The pre-polymerization temperature is −20 to 70° C., preferably −10 to 60° C., more preferably 0 to 50° C. The pre-polymerization may be carried out batchwise or continuously and under pressure, reduced pressure or normal pressure. Although the pre-polymerization may be carried out in the presence of a molecular-weight modifier, such as hydrogen, the amount thereof is desirably reduced so that a pre-polymer at least having an intrinsic viscosity [η] measured at 135° C. in decalin of not less than 0.2 dl/g, preferably 0.5 to 10 dl/g may be obtained.

In the pre-polymer catalyst thus obtained, the catalyst component (i) is supported in an amount in terms of transition metal atom of 0.1 to 50 mg, preferably 0.3 to 30 mg, more preferably 0.5 to 20 mg based on 1 g of the carrier (iv). The molar ratio (Al/M) of the aluminum atom (Al) in the catalyst components (ii) and (iii) to the transition metal atom (M) in the catalyst component (i) is usually 5 to 200, preferably 10 to 150, more preferably 15 to 100.

The segment $PO^1$ containing long-chain branches may be prepared by homopolymerizing or copolymerizing the olefin of 2 to 20 carbon atoms in the presence of the above catalyst.

In the present invention, it is preferable that the segment $PO^1$ be produced by copolymerizing ethylene with at least one olefin selected from α-olefins of 3 to 20 carbon atoms, such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

Polymerization of olefin is performed usually in a gas phase or a liquid phase, for example, in a slurry. The solvent used in the slurry polymerization may be an inert hydrocarbon or the olefin per se.

Examples of the hydrocarbon medium include aliphatic hydrocarbons, such as butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of the hydrocarbon media, aliphatic hydrocarbons, alicyclic hydrocarbons and petroleum fractions are preferred.

The polymerization temperature in carrying out the slurry polymerization is usually −50 to 100° C., preferably 0 to 90° C. The polymerization temperature in the gas-phase polymerization is usually 0 to 120° C., preferably 20 to 100° C.

In carrying out the slurry polymerization or the gas-phase polymerization, the catalyst component (i) is desirably used in an amount so as to have a concentration of the transition metal atom in the polymerization reaction system of $10^{-8}$ to $10^{-2}$ g/LTR, preferably $10^{-7}$ to $10^{-3}$ g/LTR.

An aluminum oxy-compound and an aluminum compound similar to the catalyst components (ii) and (iii), respectively, may additionally be added in carrying out the polymerization. In such a case, the atomic ratio (Al/M) of the aluminum compound to the transition metal atom (M) is in the range of 5 to 300, preferably 10 to 200, more preferably 15 to 150.

The polymerization pressure is usually normal pressures to 100 kg/cm$^2$, preferably 2 to 50 kg/cm$^2$. The polymerization may be carried out batchwise, semi-continuously or continuously.

It is also possible to conduct the polymerization over 2 or more stages under different reaction conditions.

The polyolefin containing long-chain branches thus produced may be imparted with a Group 13 element in the terminal position of its segment $PO^1$ by the same process as carried out for the polyolefin constituting the segment $PO^1$ of the olefin block copolymer (A-12).

Next, a polymerization active species for such chain polymerization as radical polymerization, ring-opening polymerization or ionic polymerization is formed in the presence of the polyolefin which links with a Group 13 element in the terminal position of one side, and such a reaction is made to produce the olefin block copolymer. The reaction forms the linkage $g^1$ between the Group 13 element linked in the terminal position and the segment $PO^1$. The polymer produced by radical polymerization or ring-opening polymerization constitutes the functional segment (segment $B^1$). The linkage $g^1$ occasionally contains a part of the structure formed as a result of the chain polymerization, such as radical polymerization, ring-opening polymerization or ionic polymerization.

For example, the polymerization is carried out as follows.

(1) When the Group 13 element linked with one end of the polyolefin is boron, the carbon-boron bond is oxidized with molecular oxygen in the presence of a radically polymerizable monomer to generate radicals, thereby conducting the radical polymerization.

Specifically, the polyolefin which links with boron in the terminal position of one side is oxidized with molecular oxygen in the presence of a radically polymerizable monomer. Through such oxidation, the boron present in the terminal position is converted to peroxyborane (—O—O—B). The peroxyborane generates radicals on agitation in the presence of a radically polymerizable monomer because the O—O bond is cleaved by the agitation. The alkoxy radicals (—O*) thus generated work as an initiator, and thereby the radical polymerization of a radically polymerizable monomer proceeds.

Examples of the radically polymerizable monomer include methyl methacrylate (MMA), ethyl methacrylate (EMA), butyl methacrylate, vinyl acrylate (VA), butyl acrylate (BA), styrene, acrylonitrile and vinylacetate. These radically polymerizable monomers may be used either individually or in combination.

The radical polymerization may be terminated when the polymer is precipitated in methanol. Through the above process, the olefin block copolymer (A-11) or (A-12) in which the linkage $g^1$ is an ether linkage or an ester linkage and the segment $B^1$ is a radical polymer can be produced.

(2) When the Group 13 element linked with one end of the polyolefin is aluminum, the carbon-aluminum bond is oxidized with molecular oxygen to generate a polymerization active species, thereby conducting the ring-opening polymerization.

Specifically, the carbon-aluminum bond is oxidized with molecular oxygen, and thereby the aluminum present in the terminal position of the segment $PO^1$ is converted to aluminum oxide (—O—Al). By use of the aluminum oxide thus obtained as a polymerization active species, a ring opening-polymerizable monomer is polymerized by ring-opening polymerization.

The ring-opening polymerization is carried out usually at 0 to 100° C. for 30 minutes to 12 hours, preferably 1 to 6 hours. The ring-opening polymerization may be terminated by precipitating the polymer in methanol. Through the above process, the olefin block copolymer (A-11) or (A-12) in which the linkage $g^1$ is an ether linkage or an ester linkage and the segment $B^1$ is a ring opening polymer can be produced.

(3) After the Group 13 element linked with one end of the polyolefin has been converted to a hydroxyl group, an amino group, an aldehyde group or a halogen, an active species for ring-opening polymerization is formed, thereby conducting the ring-opening polymerization.

The active species for ring-opening polymerization can be formed, for example, by adding a sodium hydroxide solution and a hydrogen peroxide solution to the polyolefin which links with boron in the terminal position of one side, allowing them to react with each other at 40 to 50° C. for 3 to 5 hours to convert the boron to a hydroxyl group, and reacting the hydroxyl group with butyl lithium and then with diethylaluminumchloride to convert the hydroxyl group to aluminum oxide.

By use of the aluminum oxide obtained from the above process as a polymerization active species, the ring-opening polymerizable monomer is polymerized by ring-opening polymerization. The ring-opening polymerization is carried out in the same manner as in the above (2). In place of the aluminum oxide, other metal alkoxide, metallic halide or metal amine may be linked with one end of the polyolefin to form a polymerization active species for ring-opening polymerization. Polymerization active species other than the aluminum oxide are formed by use of a hydroxyl group, an amino group, an aldehyde group or a halogen linking with one end of the polyolefin. Of these, the aluminum oxide is preferable to use as a polymerization active species. Through the above process, the olefin block copolymer (A-11) or (A-12) in which the linkage is an ether linkage, an ester linkage or an amide linkage and the segment $B^1$ is a ring opening polymer can be produced.

The olefin block copolymer (A-11) or (A-12) in which the linkage $g^1$ is an ether linkage, an ester linkage or an amide linkage and the segment $B^1$ is an ionic polymer can be obtained by ionic polymerization, such as anionic polymerization wherein the polyolefin having a hydroxyl group in the terminal position is converted to a polyolefin having, for example, lithium, potassium, sodium or a phosphorus-containing group in the terminal position, and thereafter an anionically polymerizable monomer is polymerized. Examples of the process for producing the olefin block copolymer (A-11) or (A-12) in which the "R" is a segment obtained by anionically polymerizing a (meth) acrylic ester by use of the polyolefin having lithium in the terminal position, include the same process as the process for producing the olefin block copolymer (A-8) mentioned later.

The olefin block copolymers (A-11) and (A-12) may be compounded with thermoplastic resins, fillers, nucleating agents and additives used for polymers at an arbitrary proportion, and may be subjected to post-modification, such as crosslinking and foaming.

In addition to the thermoplastic resins, the olefin block copolymers (A-11) and (A-12) may contain additives, such as a crosslinking agent, a filler, a crosslinking accelerator, a crosslinking assistant, a softener, a tackifier, an anti-aging agent, a foaming agent, a processing assistant, an adhesion improver, an inorganic filler, an organic filler, a crystalline nucleating agent, a heat stabilizer, a weathering stabilizer, an antistatic agent, a colorant, a lubricant, a flame retardant and a blooming inhibitor.

(Process for Producing Molded Articles)

The olefin block copolymers (A-11) and (A-12) can be produced into various molded articles, just as with the olefin block copolymer (A-1), by calendering, extrusion molding, injection molding, blow molding, press molding or stamping molding.

(Uses)

The olefin block copolymers (A-11) and (A-12) can be used for many purposes. For example, as is the case with the olefin block copolymer (A-1), they can be used for films and sheets, laminates, modifiers, viscosity modifiers, moldability improvers, construction and civil engineering materials, automobile interior and exterior parts, gasoline tanks, electric and electronic parts, aqueous emulsion, coating bases, medical and sanitary products, miscellaneous products, environmentally degradable resins, modifiers for filler, compatibilizer, microcapsules, PTP packages, chemical valves and drug delivery system.

Olefin Block Copolymer (A-13)

Next, the olefin block copolymer (A-13) will be described.

The segment $PO^1$ of the olefin block copolymer (A-13) is a polyolefin segment comprising repeating units derived from an olefin of 2 to 20 carbon atoms. Specifically, the segment $PO^1$ is a homopolymer or a copolymer of an olefin selected from olefins having 2 to 20 carbon atoms. When the polyolefin segment has stereoregularity, the polyolefin may be an isotactic polyolefin or a syndiotactic polyolefin.

Examples of the olefins having 2 to 20 carbon atoms include the linear or branched α-olefins, the cycloolefins, the aromatic vinyl compounds, the conjugated dienes and the non-conjugated polyenes noted above.

The segment $PO^1$ of the olefin block copolymer (A-13) has a weight-average molecular weight of preferably less than 2000, more preferably from 500 to 1800.

The segment $PO^1$ ideally has a molecular weight distribution (Mw/Mn) determined by the gel permeation chromatography of 2.5 or less, preferably 2.3 or less.

The glass transition temperature (Tg) of the segment $PO^1$, as determined with the differential scanning calorimeter (DSC), is ideally in the range of usually 150° C. or below, preferably from −100 to 100° C., more preferably from −80 to 40° C.

The segment $PO^1$ of the olefin block copolymer (A-13) is preferably obtained by polymerizing or copolymerizing at least one α-olefin selected from linear or branched α-olefins having 2 to 20 carbon atoms. Specifically, the segment $PO^1$ is an ethylene polymer, such as ethylene homopolymer and ethylene/α-olefin copolymers; a propylene polymer, such as propylene homopolymer and propylene/α-olefin copolymers; a butene polymer, such as butene homopolymer and butene/ethylene copolymer; or a 4-methyl-1-pentene polymer, such as 4-methyl-1-pentene homopolymer.

The linkage $g^1$ of the olefin block copolymer (A-13) is preferably an ether linkage, an ester linkage or an amide linkage. Of these, an ether linkage is particularly preferable.

The segment $B^1$ of the olefin block copolymer (A-13) is preferably a functional segment obtained by chain polymerization. More preferably, the segment $B^1$ is such a functional segment containing repeating units containing an unsaturated hydrocarbon and/or repeating units containing a hetero atom. Even more preferably, the segment $B^1$ is a functional segment obtained by radical polymerization, ring-opening polymerization or ionic polymerization. Particularly preferably, the segment $B^1$ is a functional segment obtained by radical polymerization or ring-opening polymerization.

The functional segment may be obtained by the chain polymerization of at least one chain-polymerizable monomer. For example, it can be obtained by radically polymerizing at least one radically polymerizable monomer, ring-opening polymerizing at least one cyclic monomer, or ionically polymerizing at least one ionically polymerizable monomer.

Examples of the radically polymerizable monomer, the cyclic monomer and the ionically polymerizable monomer are as described above.

Of the radically polymerizable monomers, preferable are aromatic vinyl derivatives, (meth)acrylic acid derivatives, maleic anhydride, vinyl acetate, acrylonitrile, 9-vinylcarbazole, N-vinylpyrrolidone, N,N-dimethylacrylamide, isobutyl vinyl ether and isobutene. Even more preferred are styrene, maleic anhydride, methyl methacrylate, ethyl methacrylate, tert-butyl methacrylate, vinyl acetate, vinyl acrylate, butyl acrylate, acrylonitrile and vinyl chloride.

Of the cyclic monomers, ε-caprolactone, ε-caprolactam and ethyleneoxide are preferred.

The segment $B^1$ has a weight-average molecular weight of preferably 500 or more, still preferably from 500 to 1,000,000, more preferably 500 to 100,000, particularly preferably 500 to 50,000.

The segment $B^1$ is contained in the olefin block copolymer (A-13) in an amount of 20 to 99.99% by weight, preferably 20 to 99% by weight, more preferably 20 to 95% by weight, particularly preferably 20 to 90% by weight based on the copolymer.

The melt flow rate (MFR) of the olefin block copolymer (A-13), as measured at 230° C. under 2.16 kg load in accordance with ASTM D1238, ideally ranges from 0.01 to 5000 g/10 min, preferably 0.05 to 1000 g/10 min, more preferably 0.1 to 500 g/10 min.

Specific examples of the olefin block copolymer (A-13) include the following.

A block copolymer wherein the segment $PO^1$ is an isotactic polypropylene segment having a molecular weight of 500 to less than 2000 and the segment $B^1$ is a polycaprolactam segment having a molecular weight of 500 to 10,000. Such a block copolymer is useful as a compatibilizer for polypropylenes and nylon resins.

A block copolymer wherein the segment $PO^1$ is a random copolymer segment of ethylene and an α-olefin of 3 to 20 carbon atoms and has a molecular weight of 500 to less than 2000 and an ethylene content of 10 to 90% by mol, and the segment $B^1$ is a polycaprolactam segment having a molecular weight of 500 to 10,000. Such a block copolymer is useful as an impact modifier for nylon resins and as a compatibilizer for nylon resins and soft polyolefins.

A block copolymer wherein the segment $PO^1$ is an ethylene/propylene random copolymer segment and has a molecular weight of 500 to less than 2000 and an ethylene content of 10 to 90% by mol, and the segment $B^1$ is a polystyrene segment having a molecular weight of 500 to 50,000. Such a block copolymer is useful as an impact modifier which does not deteriorate the transparency of polystyrene and as a compatibilizer for polystyrenes and soft polyolefins.

A block copolymer wherein the segment $PO^1$ is an ethylene/propylene random copolymer segment and has a molecular weight of 500 to less than 2000 and an ethylene content of 10 to 90% by mol, and the segment $B^1$ is a polymethyl methacrylate segment having a molecular weight of 500 to 10,000. Such a block copolymer is useful as an impact modifier which does not deteriorate the transparency of polymethyl methacrylate and as a compatibilizer for polymethyl methacrylate and soft polyolefins.

A block copolymer wherein the segment $PO^1$ is a polyethylene segment having a molecular weight of 500 to less than 2000 and an ethylene content of 90 to 100% by mol and the segment $B^1$ is a polyethyleneoxide segment having a molecular weight of 500 to 10,000. Such a block copolymer is preferred to use as a long-term anti-fogging agent for linear low-density polyethylene (LLDPE) films and a long-term antistatic agent for high-density polyethylene (HDPE).

(Production Process)

The olefin block copolymer (A-13) can be produced, for example, by the same processes as to produce the olefin block copolymers (A-11) and (A-12), preferably by the same process as to produce the olefin block copolymer (A-11). That is, the olefin block copolymer (A-13) can be produced by first preparing a polyolefin linking with a Group 13 element in the terminal position, which has a weight-average molecular weight of less than 2000, preferably from 500 to 1800; forming a polymerization active species for such chain polymerization as radical polymerization, ring-opening polymerization or ionic polymerization, in the presence of the polyolefin; and performing such a reaction, thereby synthesizing the segment $B^1$ having a weight-average molecular weight of 500 or more.

The chain polymerization, such as radical polymerization, ring-opening polymerization or ionic polymerization, can produce an olefin block copolymer which links, in the terminal position, with a polymerization active species for chain polymerization, such as a group containing a bond of oxygen and a Group 13 element. Said olefin block copolymer, as far as treated in such an inert gas as nitrogen, argon or helium, can maintain its polymer structure where it has, in the terminal position, a polymerization active species for chain polymerization, such as radical polymerization, ring-opening polymerization or ionic polymerization, e.g., a group containing a bond of oxygen and a Group 13 element.

(Uses)

The olefin block copolymer (A-13), where the molecular weight is low, can move easily in a synthetic resin, produce excellent effects of stabilizing an interface in an alloy of a polyolefin and a polar polymer, and be used as a compatibilizer for polymer alloys of polyolefins and polar polymers.

When the olefin block copolymer (A-13), in which the segment $PO^1$ has a low glass transition temperature, is blended with a polar polymer, domains are formed minute because the segment $PO^1$ has a low molecular weight. Therefore, it can be used as an impact modifier which does not deteriorate the transparency of transparent polar polymers, such as polystyrene, polymethyl methacrylate and polyvinyl chloride.

The olefin block copolymer comprising the segment $PO^1$ and a functional segment, such as hydrophilic groups and resin-stabilizing groups, can be used as a functional additive having good suitability to polyolefins. For example, it can be used as additives for resin, such as a long-term anti-fogging agent, a long-term antistatic agent, a long-term heat stabilizer and a long-term weathering stabilizer.

The olefin block copolymer can be used for toner binders for printing various adherends because it has both a sharp melting point and polarity which are inherent in the low-molecular weight polyolefin.

The olefin block copolymer (A-13) can be suitably used for surface-active agents where higher fatty esters have been conventionally used, and for waxes where low-molecular weight polyolefins or modified low-molecular weight polyolefins have been conventionally used.

The olefin block copolymer (A-13) has an excellent affinity with both a polyolefin and a polar polymer because its segment $PO^1$ has a molecular weight of less than 2000.

Olefin Block Copolymer (A-14)

The olefin block copolymer (A-14) will next be described.

The segment $PO^1$ of the olefin block copolymer (A-14) is a polyolefin segment comprising repeating units derived from an olefin of 2 to 20 carbon atoms. Specifically, the segment $PO^1$ is a homopolymer or a copolymer of an olefin selected from olefins having 2 to 20 carbon atoms. When the polyolefin segment has stereoregularity, the polyolefin may be an isotactic polyolefin or a syndiotactic polyolefin.

Examples of the olefins having 2 to 20 carbon atoms include the linear or branched α-olefins, the cycloolefins, the aromatic vinyl compounds, the conjugated dienes and the non-conjugated polyenes described above.

The segment PO¹ has a weight-average molecular weight of preferably at least 2,000, more preferably 2,000 to 1,000,000, even more preferably 10,000 to 800,000, particularly preferably 50,000 to 500,000.

Preferably, the segment PO¹ has a molecular weight distribution (Mw/Mn) determined by the gel permeation chromatography of 2.5 or less.

The segment PO¹ of the olefin block copolymer (A-14) is preferably obtained by polymerizing or copolymerizing at least one α-olefin selected from linear or branched α-olefins having 2 to 20 carbon atoms. Specifically, the segment PO¹ is composed of an ethylene polymer, such as ethylene homopolymer and ethylene/α-olefin copolymers; a propylene polymer, such as propylene homopolymer and propylene/α-olefin copolymers; a butene polymer, such as butene homopolymer and butene/ethylene copolymer; or a 4-methyl-1-pentene polymer, such as 4-methyl-1-pentene homopolymer.

The linkage $g^1$ of the olefin block copolymer (A-14) is preferably an ether linkage, an ester linkage or an amide linkage. Of these, an ether linkage is particularly preferable.

The segment $B^1$ of the olefin block copolymer (A-14) is preferably a functional segment obtained by chain polymerization. More preferably, the segment $B^1$ is such a functional segment containing repeating units containing an unsaturated hydrocarbon and/or repeating units containing a hetero atom. Even more preferably, the segment $B^1$ is a functional segment obtained by radical polymerization, ring-opening polymerization or ionic polymerization. Still preferably, the segment $B^1$ is a functional segment obtained by radical polymerization or ring-opening polymerization.

The functional segment may be obtained by the chain polymerization of at least one chain-polymerizable monomer. For example, it can be obtained by radically polymerizing at least one radically polymerizable monomer, ring-opening polymerizing at least one cyclic monomer, or ionically polymerizing at least one ionically polymerizable monomer.

Examples of the radically polymerizable monomer, the cyclic monomer and the tonically polymerizable monomer are as described above.

Of the radically polymerizable monomers, preferable are aromatic vinyl derivatives, (meth)acrylic acid derivatives, maleic anhydride, vinyl acetate, acrylonitrile, 9-vinylcarbazole, N-vinylpyrrolidone, N,N-dimethylacrylamide, isobutyl vinyl ether and isobutene. Even more preferred are styrene, maleic anhydride, methyl methacrylate, ethyl methacrylate, tert-butyl methacrylate, vinyl acetate, vinyl acrylate, butyl acrylate, acrylonitrile and vinyl chloride.

Of the cyclic monomers, ε-caprolactone, ε-caprolactam and ethyleneoxide are preferred.

The segment $B^1$ of the olefin block copolymer (A-14) ideally has a weight-average molecular weight of less than 500, preferably from 50 to less than 500, even more preferably 50 to 450, particularly preferably 100 to 400.

The segment $B^1$ is contained in the olefin block copolymer (A-14) in an amount of 0.0001 to 50% by weight, preferably 0.005 to 20% by weight, more preferably 0.01 to 15% by weight, particularly preferably 0.05 to 10% by weight based on the copolymer.

The melt flow rate (MFR) of the olefin block copolymer (A-14), as measured at 230° C. under 2.16 kg load in accordance with ASTM D1238, ideally ranges from 0.01 to 200 g/10 min, preferably 0.05 to 100 g/10 min, more preferably 0.05 to 80 g/10 min.

In light of good adhesion to polar substances and good surface hydrophilicity, the olefin block copolymer (A-14) preferably comprises the segment PO¹ which is composed of an ethylene homopolymer, a random copolymer of ethylene and an α-olefin of 3 to 20 carbon atoms ($C_{3-20}$ α-olefin content: less than 10% by mol), a propylene homopolymer, a propylene/ethylene random copolymer (ethylene content: less than 10% by mol), a random copolymer of propylene and an α-olefin of 4 to 20 carbon atoms ($C_{4-20}$ α-olefin content: less than 10% by mol), a random copolymer of ethylene and an α-olefin of 3 to 20 carbon atoms (ethylene content: 10 to 90% by mol, $C_{3-20}$ α-olefin content: 90 to 10% by mol) or a random copolymer of propylene and an α-olefin of 4 or more carbon atoms (propylene content: 10 to 90% by mol, and $C_{4-20}$ α-olefin content: 90 to 10% by mol); and the segment $B^1$ which is composed of a homopolymer of a (meth)acrylic acid, such as polymethyl methacrylate, or a derivative thereof; a copolymer of at least two monomers selected from (meth)acrylic acids and derivatives thereof; or a cyclic polyester, such as polycaprolactone.

Specifically, examples of the preferred olefin block copolymer (A-14) include the following.

A block copolymer wherein the segment PO¹ is polypropylene (Mw: 1,000 to 1,000,000), the linkage $g^1$ is an ether linkage and the segment $B^1$ is poly(2-hydroxyethyl methacrylate) (Mw: 130 to 450).

A block copolymer wherein the segment PO¹ is polypropylene (Mw: 1,000 to 1,000,000), the linkage $g^1$ is an ether linkage and the segment $B^1$ is a styrene/maleic anhydride copolymer (Mw: 200 to 450).

A block copolymer wherein the segment PO¹ is polypropylene (Mw: 1,000 to 1,000,000), the linkage $g^1$ is an ether linkage and the segment $B^1$ is a polyethylene glycol (Mw: 45 to 450).

A block copolymer wherein the segment PO¹ is an ethylene/hexene copolymer (hexene content: 0.1 to 30 mol %, Mw: 1,000 to 1,000,000), the linkage $g^1$ is an ether linkage and the segment $B^1$ is polycaprolactone (Mw: 100 to 450).

A block copolymer wherein the segment PO¹ is an ethylene/butene copolymer (butene content: 0.1 to 30 mol %, Mw: 1,000 to 1,000,000), the linkage $g^1$ is an ether linkage and the segment $B^1$ is polycaprolactone (Mw: 100 to 450).

A block copolymer wherein the segment PO¹ is an ethylene/octene copolymer (octene content: 0.1 to 30 mol %, Mw: 1,000 to 1,000,000), the linkage $g^1$ is an ether linkage and the segment $B^1$ is polymethyl methacrylate (Mw: 100 to 450).

A block copolymer wherein the segment PO¹ is an ethylene/octene copolymer (octene content: 0.1 to 30 mol %, Mw: 1,000 to 1,000,000), the linkage $g^1$ is an ether linkage and the segment $B^1$ is polycaprolactone (Mw: 100 to 450).

A block copolymer wherein the segment PO¹ is an ethylene/hexene copolymer (hexene content: 0.1 to 30 mol %, Mw: 1,000 to 1,000,000), the linkage $g^1$ is an ether linkage and the segment $B^1$ is a styrene/maleic anhydride copolymer (Mw: 200 to 450).

(Production Process)

The olefin block copolymer (A-14) can be produced, for example, by the same processes as to produce the olefin block copolymers (A-11) and (A-12), preferably by the same process as to produce the olefin block copolymer (A-11). That is, the olefin block copolymer (A-14) can be produced by first preparing a polyolefin linking with a Group 13 element in the terminal position, which has a weight-average molecular weight of not less than 2000, preferably from 2,000 to 1,000,000; forming a polymerization active species for chain polymerization, such as radical polymerization, ring-opening polymerization or ionic polymerization, in the presence of the polyolefin and performing such a reaction, thereby synthesizing the segment $B^1$ having a weight-average molecular weight of usually less than 500, preferably from 50 to less than 500.

The olefin block copolymer (A-14) may be compounded with thermoplastic resins, fillers, nucleating agents and additives used for polymers at an arbitrary proportion, and may be subjected to post-modification, such as crosslinking and foaming.

Examples of the thermoplastic resins are as exemplified with respect to the thermoplastic resin (C).

The thermoplastic resins may be used either individually or in combination.

The olefin block copolymer (A-14) may contain, in addition to the thermoplastic resins, such additives as a crosslinking agent, a filler, a crosslinking accelerator, a crosslinking assistant, a softener, a tackifier, an anti-aging agent, a foaming agent, a processing assistant, an adhesion improver, an inorganic filler, an organic filler, a crystalline nucleating agent, a heat stabilizer, a weathering stabilizer, an antistatic agent, a colorant, a lubricant, a flame retardant and a blooming inhibitor.

Examples of the crosslinking agent, the filler, the crosslinking accelerator, the crosslinking assistant, the softener, the tackifier, the anti-aging agent, the foaming agent, the processing assistant, the adhesion improver, the inorganic filler, the organic filler and the crystalline nucleating agent include the same ones noted above.

(Process for Preparing Molded Articles)

The olefin block copolymer (A-14) can be produced into various molded articles, just as with the olefin block copolymer (A-1), by calendering, extrusion molding, injection molding, blow molding, press molding or stamping molding.

(Uses)

The olefin block copolymer (A-14) can be used for many purposes. For example, as is the case with the olefin block copolymer (A-1), it can be used for films, sheets, laminates, modifiers, viscosity modifiers, moldability improvers, construction and civil engineering materials, automobile interior and exterior parts, gasoline tanks, electric and electronic parts, aqueous emulsion, coating bases, medical and sanitary products, miscellaneous products, modifiers for filler, compatibilizer, microcapsules, PTP packages, chemical valves and drug delivery system.

Olefin Block Copolymer (A-2)

The olefin block copolymer (A-2) is represented by formula (II);

$$PO^2\text{-}f^2\text{-}R^2\text{---}(X^2)_n\text{-}h^2 \qquad (II)$$

wherein $PO^2$ is a polyolefin segment comprising repeating units derived from an olefin of 2 to 20 carbon atoms, specifically, it is a homopolymer or a random copolymer of an olefin selected from olefins having 2 to 20 carbon atoms. When the polyolefin segment has stereoregularity, the polyolefin may be either an isotactic polyolefin or a syndiotactic polyolefin.

Examples of the olefins having 2 to 20 carbon atoms include the linear or branched α-olefins, the cycloolefins, the aromatic vinyl compounds, the conjugated dienes and the non-conjugated polyenes described above.

The segment $PO^2$ has a weight-average molecular weight of, although not particularly limited to, usually 200 to 1,000,000, preferably 5,000 to 500,000, more preferably 10,000 to 50,000.

The segment $PO^2$ has a molecular weight distribution (Mw/Mn) of 2.5 or less, preferably 2.3 or less according to the gel permeation chromatography.

The segment $PO^2$ is preferably obtained by polymerizing or copolymerizing at least one α-olefin selected from linear or branched α-olefins having 2 to 20 carbon atoms. Specifically, the segment $PO^2$ is composed of an ethylene polymer, such as ethylene homopolymer and ethylene/α-olefin random copolymers; a propylene polymer, such as propylene homopolymer and propylene/α-olefin random copolymers; a butene polymer, such as butene homopolymer and butene/ethylene random copolymer; or a 4-methyl-1-pentene polymer, such as 4-methyl-1-pentene homopolymer.

In formula (II), $f^2$ denotes an ether linkage, an ester linkage or an amide linkage. Of these, an ether linkage is preferable. The linkage $f^2$ chemically bonds the polyolefin segment and the functional segment described below to each other.

The linkage $f^2$ occasionally contains a part of the structure formed as a result of such chain polymerization as radical polymerization, ring-opening polymerization or ionic polymerization.

In formula (II), $R^2$ is a functional segment obtained by chain polymerization, preferably containing repeating units containing an unsaturated hydrocarbon and/or repeating units containing a hetero atom. More preferably, $R^2$ is a functional segment obtained by radical polymerization, ring-opening polymerization or ionic polymerization. More preferably, $R^2$ is a functional segment obtained by radical polymerization or ring-opening polymerization.

The segment $R^2$ is obtained by chain polymerizing at least one chain-polymerizable monomer. For example, it can be prepared by the radical polymerization of at least one radically polymerizable monomer, the ring-opening polymerization of at least one cyclic monomer, or the ionic polymerization of at least one ionically polymerizable monomer.

Examples of the radically polymerizable monomer for the radical polymerization are as described above.

Of the radically polymerizable monomers exemplified above, preferred are aromatic vinyl derivatives, (meth) acrylic acid derivatives, maleic anhydride, vinyl acetate, acrylonitrile, 9-vinyl carbazole, N-vinyl pyrrolidone, N,N-dimethylacrylamide, isobutyl vinyl ether and isobutene. Even more preferred are styrene, maleic anhydride, methyl methacrylate, ethyl methacrylate, tert-butyl methacrylate, vinyl acetate, vinyl acrylate, butyl acrylate, acrylonitrile and vinyl chloride.

Examples of the cyclic monomers used in the ring-opening polymerization include those above described.

Of the cyclic monomers exemplified above, ε-caprolactone, ε-caprolactam and ethyleneoxide are preferred.

Examples of the ionically polymerizable monomers include the same ones as above noted.

As the segment $R^2$, a segment obtained by the radical polymerization of a radically polymerizable monomer, such as methyl methacrylate, ethyl methacrylate, vinyl acrylate, butyl acrylate, styrene and acrylonitrile; and a segment obtained by the ring-opening polymerization of a cyclic monomer, such as lactone, lactam, 2-oxazoline and cyclic ethers, are preferred.

The segment $R^2$ has a weight-average molecular weight of, although not particularly limited to, usually 100 to 1,000,000, preferably 200 to 500,000, more preferably 300 to 490.

Desirably, the segment $R^2$ is contained in the olefin block copolymer (A-2) in an amount of usually 0.01 to 99.99% by weight, preferably 1 to 99% by weight, more preferably 1 to 95% by weight based on the copolymer (A-2).

In formula (II), $X^2$ denotes an ester linkage, an ether linkage, an amide linkage, an imide linkage, a urethane linkage, a urea linkage, a silylether linkage or a carbonyl linkage.

In formula (II), $h^2$ denotes a polar group selected from an amino group, a halogen atom, an isocyanate group, an aldehyde group, a hydroxyl group, a carboxyl group, an anhydride group, a silanol group, a sulfonic group and an epoxy group; and n is 0 or 1.

In the present invention, $h^2$ is desired to be an amino group, a halogen atom, an isocyanate group, an aldehyde group or a carboxyl group, preferably a halogen atom, an isocyanate group or an aldehyde group when n is 0.

The olefin block copolymer (A-2) of formula (II) desirably has a melt flow rate (MFR), as measured at 230° C. under 2.16 kg load according to ASTM D 1238, of usually 0.01 to 200 g/10 min, preferably 0.05 to 100 g/10 min, more preferably 0.05 to 80 g/10 min.

Examples of the olefin block copolymer (A-2) represented by formula (II) include the following.

Examples of the olefin block copolymer (A-2) represented by formula (II) wherein n is 0 include;

a block copolymer wherein the segment $PO^2$ is an ethylene/butene copolymer (butene content: 30 mol %), the linkage $f^2$ is an ether linkage, the segment $R^2$ is a methyl methacrylate polymer and the polar group $h^2$ is a hydroxyl group;

a block copolymer wherein the segment $PO^2$ is an ethylene/propylene/DMDT copolymer (propylene content: 28 mol %, DMDT content: 3 mol %), the linkage $f^2$ is an ether linkage, the segment $R^2$ is a styrene polymer and the polar group $h^2$ is a carboxyl group; and a block copolymer wherein the segment $PO^2$ is a polypropylene homopolymer, the linkage $f^2$ is an ether linkage, the segment $R^2$ is a hydroxyethyl acrylate homopolymer and the polar group $h^2$ is an amino group.

Examples of the olefin block copolymer (A-2) represented by formula (II) wherein n is 1 include;

a block copolymer wherein the segment $PO^2$ is an ethylene/butene random copolymer (butene content: 10 mol %), the linkage $f^2$ is an ether linkage, the segment $R^2$ is an ethylene glycol polymer, the linkage $X^2$ is an ether linkage and the polar group $h^2$ is an amino group;

a block copolymer wherein the segment $PO^2$ is an ethylene/norbornene random copolymer (norbornene content: 8.5 mol %), the linkage $f^2$ is an ether linkage, the segment $R^2$ is a methyl methacrylate polymer, the linkage $X^2$ is an ether linkage and the polar group $h^2$ is an isocyanate group; and a block copolymer wherein the segment $PO^2$ is an ethylene homopolymer, the linkage $f^2$ is an amide linkage, the segment $R^2$ is an ε-caprolactam ring-opening polymer, the linkage $X^2$ is an amide linkage and the polar group $h^2$ is an isocyanate group.

These copolymers characteristically have both the hydrophobicity of polyolefin and the reactivity of polar group.

Referring to the olefin block copolymer (A-2), it is also preferable that the segment $R^2$ have a weight-average molecular weight of less than 500. Such an olefin block copolymer is suitably used for anti-fogging films, paints, adhesives for resins and coating of metals.

Examples of the olefin block copolymer (A-2) wherein the segment $R^2$ has a weight-average molecular weight of less than 500 include;

a block copolymer wherein the segment $PO^2$ is an ethylene/butene random copolymer (butene content: 5 mol %), the linkage $f^2$ is an ether linkage, the segment $R^2$ is an ethylene glycol polymer, n is 0 and the polar group $h^2$ is a hydroxyl group; and a block copolymer wherein the segment $PO^2$ is an ethylene/octene random copolymer (octene content: 10 mol %), the linkage $f^2$ is an ether linkage, the segment $R^2$ is a polymethyl methacrylate segment, n is 1, the linkage $X^2$ is an ether linkage and the polar group $h^2$ is a sulfonic group.

These olefin block copolymers (A-2) characteristically have all the compatibility with polyolefins and the reactivity to functional groups and the hydrophilicity.

The olefin block copolymer (A-2) represented by formula (II) can be produced by the following processes.

First, the olefin block copolymer (A-2a) represented by formula (II) wherein n is 0 will be described.

The olefin block copolymer (A-2a) can be prepared, for example, by replacing an active species for chain polymerization (-Z) present in the terminal position of the olefin block copolymer (A-2b) represented by formula (IIb) with a functional group containing an oxygen, nitrogen, silicon or halogen atom. The term functional group containing a halogen atom comprehends a halogen atom per se.

$$PO^2\text{-}f^2\text{-}R^2\text{-}Z \qquad (IIb)$$

wherein $PO^2$, $f^2$ and $R^2$ are as defined with respect to formula (II) and Z denotes an active species for chain polymerization.

The olefin block copolymer (A-2b) can be produced, for example, by the same process as to produce the olefin block copolymer (A-11) or (A-12), preferably by the same process as to produce the olefin block copolymer (A-11). That is, the olefin block copolymer (A-2b) can be produced by first preparing a polyolefin linking with a Group 13 element in the terminal position, which has a weight-average molecular weight of 200 to 1,000,000; forming a polymerization active species for chain polymerization, such as radical polymerization, ring-opening polymerization or ionic polymerization, in the presence of the polyolefin; and conducting such a reaction, thereby synthesizing the segment $R^2$ having a weight-average molecular weight of 100 to 1,000,000.

The olefin block copolymer (A-2b) thus produced, as far as treated in such an inert gas as nitrogen, argon or helium, can maintain its polymer structure where it has, in the terminal position, an active species for chain polymerization, such as a group containing a bond of oxygen and a Group 13 element.

The olefin block copolymer (A-2b) can also be prepared by anionic polymerization, likewise the process for producing the olefin block copolymer (A-8) mentioned later. Such a process gives the olefin block copolymer (A-2b) having lithium or a phosphorus-containing group in the terminal position.

Of the olefin block copolymers (A-2a), the copolymers wherein the linkage $h^2$ is a hydroxyl group can be prepared by hydrolysis or alcoholysis of the olefin block copolymer (A-2b)

The hydrolysis or the alcoholysis is performed by introducing the olefin block copolymer (A-2b) in an excessive amount of water or alcohol containing hydrochloric acid in small amounts and stirring the mixture for at least 5 minutes.

The olefin block copolymer (A-2a) wherein the linkage $h^2$ is a group other than the hydroxyl group, namely wherein the linkage $h^2$ is an amino group, a halogen, an isocyanate group, an aldehyde group, a carboxyl group, an anhydride group, a silanol group, a sulfonic group or an epoxy group, can be prepared by reacting the hydroxyl group constituting the linkage $h^2$ of the olefin block copolymer (A-2a) with a compound containing a functional group which can react with the hydroxyl group, thereby converting the hydroxyl group to a different group.

In producing the olefin block copolymer (A-2a) wherein the linkage $h^2$ is a group other than the hydroxyl group, the functional group obtained as a result of conversion of the hydroxyl group constituting the linkage $h^2$ of the olefin block copolymer (A-2a), may be reacted with a compound containing a functional group which can react with the former functional group to be converted to a different group. As specific and preferable examples, there can be mentioned a conversion where a hydroxyl group is converted to a halogen and the halogen is converted to an amino group; and a conversion where a hydroxyl group is converted to a halogen and the halogen is converted to an amino group to form a polymer and further the linkage $h^2$ of the polymer is converted to an isocyanate group.

The conversion is preferably made with the olefin block copolymer (A-2a) being molten or with at least a part of the olefin block copolymer (A-2a) being dissolved in an organic solvent, more preferably with the olefin block copolymer (A-2a) being completely dissolved in an organic solvent.

Examples of the organic solvent used in the conversion include aliphatic hydrocarbons, such as hexane, heptane and decane; aromatic hydrocarbons, such as benzene, toluene and xylene; halogen-containing hydrocarbons, such as methylene chloride and dichlorobenzene; and hetero atom-containing hydrocarbons, such as dimethyl sulfoxide and dimethyl formamide.

Next, specific examples of the process for producing the olefin block copolymer (A-2a) wherein the linkage $h^2$ is a halogen, an aldehyde group, a carboxyl group, an amino group or an isocyanate group will be described.

(When the Linkage $h^2$ is a Halogen:)

The olefin block copolymer (A-2a) wherein the linkage $h^2$ is a hydroxyl group is mixed with thionyl chloride of an amount 1 to 10 molar times that of the hydroxyl group, and they are allowed to react with each other at 0 to 100° C. for 5 minutes to 24 hours. Thionyl bromide can be used in place of the thionyl chloride.

(When the Linkage $h^2$ is an Aldehyde Group:)

The olefin block copolymer (A-2a) wherein the linkage $h^2$ is a hydroxyl group (contained in the form of a primary alcohol) is mixed with pyridinium chlorochromate of an amount 1 to 5 molar times that of the hydroxyl group, and they are allowed to react with each other at −20 to 100° C. for 0.5 to 24 hours.

(When the Linkage $h^2$ is a Carboxyl Group:)

The olefin block copolymer (A-2a) wherein the linkage $h^2$ is a hydroxyl group (contained in the form of a primary alcohol) is mixed with potassium permanganate of an amount 1 to 10 molar times that of the hydroxyl group, and they are allowed to react with each other at 0 to 200° C. for 0.5 to 24 hours.

(When the Linkage $h^2$ is an Amino Group:)

The olefin block copolymer (A-2a) wherein the linkage $h^2$ is a halogen is mixed with sodium azide of an amount 1 to 10 molar times that of the halogen, and they are allowed to react with each other at 50 to 150° C. for 0.5 to 24 hours. The resulting reaction product is mixed with triphenylphosphine of an amount 1 to 10 molar times that of the halogen (the halogen in the olefin block copolymer (A-2a)), and they are allowed to react with each other at 0 to 100° C. for 0.5 to 24 hours.

(When the Linkage $h^2$ is an Isocyanate Group:)

The olefin block copolymer (A-2a) wherein the linkage $h^2$ is an amino group is mixed with hydrochloric acid of an amount 2 to 20 molar times that of the amino group, and they are allowed to react with each other at temperatures lower than 30° C., preferably at −20 to 20° C. for 0.5 to 12 hours. The resulting reaction product is precipitated by addition of acetone. The precipitate is reacted in a suspended state by passing phosgene through while being heated to 150 to 250° C. for 8 to 48 hours.

The olefin block copolymers (A-2a) can be produced by the processes given above.

The olefin block copolymer (A-2c) of formula (II) wherein n is 1 can be prepared by reacting the olefin block copolymer (A-2a) with a compound containing in the molecule 2 or more functional groups which can react with the linkage $h^2$. The functional groups of the compound containing in the molecule 2 or more functional groups which can react with the linkage $h^2$ may be the same or different. These functional groups may be present independently or condensed like the acid anhydride.

Examples of the process for producing the olefin block copolymer (A-2c) by reacting the olefin block copolymer (A-2a) with a compound containing in the molecule 2 or more functional groups will be given hereinafter.

(When the Linkage $h^2$ is an Amino Group:)

The olefin block copolymer (A-2a) wherein the linkage $h^2$ is a hydroxyl group is mixed with ethanolamine of an amount 1 to 50 molar times that of the hydroxyl group, and with a sulfuric acid of catalytic quantity. They are allowed to react with each other at 40 to 200° C. for 1 to 24 hours.

(When the Linkage $h^2$ is a Halogen:)

The olefin block copolymer (A-2a) wherein the linkage $h^2$ is a hydroxyl group is mixed with 1,3-dibromopropane of an amount 1 to 100 molar times that of the hydroxyl group, and they are allowed to react with each other in the presence of such a basic organic solvent as represented by pyridine at −20 to 100° C. for 5 to 24 hours.

(When the Linkage $h^2$ is an Isocyanate Group:)

The olefin block copolymer (A-2a) wherein the linkage $h^2$ is an amino group is mixed with a hydrochloric acid of an amount 2 to 20 molar times that of the amino group, and they are allowed to react with each other at temperatures lower than 30° C., preferably at −20 to 20° C. for 0.5 to 12 hours. The reaction product is precipitated by addition of acetone. The resulting precipitate is reacted in a suspended state by passing phosgene through while being heated to 150 to 250° C. for 8 to 48 hours.

(When the Linkage $h^2$ is an Aldehyde Group:)

The olefin block copolymer (A-2a) wherein the linkage $h^2$ is a hydroxyl group (contained in the form of a primary alcohol) is mixed with pyridinium chlorochromate of an amount 1 to 5 molar times that of the hydroxyl group, and they are allowed to react with each other at −20 to 100° C. for 0.5 to 24 hours.

(When the Linkage $h^2$ is a Hydroxyl Group:)

The olefin block copolymer (A-2a) wherein the linkage $h^2$ is a hydroxyl group is mixed with ethylene glycol of an amount 1 to 10 molar times that of the hydroxyl group, and with a sulfuric acid of catalytic quantity. They are allowed to react with each other at 40 to 150° C. for 1 to 10 hours.

(When the Linkage $h^2$ is a Carboxyl Group:)

The olefin block copolymer (A-2a) wherein the linkage $h^2$ is a hydroxyl group (contained in the form of a primary alcohol) is mixed with maleic anhydride of an amount 1 to 10 molar times that of the hydroxyl group, and they are allowed to react with each other at 20 to 150° C. for 0.5 to 10 hours.

(When the Linkage $h^2$ is an Anhydride Group:)

The olefin block copolymer (A-2a) wherein the linkage $h^2$ is a hydroxyl group is mixed with meso-butane-1,2,3,4-tetracarboxylic dianhydride of an amount 1 to 10 molar times that of the hydroxyl group, and they are allowed to react with each other at 20 to 150° C. for 0.5 to 10 hours.

(When the Linkage $h^2$ is a Silanol Group:)

The olefin block copolymer (A-2a) wherein the linkage $h^2$ is a hydroxyl group is mixed with di-tert-butylsilyl dichloride of an amount 1 to 10 molar times that of the hydroxyl group, and with $AgNO_3$ of catalytic quantity. They are allowed to react with each other at 10 to 40° C. for 10 to 24 hours.

(When the Linkage $h^2$ is a Sulfonic Group:)

The olefin block copolymer (A-2a) wherein the linkage $h^2$ is a hydroxyl group is mixed with a sulfuric acid of an amount 1 to 10 molar times that of the hydroxyl group, and they are allowed to react with each other at 40 to 200° C. for 1 to 12 hours.

Olefin Block Copolymer (A-21)

Next, the olefin block copolymer (A-21) will be described.

The olefin block copolymer (A-21) is a copolymer of the olefin block copolymers (A-2), wherein the segment $PO^2$ has a weight-average molecular weight of less than 2000, preferably from 500 to 1800, and the segment $R^2$ has a weight-average molecular weight of at least 500, preferably from 500 to 1,000,000, more preferably from 500 to 100,000, even more preferably 500 to 50,000.

In the olefin block copolymer (A-21), the segment $PO^2$ desirably has a molecular weight distribution (Mw/Mn), determined by the gel permeation chromatography, of 2.5 or less, preferably 2.3 or less.

In the olefin block copolymer (A-21), the segment $PO^2$ desirably has a glass transition temperature (Tg) determined with the differential scanning calorimeter (DSC) of usually 150° C. or less, preferably from −100 to 100° C., more preferably from −80 to 40° C.

The segment $PO^2$ is preferably obtained by polymerizing or copolymerizing at least one α-olefin selected from linear or branched α-olefins having 2 to 20 carbon atoms. Specifically, the segment $PO^2$ is composed of an ethylene polymer, such as ethylene homopolymer and ethylene/α-olefin copolymers; a propylene polymer, such as propylene homopolymer and propylene/α-olefin copolymers; a butene polymer, such as butene homopolymer and butene/ethylene copolymer; or a 4-methyl-1-pentene polymer, such as 4-methyl-1-pentene homopolymer.

The segment $R^2$ is contained in the olefin block copolymer (A-21) in an amount of 20 to 99.99% by weight, preferably 20 to 99% by weight, more preferably 20 to 95% by weight, particularly preferably 20 to 90% by weight based on the copolymer (A-21).

The melt flow rate (MFR) of the olefin block copolymer (A-21), as measured at 230° C. under 2.16 kg load in accordance with ASTM D1238, ideally ranges from 0.01 to 5000 g/10 min, preferably 0.05 to 1000 g/10 min, more preferably 0.1 to 500 g/10 min.

Specific examples of the olefin block copolymer (A-21) include the following.

A block copolymer wherein the segment $PO^2$ is an isotactic polypropylene segment having a molecular weight of 500 or more and less than 2000 and the segment $R^2$ is a polycaprolactam segment having a molecular weight of 500 to 10,000. Such a block copolymer is useful as a compatibilizer for polypropylenes and nylon resins.

A block copolymer wherein the segment $PO^2$ is composed of a random copolymer of ethylene and an α-olefin of 3 to 20 carbon atoms and has a molecular weight of 500 or more and less than 2000 and an ethylene content of 10 to 90% by mol, and the segment $R^2$ is a polycaprolactam segment having a molecular weight of 500 to 10,000. Such a block copolymer is useful as an impact modifier for nylon resins and as a compatibilizer for nylon resins and soft polyolefins.

A block copolymer wherein the segment $PO^2$ is an ethylene/propylene random copolymer segment and has a molecular weight of 500 or more and less than 2000 and an ethylene content of 10 to 90% by mol, and the segment $R^2$ is a polystyrene segment having a molecular weight of 500 to 50,000. Such a block copolymer is useful as an impact modifier which does not deteriorate the transparency of polystyrene and as a compatibilizer for polystyrenes and soft polyolefins.

A block copolymer wherein the segment $PO^2$ is an ethylene/propylene random copolymer segment and has a molecular weight of 500 or more and less than 2000 and an ethylene content of 10 to 90% by mol, and the segment $R^2$ is a polymethyl methacrylate segment having a molecular weight of 500 to 10,000. Such a block copolymer is useful as an impact modifier which does not deteriorate the transparency of polymethyl methacrylate and as a compatibilizer for polymethyl methacrylate and soft polyolefins.

A block copolymer wherein the segment $PO^2$ is a polyethylene segment having a molecular weight of 500 or more and less than 2000 and an ethylene content of 90 to 100% by mol and the segment $R^2$ is a polyethyleneoxide segment having a molecular weight of 500 to 10,000. Such a block copolymer is preferred to use as a long-term anti-fogging agent for LLDPE films and a long-term antistatic agent for HDPE.

(Production Process)

The olefin block copolymer (A-21) can be prepared by the same process as to produce the olefin block copolymer (A-2).

(Uses)

The olefin block copolymer (A-21) can be linked to a low-molecular weight compound at a part of the functional group of the segment $R^2$ or at its terminal —$(X^2)_n$-$h^2$. Otherwise, the olefin block copolymer (A-21) can be linked to a low-molecular weight compound during the synthesis thereof. For example, the olefin block copolymer having a hindered-amine structure in the molecule can be produced by esterification of a methacrylic acid segment with 4-hydroxy-2,2',6,6'-tetramethyl-1-piperidine. With such a structure as a hindered-phenol structure, a phosphite structure or a thioether structure, the copolymer can be imparted with functions to act as a heat stabilizer or a weathering stabilizer.

The olefin block copolymer (A-21), where the molecular weight is low, can move easily in a synthetic resin, produce excellent effects of stabilizing an interface in an alloy of a polyolefin and a polar polymer, and be used as a compatibilizer for polymer alloys of polyolefins and polar polymers.

When the olefin block copolymer (A-21), in which the polyolefin segment has a low glass transition temperature, is blended with a polar polymer, domains are formed minute because the polyolefin segment has a low molecular weight. Therefore, the olefin block copolymer (A-21) can be used as an impact modifier which does not deteriorate the transparency of transparent polar polymers, such as polystyrene, polymethyl methacrylate and polyvinyl chloride.

The olefin block copolymer (A-21) comprising the segment $R^2$ composed of, for example, a hydrophilic group or a resin-stabilizing group, can be used as a functional additive having a good suitability to polyolefins. For example, such an olefin block copolymer can be used as additives for resins, such as a long-term anti-fogging agent, a long-term antistatic agent, a long-term heat stabilizer and a long-term weathering stabilizer.

The olefin block copolymer (A-21) can be used in toner binders for printing various adherends because it has both a sharp melting point and polarity which are inherent in the low-molecular weight polyolefin.

The olefin block copolymer (A-21) also can be suitably used as surface-active agents where higher fatty esters have been conventionally used, and as waxes where low-molecular weight polyolefins or modified low-molecular weight polyolefins have been conventionally used.

The olefin block copolymer (A-21) has an excellent affinity with both a polyolefin and a polar polymer because its segment $PO^2$ has a molecular weight of less than 2000.

Olefin Block Copolymer (A-3)

The olefin block copolymer (A-3) is represented by formula (III):

$$PO^3-g^3-F^3 \qquad (III)$$

Wherein $PO^3$ is of the same definition as $PO^2$ in formula (II).

When the segment $PO^3$ is derived from a linear α-olefin of 2 to 20 carbon atoms, the crystallinity, the melting point, the impact resistance and the rigidity can be adjusted freely.

When the segment $PO^3$ is derived from a branched olefin or a cycloolefin having 5 to 20 carbon atoms, Tg can be adjusted.

When the segment $PO^3$ is derived from a conjugated diene or a non-conjugated polyene, the copolymer becomes rich in reactivity in crosslinking or the like.

When the segment $PO^3$ has a molecular weight distribution (Mw/Mn) of 2.5 or less, the copolymer is excellent in adhesion and coating properties owing to no sticking and no bleedout of low-molecular weight substances because low-molecular weight substances formed in small amounts.

The segment $PO^3$ is preferably obtained by polymerizing or copolymerizing at least one α-olefin selected from linear or branched α-olefins having 2 to 20 carbon atoms. Specifically, the segment $PO^3$ is composed of an ethylene polymer, such as ethylene homopolymer and ethylene/α-olefin random copolymers; a propylene polymer, such as propylene homopolymer and propylene/α-olefin random copolymers; a butene polymer, such as butene homopolymer and butene/ethylene random copolymer; or a 4-methyl-1-pentene polymer, such as 4-methyl-1-pentene homopolymer.

The segment $PO^3$ has a weight-average molecular weight of, although not particularly limited to, usually 200 to 1,000,000, preferably 5,000 to 500,000, more preferably 10,000 to 50,000.

In formula (III), $g^3$ denotes an ester linkage, an ether linkage, an amide linkage, an imide linkage, a urethane linkage, a urea linkage, a silylether linkage or a carbonyl linkage. Of these, a urea linkage, a silylether linkage and a carbonyl linkage are preferred. An ether linkage, an ester linkage, an amide linkage, an imide linkage and a urethane linkage are also preferable.

The linkage $g^3$ is formed as a result of the reaction of the polyolefin having in the terminal position a functional group containing an oxygen atom, a nitrogen atom, a silicon atom or a halogen atom (mentioned later) with a polar polymer. The linkage $g^3$ occasionally contains a part of the structure of the polyolefin or the polar polymer.

In formula (III), $F^3$ denotes a segment containing an unsaturated hydrocarbon or a hetero atom, which segment can be derived from a polar polymer obtained by a condensation reaction, such as polycondensation; an ionic reaction, such as anionic polymerization and cationic polymerization; or an addition reaction, such as polyaddition reaction. Examples of the segment $F^3$ include compounds obtained by subjecting an amphoteric electrolyte monomer to a condensation reaction, an ionic reaction or an addition reaction.

Preferably, the bonding structures of monomer units in the segment $F^3$ are symmetrical about the center of the monomer units.

The definition that the bonding structures of monomer units in the segment $F^3$ are symmetrical about the center of the monomer units, is that the bonding structures in a polymer, where 4 or more sequential monomer units are symmetrical about the part of the structures excluding the functional group-parts contributing to the formation of the bonded parts of the monomer units.

Examples of the bonding structures of the monomer units which are symmetrical about the center of the monomer units include the following.

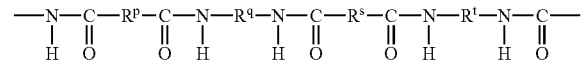

In the above structure, the bonding structures are symmetrical about any of $R^p$, $R^q$, $R^s$ and $R^t$. The structures are symmetrical in only the order of bonding of elements, and the symmetry does not concern itself in terms of the conformation and the enantiomer.

Examples of the combination of monomers that can make such bonding include combinations of diols and dibasic acids, e.g., dicarboxylic acid; diols and diisocyanates; diamines and dicarboxylic acids; and diamines and dialdehydes. Examples of the type of the bonding structure include an amide linkage, an ester linkage, a urea linkage, a urethane linkage and an imide linkage.

Examples of the diols include aliphatic diols, such as diethylene glycol, 1,2-propane diol, 1,3-propane diol, 1,4-butane diol, 1,6-hexane diol, trimethylene glycol, neopentyl glycol, dodecamethylene glycol, triethylene glycol and tetraethylene glycol; alicyclic diols, such as cyclohexanedimethanol; and aromatic group-containing diols, such as 1,3-bis(2-hydroxyethoxy)benzene, 1,2-bis(2-hydroxyethoxy)benzene, 1,4-bis(2-hydroxyethoxy)benzene, bis[4-(2-hydroxyethoxy)phenyl]sulfone, 2,2-bis(4-β-hydroxyethoxyphenyl)propane, bisphenols, hydroquinone and resorcin.

Examples of the dicarboxylic acids include aromatic dicarboxylic acids, such as terephthalic acids, 2,7-naphthalenedicarboxylic acid, 1,4-naphthalenedicarboxylic acid, 4,4'-sulfone-bisbenzoic acid, 4,4'-biphenyldicarboxylic acid, 4,4'-sulfide-bisbenzoic acid, 4,4'-oxy-bisbenzoic acid and diphenoxyethanedicarboxylic acid; aliphatic dicarboxylic acids, such as oxalic acid, malonic acid, succinic acid, glutaric acid, adipic acid, pimelic acid, cork acid, fumaric acid, maleic acid, sebacic acid, azelaic acid and decanedicarboxylic acid; and alicyclic dicarboxylic acids, such as cyclohexanedicarboxylic acid.

Examples of the diamines include ethylenediamine, tetramethylenediamine, hexamethylenediamine, octamethylenediamine, 1,3-bis[4-(4-aminophenoxy)-α,α-dimethylbenzyl]benzene, 1,4-bis[4-4(aminophenoxy)-α,α-dimethylbenzyl]benzene, m-phenylenediamine, o-phenylenediamine, p-phenylenediamine, m-aminobenzylamine, o-aminobenzylamine, 3-chloro-1,2-phenylenediamine, 4-chloro-1,2-phenylenediamine, 2,3-diaminotoluene, 2,4-diaminotoluene, 2,5-diaminotoluene, 2,6-diaminotoluene, 3,4-diaminotoluene, 3,5-diaminotoluene, 2-methoxy-1,4-phenylenediamine, 4-methoxy-1,2-phenylenediamine, 4-methoxy-1,3-phenylenediamine, benzidine, 3,3'dichlorobenzidine, 3,3'-dimethylbenzidine, 3,3'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,3'-diaminodiphenyl sulfoxide, 3,4'-diaminodiphenyl sulfoxide, 4,4'-diaminodiphenyl sulfoxide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis[4-(4-aminophenoxy)phenyl]methane, 1,1-bis[4-(4-aminophenoxy)phenyl]ethane, 1,2-bis[4-(4-aminophenoxy)phenyl]ethane, 1,1-bis[4-(4-aminophenoxy)phenyl]propane, 1,2-bis[4-(4-aminophenoxy)phenyl]propane, 1,3-bis[4-(4-aminophenoxy)phenyl]propane, 2,2-bis[4-(4-aminophenoxy)phenyl]propane, 1,1-bis[4-(4-aminophenoxy)phenyl]butane, 1,3-bis[4-(4-aminophenoxy)phenyl]butane, 1,4-bis[4-(4-aminophenoxy)phenyl]butane, 2,2-bis[4-(4-aminophenoxy)phenyl]butane, 2,3-bis[4-(4-aminophenoxy)phenyl]butane, 2-[4-(4-aminophenoxy)phenyl]-2-[4-(4-aminophenoxy)-3-methylphenyl]propane, 2,2-bis[4-(4-aminophenoxy)-3-methylphenyl]propane, 2-[4-(4-aminophenoxy)phenyl]-2-[4-(4-aminophenoxy)-3,5-dimethylphenyl]propane, 2,2-bis[4-(4-aminophenoxy)-3,5-dimethylphenyl]propane, 2,2-bis[4-(4-aminophenoxy)phenyl]-1,1,1,3,3,3-hexafluoropropane, 1,3-bis(4-aminophenoxy)benzene, 1,4-bis(3-aminophenoxy)benzene, 1,4-bis(4-aminophenoxy)benzene, 4,4'-bis(3-aminophenoxy)biphenyl, 4,4'-bis(4-aminophenoxy)biphenyl, bis[4-(4-aminophenoxy)phenyl]ketone, bis[4-(4-aminophenoxy)phenyl]sulfide, bis[4-(4-aminophenoxy)phenyl]sulfoxide, bis[4-(4-aminophenoxy)phenyl]sulfone, bis[4-(3-aminophenoxy)phenyl ether, bis[4-(4-aminophenoxy)phenyl]ether, 1,3-bis[4-(4-aminophenoxy)benzoyl]benzene, 1,3-bis[4-(3-aminophenoxy)benzoyl]benzene, 1,4-bis[4-(3-aminophenoxy)benzoyl]benzene, 4,4'-bis(3-aminophenoxy)benzoyl]benzene, 4,4'-bis(3-aminophenoxy)-3,3'-dimethylbiphenyl, 4,4'-bis(3-aminophenoxy)-3,3',5,5'-tetramethylbiphenyl, 4,4'-bis(3-aminophenoxy)-3,3',5,5'-tetrachlorobiphenyl, 4,4'-bis(3-aminophenoxy)-3,3',5,5'-tetrabromobiphenyl, bis[4-(3-aminophenoxy)-3-methoxyphenyl]sulfide, [4-(3-aminophenoxy)phenyl][4-(3-aminophenoxy)-3,5-dimethoxyphenyl]sulfide, bis[4-(3-aminophenoxy)-3,5-dimethoxyphenyl]sulfide, 1,1-bis[4-(3-aminophenoxy)phenyl]propane, 1,3-bis[4-(3-aminophenoxy)phenyl]propane, 2,2-bis[4-(3-aminophenoxy)phenyl]propane, 2,2-bis[4-(3-aminophenoxy)phenyl]-1,1,1,3,3,3-hexafluoro propane, bis[4-(3-aminophenoxy)phenyl]ketone, bis[4-(3-aminophenoxy)phenyl]sulfide, bis[4-(3-aminophenoxy)phenyl]sulfone and 1,3-bis(3-aminophenoxy)benzene.

Examples of the diisocyanates include aliphatic diisocyanates, such as methylenediisocyanate, ethylenediisocyanate, trimethylenediisocyanate, hexamethylenediisocyanate and butenediisocyanate; and alicyclic or aromatic diisocyanates, such as cyclohexane-1,2-diisocyanate and p-phenylenebis(isopropylisocyanate).

The amphoteric electrolyte monomer is a combination of at least two functional groups which are reactable with each other and present in one compound, e.g., hydroxy acids and amino acids. Examples include glycolic acid, diglycolic acid, lactic acid, 3-hydroxybutylic acid, p-hydroxybenzoic acid, m-hydroxybenzoic acid, p-hydroxymethylbenzoic acid, m-hydroxymethylbenzoic acid, p-(2-hydroxyethyl)benzoic acid and m-(2-hydroxyethyl)benzoic acid.

Specific examples of the segment $F^3$ include segments derived from polyamide, polypeptide, polyurea, polyimide, polyimidazole, polyurethane, polyester, polycarbonate, polyamide, polysiloxane, polystyrene, polybutadiene, polyisoprene, a styrene/diene copolymer, polyacrylate or polyether.

The segment $F^3$ preferably has bonding structures of monomer units which are symmetrical about the center of the monomer units, and is preferably derived from a polymer which contains an unsaturated hydrocarbon or a hetero atom and is obtained by a condensation reaction, an ionic reaction or an addition reaction; a polymer which contains, in the monomer units, a hetero atom and an alicyclic or aromatic hydrocarbon and is obtained by a condensation reaction, an ionic reaction or an addition reaction; or a polymer which is obtained by subjecting the amphoteric electrolyte monomer to a condensation reaction, an ionic reaction or an addition reaction.

The segment $F^3$ has a weight-average molecular weight of, although not particularly limited to, preferably 100 to 1,000,000, more preferably 200 to 500,000, even more preferably 300 to 300,000.

The segment $F^3$ is ideally contained, based on the olefin block copolymer (A-3), in an amount of usually 0.01 to 99.99% by weight, preferably 0.01 to 99% by weight, more preferably 0.1 to 95% by weight, particularly preferably 0.1 to 90% by weight.

The olefin block copolymer (A-3), which is represented by formula (III), has a melt flow rate of usually 0.01 to 200 g/10 min, preferably 0.05 to 100 g/10 min, more preferably 0.05 to 80 g/10 min.

Examples of the olefin block copolymer (A-3) represented by formula (III) include the following.

A block copolymer wherein the segment $PO^3$ is an ethylene/butene random copolymer segment (butene content: 10 mol %), the linkage $g^3$ is an ester linkage and the segment $F^3$ is composed of a copolymer of terephthalic acid and ethylene glycol.

A block copolymer wherein the segment $PO^3$ is a propylene polymer segment, the linkage $g^3$ is an ester linkage and the segment $F^3$ is composed of a copolymer of succinic acid and ethylene glycol.

A block copolymer wherein the segment $PO^3$ is an ethylene/propylene/DMDT random copolymer segment (propylene content: 28 mol %, DMDT content: 3 mol %), the linkage $g^3$ is an ester linkage and the segment $F^3$ is a nylon-66 segment.

The above exemplary copolymers have the bonding structures of the monomer units which are symmetrical about the center of the monomer units.

These copolymers characteristically form a hydrophobic domain and a hydrophilic domain in the same polymer.

It is also preferable that the linkage $g^3$ be an ether linkage, an ester linkage, an amide linkage, an imide linkage or a urethane linkage and that the segment $F^3$ be a segment which contains in the monomer units a hetero atom and an alicyclic or aromatic ring. Examples of the segment containing an alicyclic or aromatic ring include the alicyclic dicarboxylic acids, the aromatic dicarboxylic acids, the alicyclic diols, the aromatic diols, the alicyclic diamines, the aromatic diamines, the alicyclic diisocyanates and the aromatic diisocyanates described above.

Examples of the olefin block copolymer (A-3) include:

a block copolymer wherein the segment $PO^3$ is an ethylene/butene copolymer segment (butene content: 10 mol %), the linkage $g^3$ is an ester linkage and the segment $F^3$ is a hydroxybenzoic acid polymer segment;

a block copolymer wherein the segment $PO^3$ is a propylene polymer segment, the linkage $g^3$ is an ester linkage and the segment $F^3$ is a hydroxycyclohexanecarboxylic acid polymer segment; and a block copolymer wherein the segment $PO^3$ is an ethylene/octene copolymer segment (octene content: 10 mol %), the linkage $g^3$ is an ether linkage and the segment $F^3$ is a 5-hydroxybicycloheptanecarboxylic acid polymer segment.

These copolymers characteristically form a hydrophobic domain and a hydrophilic domain in the same polymer.

The olefin block copolymer (A-3) of formula (III) can be prepared, for example, by reacting a polyolefin having in the terminal position a functional group containing an oxygen, nitrogen, silicon or halogen atom with a polar polymer containing in the terminal position, preferably in the terminal position of one side a functional group which is reactable with the above functional group. The term functional group containing a halogen atom comprehends a halogen atom per se.

The reaction is preferably performed with the polyolefin and the polar polymer being molten or with at least a part of the polyolefin and/or at least a part of the polar polymer being dissolved in an organic solvent. The same organic solvent as used in preparation of the olefin block copolymer (A-2a) is used herein.

The reaction is carried out usually at a temperature of 20 to 300° C. under a pressure of 0.1 to 10 MPa. The weight ratio of the olefin polymer and the polar polymer for the reaction is usually 1:100 to 100:1, preferably 1:10 to 10:1.

The polyolefin having in the terminal position a functional group containing an oxygen, nitrogen, silicon or halogen atom can be produced by, for example, substituting a polyolefin which links with a Group 13 element in the terminal position with a functional group containing an oxygen, nitrogen, silicon or halogen atom.

Examples of the functional group containing an oxygen atom include a halogenated carbonyl group, a carboxyl group, a hydroxyl group and an anhydride group. Examples of the functional group containing a nitrogen atom include an isocyanate group and an amino group. Examples of the functional group containing a silicone atom include a silanol group.

The polyolefin which links with a Group 13 element in the terminal position can be produced, for example, by the same processes as to produce the olefin block copolymers (A-11) and (A-12), preferably by the same process as to produce the olefin block copolymer (A-11).

The olefin block copolymer (A-3) wherein the linkage $g^3$ is a urea linkage can be prepared, for example, by reacting a polyolefin having an isocyanate group in the terminal position with a polar polymer having an amino group in the terminal position, or by reacting a polyolefin having an amino group in the terminal position with a polar polymer having an isocyanate group in the terminal position. The polyolefin having an isocyanate group in the terminal position can be prepared by the same process as to produce the olefin block copolymer (A-2a) wherein the polar group $h^2$ is an isocyanate group. The polyolefin having an amino group in the terminal position can be prepared by the same process as to produce the olefin block copolymer (A-2a) wherein the polar group $h^2$ is an amino group. Examples of the polar polymer having an amino group in the terminal position include polyamide, polypeptide, polyurea, polyimide and polyimidazole. Examples of the polar polymer having an isocyanate group in the terminal position include polyurethane and polyurea. These polar polymers may be the one obtained by subjecting a polar group-containing monomer to a condensation reaction, an ionic reaction or an addition reaction; or by converting the end of a polar polymer which does not have an amino group or an isocyanate group in the terminal position to an amino group or an isocyanate group by the same process as given above.

The olefin block copolymer (A-3) wherein the linkage $g^3$ is a silylether linkage can be prepared by reacting a polyolefin having a silanol group in the terminal position with a polar polymer having a halogen in the terminal position; or by reacting a polyolefin having a halogen in the terminal position with a polar polymer having a silanol group in the terminal position. The polyolefin having a silanol group in the terminal position can be prepared by the same process as to produce the olefin block copolymer (A-2a) wherein the polar group $h^2$ is a silanol group. The polyolefin having a halogen in the terminal position can be prepared by the same process as to produce the olefin block copolymer (A-2a) wherein the polar group $h^2$ is a halogen. Examples of the polar polymer having a halogen in the terminal position include polyester, polycarbonate and polyamide. Examples of the polar polymer having a silanol group in the terminal position include polysiloxane. These polar polymers may be the one obtained by subjecting a polar group-containing monomer to a condensation reaction, an ionic reaction or an addition reaction; or by converting the end of a polar polymer which does not have a silanol group or a halogen in the terminal position, i.e., the polar group $h^2$, to a silanol group or a halogen by the same process as to synthesize a silanol group or a halogen given above.

The olefin block copolymer (A-3) wherein the linkage $g^3$ is a carbonyl linkage can be prepared, for example, by reacting a polyolefin having a halogenated carbonyl group in the terminal position with a polar polymer having a metal in the terminal position. The polyolefin having a halogenated carbonyl group in the terminal position can be prepared, for example, by converting the end of a polyolefin having a carboxyl group in the terminal position, which is prepared by the same process as to produce the olefin block copolymer (A-2a) wherein the polar group $h^2$ is a carboxyl group, to a halogenated carbonyl group. Examples of the preferable method of converting the end of a polyolefin having a carboxyl group in the terminal position to a halogenated carbonyl group include a method where a carboxyl group is reacted with thionyl chloride. The polar polymer having a metal in the terminal position is preferably obtained by living polymerization. Examples of the preferred metal include lithium and magnesium. The living-polymerized polymer is preferably obtained by an ionic reaction or an addition reaction. Examples of the preferred living-polymerized polymer include polystyrene, polybutadiene, polyisoprene, styrene/diene copolymer, polyacrylate and polysiloxane.

The olefin block copolymer (A-3) wherein the linkage $g^3$ is an ether linkage can be prepared, for example, by reacting a polyolefin having a halogen in the terminal position with a polymer obtained as a result of the reaction of a polar polymer having a hydroxyl group in the terminal position with such a hydrogenated metal as sodium halide. The polyolefin having a halogen in the terminal position can be prepared by the same process as to produce the olefin block copolymer (A-2a) wherein the polar group $h^2$ is a halogen. Examples of the polar polymer having a hydroxyl group in the terminal position include polyether, polyester and polyurethane.

The olefin block copolymer (A-3) wherein the linkage $g^3$ is an ester linkage can be prepared, for example, by reacting a polyolefin having a carboxyl group in the terminal position with a polar polymer having a hydroxyl group in the terminal position; or by reacting a polyolefin having a hydroxyl group in the terminal position with a polar polymer having a carboxyl group in the terminal position. The polyolefin having a carboxyl group in the terminal position can be prepared by the same process as to produce the olefin block copolymer (A-2a) wherein the polar group $h^2$ is a carboxyl group. The polyolefin having a hydroxyl group in the terminal position can be prepared by the same process as to produce the olefin block copolymer (A-2a) wherein the polar group $h^2$ is a hydroxyl group. It is also possible to prepare the polyolefin having a hydroxyl group in the terminal position by adding a sodium hydroxide solution and a hydrogen peroxide solution to a polyolefin having boron bonded in the terminal position of one side, and allowing them to react with each other at 40 to 50° C. for 3 to 5 hours. Examples of the polar polymer having a hydroxyl group in the terminal position include polyether, polyester and polyurethane. Examples of the polar polymer having a carboxyl group in the terminal position include polyester, polyamide, polypeptide and polyimidazole.

The olefin block copolymer (A-3) wherein the linkage $g^3$ is an amide linkage can be prepared, for example, by reacting a polyolefin having a carboxyl group in the terminal position with a polar polymer having an amino group in the terminal position; or by reacting a polyolefin having an amino group in the terminal position with a polar polymer having a carboxyl group in the terminal position. The polyolefin having a carboxyl group in the terminal position can be prepared by the same process as to produce the olefin block copolymer (A-2a) wherein the polar group $h^2$ is a carboxyl group. The polyolefin having an amino group in the terminal position can be prepared by the same process as to produce the olefin block copolymer (A-2a) wherein the polar group $h^2$ is an amino group. Examples of the polar polymer having an amino group in the terminal position include the same ones as those given above. Examples of the polar polymer having a carboxyl group in the terminal position include polyester, polyamide, polypeptide and polyimidazole.

The olefin block copolymer (A-3) wherein the linkage $g^3$ is an imide linkage can be prepared, for example, by reacting a polyolefin having an anhydride group in the terminal position with a polar polymer having an amino group in the terminal position; or by reacting a polyolefin having an amino group in the terminal position with a polar polymer having an anhydride group in the terminal position. The polyolefin having an anhydride group in the terminal position can be prepared by the same process as to produce the olefin block copolymer (A-2a) wherein the polar group $h^2$ is an anhydride group. The polyolefin having an amino group in the terminal position can be prepared by the same process as to produce the olefin block copolymer (A-2a) wherein the polar group $h^2$ is an amino group. Examples of the polar polymer having an amino group in the terminal position include the same ones as previously described. Examples of the polar polymer having an anhydride group in the terminal position include polyimide.

The olefin block copolymer (A-3) wherein the linkage $g^3$ is a urethane linkage can be prepared, for example, by reacting a polyolefin having an isocyanate group in the terminal position with a polar polymer having a hydroxyl group in the terminal position; or by reacting a polyolefin having a hydroxyl group in the terminal position with a polar polymer having an isocyanate group in the terminal position. The polyolefin having an isocyanate group in the terminal position can be prepared by the same process as to produce the olefin block copolymer (A-2a) wherein the polar group $h^2$ is an isocyanate group. The polyolefin having a hydroxyl group in the terminal position can be prepared by the same process as described above. Examples of the polar polymer having a hydroxyl group or an isocyanate group in the terminal position include the same ones as those given above.

Olefin Block Copolymer (A-4)

The olefin block copolymer (A-4) is represented by formula (IV):

$$PO^4\text{-}g^4\text{-}F^4\text{-}g^{14}\text{-}PO^{14} \qquad (IV)$$

wherein $PO^4$ and $PO^{14}$, which may be the same or different, have the same definition as that of $PO^2$ in formula (II), and $g^4$ and $g^{14}$, which may be the same or different, have the same definition as that of $g^3$ in formula (III).

The linkage $g^4$ and the linkage $g^{14}$ are formed by the reaction of a polyolefin having in the terminal position a functional group containing an oxygen, nitrogen, silicone or halogen atom with a polar polymer having a functional group in the terminal position of both sides; and these linkages occasionally contain a part of the structure of the polyolefin or the polar polymer.

In formula (IV), $F^4$ denotes a segment composed of a hydrocarbon or a segment containing an unsaturated hydrocarbon or a hetero atom, which is a polar segment obtained as a result of a condensation reaction, an ionic reaction or an addition reaction. Specific examples of the polar segment include the same ones as given with respect to the segment $F^3$ of formula (III).

Referring to the olefin block copolymer (A-4) of formula (IV), -$g^4$-$F^4$-$g^{14}$- may be derived from one compound and, in such a case, the segment $F^4$ is composed of a hydrocarbon.

Examples of -$g^4$-$F^4$-$g^{14}$- include those derived from diamine, diisocyanate, a dicarboxylic acid or a dihydroxy compound.

The segment $F^4$ is desirably contained in an amount of usually 0.01 to 99.99% by weight, preferably 0.01 to 99% by weight, more preferably 0.1 to 95% by weight, particularly preferably 0.1 to 90% by weight based on the olefin block copolymer (A-4).

The olefin block copolymer (A-4) of formula (IV) ideally has a melt flow rate of usually 0.01 to 200 g/10 min, preferably 0.05 to 100 g/10 min, more preferably 0.05 to 80 g/10 min.

Examples of the olefin block copolymer (A-4) include:

a block copolymer wherein the segment $PO^4$ and the segment $PO^{14}$ are each composed of polyethylene, the linkage $g^4$ and the linkage $g^{14}$ are each an ester linkage and the segment $F^4$ is composed of polyethylene glycol; and a block copolymer wherein the segment $PO^4$ and the segment $PO^{14}$ are each composed of polypropylene, the linkage $g^4$ and the linkage $g^{14}$ are each an ester linkage and the segment $F^4$ is composed of nylon-66.

These copolymers characteristically form a hydrophobic domain and a hydrophilic domain in the same polymer.

The olefin block copolymer (A-4) of formula (IV) can be prepared, for example, by reacting a polyolefin having in the terminal position a functional group containing an oxygen, nitrogen, silicon or halogen atom with a polar polymer containing in the terminal position of both sides a functional group which is reactable with the above functional group or the halogen. The functional group containing a halogen atom comprehends a halogen atom per se.

Examples of the polar polymer having a functional group in the terminal position of both sides include thermoplastic polyurethanes, epoxy resins, polyamides, polyesters and polyvinyl alcohols.

The reaction is preferably performed with the polyolefin and the polar polymer being molten or with at least a part of the polyolefin and/or at least a part of the polar polymer being dissolved in an organic solvent. Examples of the organic solvent include the same ones as used in preparation of the olefin block copolymer (A-2a).

The reaction is carried out usually at a temperature of 20 to 300° C. under a pressure of 0.1 to 10 MPa. The weight ratio of the polyolefin and the polar polymer for the reaction is usually 1:100 to 100:1, preferably 1:10 to 10:1.

Olefin Block Copolymer (A-5)

The olefin block copolymer (A-5) is represented by formula (V):

$$POB^5\text{-}g^5\text{-}F^5 \qquad (V)$$

wherein $POB^5$ denotes a di-block segment ($PO^2\text{-}f^2\text{-}R^2$—) derived from the olefin block copolymer (A-2) of formula (II), and the linkage $g^5$ is an ester linkage, an ether linkage, an amide linkage, an imide linkage, a urethane linkage, a urea linkage, a silylether linkage or a carbonyl linkage.

The linkage $g^5$ is formed as a result of the reaction of the olefin block copolymer (A-2) with a polar polymer having a functional group in the terminal position; and occasionally contains a part of the structure of the olefin block copolymer (A-2) or the polar polymer.

The segment $F^5$ of formula (V) is a polar segment containing an unsaturated hydrocarbon or a hetero atom, which is obtained by a condensation reaction, an ionic reaction or an addition reaction. Examples of the segment $F^5$ include the same ones as given with respect to the segment $F^5$ of formula (III).

The segment $F^5$ is ideally contained, based on the olefin block copolymer (A-5), in an amount of usually 0.01 to 99.99% by weight, preferably 0.01 to 99% by weight, more preferably 0.1 to 95% by weight, particularly preferably 0.1 to 90% by weight.

The olefin block copolymer (A-5), which is represented by formula (V), has a melt flow rate of usually 0.01 to 200 g/10 min, preferably 0.05 to 100 g/10 min, more preferably 0.05 to 80 g/10 min.

Examples of the olefin block copolymer (A-5) represented by formula (V) include:

a block copolymer wherein the segment $PO^2$ is composed of an ethylene/butene random copolymer (butene content: 30 mol %), the linkage $f^2$ is an ether linkage, the segment $R^2$ is composed of a methyl methacrylate polymer, the linkage $g^5$ is an ester linkage and the segment $F^5$ is composed of a random copolymer of terephthalic acid and ethylene glycol; and a block copolymer wherein the segment $PO^2$ is composed of an ethylene/propylene/DMDT random copolymer (propylene content: 28 mol %, DMDT content 3 mol %), the linkage $f^2$ is an ether linkage, the segment $R^2$ is composed of a styrene polymer, the linkage $g^5$ is an ester linkage and the segment $F^5$ is composed of nylon-6.

These copolymers characteristically form a hydrophobic domain and a hydrophilic domain in the same polymer.

The olefin block copolymer (A-5) of formula (V) can be prepared, for example, by reacting the olefin block copolymer (A-2) with a polar polymer having in the terminal position, preferably in the terminal position of one side a functional group which is reactable with the above terminal functional group (polar group $h^2$) of the copolymer (A-2).

The reaction is preferably performed with the olefin block copolymer (A-2) and the polar polymer being molten or with at least a part of the olefin polymer and at least a part of the polar polymer being dissolved in an organic solvent. Examples of the organic solvent include the same ones as used in preparation of the olefin block copolymer (A-2a).

The reaction is carried out usually at a temperature of 20 to 300° C. under a pressure of 0.1 to 10 MPa. The weight ratio of the olefin block copolymer (A-2) and the polar polymer for the reaction is usually 1:100 to 100:1, preferably 1:10 to 10:1.

The olefin block copolymer (A-5) wherein the linkage $g^5$ is an ether linkage can be prepared, for example, by reacting the olefin block copolymer (A-2) wherein the polar group $h^2$ is a halogen with a polymer obtained by the reaction of a polar polymer having a hydroxyl group in the terminal position with a hydrogenated metal, such as sodium halide. Examples of the polar polymer having a hydroxyl group in the terminal position include the same ones as those given above.

The olefin block copolymer (A-5) wherein the linkage $g^5$ is an ester linkage can be prepared, for example, by reacting the olefin block copolymer (A-2) wherein the polar group $h^2$ is a carboxyl group with a polar polymer having a hydroxyl group in the terminal position; or by reacting the olefin block copolymer (A-2) wherein the polar group $h^2$ is a hydroxyl group with a polar polymer having a carboxyl group in the terminal position. Examples of the polar polymer having a hydroxyl group in the terminal position and those of the polar polymer having a carboxyl group in the terminal position include the same ones as described above.

The olefin block copolymer (A-5) wherein the linkage $g^5$ is an amide linkage can be prepared, for example, by reacting the olefin block copolymer (A-2) wherein the polar group $h^2$ is a carboxyl group with a polar polymer having an amino group in the terminal position; or by reacting the olefin block copolymer (A-2) wherein the polar group $h^2$ is an amino group with a polar polymer having a carboxyl group in the terminal position. Examples of the polar polymer having an amino group in the terminal position and those of the polar polymer having a carboxyl group in the terminal position include the same ones as described above.

The olefin block copolymer (A-5) wherein the linkage $g^5$ is an imide linkage can be prepared, for example, by reacting the olefin block copolymer (A-2) wherein the polar group $h^2$ is an anhydride group with a polar polymer having an amino group in the terminal position; or by reacting the olefin block copolymer (A-2) wherein the polar group $h^2$ is an amino group with a polar polymer having an anhydride group in the terminal position. Examples of the polar polymer having an amino group in the terminal position and those of the polar polymer having an anhydride group in the terminal position include the same ones as described above.

The olefin block copolymer (A-5) wherein the linkage $g^5$ is a urethane linkage can be prepared, for example, by reacting the olefin block copolymer (A-2) wherein the polar group $h^2$ is an isocyanate group with a polar polymer having a hydroxyl group in the terminal position; or by reacting the olefin block copolymer (A-2) wherein the polar group $h^2$ is a hydroxyl group with a polar polymer having an isocyanate group in the terminal position. Examples of the polar polymer having a hydroxyl group in the terminal position and those of the polar polymer having an isocyanate group in the terminal position include the same ones as described above.

The olefin block copolymer (A-5) wherein the linkage $g^5$ is a urea linkage can be prepared, for example, by reacting the olefin block copolymer (A-2) wherein the polar group $h^2$ is an isocyanate group with a polar polymer having an amino group in the terminal position; or by reacting the olefin block copolymer (A-2) wherein the polar group $h^2$ is an amino group with a polar polymer having an isocyanate group in the terminal position. Examples of the polar polymer having an amino group in the terminal position and those of the polar polymer having an isocyanate group in the terminal position include the same ones as described above.

The olefin block copolymer (A-5) wherein the linkage $g^5$ is a silylether linkage can be prepared, for example, by reacting the olefin block copolymer (A-2) wherein the polar group $h^2$ is a silanol group with a polar polymer having a halogen in the terminal position; or by reacting the olefin block copolymer (A-2) wherein the polar group $h^2$ is a halogen with a polar polymer having a silanol group in the terminal position. Examples of the polar polymer having a halogen in the terminal position and those of the polar polymer having a silanol group in the terminal position include the same ones as described above.

The olefin block copolymer (A-5) wherein the linkage $g^5$ is a carbonyl linkage can be prepared, for example, by reacting a polymer, which is obtained by converting the olefin block copolymer (A-2) wherein the polar group $h^2$ is a carboxyl group to halogenated carbonyl, with a polar polymer having a metal in the terminal position. Examples of the preferred process for converting the polymer imparted with a carboxyl group in the terminal position to halogenated carbonyl include a reaction of the carboxyl group with thionyl chloride. Examples of the polar polymer having a metal in the terminal position include the same ones as given above.

Olefin Block Copolymer (A-6)

The olefin block copolymer (A-6) is represented by formula (VI):

wherein $POB^6$ and $POB^{16}$, which may be the same or different, each independently denote a di-block segment $(PO^2\text{-}f^2\text{-}R^2—)$ derived from the olefin block copolymer (A-2) of formula (II), and $g^6$ and $g^{16}$, which may be the same or different, each independently denote an ester linkage, an ether linkage, an amide linkage, an imide linkage, a urethane linkage, a urea linkage, a silylether linkage or a carbonyl linkage.

The linkages $g^6$ and $g^{16}$ are formed as a result of the reaction of the olefin block copolymer (A-2) with a polar polymer having a functional group in the terminal position of both sides; and occasionally contain a part of the structure of the olefin block copolymer (A-2) or the polar polymer.

The segment $F^6$ of formula (VI) is a polar segment which is composed of a hydrocarbon or which contains an unsaturated hydrocarbon or a hetero atom, and is obtained by a condensation reaction, an ionic reaction or an addition reaction. Examples of the polar segment include the same ones as given with respect to the segment $F^3$ of formula (III).

The segment $F^6$ is ideally contained, based on the olefin block copolymer (A-6), in an amount of usually 0.01 to 99.99% by weight, preferably 0.01 to 99% by weight, more preferably 0.1 to 95% by weight, particularly preferably 0.1 to 90% by weight.

The olefin block copolymer (A-6), which is represented by formula (VI), has a melt flow rate of usually 0.01 to 200 g/10 min, preferably 0.05 to 100 g/10 min, more preferably 0.05 to 80 g/10 min.

Examples of the olefin block copolymer (A-6) represented by formula (VI) include a copolymer wherein the segment $POB^6$ is a di-block segment composed of a segment of ethylene/propylene random copolymer (propylene content: 20 mol %), an ether linkage and a segment of methyl methacrylate polymer; the linkages $g^6$ and $g^{16}$ are each an ester linkage; the segment $F^6$ is a segment composed of a copolymer of an adipic acid and hexamethylenediamine; and the segment $POB^{16}$ is a di-block segment composed of a segment of ethylene/butene random copolymer (butene content: 10 mol %), an ether linkage and a segment of styrene copolymer.

Such a copolymer characteristically forms a hydrophobic segment and a hydrophilic segment in the same polymer.

In the olefin block copolymer (A-6) represented by formula (VI), $-g^6\text{-}F^6\text{-}g^{16}-$ may be derived from one compound and, in such a case, F is a segment composed of a hydrocarbon.

Examples of $-g^6\text{-}F^6\text{-}g^{16}-$ include those derived from diamine, diisocyanate, a dicarboxylic acid or a dihydroxy compound.

Examples of the olefin block copolymer (A-6) include a block copolymer wherein the segment $PO^2$ regarded as the segment $POB^6$ and the segment $POB^{16}$, is composed of a propylene/ethylene copolymer (ethylene content: 5 mol %), the linkage $f^2$ is an ether linkage, the segment $R^2$ is composed of a polyethylene glycol polymer and $-g^6\text{-}F^6\text{-}g^{16}-$ is a segment derived from diisocyanate.

The olefin block copolymer (A-6) represented by formula (VI) can be prepared, for example, by reacting the olefin block copolymer (A-2) with a polar polymer having in the terminal position of both sides a functional group which is reactable with the terminal functional group (polar group $h^2$) of the copolymer (A-2).

Examples of the polar polymer having in the terminal position of both sides a functional group which is reactable with the terminal functional group of the olefin block copolymer (A-2) include thermoplastic polyurethanes, epoxy resins, polyamides, polyesters and polyvinyl alcohols.

The terminal functional group $h^2$ of the olefin block copolymer (A-2) is reacted with the both ends of the polar polymer. The reaction is preferably performed with the olefin block copolymer (A-2) and the polar polymer being molten, or with at least a part of the olefin block copolymer (A-2) and/or at least a part of the polar polymer being dissolved in an organic solvent. Examples of the organic solvent include the same ones as used in preparation of the olefin block copolymer (A-2a).

The reaction is carried out usually at a temperature of 20 to 300° C. under a pressure of 0.1 to 10 MPa. The weight ratio of the polar polymer and the olefin block copolymer (A-2) for the reaction is usually: 1:100 to 100:1, preferably: 1:10 to 10:1.

Olefin Block Copolymer (A-7)

The olefin block copolymer (A-7) is represented by formula (VII):

$$(POB^7_{i}\text{-}g^7_{i}\text{-})_k\text{-}G^7 \qquad (VII)$$

wherein $POB^7$, which may be the same or different, each independently denotes a di-block segment $(PO^2\text{-}f^2\text{-}R^2\text{—})$ derived from the olefin block copolymer (A-2) of formula (II) or a di-block segment $(PO^3\text{-}g^3\text{-}F^3\text{—})$ derived from the olefin block copolymer (A-3) of formula (III), and the linkage $g^7$, which may be the same or different, each independently denote an ester linkage, an ether linkage, an amide linkage, an imide linkage, a urethane linkage, a urea linkage, a silylether linkage or a carbonyl linkage.

The linkage $g^7$ is formed as a result of the reaction of the olefin block copolymer (A-2) or the olefin block copolymer (A-3) with a polyfunctional compound or a polyfunctional polymer; and occasionally contains a part of the structure of the olefin block copolymer (A-2), the olefin block copolymer (A-3), the polyfunctional compound or the polyfunctional polymer.

The segment $G^7$ is a polyvalent group containing an unsaturated hydrocarbon or a hetero atom. Examples of such a group include groups derived from a polyfunctional compound and groups derived from a polyfunctional polymer. Examples of the polyfunctional compound and the polyfunctional polymer include the compounds and the polymers given below.

Examples of the polyfunctional compound include amic acid, diacids, polyacids, monoethylenically unsaturated compounds, diols, polyols, polyoxyalkylene diols, polyoxyalkylene polyols, diamines, polyamines, polyfunctional isocyanates and acrylic polyfunctional compounds.

Examples of polyamines and polythiols include aliphatic polyamines, such as hydrazine, ethylenediamine, propylenediamine, 1,4-butanediamine, pentamethylenediamine, hexamethylenediamine, heptamethylenediamine, octamethylenediamine, nonamethylenediamine, decamethylenediamine, undecamethylenediamine, dodecamethylenediamine, tetradecamethylenediamine, hexadecamethylenediamine, 1-amino-2,2-bis(aminomethyl)butane, tetraaminomethane, diethylenetriamine and triethylenetetramine; alicyclic polyamines, such as norbornenediamine, 1,4-diaminocyclohexane, 1,3,5-triaminocyclohexane and isophoronediamine; aromatic polyamines, such as phenylenediamine, tolylenediamine and xylylenediamine; basic amino acids, such as lysine and ornithine, and esters thereof; polyamines which are composed of monoamino compounds linked to each other via a disulfide bond, such as cystamine and derivatives thereof; aliphatic polythiols, such as 1,2-ethanedithiol, 1,3-propanedithiol, 1,4-butanedithiol, 1,6-hexanedithiol and pentaerythrithiol; alicyclic polyols, such as cyclohexanedithiol; aromatic polythiols, such as xylylenedithiol, benzenedithiol and toluenedithiol; and esters, such as trimethylolpropane tris(thioglycolate), trimethylolpropane tris(3-mercaptopropionate), pentaerythritol tetrakis(thioglycolate) and pentaerythritol tetrakis(3-mercaptopropionate)polythiol.

Examples of the polyfunctional isocyanate compounds include diisocyanates, such as tolylene diisocyanate (including various mixtures of isomers), diphenylmethane diisocyanates (including various mixtures of isomers), 3,3'-dimethyl-4,4'-biphenylene diisocyanate, 1,4-phenylene diisocyanate, xylylene diisocyanate, tetramethylxylylene diisocyanate, naphthylene diisocyanate, dicyclohexylmethane-4,4'-diisocyanate, isophorone diisocyanate, hexamethylene diisocyanate, hydrogenated xydilene diisocyanate, 1,4-cyclohexyl diisocyanate, 1-methyl-2,4-diisocyanate-cyclohexane and 2,4,4-trimethyl-1,6-diisocyanate-hexane; triisocyanates, such as 4,4',4"-triphenylmethane triisocyanate and tris(4-phenylisocyanato)thiophosphate; urethanized isocyanates, isocyanurated isocyanates, carbodiimidated isocyanates and biuretized isocyanates of the above isocyanates; crude tolylene diisocyanate and polymethylene polyphenyl isocyanate.

Examples of the acrylic polyfunctional compounds include 1,3-butyleneglycol diacrylate, 1,5-pentanediol diacrylate, neopentylglycol diacrylate, 1,6-hexanediol diacrylate, diethyleneglycol diacrylate, triethyleneglycol diacrylate, tetraethyleneglycol diacrylate, polyethyleneglycol diacrylate, polypropyleneglycol diacrylate, N,N'-methylene bisacrylamide, pentaerythritol triacrylate, trimethylolpropane triacrylate, tetramethylolmethane tetraacrylate and 1,4-butanediol diacrylate.

Examples of the polyfunctional polymers include the polymers having plural functional groups in the terminal position and in the side chain. Specific examples include acrylic polymers, such as ethylene/vinyl acetate copolymer (EVA), ethylene/vinyl alcohol copolymer (EVOH), poly-N-vinyl acetamide and polyacrylamide; and amide polymers, such as poly-N-vinyl formamide. These polyfunctional polymers have a molecular weight of usually 200 to 500,000, preferably 500 to 100,000.

The letter i denotes an integer of 1 to 5, preferably 1 or 2.

The letter k denotes an integer of 2 to 500, preferably 2 to 10.

The olefin block copolymer (A-7) represented by formula (VII) desirably has a melt flow rate of usually 0.01 to 200 g/10 min, preferably 0.05 to 100 g/10 min, more preferably 0.05 to 80 g/10 min.

Examples of the olefin block copolymer (A-7) represented by formula (VII) include a block copolymer wherein the segment $PO^3$ regarded as the segment $POB^7$ is composed of an ethylene/butene random copolymer (butene content: 6 mol %), the linkage $g^3$ is an amide linkage and the segment $F^3$ is composed of a polymer derived from an ethylene/vinyl alcohol random copolymer, which has such a structure that an ethylene/butene random copolymer is grafted in proportion to the alcohol content.

The olefin block copolymer (A-7) of formula (VII) can be prepared, for example, by reacting at least one olefin block copolymer (A-2) and at least one olefin block copolymer (A-3) with the polyfunctional compound or the polyfunctional polymer; or by reacting at least two olefin block copolymers (A-2) with the polyfunctional compound or the polyfunctional polymer; or by reacting at least two olefin block copolymers (A-3) with the polyfunctional compound or the polyfunctional polymer.

The reaction is preferably performed with the olefin block copolymers and the polyfunctional compound or the polyfunctional polymer being molten, or with at least a part of the olefin block copolymers and/or at least a part of the polyfunctional compound or the polyfunctional polymer being dissolved in an organic solvent. Examples of the organic solvent include the same ones as used in preparation of the olefin block copolymer (A-2a).

The reaction is carried out usually at a temperature of 20 to 300° C. under a pressure of 0.1 to 10 MPa. The weight ratio of the olefin block copolymers and the polyfunctional compound or the polyfunctional polymer for the reaction is usually 1:100 to 100:1, preferably 1:10 to 10:1.

(Uses)

The olefin block copolymers (A-2) to (A-7) may be compounded with thermoplastic resins, fillers, nucleating agents and additives used for polymers at an arbitrary proportion, and may be subjected to post-modification, such as crosslinking and foaming.

Examples of the thermoplastic resins include the above-noted crystalline thermoplastic resins, such as polyolefins, polyamides, polyesters and polyacetals; and the above-noted non-crystalline thermoplastic resins, such as polystyrene, acrylonitrile/butadiene/styrene copolymer (ABS), polycarbonate, polyphenyleneoxide and polyacrylates. Polyvinyl chloride is also used preferably.

The thermoplastic resins can used either individually or in combination.

The olefin block copolymers (A-2) to (A-7) may contain, in addition to the thermoplastic resins, such additives as a crosslinking agent, a filler, a crosslinking accelerator, a crosslinking assistant, a softener, a tackifier, an anti-aging agent, a foaming agent, a processing assistant, an adhesion improver, an inorganic filler, an organic filler, a crystalline nucleating agent, a heat stabilizer, a weathering stabilizer, an antistatic agent, a colorant, a lubricant, a flame retardant and a blooming inhibitor.

Examples of the crosslinking agent, the filler, the crosslinking accelerator, the crosslinking assistant, the softener, the tackifier, the anti-aging agent, the foaming agent, the processing assistant, the adhesion improver, the inorganic filler, the organic filler and the crystalline nucleating agent include the same ones as described above.

(Process for Producing Molded Articles)

The olefin block copolymers (A-2) to (A-7) can be produced into various molded articles, just as with the olefin block copolymer (A-1), by calendering, extrusion molding, injection molding, blow molding, press molding or stamping molding.

The injection-molded articles comprising any one of the olefin block copolymers (A-2) to (A-7) hardly become charged and are excellent in rigidity, heat resistance, impact resistance, surface gloss, chemical resistance and abrasion resistance. They can be used widely for trims for automobile interior, automobile exterior parts, housings of home electric appliances and containers.

(Uses)

The olefin block copolymers (A-2) to (A-7) can be used for various purposes. For example, they can have the same applications as those of the olefin block copolymer (A-1), such as films and sheets, laminates, modifiers, viscosity modifiers, moldability improvers, construction and civil engineering materials, automobile interior and exterior parts, gasoline tanks, electric and electronic parts, aqueous emulsion, coating bases, medical and sanitary products, miscellaneous products, modifiers for filler, compatibilizer, microcapsules, PTP packages, chemical valves and drug delivery system.

The olefin block copolymers (A-2) to (A-7) have an excellent affinity with both a polyolefin and a polar polymer because the copolymers comprise a polyolefin segment and a functional segment.

(Process for Producing Olefin Block Copolymer (A-8))

The process for producing the olefin block copolymer (A-8) will be now described.

In the process for producing the olefin block copolymer (A-8), a polyolefin having a hydroxyl group in the terminal position is reacted with an organolithium compound or a organophosphorus compound to prepare a polyolefin having lithium or a phosphorus-containing group in the terminal position, and a (meth)acrylic ester is polymerized in the presence of the polyolefin having lithium or a phosphorus-containing group in the terminal position, thereby obtaining a block copolymer comprising a polyolefin segment and a poly(meth)acrylic ester segment.

(Production of Polyolefin Having a Hydroxyl Group in the Terminal Position)

The polyolefin having a hydroxyl group in the terminal position can be prepared, for example, by producing a terminal-modified polyolefin in the presence of an olefin polymerization catalyst, then conducting substitution of the end group of the terminal-modified polyolefin on a compound having a functional group-structure, and thereafter performing solvolysis; or by performing solvolysis for the purpose of substitution of the end group of the terminal-modified polyolefin on a compound which has a structure forming a functional group, and thereafter performing solvolysis.

The olefin polymerization catalyst used in preparing the terminal-modified polyolefin will be first described.

The olefin polymerization catalyst used in preparing the terminal-modified polyolefin maybe any conventional and known catalyst. Examples of the conventional and known catalysts include a magnesium-supported titanium catalyst and a metallocene catalyst.

(Magnesium-Supported Titanium Catalyst)

As an example, a polymerization catalyst comprising a solid titanium catalyst component (a) and an organometallic compound catalyst component (b) will be described.

The solid titanium catalyst component (a), which forms the olefin polymerization catalyst, can be prepared by bringing the magnesium compound, the titanium compound and the electron donor (ED1) mentioned below into contact with each other.

(Magnesium Compound)

Examples of the magnesium compound include magnesium compounds having reducing ability and magnesium compounds having no reducing ability.

Examples of the magnesium compounds having reducing ability include organomagnesium compounds represented by the following formula:

wherein n is 0≦n<2, $R^{16}$ denotes hydrogen, an alkyl group, an aryl group or a cycloalkyl group where the number of the carbon atom ranges from 1 to 20, two $R^{16}$'s may be the same or different when n is 0, and X is a halogen.

Specific examples of the organomagnesium compounds having reducing ability include alkyl magnesium compounds, such as dimethyl magnesium, diethyl magnesium, dipropyl magnesium, dibutyl magnesium, diamyl magnesium, dihexyl magnesium, didecyl magnesium, octyl butyl magnesium and ethyl butyl magnesium; alkyl magnesium halides, such as ethyl magnesium chloride, propyl magnesium chloride, butyl magnesium chloride, hexyl magnesium chloride and amyl magnesium chloride; alkyl magnesium alkoxide, such as butyl ethoxy magnesium, ethyl butoxy magnesium and octyl butoxy magnesium; butyl magnesium hydrides and hydrogenated magnesiums.

Metallic magnesium is also employable.

Specific examples of the magnesium compounds having no reducing ability include halogenated magnesiums, such as magnesium chloride, magnesium bromide, magnesium iodide and magnesium fluoride; alkoxy magnesium halides, such as methoxymagnesium chloride, ethoxymagnesium chloride, isopropoxymagnesium chloride, butoxymagnesium chloride and octoxymagnesium chloride; allyloxymagnesium halides, such as phenoxymagnesium chloride and methylphenoxymagnesium chloride; dialkoxymagnesiums, such as diethoxymagnesium, diisopropoxymagnesium, dibutoxymagnesium, di-n-octoxymagnesium, di-2-ethylhexoxymagnesium and methoxyethoxymagnesium; diallyloxymagnesiums, such as diphenoxymagnesium, di-methylpenoxymagnesium and phenoxymethylphenoxymagnesium; and magnesium carboxylates, such as magnesium laurate and magnesium stearate.

The magnesium compound having no reducing ability may be the compound derived from the magnesium compound having reducing ability or may be the compound derived at the time of preparing the catalyst component. The magnesium compound having no reducing ability can be derived from the magnesium compound having reducing ability by bringing the magnesium compound having reducing ability into contact with, for example, a polysiloxane compound, a halogen-containing silane compound, a halogen-containing aluminum compound, an ester-containing, alcohol-containing or halogen-containing compound or a compound having an OH group or an active carbon-oxygen bond.

The magnesium compound having reducing ability and the magnesium compound having no reducing ability may form a complex compound or a composite compound with other metal, such as aluminum, zinc, boron, beryllium, sodium or potassium, or may be a mixture with other metallic compound. The magnesium compounds may be used either individually or in combination.

The solid magnesium compounds of the above magnesium compounds may be liquefied by use of an electron donor (ED1) Examples of the electron donor (ED1) include oxygen-containing electron donors, such as alcohols, esters, ethers, phenols, ketones, aldehydes, carboxylic acids, organic acid halides, acid amides, acid anhydrides and alkoxysilanes; and nitrogen-containing electron donors, such as ammonias, amines, nitrites, pyridines and isocyanates.

Specifically, examples of the alcohols include:

alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols having 1 to 18 carbon atoms, such as trichloromethanol, trichloroethanol and trichlorohexanol; and alkoxyalcohols, such as 2-propoxy ethanol, 2-butoxy ethanol, 2-ethoxy propanol, 3-ethoxy propanol, 1-methoxy butanol, 2-methoxy butanol and 2-ethoxy butanol.

Examples of the esters include organic esters having 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerianate, chloromethyl acetate, dichloroethyl acetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethyl benzoate, methyl anisate, ethyl anisate, ethoxy ethyl benzoate, γ-butyrolactone, δ-valerolactone, coumarin, phthalide and ethyl carbonate;

metallic acid esters, such as titanate, vanadate, niobate and zirconate;

orthotitanic acid esters, such as methyl orthotitanate, ethyl orthotitanate, n-propyl orthotitanate, i-propyl orthotitanate, n-butyl orthotitanate, i-butyl orthotitanate, n-amyl orthotitanate, 2-ethylhexyl orthotitanate, n-octyl orthotitanate, phenyl orthotitanate and cyclohexyl orthotitanate;

polytitanic acid esters, such as methyl polytitanate, ethyl polytitanate, n-propyl polytitanate, i-propyl polytitanate, n-butyl polytitanate, i-butyl polytitanate, n-amyl polytitanate, 2-ethylhexyl polytitanate, n-octyl polytitanate, phenyl polytitanate and cyclohexyl polytitanate; and vanadic acid ester, niobic acid ester and zirconic acid ester obtained by substituting the titanium of the titanate with vanadium, niobium or zirconium, respectively.

Examples of the esters further include polyvalent carboxylic acid esters having the skeleton represented by any one of the following formulae:

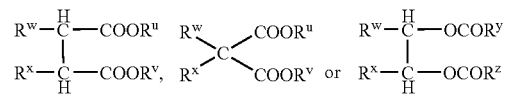

wherein $R^u$ denotes a substituted or unsubstituted hydrocarbon group; $R^v$, $R^y$ and $R^z$ each independently denote hydrogen or a substituted or unsubstituted hydrocarbon group; $R^w$ and $R^x$ each independently denote hydrogen or a substituted or unsubstituted hydrocarbon group, and at least one of the two is preferably a substituted or unsubstituted hydrocarbon group; $R^w$ and $R^x$ may linked to each other to form a cyclic structure; and when the hydrocarbon groups $R^u$ to $R^z$ are substituted, the substituent group contains a hetero atom, e.g., N, O or S, to form such a group as C—O—C, COOR, COOH, OH, SO₃H, —C—N—C— or NH₂.

Specific examples of the polyvalent carboxylic acid esters include aliphatic polycarboxylates, alicyclic polycarboxylates, aromatic polycarboxylates and heterocyclic polycarboxylates.

Examples of the preferable polyvalent carboxylic acid esters represented by the above formulae include diethyl succinate, dibutyl succinate, diethyl methylsuccinate, diaryl methylsuccinate, diisobutyl α-methylglutarate, diisopropyl β-methylglutarate, diisobutyl methylmalonate, dibutyl ethylmalonate, diethyl ethylmalonate, diethyl isopropylmalonate, dibutyl isopropylmalonate, dibutyl butylmalonate, dibutyl phenylmalonate, diethyl diethylmalonate, dibutyl dibutylmalonate, diethyl dibutylmalonate, n-butyl maleate, dibutyl methylmaleate, dibutyl butylmaleate, di 2-ethylhexyl fumarate, di n-hexyl cyclohexenecarboxylate, diethyl nadiate, diisopropyl tetrahydrophthalate, diethyl phthalate, monoethyl phthalate, dipropyl phthalate, diisobutyl phthalate, diisopropyl phthalate, ethylisobutyl phthalate, di n-butyl phthalate, di n-heptyl phthalate, di n-octyl phthalate, di 2-ethylhexyl phthalate, di(2-methylpentyl) phthalate, di(3-methylpentyl) phthalate, di(4-methylpentyl) phthalate, di(2, 3-dimethylbutyl) phthalate, di(3-methylhexyl) phthalate, di(4-methylhexyl) phthalate, di(5-methylhexyl) phthalate, di(3-ethylpentyl) phthalate, di(3,4-dimethylpentyl) phthalate, di(2,4-dimethylpentyl) phthalate, di(2-methylhexyl)

phthalate, di(2-methyloctyl) phthalate, didecyl phthalate, diphenyl phthalate and mixtures of these phthalic acid diesters; and diethyl naphthalenedicarboxylate, dibutyl naphthalenedicarboxylate, triethyl trimellitate, tributyl trimellitate, dibutyl 3,4-furandicarboxylate, diethyl adipate, dibutyl adipate, dioctyl sebacate and dibutyl sebacate.

Examples of the particularly preferred esters include n-butyl maleate, diisobutyl methylmalonate, di n-hexyl cyclohexenecarboxylate, diethyl nadiate, diisopropyl tetrahydrophthalate, diethyl phthalate, diisobutyl phthalate, di n-butyl phthalate, di 2-ethylhexyl phthalate and dibutyl 3,4-furandicarboxylate.

Examples of the ethers include those having 2 to 20 carbon atoms, such as methyl ether, ethyl ether, isopropyl ether, butyl ether, amyl ether, tetrahydrofuran, anisole and diphenyl ether.

Examples of the ethers further include the compounds having at least two ether linkages which are present via plural atoms (such compounds will sometimes be referred to as "polyether compound(s)" hereinafter). Examples of the polyether compounds include the compounds wherein the atoms existing between the ether linkages are carbon, silicon, oxygen, nitrogen, phosphorus, boron, sulfur or at least two of them. Of such compounds, preferable are the compounds wherein a relatively bulky substituent group is bonded to the atom existing between the ether linkages and further wherein the atoms present between the 2 or more ether linkages include plural carbon atoms. For example, the polyether represented by the following formula can be mentioned:

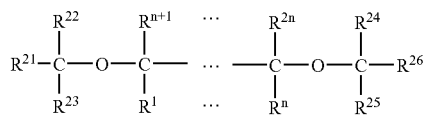

wherein n is an integer of $2 \leq n \leq 10$, $R^1$ to $R^{26}$ each independently denote a substituent group having at least one element selected from carbon, hydrogen, oxygen, halogen, nitrogen, sulfur, phosphorus, boron and silicon; arbitrary groups of $R^1$ to $R^{26}$, preferably of $R^1$ to $R^{20}$ may form in association a ring other than a benzene ring; and the main chain may contain atoms other than carbon.

Specific examples of the polyether compounds include 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(2-fluorophenyl)-1,3-dimethoxypropane, 2-(1-decahydronaphthyl)-1,3-dimethoxypropane, 2-(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-s-butyl-1,3-dimethoxypropane, 2,2-di-tert-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2,3-diphenyl-1,4-diethoxybutane, 2,3-dicyclohexyl-1,4-diethoxybutane, 2,2-dibenzyl-1,4-diethoxybutane, 2,3-dicyclohexyl-1,4-diethoxybutane, 2,3-diisopropyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane, 2,4-diisoamyl-1,5-dimethoxypentane, 3-methoxymethyltetrahydrofuran, 3-methoxymethyldioxane, 1,2-diisobutoxypropane, 1,2-diisobutoxyethane, 1,3-diisoamyloxyethane, 1,3-diisoamyloxypropane, 1,3-diisoneopentyloxyethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro[5,5]undecane, 3,7-dioxabicyclo[3,3,1]nonane, 3,7-dioxabicyclo[3,3,0]octane, 3,3-diisobutyl-1,5-oxononane, 6,6-diisobutyldioxyheptane, 1,1-dimethoxymethylcyclopentane, 1,1-bis(dimethoxymethyl)cyclohexane, 1,1-bis(methoxymethyl)bicyclo[2,2,1]heptane, 1,1-dimethoxymethylcyclopentane, 2-methyl-2-methoxymethyl-1,3-dimethoxypropane, 2-cyclohexyl-2-ethoxymethyl-1,3-diethoxypropane, 2-cyclohexyl-2-methoxymethyl-1,3-dimethoxypropane, 2,2-diisobutyl-1,3-dimethoxycyclohexane, 2-isopropyl-2-isoamyl-1,3-dimethoxycyclohexane, 2-cyclohexyl-2-methoxymethyl-1,3-dimethoxycyclohexane, 2-isopropyl-2-methoxymethyl-1,3-dimethoxycyclohexane, 2-isobutyl-2-methoxymethyl-1,3-dimethoxycyclohexane, 2-cyclohexyl-2-ethoxymethyl-1,3-diethoxycyclohexane, 2-cyclohexyl-2-ethoxymethyl-1,3-dimethoxycyclohexane, 2-isopropyl-2-ethoxymethyl-1,3-diethoxycyclohexane, 2-isopropyl-2-ethoxymethyl-1,3-dimethoxycyclohexane, 2-isobutyl-2-ethoxymethyl-1,3-diethoxycyclohexane and 2-isobutyl-2-ethoxymethyl-1,3-dimethoxycyclohexane.

Examples of the polyethers include tris(p-methoxyphenyl)phosphine, methylphenyl bis(methoxymethyl)silane, diphenyl bis(methoxymethyl)silane, methylcyclohexyl bis(methoxymethyl)silane, di-tert-butyl bis(methoxymethyl)silane, cyclohexyl-tert-butyl bis(methoxymethyl)silane and i-propyl-tert-butyl bis(methoxymethyl)silane.

Of the polyether compounds, 1,3-diethers are preferable, and particularly, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl) 1,3-dimethoxypropane, 2-isopropyl-2-cyclohexyl-1,3-dimethoxypropane, 2-isopropyl-2-s-butyl-1,3-dimethoxypropane, 2,2-diphenyl-1,3-dimethoxypropane and 2-isopropyl-2-cyclopentyl-1,3-dimethoxypropane are preferred.

Examples of the phenols include those of 6 to 20 carbon atoms which may have a lower alkyl group, such as phenol, cresol, xylenol, ethylphenol, propylphenol, nonylphenol, cumylphenol and naphthol.

Examples of the ketones include those having 3 to 15 carbon atoms, such as acetone, methyl ethyl ketone, methyl isobutyl ketone, acetophenone, benzophenone and benzoquinone.

Examples of the aldehydes include those having 2 to 15 carbon atoms, such as acetaldehyde, propionaldehyde, octyl aldehyde, benzaldehyde, trialdehyde and naphthaaldehyde.

Examples of the organic acid halides include acid halides having 2 to 15 carbon atoms, such as acetyl chloride, benzoyl chloride, toluic acid chloride and anisic acid chloride.

Examples of the acid amides include N,N-dimethylacetamide, N,N-diethylbenzamide and N,N-dimethyltoluamide.

Examples of the acid anhydrides include acetic anhydride, phthalic anhydride and benzoic anhydride.

Examples of the amines include trimethylamine, triethylamine, tributylamine, tribenzylamine and tetramethylethylenediamine.

Examples of the pyridines include pyridine, methylpyridine, ethylpyridine and dimethylpyridine.

These electron donors (ED1) may be used either individually or in combination.

Of these, the alcohols, the alkoxyalcohols and the metallic acid esters are particularly preferably employed. Solubilization of a solid magnesium compound by use of the electron donor (ED1) is typically made by the method where a solid magnesium compound is brought into contact with the electron donor (ED1) and, according to necessity, heated. The contact temperature ranges from 0 to 200° C., preferably from 20 to 180° C., more preferably from 50 to 150° C.

A hydrocarbon solvent or the like may coexist in the solubilization.

Examples of the hydrocarbon solvent include aliphatic hydrocarbons, such as pentane, hexane, heptane, octane, decane, dodecane, tetradecane and kerosene; alicyclic hydrocarbons, such as cyclopentane, methylcyclopentane, cyclohexane, methylcyclohexane, cyclooctane and cyclohexene; aromatic hydrocarbons, such as benzene, toluene and xylene; and halogenated hydrocarbons, such as dichloroethane, dichloropropane, trichloroethylene, chlorobenzene and 2,4-dichlorotoluene.

Although many magnesium compounds other than the above-noted ones can be used as the magnesium compound in preparing the solid titanium catalyst component (a), the magnesium compound preferably exists in the form of a halogen-containing magnesium compound in the final solid titanium catalyst component (a). Therefore, when the magnesium compound containing no halogen is used, it is preferably brought into contact with a halogen-containing compound in the course of preparation.

In particular, a magnesium compound having no reducing ability is preferably contained, especially a halogen-containing magnesium compound is preferably contained, and more especially magnesium chloride, alkoxy magnesium chloride and aryloxy magnesium chloride are preferably contained.

(Titanium Compound)

Tetravalent titanium compounds are preferably used as the titanium compound. Examples of the tetravalent titanium compound include the compounds represented by the following formula:

$$\text{Ti}(\text{OR}^{17})_g X_{4-g}$$

wherein $R^{17}$ is a hydrocarbon group, X is a halogen atom and $0 \leq g \leq 4$. Specific examples of such compounds include tetrahalogenated titaniums, such as $TiCl_4$, $TiBr_4$ and $TiI_4$;

trihalogenated alkoxytitaniums, such as $Ti(OCH_3)Cl_3$, $Ti(OC_2H_5)Cl_3$, $Ti(O\ n\text{-}C_4H_9)Cl_3$, $Ti(OC_2H_5)Br_3$ and $Ti(O\text{-iso-}C_4H_9)Br_3$;

dihalogenated dialkoxytitaniums, such as $Ti(OCH_3)_2Cl_2$, $Ti(OC_2H_5)_2Cl_2$, $Ti(O\ n\text{-}C_4H_9)_2Cl_2$ and $Ti(OC_2H_5)_2Br_2$;

monohalogenated trialkoxytitaniums, such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxytitaniums, such as $Ti(OCH_3)_4$, $Ti(OC_2H_5)_4$, $Ti(O\ n\text{-}C_4H_9)_4$, $Ti(O\ \text{iso-}C_4H_9)_4$ and $Ti(O\ 2\text{-ethylhexyl})_4$.

Of these, tetrahalogenated titaniums are preferred, and titanium tetrachlorides are particularly preferred. The titanium compounds may be used either individually or in combination. The titanium compound may be used together with an aromatic hydrocarbon, or may be diluted with a hydrocarbon or a halogenated hydrocarbon for use.

The solid titanium catalyst component (a) is formed by bringing the magnesium compound into contact with the titanium compound and, according to necessity, with an electron donor (ED2).

(Electron Donor (ED2))

The electron donor (ED2) is preferably used in preparing the solid titanium catalyst component (a). Examples of the electron donor (ED2) include such acid halides, acid amides, nitriles, acid anhydrides, organic esters and polyethers as given below.

Specific examples include acid halides of 2 to 15 carbon atoms, such as acetyl chloride, benzoyl chloride, toluic chloride and anisic chloride; acid amides, such as N,N-dimethylacetamide, N,N-diethylbenzamide and N,N-dimethyltoluamide; nitriles, such as acetonitrile, benzonitrile and trinitrile; acid anhydrides, such as acetic anhydride, phthalic anhydride and benzoic anhydride; and organic esters of 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerianate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, γ-butyrolactone, δ-valerolactone, coumarin, phthalide and ethyl carbonate.

Examples of the preferable organic esters include the polyvalent carboxylic acid esters described above.

Phthalic acid diesters are preferably used as the polyvalent carboxylic acid ester.

Examples of the electron donor (ED2) further include the above polyethers.

Examples of the polyethers include
2,2-diisobutyl-1,3-dimethoxy propane,
2-isopropyl-2-isobutyl-1,3-dimethoxy propane,
2-isopropyl-2-isopentyl-1,3-dimethoxy propane,
2,2-dicyclohexyl-1,3-dimethoxy propane and
2,2-bis(cyclohexylmethyl)-1,3-dimethoxy propane.

Organic esters and polyethers are preferred as the electron donor (ED2), and aromatic diesters and polyethers are more preferably employed. The electron donor (ED2) maybe used in combination of 2 or more types. The electron donors above noted are to be contained in the final solid titanium catalyst component (a). Therefore, the very compound described above is not compulsorily used, and other compound which can form the compound in the course of preparing the solid titanium catalyst component (a) may be employed. In such a case also, other compounds may be used in combination to form 2 or more electron donors (ED2).

These electron donors (ED2) may be used either individually or in combination.

(Particle Carrier)

The particle carrier shown below may be used in bringing the titanium compound, the magnesium compound and according to necessity the electron donor (ED2) into their contact, thereby preparing the carrier-supported solid titanium catalyst component (a).

Examples of the carrier include inorganic carriers, such as $Al_2O_3$, $SiO_2$, $B_2O_3$, MgO, CaO, $TiO_2$, ZnO, $Zn_2O$, $SnO_2$, BaO and ThO, and organic carriers, such as styrene/divinylbenzene copolymer. Of these, $SiO_2$, $Al_2O_3$, MgO, ZnO and $Zn_2O$ are preferable.

The above components may be brought into contact in the presence of a reagent, such as silicon, phosphorus or aluminum.

(Preparation of Solid Titanium Catalyst Component (a))

The solid titanium catalyst component (a) may be prepared by bringing the titanium compound, the magnesium compound and according to necessity the electron donor (ED2) into contact, and may be produced by any conventional and known method.

Several exemplary methods for preparing the solid titanium catalyst component (a) will be briefly described below.

(1) A method wherein a solution containing the magnesium compound, the electron donor (ED2) and a hydrocarbon solvent is put in contact with an organoaluminum compound and reacted therewith to thereby precipitate the solid and thereafter, or while precipitating the solid, the solution is put in contact with the titanium compound and reacted therewith.

(2) A method wherein a complex comprising the magnesium compound and the electron donor (ED2) is brought into contact with an organoaluminum compound to react therewith, and thereafter the complex is put in contact with the titanium compound and reacted therewith.

(3) A method wherein the reactant of contact of an inorganic carrier and an organoaluminum compound is put in contact with the titanium compound and preferably with the electron donor (ED2) and reacted therewith. In this case, the reactant of contact may have been put in pre-contact with a halogen-containing compound and/or an organoaluminum compound and reacted therewith.

(4) A method wherein a magnesium-compound-supported inorganic or organic carrier is obtained from a mixture of a solution containing the magnesium compound, the electron donor (ED2) and, depending on the case, a hydrocarbon solvent, and an inorganic or organic carrier; and the organic or inorganic carrier is brought into contact with the titanium compound.

(5) A method wherein a solution containing the magnesium compound, the titanium compound, the electron donor (ED2) and, depending on the case, a hydrocarbon solvent is brought into contact with an inorganic or organic carrier to thereby obtain a magnesium and titanium-supported solid titanium catalyst component.

(6) A method wherein a liquid organomagnesium compound is put in contact with a halogen-containing titanium compound and reacted therewith.

(7) A method wherein a liquid organomagnesium compound is put in contact with a halogen-containing compound and reacted therewith, and thereafter further put in contact with the titanium compound.

(8) A method wherein an alkoxy group-containing magnesium compound is put in contact with a halogen-containing titanium compound and reacted therewith.

(9) A method wherein a complex comprising an alkoxy group-containing magnesium compound and the electron donor (ED2) is put in contact with the titanium compound and reacted therewith.

(10) A method wherein a complex comprising an alkoxy group-containing magnesium compound and the electron donor (ED2) is put in contact with an organoaluminum compound and thereafter further put in contact with the titanium compound and reacted therewith.

(11) A method wherein the magnesium compound, the electron donor (ED2) and the titanium compound are put in their contact in an arbitrary order and reacted with each other in order. In this method, the components may have been pretreated with the electron donor (ED2) and/or a reaction auxiliary, such as an organoaluminum compound or a halogen-containing silicon compound.

(12) A method wherein the liquid magnesium compound having no reducing ability is reacted with the liquid titanium compound preferably in the presence of the electron donor (ED2) to thereby precipitate a solid magnesium/titanium complex.

(13) A method wherein the reaction product obtained in (12) is further reacted with the titanium compound.

(14) A method wherein the reaction product obtained in (11) or (12) is further reacted with the electron donor (ED2) and with the titanium compound.

(15) A method wherein solid matters obtained by finely dividing the magnesium compound, and preferably the electron donor (ED2) and the titanium compound are treated with a halogen, a halogen compound or an aromatic hydrocarbon. This method may comprise a step of finely dividing the magnesium compound alone, or a complex compound containing the magnesium compound and the electron donor (ED2), or the magnesium compound and the titanium compound. The finely divided solid matters may be pretreated with a reaction auxiliary and thereafter treated with a halogen or the like. Examples of the reaction auxiliary include an organoaluminum compound and a halogen-containing silicon compound.

(16) A method wherein the magnesium compound is finely divided and thereafter put in contact with the titanium compound and reacted therewith. In this case, the electron donor (ED2) and a reaction auxiliary are preferably used in the pulverizing and/or the contact and the reaction.

(17) The compound obtained in any one of (11) to (16) is treated with a halogen, a halogen compound or an aromatic hydrocarbon.

(18) A method wherein the reactant of contact of a metallic oxide, an organomagnesium compound and a halogen-containing compound is put in contact with preferably the electron donor (ED2) and the titanium compound.

(19) A method wherein a magnesium compound, such as a magnesium salt of organic acid, alkoxymagnesium or aryloxymagnesium, is reacted with the titanium compound and/or a halogen-containing hydrocarbon and preferably with the electron donor (ED2).

(20) A method wherein a hydrocarbon solvent containing at least the magnesium compound and alkoxytitanium is put in contact with the titanium compound and/or the electron donor (ED2). In this case, a halogen-containing compound, such as a halogen-containing silicon compound, is preferably allowed to coexist.

(21) A method wherein the liquid magnesium compound having no reducing ability is reacted with an organoaluminum compound to thereby precipitate a solid magnesium/metal (aluminum) complex, and thereafter the complex is reacted with the electron donor (ED2) and with the titanium compound.

The amounts of the above components in preparing the solid titanium catalyst component (a) are variable depending on the method of preparation and can not be categorically determined. For example, the titanium compound is used in an amount of 0.01 to 1000 mol, preferably 0.1 to 200 mol based on 1 mol of the magnesium compound. The electron donor (ED2), which is employed according to necessity, is used in an amount of 0.01 to 5 mol, preferably 0.1 to 1 mol based on 1 mol of the magnesium compound.

The solid titanium catalyst component (a) thus obtained contains magnesium, titanium and a halogen.

With respect to the solid titanium catalyst component (a), it is desirable that the halogen/titanium atomic ratio be about 2 to 200, preferably about 4 to 100, the electron donor/titanium molar ratio be about 0.01 to 100, preferably about 0.2 to 10, and the magnesium/titanium atomic ratio be about 1 to 100, preferably about 2 to 50.

(Organometallic Compound Catalyst Component (b))

The organometallic compound catalyst component (b) preferably contains a metal selected from Group 13 of the Periodic Table. Particularly, organoaluminum compounds, organoboron compounds and alkyl complex compounds of a Group 1 element and aluminum or boron are preferable.

Examples of the organoaluminum compounds, the organoboron compounds and the alkyl complex compounds of a Group 1 element and aluminum or boron include the organoaluminum compounds, the organoboron compounds and the alkyl complex compounds of a Group 1 element of the Periodic Table and aluminum or boron exemplified with respect to the organometallic catalyst component.

(Electron Donor (ED3))

The olefin polymerization catalyst may contain the electron donor (ED2) and/or the electron donor (ED3) shown below in addition to the solid titanium catalyst component (a) and the organometallic compound catalyst component (b).

Examples of the electron donor (ED3) include organosilicon compounds represented by the following formula:

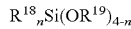

$R^{18}{}_n Si(OR^{19})_{4-n}$ wherein $R^{18}$ and $R^{19}$ are each a hydrocarbon group and $0<n<4$.

Specific examples include trimethylmethoxysilane, trimethylethoxysilane, dimethyldimethoxysilane, dimethyldiethoxysilane, diisopropyldimethoxysilane, tert-butylmethyldimethoxysilane, tert-butylmethyldiethoxysilane, tert-amylmethyldiethoxysilane, diphenyldimethoxysilane, phenylmethyldimethoxysilane, diphenyldiethoxysilane, bis o-tolyldimethoxysilane, bis m-tolyldimethoxysilane, bis p-tolyldimethoxysilane, bis p-tolyldiethoxysilane, bis ethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, tert-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyl tris(β-methoxyethoxysilane), vinyltriacetoxysilane, dimethyltetraethoxydisiloxane, cyclopentyltrimethoxysilane, 2-methylcyclopentyltrimethoxysilane, 2,3-dimethylcyclopentyltrimethoxysilane, cyclopentyltriethoxysilane, dicyclopentyldimethoxysilane, bis(2-methylcyclopentyl)dimethoxysilane, bis(2,3-dimethylcyclopentyl)dimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane and cyclopentyldimethylethoxysilane.

Of these, preferably used are ethyltriethoxysilane, n-propyltriethoxysilane, tert-butyltriethoxysilane, vinyltriethoxysilane, phenyltriethoxysilane, vinyltributoxysilane, diphenyldimethoxysilane, phenylmethyldimethoxysilane, bis p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

Also, usable as the electron donor (ED3) are nitrogen-containing electron donors, such as 2,6-substituted piperidines, 2,5-substituted piperidines, substituted methylenediamines (e.g. N,N,N',N'-tetramethylmethylenediamine and N,N,N',N'-tetraethylmethylenediamine), and substituted methylenediamines (e.g. 1,3-dibenzylimidazolidine and 1,3-dibenzyl-2-phenylimidazolidine); phosphorus-containing electron donors, such as phosphites (e.g. triethyl phosphite, tri n-propyl phosphite, triisopropyl phosphite, tri n-butyl phosphite, triisobutyl phosphite, diethyl n-butyl phosphite and diethylphenyl phosphite); and oxygen-containing electron donors, such as 2,6-substituted tetrahydropyrans and 2,5-substituted tetrahydropyrans.

The electron donors (ED3) may be used either individually or in combination.

(Metallocene Catalyst)

An example of the metallocene catalyst will be described next.

There is no limitation on the metallocene compound used in preparing the terminal-modified polyolefin, and the known metallocene catalyst can be exemplified. Examples of the known metallocene catalyst include compounds of such a transition metal as titanium, vanadium, chromium, zirconium or hafnium. Both liquid compounds and solid compounds under use conditions can be used. The compound need not be a single compound, and may be supported on other compound, be a uniform mixture containing other compound or be a complex compound or a composite compound containing other compound.

Of the known metallocene catalysts, the metallocene compounds of a chiral structure having the C2 symmetry or the C1 symmetry shown below are preferable to use.

More preferred of the above compounds are the metallocene compounds having a bulky substituent group, such as rac-dimethylsilyl-bis{1-[2-ethyl-4-(1-naphthyl)indenyl]}zirconium dichloride, rac-dimethylsilyl-bis{1-[2-ethyl-4-(9-phenanthryl)indenyl]}zirconium dichloride, rac-dimethylsilyl-bis{1-[2-n-propyl-4-(1-naphthyl)indenyl]}zirconium dichloride and rac-dimethylsilyl-bis{1-[2-n-propyl-4-(9-phenanthryl)indenyl]}zirconium dichloride.

The metallocene compounds may be used either individually, in combination or together with the solid titanium catalyst component (a).

The metallocene compound may be used in combination with the organometallic compound catalyst component (b).

One example of the metallocene catalyst will be discussed hereinafter.

The metallocene catalyst comprises, for example, (c) a transition-metal compound of Group 4 of the Periodic Table containing a ligand having a cyclopentadienyl skeleton (such a transition-metal compound will sometimes be referred to simply as "metallocene compound (c)"), (d) an organoaluminum oxy-compound, and according to necessity, (e) a particle carrier.

[Metallocene Compound (c)]

The metallocene compound (c) is represented by formula (7):

$$M^3 L_x \qquad (7)$$

wherein $M^3$ is a transition metal atom of Group 4 of the Periodic Table, and is specifically zirconium, titanium or hafnium;

L is a ligand coordinated to the transition metal atom, and at least one L is a ligand containing a ligand having a cyclopentadienyl skeleton, and the other L but the ligand containing a ligand having a cyclopentadienyl skeleton is a hydrocarbon group of 1 to 12 carbon atoms, an alkoxy group, an aryolxy group, a trialkylsilyl group, an $SO_3R$ group (wherein R is a hydrocarbon group of 1 to 8 carbon atoms which may have such a substituent group as a halogen), a halogen atom or hydrogen; and x is an integer satisfying the valence of the transition metal atom.

Examples of the ligand containing a ligand having cyclopentadienyl skeleton include alkyl-substituted cyclopentadienyl groups, such as cyclopentadienyl group, methylcyclopentadienyl group, dimethylcyclopentadienyl group, trimethylcyclopentadienyl group, tetramethylcyclopentadienyl group, pentamethylcyclopentadienyl group, ethylcyclopentadienyl group, methylethylcyclopentadienyl group, propylcyclopentadienyl group, methylpropylcyclopentadienyl group, butylcyclopentadienyl group, methylbutylcyclopentadienyl group and hexylcyclopentadienyl group; indenyl groups, 4,5,6,7-tetrahydroindenyl groups and fluorenyl groups. These groups may be substituted with a halogen atom or a trialkylsilyl group.

When the compound represented by formula (7) contains two or more groups having a cyclopentadienyl skeleton, the two groups having a cyclopentadienyl skeleton may be bonded to each other via an alkylene group, such as ethylene or propylene; a substituted-alkylene group, such as isopropylidene or diphenylmethylene; a silylene group; or a substituted-silylene group, such as dimethylsilylene group, diphenylsilylene group or methylphenylsilylene group.

Examples of the other ligand L but the ligand having a cyclopentadienyl skeleton include the following.

Examples of the hydrocarbon groups having 1 to 12 carbon atoms include alkyl groups, cycloalkyl groups, aryl groups and aralkyl groups, specifically, such alkyl groups as a methyl group, an ethyl group, a propyl group, an isopropyl group and a butyl group;

such cycloalkyl groups as a cyclopentyl group and a cyclohexyl group;

such aryl groups as a phenyl group and a tolyl group; and such aralkyl groups as a benzyl group and a neophyl group.

Examples of the alkoxy groups include a methoxy group, an ethoxy group and a butoxy group.

Examples of the aryolxy groups include a phenoxy group.

Examples of the halogen include fluorine, chlorine, bromine and iodine.

Examples of the ligands represented by $SO_3R$ include a p-toluenesulfonato group, a methanesulfonato group and a trifluoromethanesulfonato group.

More specifically, when the valence of the transition metal atom is 4, the metallocene compound (c) containing a ligand having a cyclopentadienyl skeleton is represented by formula (8):

$$R^{21}_a R^{22}_b R^{23}_c R^{24}_d M^3 \qquad (8)$$

wherein $M^3$ is the same transition metal atom as $M^3$ of formula (7); $R^{21}$ is a group (ligand) having a cyclopentadienyl skeleton; $R^{22}$, $R^{23}$ and $R^{24}$ are each independently a group having a cyclopentadienyl skeleton, an alkyl group, a cycloalkyl group, an aryl group, an aralkyl group, an alkoxy group, an aryolxy group, a trialkylsilyl group, an $SO_3R$ group, a halogen atom or hydrogen; a is an integer of 1 or more; and a+b+c+d=4.

The metallocene compound wherein at least two of $R^{21}$, $R^{22}$, $R^{23}$ and $R^{24}$ of formula (8), for example, $R^{21}$ and $R^{22}$, are each a group (ligand) having a cyclopentadienyl skeleton, is preferably used.

These groups having a cyclopentadienyl skeleton may be bonded to each other via an alkylene group, such as ethylene or propylene; a substituted alkylene group, such as isopropylidene or diphenylmethylene; a silylene group; or a substituted silylene group, such as dimethylsilylene, diphenylsilylene or methylphenylsilylene.

$R^{23}$ and $R^{24}$ are each independently a group having a cyclopentadienyl skeleton, an alkyl group, a cycloalkyl group, an aryl group, an aralkyl group, an alkoxy group, an aryolxy group, a trialkylsilyl group, an $SO_3R$ group, a halogen atom or hydrogen.

Exemplary metallocene compounds wherein $M^3$ is zirconium are given below: bis(indenyl)zirconium dichloride, bis(indenyl)zirconiumdibromide, bis(indenyl)zirconiumbis(p-toluenesulfonato)bis(4,5,6,7-tetrahydroindenyl)zirconium dichloride, bis(fluorenyl)zirconium dichloride, ethylenebis(indenyl)zirconium dichloride, ethylenebis(indenyl)zirconium dibromide, ethylenebis(indenyl)dimethyl zirconium, ethylenebis(indenyl)diphenyl zirconium, ethylenebis(indenyl)methyl zirconium monochloride, ethylenebis(indenyl)zirconiumbis(methanesulfonato), ethylenebis(indenyl)zirconiumbis(p-toluenesulfonato), ethylenebis(indenyl)zirconiumbis(trifluoromethanesulfonato), ethylenebis(4,5,6,7-tetrahydroindenyl)zirconium dichloride, isopropylidene(cyclopentadienyl-fluorenyl)zirconium dichloride, isopropylidene(cyclopentadienyl-methylcyclopentadienyl)zirconium dichloride, dimethylsilylenebis(cyclopentadienyl)zirconium dichloride, dimethylsilylenebis(methylcyclopentadienyl)zirconium dichloride, dimethylsilylenebis(dimethylcyclopentadienyl)zirconium dichloride, dimethylsilylenebis(trimethylcyclopentadienyl)zirconium dichloride, dimethylsilylenebis(indenyl)zirconium dichloride, dimethylsilylenebis(indenyl)zirconiumbis(trifluoromethane sulfonato), dimethylsilylenebis(4,5,6,7- tetrahydroindenyl)zirconium dichloride, dimethylsilylene (cyclopentadienyl-fluorenyl)zirconium dichloride, diphenylsilylenebis(indenyl)zirconium dichloride, methylphenylsilylenebis(indenyl)zirconium dichloride, bis(cyclopentadienyl)zirconium dichloride, bis(cyclopentadienyl) zirconium dibromide, bis(cyclopentadienyl) methylzirconium monochloride, bis(cyclopentadienyl) ethylzirconium monochloride, bis(cyclopentadienyl) cyclohexylzirconium monochloride, bis(cyclopentadienyl) phenylzirconium monochloride, bis(cyclopentadienyl) benzylzirconium monochloride, bis(cyclopentadienyl) zirconium monochloride monohydride, bis (cyclopentadienyl)methylzirconium monohydride, bis (cyclopentadienyl)dimethylzirconium, bis (cyclopentadienyl)diphenylzirconium, bis (cyclopentadienyl)dibenzylzirconium, bis (cyclopentadienyl)zirconiummethoxy chloride, bis (cyclopentadienyl)zirconiumethoxy chloride, bis (cyclopentadienyl)zirconiumbis(methanesulfonato), bis (cyclopentadienyl)zirconiumbis(p-toluenesulfonato), bis (cyclopentadienyl)zirconiumbis(trifluoromethane sulfonato), bis(methylcyclopentadienyl)zirconium dichloride, bis(dimethylcyclopentadienyl)zirconium dichloride, bis(dimethylcyclopentadienyl)zirconiumethoxy chloride, bis(dimethylcyclopentadienyl)zirconiumbis(trifluoromethanesulfonato), bis(ethylcyclopentadienyl)zirconium dichloride, bis(methylethylcyclopentadienyl)zirconium dichloride, bis(propylcyclopentadienyl)zirconium dichloride, bis(methylpropylcyclopentadienyl)zirconium dichloride, bis(butylcyclopentadienyl)zirconium dichloride, bis (methylbutylcyclopentadienyl)zirconium dichloride, bis (methylbutylcyclopentadienyl)zirconiumbis (methanesulfonato), bis(trimethylcyclopentadienyl) zirconium dichloride, bis(tetramethylcyclopentadienyl) zirconium dichloride, bis(pentamethylcyclopentadienyl) zirconium dichloride, bis(hexylcyclopentadienyl)zirconium dichloride and bis(trimethylsilylcyclopentadienyl)zirconium dichloride.

With respect to the above-exemplified compounds, the di-substitution product in the cyclopentadienyl ring includes 1,2-substituion products and 1,3-substitution products, and the tri-substitution product includes 1,2,3-substitution products and 1,2,4-substitution products. The alkyl group, such as propyl or butyl, contains such an isomer as n-, iso-, sec- or tert-.

The corresponding compounds to the above zirconium compounds where the zirconium is substituted with titanium or hafnium can be used as the metallocene compound (c).

These compounds may be used either individually or in combination. They can be diluted in a hydrocarbon or a halogenated hydrocarbon for use.

The zirconocene compound which contains at least two ligands having a cyclopentadienyl skeleton and wherein the central metal is zirconium is preferably used as the metallocene compound (c).

(Organoaluminum Oxy-compound (d))

Specific examples of the organoaluminum oxy-compound (d) include the conventional and known aluminoxanes and the benzene-insoluble aluminum oxy-compound disclosed in JP-A-2(1990)/276807.

The conventional and known aluminoxanes can be prepared by the method described earlier.

(Particle Carrier (e))

Examples of the particle carrier (e), which is used according to necessity, include inorganic carriers, such as $SiO_2$, $Al_2O_3$, $B_2O_3$, MgO, $ZrO_2$, CaO, $TiO_2$, ZnO, $Zn_2O$, $SnO_2$, BaO and ThO; and resins (organic carriers), such as polyethylene, polypropylene, poly-1-butene, poly 4-methyl-1-pentene and a styrene/divinylbenzene copolymer. Of these, $SiO_2$ is preferable. They can be used either individually or in combination.

When the metallocene catalyst is a solid metallocene catalyst comprising the metallocene compound (c), the organoaluminum oxy-compound (d) and the particle carrier (e), the solid catalyst is prepared by supporting the metallocene compound (c) and the organoaluminum oxy-compound (d) on the particle carrier by the conventional method.

The solid metallocene catalyst may be prepared by supporting the metallocene compound (c), the organoaluminum oxy-compound (d) and the organoaluminum compound (b-2) shown below on the particle carrier (e).

In preparing the solid metallocene catalyst, the metallocene compound (c) is used in an amount of usually 0.001 to 1.0 mmol, preferably 0.01 to 0.5 mmol (in terms of the transition metal atom) and the organoaluminum oxy-compound (d) is used in an amount of usually 0.1 to 100 mmol, preferably 0.5 to 20 mmol, both based on 1 g of the particle carrier (e).

The solid metallocene catalyst has a particle diameter of usually 1 to 300 μm, preferably 10 to 100 μm.

According to necessity, the solid metallocene catalyst may contain, in addition to the above catalyst components, other component useful for the olefin polymerization, such as an electron donor or a reaction auxiliary.

The solid metallocene catalyst may have been pre-polymerized with an olefin to be used as the solid metallocene catalyst in the invention.

The organoaluminum compound (b-2) shown below may be used together with the metallocene compound in polymerizing an olefin by use of the metallocene catalyst.

Examples of the organoaluminum compound (b-2), which is used as the organoaluminum compound (b-2) and also used in preparing a solution of the organoaluminum oxy-compound (d), include the same organoaluminum compounds as those exemplified with respect to the organometallic catalyst component (excluding the aluminoxanes).

Of such compounds, trialkylaluminums are preferred, and triethylaluminum and triisobutylaluminum are especially preferred.

The isoprenylaluminums represented by the following formula also may be used as the organoaluminum compound:

$(i\text{-}C_4H_9)_xAl_y(C_5H_{10})_z$ wherein x, y and z are each a positive number and $z \geq 2x$.

They can be used in combination of 2 or more kinds.

The organoaluminum compound (b-2) may contain a small amount of a metallic component other than aluminum.

The organoaluminum compound (b-2), when supported on the particle carrier (e) together with the metallocene compound (c) and the organoaluminum oxy-compound (d), is used in an amount of usually 1 to 300 mol, preferably 2 to 200 mol based on 1 mol of the solid metallocene catalyst (in terms of the transition metal atom).

The terminal-modified polyolefin represented by formula (IX) may be prepared, for example, in the presence of the above olefin polymerization catalyst:

$$PO^8\text{—}AlR^{25}R^{26} \qquad (IX)$$

wherein $PO^8$ is a polymer chain obtained by homopolymerizing or copolymerizing an olefin represented by CH$_2$=CHR$^{27}$. R$^{27}$ is a group or an atom selected from hydrocarbon groups having 1 to 10 carbon atoms, hydrogen and a halogen atom.

Examples of the olefin represented by CH$_2$=CHR$^{27}$ include ethylene, propylene, butene, pentene, hexene, octene and decene.

R$^{25}$ and R$^{26}$, which may be the same or different, are each a group or an atom selected from hydrocarbon groups of 1 to 10 carbon atoms, hydrogen and a halogen atom.

Examples of the hydrocarbon groups of 1 to 10 carbon atoms include methyl, ethyl, propyl, butyl, pentyl, octyl and decyl.

Preferably, PO$^8$ has a weight-average molecular weight of 1,000 to 10,000,000. PO$^8$ ideally has Mw/Mn of at least 2, preferably 3 to 15, more preferably 4 to 14.

Polymerization of the terminal-modified polyolefin represented by formula (IX) is made by suspension polymerization in a solvent or suspension polymerization using a liquid olefin as a solvent.

A hydrocarbon which is inert in any polymerization can be used as the polymerization solvent in carrying out suspension polymerization in a solvent.

Examples of the usable inert hydrocarbon medium include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures thereof. Of these, aliphatic hydrocarbons are particularly preferably used.

When the magnesium-supported titanium catalyst is used, the solid titanium catalyst component (a) or the pre-polymerized catalyst thereof is used in an amount of, in terms of titanium, about 0.0001 to about 50 mmol, preferably about 0.001 to about 10 mmol per 1 liter of the polymerization volume in the polymerization system. The organometallic compound catalyst component (b) is used in such amounts that the metallic atom of the catalyst component (b) accounts for usually 1 to 2000 mol, preferably 2 to 1000 mol based on 1 mol of the titanium atom of the solid titanium catalyst component (a) in the polymerization system. The electron donor (ED3) is used in an amount of usually 0.001 to 10 mol, preferably 0.01 to 5 mol based on 1 mol of the metallic atom of the organometallic compound catalyst component (b).

When the catalyst used is the metallocene catalyst, it is used in such amounts that the metallocene compound (c) has a concentration of usually 0.00005 to 0.1 mmol, preferably 0.0001 to 0.05 mmol based on 1 liter of the polymerization volume in the polymerization system. The organoaluminum oxy-compound (d) is used in such amounts that the molar ratio (Al/M) of the aluminum atom to the transition metal atom (M) of the metallocene compound (c) becomes 5 to 1,000, preferably 10 to 400. When the organoaluminum compound (b-2) is used, the amount thereof is usually about 1 to about 300 mol, preferably about 2 to about 200 mol based on 1 mol of the transition metal atom in the metallocene compound (c).

The concentration of hydrogen in the course of the polymerization is ideally 0 to 0.01 mol, preferably 0 to 0.005 mol, more preferably 0 to 0.001 mol based on 1 mol of the monomers.

Olefin polymerization can be made by a liquid-phase polymerization process, such as solution polymerization or suspension polymerization, or a gas-phase polymerization process. The inert solvents and liquid olefins at the reaction temperature can be used as a reaction solvent in suspension polymerization. The polymerization temperature is usually 70° C. or over, preferably from 80 to 150° C., more preferably from 85 to 140° C., particularly preferably from 90 to 130° C. The pressure is set at usually the normal pressure to 10 MPa, preferably the normal pressure to 5 MPa. The polymerization can be made by a batchwise, semi-continuous or continuous process. The reaction conditions may be the same or different when the polymerization is carried out over 2 or more steps.

The terminal-modified polyolefin represented by formula (IX) thus prepared is obtained usually as a slurry.

Next, the group, —AlR$^{25}$R$^{26}$, of the terminal-modified polyolefin is subjected to substitution with a compound having a structure which forms a functional group on solvolysis, and thereafter subjected to solvolysis to thereby prepare the polyolefin represented by formula (X) shown below:

PO$^8$—OH     (X)

wherein PO$^8$ is as defined earlier.

Examples of the compound having a structure which forms a functional group on solvolysis include oxygen and ozone.

Substitution of the group, —AlR$^{25}$R$^{26}$, of the terminal-modified polyolefin with a compound having a functional group or a compound having a structure which forms a functional group on solvolysis is made usually at 0 to 300° C., preferably 10 to 200° C. for 0 to 100 hours, preferably 0.5 to 50 hours.

Solvolysis after the substitution is carried out at a temperature of usually 0 to 100° C., preferably 10 to 80° C. over a period of 0 to 100 hours, preferably 0.5 to 50 hours. Examples of the solvent usable in solvolysis include methanol, ethanol, propanol, butanol and water.

The polyolefin having a hydroxyl group in the terminal position may be prepared also by reacting a polyolefin having an unsaturated bond in the terminal position of one side with a compound containing a Group 13 element, such as an organoaluminum compound or an organoboron compound, to thereby prepare the terminal-modified polyolefin represented by formula (IX), and thereafter converting the end to a hydroxyl group in such a manner as described above.

The polyolefin having an unsaturated bond in the terminal position of one side (unsaturated-terminal polyolefin) may be prepared, for example, by polymerizing or copolymerizing an olefin having 3 to 20 carbon atoms in the presence of the olefin polymerization catalyst.

Examples of the preferable olefin having 3 to 20 carbon atoms include propylene, 1-butene, 3-methyl-1-butene, 3-methyl-1-pentene and 4-methyl-1-pentene. Propylene is used most preferably.

Olefin polymerization may be carried out by a liquid-phase polymerization process, such as solution polymerization and suspension polymerization, or a gas-phase polymerization process. As far as the polymerization mode is concerned, suspension polymerization is preferably chosen. The reaction solvent may be an inert hydrocarbon solvent or an olefin which is liquid at the reaction temperature.

Examples of the usable inert hydrocarbon solvent include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures thereof. Of these, aliphatic hydrocarbons are particularly preferably used.

When the magnesium-supported titanium catalyst is used in preparing the unsaturated-terminal polyolefin, the solid titanium catalyst component (a) or the pre-polymerized catalyst thereof is used in an amount of, in terms of the titanium atom, usually about 0.001 to about 100 mmol, preferably about 0.005 to about 20 mmol per 1 liter of the polymerization volume. The organometallic compound catalyst component (b) is used in such amounts that the metallic atom of the catalyst component (b) accounts for usually about 1 to about 2000 mol, preferably about 2 to about 500 mol based on 1 mol of the titanium atom of the solid titanium catalyst component (a) in the polymerization system. The electron donor (ED3) is used in an amount of usually 0 to 10 mol, preferably 0 to 5 mol based on 1 mol of the metallic atom of the organometallic compound catalyst component (b).

The concentration of hydrogen in the course of the polymerization is ideally 0 to 0.25 mol, preferably 0 to 0.20 mol, more preferably 0 to 0.015 mol based on 1 mol of the monomers.

When the magnesium-supported titanium catalyst is used, the polymerization temperature is usually about 20 to about 300° C., preferably about 50 to about 150° C., and the polymerization pressure is 0.01 to 10 MPa, preferably 0.05 to 5 MPa.

When the catalyst used in preparing the unsaturated-terminal polyolefin is the metallocene catalyst, it is used in such amounts that the metallocene compound (c) has a concentration of usually 0.00005 to 0.1 mmol, preferably 0.0001 to 0.05 mmol based on 1 liter of the polymerization volume in the polymerization system. The organoaluminum oxy-compound (d) is used in such amounts that the molar ratio (Al/M) of the aluminum atom (Al) to the transition metal atom (M) of the metallocene compound (c) becomes 5 to 1,000, preferably 10 to 400. When the organoaluminum compound (b-2) is used, the amount thereof is usually about 1 to about 300 mol, preferably about 2 to about 200 mol based on 1 mol of the transition metal atom in the metallocene compound (c).

When the metallocene catalyst is used, the polymerization temperature is usually −20 to 150° C., preferably 0 to 120° C., more preferably 0 to 100° C., and the polymerization pressure ranges from above 0 to 8 MPa, preferably from above 0 to 5 MPa.

Olefin polymerization can be made by a batchwise, semi-continuous or continuous process. Polymerization can be carried out in 2 or more steps under different reaction conditions. An olefin homopolymer or a random copolymer of 2 or more olefins may be produced in olefin polymerization.

The unsaturated-terminal polyolefin thus obtained is reacted with a compound containing a Group 13 element to thereby have a terminal end linked with a Group 13 element. In the case where the polyolefin obtained is a mixture of a polyolefin having one terminal end linked with a Group 13 element and a polyolefin having one terminal end of an unsaturated bond, the end of the polyolefin having one terminal end of an unsaturated bond may be converted to the end linked with a Group 13 element according to necessity.

The compound containing a Group 13 element, which is used in the reaction, is selected from the compounds exemplified as the organic compound catalyst component (IX). The compounds exemplified as the organoaluminum compound or as the organoboron compound are preferably used.

Of these, trialkylaluminum, dialkylaluminum hydride and boron compounds having at least one hydrogen-boron bond are more preferable. As the organoaluminum compound, dialkylaluminum hydride is particularly preferred. As the organoboron compound, 9-borabicyclo[3,3,1]nonane is particularly preferred.

For example, the reaction of the polyolefin having an unsaturated bond in the terminal position of one side with the compound containing a Group 13 element is performed as follows.

1) A polypropylene having a vinylidene group in the terminal position, 0.1 to 50 g, is mixed with an octane solution, 5 to 1000 ml, containing 0.01 to 5 mol/L of diisobutylaluminum hydride, and the mixture is refluxed for 0.5 to 6 hours.

2) A polypropylene having a vinylidene group in the terminal position, 0.1 to 50 g, anhydrous tetrahydrofuran, 5 to 1000 ml, and a tetrahydrofuran solution, 0.1 to 50 ml, containing 0.05 to 10 mol/L of 9-borabicyclo[3,3,1]nonane are mixed with each other, and the mixture is refluxed at 20 to 65° C. for 0.5 to 24 hours.

The one-end-modified polyolefin is produced as described above. The polyolefin obtained links with a Group 13 element in the terminal position of one side. The Group 13 element is preferably aluminum.

(Preparation of Polyolefin Having Lithium or Phosphorus-Containing Group in Terminal Position)

Preparation of a polyolefin having lithium or a phosphorus-containing group in the terminal position is detailed based on the process of preparing a polyolefin having lithium in the terminal position.

The polyolefin having lithium in the terminal position is obtained by reacting the polyolefin having a hydroxyl group in the terminal position with an organolithium compound. The reaction of the polyolefin having a hydroxyl group in the terminal position with an organolithium compound is performed usually in a solvent.

Examples of the organolithium compound include alkyl lithiums, such as butyl lithium, propyl lithium, ethyl lithium and methyl lithium; and alkoxy lithiums, such as butoxy lithium, propoxy lithium, ethoxy lithium and methoxy lithium. In the invention, alkyl lithiums are preferably used.

Examples of the solvent used in the reaction include the same solvent as exemplified with respect to the inert hydrocarbon medium.

In reacting the polyolefin having a hydroxyl group in the terminal position with an organolithium compound, the organolithium compound is used in an amount of 0.1 to 100 mol, preferably 0.2 to 10 mol based on 1 mol of the hydroxyl group present in the terminal position of the polyolefin. The reaction temperature is usually −100 to 100° C., preferably 0 to 80° C. and the reaction time is usually 0.1 to 48 hours, preferably 0.5 to 12 hours.

Examples of the preferred organophosphorus compound which can be reacted with the polyolefin having a hydroxyl group in the terminal position include halides of tris(dimethylamino){tris(dimethylamino)phosphoranylideneamino}phosphonium, tris(diethylamino){tris(diethylamino)phosphoranylideneamino}phosphonium, bis(dimethylamino)bis{tris(dimethylamino)phosphoranylideneamino}phosphonium, dimethylaminotris{tris(dimethylamino)phosphoranylideneamino}phosphonium, tetrakis{tris(dimethylamino)phosphoranylideneamino}phosphonium, tetrakis{tris(morpholino)phosphoranylideneamino}phosphonium, and tetrakis{tris (piperidino)phosphoranylideneamino}phosphonium. Chlorides thereof are more preferable.

As the organophosphorus compound, compounds which readily generate a cation are preferable and those which readily generate a phosphoranylideneaminophosphonium cation are more preferable.

The phosphorus-containing group present in the terminal position is preferable also to serve as the active species for ring-opening polymerization.

The use of the polyolefin having lithium in the terminal position is effective to control the stereoregularity of $R^8$.

As described above, the polyolefin, which is represented by formula (VIII), having lithium or a phosphorus-containing group in the terminal position is prepared:

$$PO^8\text{—O-LP} \qquad (VIII)$$

wherein $PO^8$ denotes a polyolefin segment having a weight-average molecular weight of 1,000 to 10,000,000, preferably 3,000 to 1,000,000, more preferably 5,000 to 500,000 and LP is lithium or a phosphorus-containing group. The polyolefin having lithium or a phosphorus-containing group in the terminal position ideally has Mw/Mn of at least 2, preferably from 3 to 15, more preferably from 4 to 14.

(Preparation of Block Copolymer)

In the present invention, a (meth)acrylic ester is anionically polymerized in the presence of the polyolefin having lithium or a phosphorus-containing group in the terminal position to thereby obtain a polyolefin block copolymer comprising a polyolefin segment and a (meth)acrylic ester segment.

The polymerization is performed by mixing a solvent, the polyolefin having lithium or a phosphorus-containing group in the terminal position and a (meth)acrylic ester with each other; or by mixing the polyolefin having lithium or a phosphorus-containing group in the terminal position with a liquid (meth)acrylic ester. Mixing the polyolefin having lithium or a phosphorus-containing group in the terminal position, a solvent and a (meth)acrylic ester with each other yields the active species for anionic polymerization.

Examples of the solvent include aliphatic hydrocarbons, such as hexane and heptane; alicyclic hydrocarbons, such as cyclopentane and cyclohexane; aromatic hydrocarbons, such as benzene and toluene; and ether solvents, such as diethyl ether, dioxane, tetrahydrofuran (THF), monoglyme and diglyme. These solvents may be used either individually or in combination. Of these, aromatic hydrocarbons and ether solvents are preferably used.

Examples of the (meth)acrylic esters include methyl methacrylate, ethyl methacrylate, propyl methacrylate, butyl methacrylate, methyl acrylate, ethyl acrylate, propyl acrylate, butyl acrylate, vinyl acrylate, 2-methoxyethyl methacrylate and 2-(N,N-diethylamino)ethyl methacrylate. These (meth)acrylic esters are used either individually or in combination. Examples of the combination of (meth)acrylic esters include a combination of at least two acrylic esters, a combination of at least two methacrylic esters and a combination of at least one acrylic ester and at least one methacrylic ester.

Such compounds useful for forming the active species for anionic polymerization as triphenylphosphine, α,α'-dipyridyl, hexamethylphosphoroamide (HMPA), titanium tetrachloride, alkyl lithium and alkoxylithium, may be added in the polymerization.

The polymerization is performed at a temperature of usually −100 to 100° C., preferably −80 to 80° C., more preferably −70 to 70° C. for a period of 1 minute to 500 hours, preferably 10 minutes to 300 hours, more preferably 15 minutes to 150 hours. In this polymerization, the polyolefin having lithium in the terminal position is used in concentrations of 0.001 to 100 mol/L, preferably 0.005 to 50 mol/L, more preferably 0.01 to 10 mol/L, even more preferably 0.1 to 5 mol/L. The (meth) acrylic ester is used in concentrations of usually 0.001 to 500 mol/L, preferably 0.005 to 300 mol/L, more preferably 0.01 to 150 mol/L.

The polymerization preferably yields a poly(meth)acrylic ester segment having stereoregularity. That is, a stereoregular poly(substituted-acrylic ester) having a triad syndiotacticity (rr) of at least 70% or a triad isotacticity (mm) of at least 70% is preferred.

The values of rr and mm are determined based on the ratio of the peak area of rr or mm to the total of the peak areas of rr, mr and mm, each detected at around 0.85, 1.05 and 1.25 ppm, respectively, as the result of the $^1$H-NMR measurement of a sample dissolved in nitrobenzene-$d_5$.

As described above, the polymer containing a block copolymer wherein the polyolefin segment ($PO^8$) and the poly(meth) acrylic ester segment are chemically bonded to each other can be produced. Whether the polymer contains a polymer wherein the segment $PO^8$ and the poly (meth) acrylic ester segment are chemically bonded to each other, can be judged based on the molecular weight of the polymer obtained, the solubility thereof in an organic solvent or the results of spectroscopic analysis. That is, successful production of the objective block copolymer can be confirmed based on the fact that the polymer obtained by the method of the invention has a higher molecular weight than that of the segment $PO^8$ of the polyolefin having lithium or a phosphorus-containing group in the terminal position; the fact that the mixture of the polymer corresponding to the segment $PO^8$ of the olefin block copolymer produced by the method of the invention and a polymer corresponding to the segment of the polymer obtained by anionic polymerization of the former polymer differs in solubility behavior in an organic solvent from the olefin block copolymer obtained by the method of the invention; or the peak derived from the chemical bond between the poly(meth)acrylic ester segment of the polymer produced by anionic polymerization and the segment $PO^8$, which is detected as a result of the $^{13}$C-NMR analysis of terminal structure of the olefin block copolymer obtained by the method of the invention.

(Resin for Adhesion)

The resin for adhesion of the invention is described in detail hereinafter.

The resin for adhesion comprises the olefin block copolymer (A-1) When the olefin block copolymer (A-1) is used for the purpose of adhesion, its segment $B^1$ is ideally has a weight-average molecular weight of usually less than 500, preferably 50 or more and less than 500, more preferably from 50 to 450, particularly preferably from 100 to 400.

For example, such an embodiment as the olefin block copolymer (A-14) is preferable.

Examples of the resin for adhesion comprising the olefin block copolymer (A-1) include a hot melt adhesive.

The hot melt adhesive composition of the invention comprises the olefin block copolymer (A-1) and a tackifier resin (B).

The segment PO of the olefin block copolymer (A-1), which is used for the hot melt adhesive composition, ideally has a weight-average molecular weight of usually at least 2,000, preferably from 2,000 to 1,000,000, more preferably from 10,000 to 800,000, particularly preferably from 50,000 to 500,000.

The segment $PO^1$ is preferably composed of an ethylene polymer, such as ethylene homopolymer and ethylene/α-olefin copolymers; a propylene polymer, such as propylene homopolymer and propylene/α-olefin copolymers; a butene polymer, such as butene homopolymer and butene/ethylene copolymer; or a 4-methyl-1-pentene polymer, such as 4-methyl-1-pentene homopolymer.

The linkage $g^1$ of the olefin block copolymer (A-1), which is used for the hot melt adhesive composition, is ideally an ether linkage, an ester linkage or an amide linkage. An ether linkage is particularly preferable.

The segment $B^1$ of the olefin block copolymer (A-1), which is used for the hot melt adhesive composition, is a functional segment obtained by chain polymerization. Preferably, the segment $B^1$ is a functional segment containing repeating units containing an unsaturated hydrocarbon and/or repeating units containing a hetero atom. More preferably, it is such a functional segment obtained by radical polymerization, ring-opening polymerization or ionic polymerization. Particularly preferably, it is such a functional segment obtained by radical polymerization or ring-opening polymerization. The segment $PO^1$ and the segment $B^1$ are preferably composed of different polymers.

Examples of the preferable repeating units which constitute the segment $B^1$ include those derived from a radically polymerizable monomer, such as methyl methacrylate (MMA), ethyl methacrylate (EMA), butyl methacrylate, vinyl acrylate (VA), butyl acrylate (BA), styrene, acrylonitrile and vinylacetate; and those derived from a ring-opening polymerizable monomer, such as lactones, lactams, 2-oxazolines and cyclic ethers, e.g., β-propiolactone, β-butylolactone, δ-valerolactone, glycolide, lactide, ε-caprolactone, α-pyrrolidone, γ-butyrolactam, ε-caprolactam, ethyleneoxide, propyleneoxide, epichlorohydrin, oxetane, tetrahydrofuran and octamethylcyclotetrasiloxane.

The segment $B^1$ ideally has a weight-average molecular weight of usually at least 500, preferably from 500 to 1,000,000, more preferably from 5,000 to 800, 000, particularly preferably from 10,000 to 500,000.

The segment $B^1$ is preferably composed of, for example, a styrene polymer, such as styrene homopolymer or styrene/maleic anhydride copolymer; a vinyl acetate polymer; an acrylic ester polymer; a methacrylic ester polymer, such as methyl methacrylate homopolymer or ethyl methacrylate homopolymer; a vinylformamide polymer; an acrylamide polymer; a cyclic ester polymer; a cyclic amide polymer; a cyclic ether polymer; an oxazoline polymer or a fluorine-containing polymer.

The segment $B^1$ is contained in an amount of preferably 0.01 to 99.99% by weight, preferably 1 to 99% by weight, more preferably 1 to 95% by weight, particularly preferably 1 to 90% by weight based on the olefin block copolymer (A-1).

The olefin block copolymer (A-1), which is used for the hot melt adhesive composition, ideally has a melt flow rate (MFR: ASTM D 1238, 230° C., 2.16 kg load) of usually 0.01 to 800 g/10 min, preferably 0.05 to 500 g/10 min, more preferably 0.1 to 400 g/10 min.

The olefin block copolymer (A-1) having a molecular weight of the above range is excellent in tackiness, thermoresistant creep characteristics and fluidity.

In view of good aqueous dispersion properties and excellent heat sealing properties with polyolefins, the olefin block copolymer (A-1) ideally has the segment $PO^1$ composed of a polyethylene, an ethylene/α-olefin copolymer, a polypropylene or a propylene/α-olefin copolymer, and the segment $B^1$ composed of a polyethylene glycol, a polypropylene glycol, a polyvinyl alcohol or a poly(2-hydroxyethyl methacrylate).

In order for the olefin block copolymer (A-1), when used as a base resin for a hot melt, to balance excellent tackiness and thermoresistant creep characteristics, the block copolymer preferably comprises the segment $PO^1$ composed of a crystalline polyolefin and the segment $B^1$ which is a functional segment having a glass transition temperature of lower than room temperature (23° C.); or the segment $PO^1$ composed of a polyolefin having a crystallinity of less than 30% and the segment $B^1$ which is a crystalline functional segment or a functional segment having a glass transition temperature of not lower than 80° C.

The crystalline polyolefin is a polyolefin having a crystallinity of at least 30%. The melting point of the crystalline polyolefin is usually 80° C. or over, preferably 100° C. or over, more preferably 120° C. or over.

Examples of such a polyolefin include a propylene homopolymer, a propylene/ethylene random copolymer (ethylene content: 5 mol % or less), a copolymer of propylene and an α-olefin having 4 to 20 carbon atoms ($C_{4-20}$ α-olefin content: 5 mol % or less), an ethylene homopolymer and a copolymer of ethylene and an α-olefin having 3 or more carbon atoms (content of the α-olefin having 3 or more carbon atoms: 5 mol % or less).

Examples of the functional segment having a glass transition temperature of lower than room temperature include homopolymers of an alkyl acrylate having an alkyl group of 1 to 20 carbon atoms or an alkyl methacrylate having an alkyl group of 4 to 20 carbon atoms, and copolymers comprising two or more of the above alkyl(meth)acrylates. Exemplary alkyl (meth)acrylates used herein are butyl methacrylate, 2-ethylhexyl methacrylate, dodecyl methacrylate, methyl acrylate, ethyl acrylate, propyl acrylate, n-butyl acrylate, isobutyl acrylate, tert-butyl acrylate, 2-ethylhexyl acrylate, etc. Of these, butyl methacrylate, 2-ethylhexyl methacrylate, ethyl acrylate, n-butyl acrylate and 2-ethylhexyl acrylate are preferred.

The functional segment having a glass transition temperature of lower than room temperature may contain other radically polymerizable monomer within the limits not detrimental to the objects of the invention. Examples of the radically polymerizable monomer used herein include styrene, acrylic acids, methacrylic acids, methyl methacrylate and allyl methacrylate.

Examples of the segment having a glass transition temperature of lower than room temperature further include polymers of a conjugated diene, such as polybutadiene and polyisoprene.

Examples of the polyolefin having a crystallinity of 30% or less include a copolymer of ethylene and an α-olefin having 3 to 20 carbon atoms ($C_{3-20}$ α-olefin content: 10 to 50 mol %) and a copolymer of propylene and an α-olefin having 4 to 20 carbon atoms ($C_{4-20}$ α-olefin content: 10 to 50 mol %).

Examples of the crystalline functional segment include polycaprolactone and polycaprolactam.

Examples of the functional segment having a glass transition temperature of 80° C. or over include homopolymers and copolymers of acrylic acids, methacrylic acids, methyl methacrylate, acrylamide and 2-hydroxyethyl methacrylate.

The glass transition temperature and the melting point can be determined based on the DSC method. The crystallinity can be obtained based on the X-ray diffractometry.

Specific examples of the preferred olefin block copolymer (A-1) include:

a block copolymer wherein the segment $PO^1$ is a homopolypropylene (crystallinity: 30 to 60, Mw: 2,000 to 1,000,000), the linkage $g^1$ is an ether linkage and the segment $B^1$ is poly(butyl acrylate) (glass transition temperature: −55 to −45° C., Mw: 2,000 to 1,000,000); and a block copolymer wherein the segment $PO^1$ is an ethylene/butene random copolymer (crystallinity: 0 to 25, butene content: 5 to 30 mol %, Mw: 2,000 to 1,000,000), the linkage $g^1$ is an ether linkage and the segment $B^1$ is polystyrene (glass transition temperature: 100 to 120° C., Mw: 500 to 1,000,000).

(Tackifier (B))

The tackifier (B), which is used for the hot melt adhesive composition, is added for the purpose of controlling the viscosity of a base polymer, i.e., the olefin block copolymer (A-1) at the time of fusion and of improving hot tack and wetting properties. The tackifier (B) is not particularly limited as long as it can enhance, when compounded in the olefin block copolymer (A-1), hot tack and wetting properties on heating.

Exemplary preferable tackifiers are an alicyclic hydrogenated tackifier, a rosin, a modified rosin, esterified products thereof, an aliphatic petroleum resin, an alicyclic petroleum resin, an aromatic petroleum resin, a copolymerized petroleum resin of an aliphatic component and an aromatic component, a low molecular-weight styrene resin, an isoprene resin, an alkylphenol resin, a terpene resin and a coumarone-indene resin. In this invention, these tackifiers may be used either individually or in combination.

The hot melt adhesive composition comprises the olefin block copolymer (A-1) in an amount of 10 to 90 parts by weight, preferably 20 to 85 parts by weight, more preferably 30 to 80 parts by weight, and the tackifier resin (B) in an amount of 90 to 10 parts by weight, preferably 80 to 15 parts by weight, more preferably 70 to 20 parts by weight based on the total 100 parts by weight of the olefin block copolymer (A-1) and the tackifier resin (B).

(Other Components)

The hot melt adhesive composition may contain various additives, such as a softener, a stabilizer, a filler, an antioxidant and a crystalline nucleating agent, within the limits not detrimental to the objects of the invention.

For example, waxes can be compounded for the purpose of lowering the melting viscosity of the hot melt adhesive composition and, thereby, of improving the workability. Examples of the usable waxes include natural waxes, such as paraffin wax and microcrystalline wax; synthetic waxes, such as petroleum wax and Sasol wax; and synthetic petroleum polyolefin waxes, such as coal wax, polyethylene wax and polypropylene wax. Synthetic petroleum polyolefin waxes may be modified according to necessity.

Various conventionally known nucleating agents can be used as the crystalline nucleating agent without any specific limitations. Examples of the crystalline nucleating agent include the aromatic phosphates, the benzylidene sorbitols, the aromatic carboxylic acids and the rosin nucleating agents described above.

(Preparation of Hot Melt Adhesive Composition)

The hot melt adhesive composition may be prepared by introducing the olefin block copolymer (A-1), the tackifier resin (B) and, according to necessity, various additives into such a mixer as a Brabender mixer in given proportions, melt-kneading them while heating and shaping the mixture into a desired form, for example into particles, a flake or a bar.

(Uses)

The composition of the invention is molten with heat and applied on materials for coating such as clothes, kraft papers, aluminum foils or polyester films by a usual method to form an adhesive layer, and then submitted to use.

Further, the hot-melt adhesive composition of the invention is used for hot-melt adhesives, and can be used for pressure-sensitive adhesives, printing inks and coating resins.

The hot-melt adhesive composition of the invention has excellent thermo-resistant adhesion and thermo-resistant creep characteristics.

Molded Articles

The molded articles of the invention comprise the olefin block copolymer (A-1), or the olefin polymer composition (D) comprising the olefin block copolymer (A-1) and thermoplastic resins other than the copolymer (A-1). The olefin block copolymer (A-1) may contain two or more olefin block copolymers (A-1) having different compositions.

The molded articles of the invention are molded articles for construction and civil engineering, automobile interior and exterior materials, gasoline tanks, electric and electronic parts, molded articles for medical care and sanitation, molded articles for miscellaneous goods, resin molded articles having environmental degradation properties, films or sheets, and films or sheets having a multi-layered structure.

These will be described in order hereinafter.

Molded Articles for Construction and Civil Engineering

Firstly, the molded articles for construction and civil engineering according to the invention are described.

The molded articles for construction and civil engineering of the invention comprise the olefin block copolymer (A-1) or the olefin polymer composition (D).

In the olefin block copolymer (A-1) and that contained in the olefin polymer composition (D), forming the molded articles for construction and civil engineering, the $PO^1$ segment desirably has a weight-average molecular weight of usually not less than 2,000, preferably 2,000 to 10,000,000, more preferably 10,000 to 10,000,000, especially 10,000 to 200,000.

Preferable examples of the $PO^1$ segment are ethylene polymers such as ethylene homopolymer, ethylene/α-olefin copolymer, ethylene/propylene/vinyl norbornene copolymer, ethylene/propylene/DMDT copolymer, ethylene/cycloolefin/propylene/DMDT copolymer, ethylene/cycloolefin/propylene/conjugated diene copolymer, ethylene/cycloolefin/propylene/conjugated polyene copolymer, ethylene/aromatic vinyl copolymer, ethylene/aromatic vinyl/conjugated polyene copolymer;

propylene polymers such as propylene homopolymer, syndiotactic propylene/ethylene copolymer, atactic propylene/ethylene copolymer and propylene/α-olefin copolymer;

butene polymers such as butene homopolymer and butene/ethylene copolymer; and 4-methyl-1-pentene polymers such as 4-methyl-1-pentene homopolymer.

In the olefin block copolymer (A-1) and that contained in the olefin polymer composition (D), forming the molded articles for construction and civil engineering, the $g^1$ linkage is preferably an ether linkage, ester linkage or amide linkage, further preferably ether linkage.

In the olefin block copolymer (A-1) and that contained in the olefin polymer composition (D), forming the molded articles for construction and civil engineering, the $B^1$ segment is a segment obtainable by chain polymerization, preferably a functional segment comprising repeating units of unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment each preferably comprise different polymers.

The $B^1$ segment has a weight-average molecular weight of usually not less than 500, preferably 500 to 1,000,000, more preferably 2,000 to 1,000,000, further preferably 5,000 to 1,000,000, specifically 10,000 to 200,000.

The $B^1$ segment is contained in an amount, based on the olefin block copolymer (A-1), of preferably 0.01 to 99.99 wt %, preferably 1 to 99 wt %, more preferably 1 to 95 wt %, specifically 1 to 90 wt %.

The olefin block copolymer (A-1) and that contained in the olefin polymer composition (D), forming the molded articles for construction and civil engineering desirably have a melt flow rate (MFR as measured in accordance with ASTM D 1238, at 230° under a load of 2.16 Kg) of usually 0.01 to 200 g/10 min, preferably 0.05 to 100 g/10 min, more preferably 0.05 to 80 g/10 min.

The molded articles for construction and civil engineering according to the invention comprise the olefin block copolymer (A-1) or the olefin polymer composition (D). Such molded articles are useful in the wide fields of construction and civil engineering, for example, floor coverings, floor tiles, floor sheets, sound insulating sheets, heat insulating panels, vibration dampers, decorative sheets, skirting boards, asphalt modifiers, gasket and sealing materials, roofing sheets and water-proof sheets.

The molded articles for construction and civil engineering can be prepared by calender molding, extrusion molding, injection molding, blow molding, press molding or stamping molding in the same manner as the process for preparing the olefin block copolymer (A-1).

The invention will be described in more detail with several suitable embodiments of the molded articles for construction and civil engineering in below.

In the case that the molded articles for construction and civil engineering according to the invention are wallpapers, floor coverings (floor sheets or floor tiles), sound insulating sheets, decorative sheets, gasket and sealing materials, they are preferably formed from the olefin polymer composition (D) comprising the thermoplastic resin (C), an inorganic filler and a tackifier. Further, the olefin polymer composition (D) may be foamed or cross-linking foamed. The foaming and cross-linking foaming may be carried out either after shaping or simultaneously with molding.

The olefin block copolymer (A-1) used herein desirably comprises:

the $PO^1$ segment which is ethylene/cycloolefin copolymer (ethylene content: 1 to 99 wt %, Mw: $5 \times 10^3$ to $5 \times 10^6$), syndiotactic propylene/ethylene copolymer (propylene content: 50 to 99 mol %, Mw: $5 \times 10^3$ to $5 \times 10^6$), atactic propylene/ethylene copolymer (propylene content: 50 to 99 mol %, Mw: $5 \times 10^3$ to $5 \times 10^6$), ethylene/α-olefin copolymer (ethylene content: 1 to 99 mol %, Mw: $5 \times 10^3$ to $5 \times 10^6$), ethylene/propylene/vinyl norbornene copolymer (ethylene content: 50 to 99 mol %, propylene content: 1 to 50 mol %, Mw: $5 \times 10^3$ to $5 \times 10^6$), ethylene/propylene/DMDT copolymer (ethylene content: 50 to 98 mol %, propylene content: 1 to 50 mol %, Mw: $5 \times 10^3$ to $5 \times 10^6$), ethylene/cycloolefin/propylene/DMDT copolymer (ethylene content: 40 to 97 mol %, cycloolefin content: 1 to 20 mol %, propylene content: 1 to 39 mol %, Mw: $5 \times 10^3$ to $5 \times 10^6$), or ethylene/aromatic vinyl copolymer (ethylene content: 1 to 99 mol %, Mw: $5 \times 10^3$ to $5 \times 10^6$), the $g^1$ linkage which is an ether linkage, and the $B^1$ segment which is a styrene homopolymer (Mw: $2 \times 10^3$ to $5 \times 10^6$), methyl methacrylate homopolymer (Mw: $2 \times 10^3$ to $5 \times 10^6$), or styrene/maleic anhydride copolymer (styrene content: 50 to 99 mol %, Mw: $2 \times 10^3$ to $5 \times 10^6$).

Using the olefin block copolymer (A-1) having the above $PO^1$ segment can prepare molded articles having excellent flexibility and also excellent impact resistance and mar resistance. Using the olefin block copolymer (A-1) having the above $B^1$ segment can prepare molded articles having excellent heat resistance and affinity with fillers. Further, using the olefin block copolymer (A-1) having the above $B^1$ segment which is a homopolymer or copolymer of compounds having hydrophilic properties such as ethylene oxide, hydroxyethyl methacrylate or acryl amide can prepare molded articles having wet touch.

In the case that the molded articles for construction and civil engineering are wallpapers, sound insulating sheets or decorative sheets, sheets or films prepared by calender or extrusion molding are stretched to form perforated films having good permeability.

In the case that the molded articles for construction and civil engineering are vibration insulators, the molded articles preferably comprise the olefin polymer composition (D) comprising the thermoplastic resin (C), an inorganic filler and a tackifier. The olefin polymer composition (D) is preferably cross-linked and then submitted to use. The cross-linking thereof improves the strength and oil resistance of the molded articles.

The olefin block copolymer (A-1) used herein desirably comprises:

the $PO^1$ segment which is ethylene/cycloolefin/propylene/conjugated diene copolymer (ethylene content: 50 to 97 mol %, cycloolefin content: 1 to 35 mol %, propylene content: 1 to 45 mol %, Mw: $5 \times 10^3$ to $5 \times 10^6$), ethylene/cycloolefin/propylene/conjugated polyene copolymer (ethylene content: 50 to 97 mol %, cycloolefin content: 1 to 35 mol %, propylene content: 1 to 45 mol %, Mw: $5 \times 10^3$ to $5 \times 10^6$), ethylene homopolymer (Mw: $5 \times 10^3$ to $5 \times 10^6$), ethylene/α-olefin copolymer (ethylene content: 1 mol % or more and less than 100 mol %, Mw: $5 \times 10^3$ to $5 \times 10^6$), ethylene/aromatic vinyl/conjugated polyene copolymer (ethylene content: 2 to 98 mol %, aromatic vinyl content: 1 to 98 mol %, Mw: $5 \times 10^3$ to $5 \times 10^6$), the $g^1$ linkage which is an ether or amide linkage, and the $B^1$ segment which is a homopolymer or copolymer of styrene, methyl methacrylate, maleic anhydride and ε-caprolactam.

The $B^1$ segment is preferably contained in an amount of 1 to 99 wt % based on the olefin block copolymer (A-1).

Using the olefin block copolymer (A-1) having the above $PO^1$ segment can prepare molded articles which have a tan δ, as measured in dynamic viscoelasticity at room temperature, of not less than 0.2 by regulating the composition and thereby have excellent vibration-damping properties, also have excellent toughness and strength. Further, using the olefin block copolymer (A-1) having the above $B^1$ segment can prepare the olefin polymer composition (D) having excellent affinity with fillers and molded articles having excellent heat resistance.

In the case that the molded articles for construction and civil engineering are asphalt modifiers, the olefin block copolymer (A-1) desirably comprises:

the $PO^1$ segment which is ethylene/cycloolefin/propylene/conjugated diene copolymer, ethylene/cycloolefin/propylene/conjugated polyene copolymer, (ethylene content: 50 to 97 mol %, cycloolefin content: 1 to 30 mol %, propylene content: 1 to 40 mol %, Mw: $5\times10^3$ to $5\times10^6$), or ethylene/α-olefin copolymer (ethylene content: 1 to 99 mol %, Mw: $5\times10^3$ to $5\times10^6$), the $g^1$ linkage which is an ether or amide linkage, and the $B^1$ segment which is a homopolymer or copolymer of styrene, methyl methacrylate, maleic anhydride and ε-caprolactam.

The $B^1$ segment is preferably contained in an amount of 1 to 99 wt % based on the olefin block copolymer (A-1).

The olefin block copolymer (A-1) having the above $PO^1$ segment has excellent heat stability in blending with asphalt. The olefin block copolymer (A-1) having the $B^1$ segment has excellent compatibility with asphalt. Further, after application and setting of asphalt, the strength and heat resistance are improved.

In the case that the molded articles for construction and civil engineering are gasket and sealing materials, roofing sheets and water proof sheets, the molded articles preferably comprise the olefin polymer composition (D) comprising the thermoplastic resin (C), inorganic fillers and the like. For application of roofing sheets and water proof sheets, the olefin polymer composition (D) is preferably cross-linked and then submitted to use. The cross-linking thereof improves the strength and oil resistance of the molded articles and further the pinhole resistance and penetration resistance are improved.

For application of gasket and sealing materials, the olefin polymer composition (D) is preferably cross-linked and foamed, and then submitted to use. Furthermore, the olefin polymer compositions (D) were immersed in a solution state in clothes, etc, and a solvent is evaporated and then they may be submitted to use as gasket and sealing materials, roofing sheets and water proof sheets.

The olefin block copolymer (A-1) used herein desirably comprises:

the $PO^1$ segment which is ethylene/α-olefin/conjugated diene copolymer or ethylene/α-olefin/conjugated polyene copolymer (ethylene content: 50 to 98 mol %, α-olefin content: 1 to 48 mol %, Mw: $5\times10^3$ to $5\times10^6$), ethylene/cycloolefin/propylene/conjugated polyene copolymer (ethylene content: 50 to 97 mol %, cycloolefin content: 1 to 30 mol %, propylene content: 1 to 40 mol %, Mw: $5\times10^3$ to $5\times10^6$), or ethylene/aromatic vinyl/conjugated diene copolymer (ethylene content: 50 to 98 mol %, aromatic vinyl content: 1 to 30 mol %, Mw: $5\times10^3$ to $5\times10^6$), the $g^1$ linkage which is an ether or amide linkage, and the $B^1$ segment which is a homopolymer or copolymer of styrene, methyl methacrylate, maleic anhydride and ε-caprolactam.

The $B^1$ segment is preferably contained in an amount of 1 to 99 wt % based on the olefin block copolymer (A-1).

The molded articles for construction and civil engineering according to the present invention satisfy various requirements for uses as construction and civil engineering.

Automobile Interior and Exterior Materials and Gasoline Tanks

Next, the automobile interior and exterior materials and gasoline tanks according to the invention will be described.

The automobile interior and exterior materials and gasoline tanks according to the invention comprise the olefin block copolymer (A-1) or the olefin polymer composition (D).

In the olefin block copolymer (A-1) and that contained in the olefin polymer composition (D), forming the automobile interior and exterior materials and gasoline tanks, the $PO^1$ segment desirably has a weight-average molecular weight of usually not less than 2,000, preferably 2,000 to 10,000,000, more preferably 10,000 to 1,000,000.

Preferable examples of the p21 segment are ethylene polymers such as ethylene homopolymer, ethylene/α-olefin copolymer, ethylene/propylene/vinyl norbornene copolymer, ethylene/propylene/DMDT copolymer, ethylene/cycloolefin/propylene/DMDT copolymer, ethylene/cycloolefin/propylene/conjugated diene copolymer, ethylene/cycloolefin/propylene/conjugated polyene copolymer, ethylene/aromatic vinyl copolymer, ethylene/aromatic vinyl/conjugated polyene copolymer;

propylene polymers such as propylene homopolymer, syndiotactic propylene/ethylene copolymer, atactic propylene/ethylene copolymer and propylene/α-olefin copolymer;

butene polymers such as butene homopolymer and butene/ethylene copolymer; and 4-methyl-1-pentene polymers such as 4-methyl-1-pentene homopolymer.

Of the $PO^1$ segments, α-olefin polymers are preferable, ethylene polymers and propylene polymers are more preferable, and propylene polymers are most preferable.

Examples of the propylene polymer may include a propylene homopolymer and copolymers comprising propylene, and up to 10 mol % of ethylene and/or an α-olefin of 4 or more carbon atoms. The olefin block copolymers (A-1) having such polyolefin segment are particularly suitable for automobile interior and exterior materials.

Examples of the ethylene polymer may include an ethylene homopolymer and a copolymer of ethylene and an α-olefin of 3 or more carbon atoms. Specifically, the copolymer of ethylene and an α-olefin of 3 or more carbon atoms preferably has a molar ratio of ethylene to α-olefin of about from 100/0 to 50/50. The olefin block copolymers (A-1) having such polyolefin segment are particularly suitable for uses as gasoline tanks. Further examples of the ethylene polymer may include copolymers comprising ethylene, and optionally an α-olefin of 3 or more carbon atoms, and a cycloolefin. The olefin block copolymers (A-1) having such polyolefin segment are particularly suitable for uses as automobile interior materials.

When the $PO^1$ segment is a propylene polymer, the value of a stereoregularity index $[M_5]$, as determined by the following formula (9) is desirably from 0.970 to 0.995 and the value of a stereoregularity index [M₃], as determined by the following formula (10) is desirably from 0.0020 to 0.0050.

$$[M_5] = \frac{[Pmmmm]}{[Pw]} \quad (9)$$

In the formula (9), [Pmmm] is absorption intensity assigned to a methyl group of the third unit in five sequential propylene units of an isotactic part, and [Pw] is absorption intensity assigned to methyl group of propylene units.

$$[M_3] = \frac{[Pmmrm] + [Pmrmr] + [Pmrrr] + [Prmrr] + [Prmmr] + [Prrrr]}{[Pw]} \quad (10)$$

In the formula,

[Pmmrm] is absorption intensity assigned to a methyl group of the third unit in five sequential propylene units having a structure represented by ]]]ᵣ₁ wherein propylene unit is represented by ],

[Pmrmr] is absorption intensity assigned to a methyl group of the third unit in five sequential propylene units having a structure represented by ]]ᵣ₁] wherein propylene unit is represented by ],

[Pmrrr] is absorption intensity assigned to a methyl group of the third unit in five sequential propylene units having a structure represented by ]]ᵣ₁]ᵣ₁ wherein propylene unit is represented by ],

[Prmrr] is absorption intensity assigned to-a methyl group of the third unit in five sequential propylene units having a structure represented by ᵣ₁]]ᵣ₁ wherein propylene unit is represented by ],

[Prmmr] is absorption intensity assigned to a methyl group of the third unit in five sequential propylene units having a structure represented by ᵣ₁]]]ᵣ₁ wherein propylene unit is represented by ],

[Prrrr] is absorption intensity assigned to a methyl group of the third unit in five sequential propylene units having a structure represented by ]ᵣ₁]ᵣ₁] wherein propylene unit is represented by ], and

[Pw] is absorption intensity assigned to a methyl group of propylene units.

The stereoregularity index [M₅] of the propylene components is determined from absorption intensities of Pmmmm, Pw, Sαγ, Sαδ⁺ and Tδ⁺δ⁺ in ¹³C-NMR spectrum by the formula (9).

The stereoregularity index [M₃] is determined from absorption intensities of Pmmrm, Pmrmr, Pmrrr, Prmrr, Prmmr, Prrrr, Pw, Sαγ, Sαδ⁺ and Tδ⁺δ⁺ in ¹³C-NMR spectrum by the formula (10).

The stereoregularity indexes [M₅] and [M₃] used for evaluation of the above stereoregularity of polypropylene will be described in detail.

When polypropylene is a propylene homopolymer, for example, it is represented by the following formula (11).

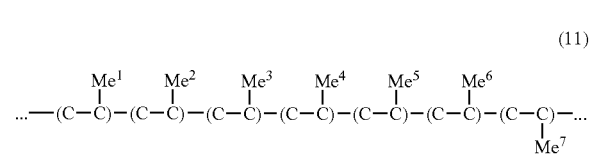

(11)

The stereoregularity represented by the formula (11) is evaluated by a ratio of Pmmmm to Pw, i.e. the value [M5] determined from the formula (9) wherein, in the five sequential propylene units represented by ]ₘ]ₘ]ₘ]ₘ], where a propylene unit

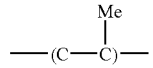

is abbreviated to as ], ]] is abbreviated to as m (meso) and ]ᵣ₁ is abbreviated to as r (rasemo), Pmmmm is absorption intensity assigned to a methyl group of the third unit (for example, Me³, Me⁴) in ¹³C-NMR spectrum and Pw is absorption intensity assigned to all methyl groups (Me¹, Me², Me³, . . . ) in propylene units.

Further, when boiling heptane-insoluble components contain constitutional units derived from olefins other than propylene units, for example, a small amount of ethylene units, the insoluble components are represented by the following formula (12) or (13). The formula (12) shows the case that sequential propylene units contain one ethylene unit, and the formula (13) shows the case that sequential propylene units contain sequential ethylene units of two or more ethylene units.

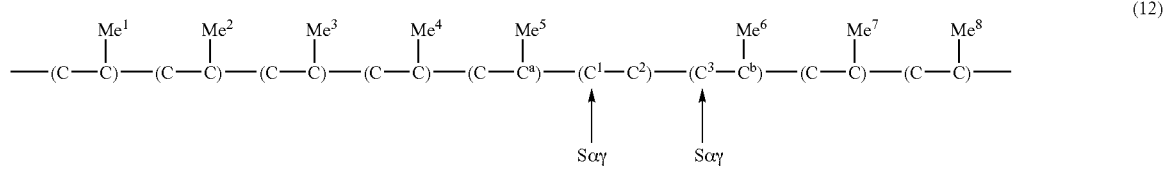

(12)

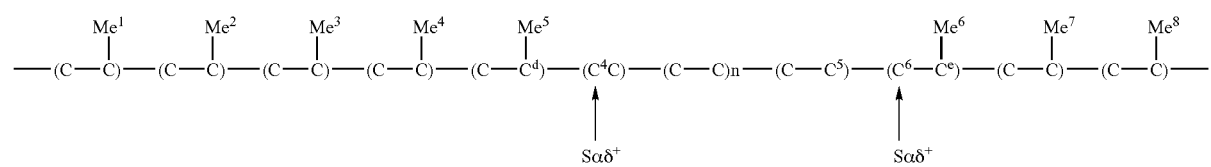

(13)

(n is 0 or a positive integer.)

In the cases, the absorption intensity assigned to methyl groups other than a methyl group of the third unit in the five sequential propylene units (in the formulas (12) and (13), $Me^4$, $Me^5$, $Me^6$ and $Me^7$) have to be excluded theoretically in evaluation of the stereoregularity. However, the absorption of these methyl groups is observed by overlapping with the absorption of other methyl groups so that the determination thereof is difficult.

In the case that the propylene polymer is represented by the formula (12), using the absorption intensity (Sαγ) in $^{13}$C-NMR assigned to a secondary carbon ($C^1$), which is present in ethylene units and linked to the tertiary carbon ($C^a$) in propylene units and the absorption intensity (Sαγ) in $^{13}$C-NMR assigned to a secondary carbon ($C^3$), which is present in propylene units and linked to the secondary carbon ($C^2$) in ethylene unit, the overlapped absorption is excluded.

That is, the absorption intensities assigned to methyl groups ($Me^4$, $Me^5$, $Me^6$ and $Me^7$) other than methyl group of the third unit in five sequential propylene units are excluded by subtracting twice the absorbing intensity (Sαγ) assigned to a secondary carbon which is present in the main sequence, is of two tertiary carbons nearest the secondary carbons ($C^1$ or $C^3$), where one ($C^a$ or $C^b$) is at α-position and the other ($C^b$ or $C^a$) is at γ-position, from Pw.

In the case that the propylene polymer is represented by the formula (13), using the absorption intensity (Sαδ$^+$) in $^{13}$C-NMR assigned to a secondary carbon ($C^4$), which is a secondary carbon in sequential ethylene units of two more ethylene units and linked to a tertiary carbon ($C^d$) in propylene units and the absorption intensity (Sαδ$^+$) in $^{13}$C-NMR assigned to a secondary carbon ($C^6$), which is a secondary carbon in propylene units and linked to a secondary carbon ($C^5$) in sequential ethylene units of two or more units, the overlapped absorption is excluded.

That is, the absorption intensities assigned to methyl groups ($Me^4$, $Me^5$, $Me^6$ and $Me^7$) other than methyl group of the third unit in five sequential propylene units are excluded by subtracting twice the absorbing intensity (Sαδ$^+$) assigned to a secondary carbon which is present in the main sequence, is of two tertiary carbons nearest the secondary carbons ($C^4$ or $C^6$), wherein one ($C^d$ or $C^e$) is at α-position and the other ($C^e$ or $C^d$) is at δ-position or at a detached position from the δ-position, from Pw.

Therefore, the stereoregularity of the propylene polymers of the formula (12) and (13) can be evaluated by the value determined from the following formula (14).

$$\frac{[Pmmmm]}{[Pw] - 2([S\alpha\gamma] + [S\alpha\delta^+])} \quad (14)$$

Further, the propylene polymers, which contain a small amount of ethylene units and one propylene unit in sequential ethylene units, can be represented by, for example, the following formula (15).

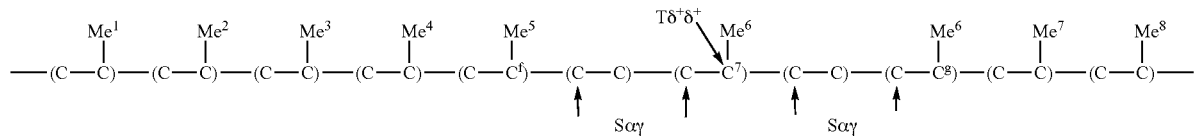

(15)

In this case, in application of the formula (14), as it is, there are five methyl groups to be excluded ($Me^4$, $Me^5$, $Me^6$, $Me^7$ and $Me^8$), but there are four methyl groups corresponding to Sαγ or Sαδ$^+$. Therefore, it is necessary to exclude additional three methyl groups other than the central methyl group in five sequential propylene units so that further correction is required.

Then, this is corrected using the absorption intensity in $^{13}$C-NMR assigned to tertiary carbon of propylene units contained in sequential ethylene units.

That is, this is corrected by adding three times the absorbing intensity (Tδ$^+$δ$^+$) assigned to a tertiary carbon ($C^7$), which is present in the main sequence, is of two tertiary carbons($C^f$, $C^g$) nearest the tertiary carbon, wherein one ($C^f$) is at δ-position or at a detached position from the δ-position and the other ($C^g$) is at δ-position or at a detached position from the δ-position, to Pw.

Therefore, the stereoregularity of the propylene polymers can be evaluated by the value of stereoregularity index [M5] determined from the formula (9).

The formula (14) are not different from the formula (9) but is a special case of the formula (9). According to constitutional units other than propylene unit, there is optionally a case where the above correction is unnecessary.

In the formula (10) for determination of the [M$_3$] stereoregularity index, [Pmmrm], [Pmrmr], [Pmrrr], [Prmrr], [Prmmr] and [Prrrr] are each absorption intensity assigned to a methyl group of the third unit of five sequential propylene units having a structure such that three methyl groups are in the identical direction and two are in the opposite direction, of methyl groups of five sequential propylene units in propylene unit linkage (hereinafter referred to as M$_3$ structure). That is, the value of the stereoregularity index [M$_3$] determined by the formula (10) shows a proportion of the M$_3$ structure in the propylene unit linkage.

In the invention, the propylene polymer forming polyolefin segment of the olefin block copolymer (A-1) has a value of the stereoregularity Index [M$_5$] determined by the formula (9) of usually from 0.970 to 0.995, and a value of the stereoregularity Index [M$_3$] determined by the formula (10) of usually from 0.0020 to 0.0050, so that it has a very long meso chain (propylene unit linkage where α-methyl carbons are in the identical direction).

The [M$_3$] value is preferably from 0.0023 to 0.0045, more preferably 0.0025 to 0.0040.

In general, propylene polymers having a small value of the stereoregularity Index [$M_3$] have long meso chain. However, in the case of propylene polymers having an extremely large value of the stereoregularity Index [$M_5$] and a very small value of the stereoregularity Index [$M_3$], when having the almost same stereoregularity Index [$M_5$], propylene polymers having a larger value of the stereoregularity Index [$M_3$] optionally have long meso chain.

For example, as compared with polypropylene having the following structure (s1) and polypropylene having the structure (s2), the polypropylene of the structure (s1) having the $M_3$ structure has longer meso chain than one of the polypropylene of the structure (s2) having no $M_3$ structure, provided that the structures (s1) and (s2) each comprise 1003 propylene units.

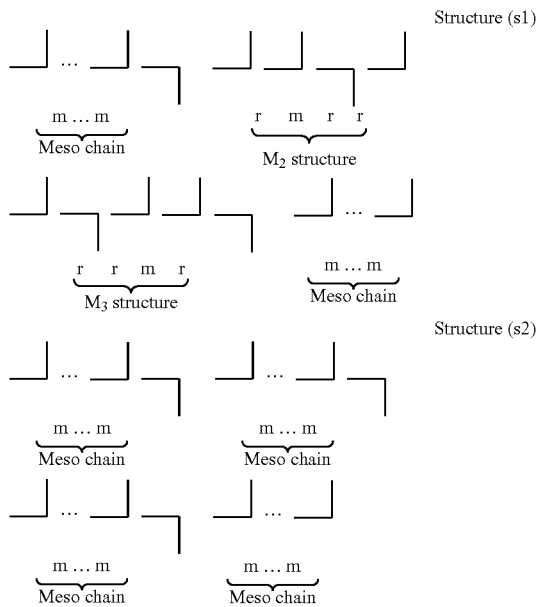

The value of the stereoregularity Index [$M_5$] of the polypropylene of the structure (s1) is 0.986 and the value of the stereoregularity Index [$M_5$] of the polypropylene of the structure (s2) is 0.985, so that the stereoregularity values are approximately the same. However, in the polypropylene of the structure (s1) having the $M_3$ structure, meso chain contains on the average 497 propylene units, while in the polypropylene of the structure (s2) having no $M_3$ structure, meso chain contains on the average 250 propylene units. That is, polypropylene having an extremely large value of the stereoregularity Index [$M_5$] has an extremely small proportion of the structure represented by r (racemo) contained in sequential propylene units. Therefore, polypropylene having the $M_3$ structure, in which the r (racemo) structures are present in a concentrated condition, has longer meso chain than that of polypropylene having no $M_3$ structure, in which the r (racemo) structures are present in a dispersed condition.

The values of the stereoregularity Index [$M_5$] and [$M_3$] are determined from the peak intensity based on each structures in $^{13}$C-NMR and the total of the peak intensities measured in the following manner.

In measurement of $^{13}$C-NMR, 0.35 g of the olefin block copolymer (A-1) is dissolved with heat in 2.0 ml of hexachlorobutadiene. The solution is filtered with a glass filter (G2) and therein 0.5 ml of heavy hydrogenated benzene is fed in an NMR tube having an inner diameter of 10 mm, and $^{13}$C-NMR measurement is carried out at 120° C. using NMR measuring apparatus Model GX-500 manufactured by Nippon Denshi Co., Ltd. The integration is conducted 10,000 times or more.

The automobile interior and exterior materials, and gasoline tanks according to the invention, which comprises the olefin block copolymer (A-1) having the $PO^1$ segment as described in the above or the olefin polymer composition (D) containing the olefin block copolymer (A-1) are preferred because of having excellent rigidity and impact resistance.

In the olefin block copolymer (A-1) or the olefin block copolymer (A-1) contained in the olefin polymer composition (D), which copolymer forms automobile interior and exterior materials, and gasoline tanks, the $g^1$ linkage is an ether linkage ester linkage or amide linkage, and preferably ether linkage.

In the olefin block copolymer (A-1) or the olefin block copolymer (A-1) contained in the olefin polymer composition (D), forming automobile interior and exterior materials, and gasoline tanks, the $B^1$ segment is obtainable by chain polymerization reaction, and is a functional segment having a weight-average molecular weight of 500 or more, preferably a functional segment comprising repeating units containing an unsaturated hydrocarbon and/or repeating units containing a hetero atom, more preferably a functional segment obtainable by radical polymerization, ring opening polymerization or ionic polymerization, specifically a function segment obtainable by radical polymerization or ring opening polymerization.

Examples of the functional segment may include the same as described in the above. It is preferred that the $PO^1$ segment and the $B^1$ segment comprise different polymers each other.

The $B^1$ segment desirably has a weight-average molecular weight of usually 500 or more, preferably from 500 to 1,000,000, more preferably 2,000 to 1,000,000.

Examples of the $B^1$ segment are preferably a segment which contains an unsaturated hydrocarbon and/or a hetero atom and is obtainable by radical reaction or ring opening reaction, more preferably at least one selected from styrene polymer, vinyl acetate polymer, acrylate polymer, methacrylate polymer, vinylformamide polymer, acrylamide polymer, cyclic ester polymer, cyclic amide polymer, cyclic ether polymer, oxazoline polymer and fluorine-containing polymer.

The automobile interior and exterior materials and gasoline tanks, which comprise the olefin block copolymer (A-1) having the $B^1$ segment according to the invention are preferred because of having excellent rigidity and oil resistance.

The $B^1$ segment is contained in an amount of preferably from 0.01 to 99.99 wt %, more preferably 1 to 99 wt %, further preferably 1 to 95 wt % based on the olefin block copolymer (A-1).

The olefin block copolymer (A-1) or the olefin block copolymer (A-1) contained in the olefin polymer composition (D), which copolymer forms automobile interior and exterior materials, and gasoline tanks, has a melt flow rate (MFR; ASTM D1238, 230° C., load 2.16 Kg) of usually from 0.01 to 200 g/10 min, preferably 0.05 to 100 g/10 min, more preferably 0.05 to 80 g/10 min.

Among the olefin block copolymers (A-1), those in which the $PO^1$ segment is an α-olefin polymer, preferably propylene polymer and the $B^1$ segment is (meth)acrylate ester are preferably employed for uses as automobile interior and exterior materials. Further, those in which the PO$^1$ segment is an ethylene polymer and the B$^1$ segment is (meth)acrylate ester are preferably employed for uses as gasoline tanks. Furthermore, those in which the PO$^1$ segment is an ethylene/α-olefin copolymer and the B$^1$ segment is an aromatic vinyl compound copolymer are preferably employed for uses as gasoline tanks. Moreover, those in which the PO$^1$ segment is a copolymer of ethylene and optionally an α-olefin of 3 or more carbon atoms and a cycloolefin and the B$^1$ segment is an aromatic vinyl compound copolymer are preferably employed for uses as mudguard.

The automobile interior and exterior materials and gasoline tanks, which comprise the olefin copolymer composition (D), are preferred because of having excellent rigidity, impact resistance, oil resistance and surface hardness.

Examples of automobile interior and exterior materials of the olefin polymer composition (D) are bumper, side mole, mirror cover, mudguard, console box, etc.

The automobile interior and exterior materials and gasoline tanks according to the present invention can be prepared by molding the olefin block copolymer (A-1) or the olefin polymer composition (D) by known processes. Particularly, preferable molding processes for preparing the automobile interior and exterior materials are injection molding, extrusion molding and hollow molding, and a preferable molding process for preparing the gasoline tanks is blow molding.

The present invention can provide the automobile interior and exterior materials and gasoline tanks having well-balanced properties in excellent rigidity, impact resistance, oil resistance, heat resistance and mar resistance.

Electric and Electronic Parts

In the next place, the electric and electronic parts of the invention are described.

The electric and electronic parts of the invention are formed from the above olefin block copolymer (A-1) or the above olefin polymer composition (D).

In the olefin block copolymer (A-1) or the olefin block copolymer (A-1) contained in the olefin polymer composition (D), forming electric and electronic parts, the PO$^1$ segment desirably has a weight-average molecular weight of usually 2,000 or more, preferably from 2,000 to 10,000,000, more preferably 10,000 to 10,000,000, specifically 10,000 to 200,000.

Preferred examples of the PO$^1$ segment may include ethylene polymers such as ethylene homopolymer and ethylene/α-olefin copolymer; propylene polymers such as propylene homopolymer and propylene/α-olefin copolymer; butene polymers such as butene homopolymer and butene/ethylene copolymer; and 4-methyl-1-pentene polymers such as 4-methyl-1-pentene homopolymer.

In the olefin block copolymer (A-1) or that contained in the olefin polymer composition (D), which copolymer forms electric and electronic parts, the g$^1$ linkage is an ether linkage, ester linkage or amide linkage, and preferably ether linkage.

In the olefin block copolymer (A-1) or that contained in the olefin polymer composition (D), which copolymer forms electric and electronic parts, the B$^1$ segment is a functional segment obtainable by chain polymerization reaction, preferably a functional segment comprising repeating units containing an unsaturated hydrocarbon and/or repeating units containing a hetero atom, more preferably a functional segment obtainable by radical polymerization, ring opening polymerization or ionic polymerization, specifically a functional segment obtainable by radical polymerization or ring opening polymerization.

Examples of the functional segment may include the same as described in the above. It is preferred that the PO$^1$ segment and the B$^1$ segment comprise different polymers each other.

The B$^1$ segment desirably has a weight-average molecular weight of usually 500 or more, preferably from 500 to 1,000,000, more preferably 2,000 to 1,000,000, further preferably 5,000 to 1,000,000, specifically 10,000 to 200,000.

The B$^1$ segment is contained in an amount of preferably from 0.01 to 99.99 wt %, more preferably 1 to 99 wt %, further preferably 1 to 95 wt %, specifically 1 to 90 wt % based on the olefin block copolymer (A-1).

The olefin block copolymer (A-1) or the olefin block copolymer (A-1) contained in the olefin polymer composition (D), which copolymer forms electric and electronic parts, has a melt flow rate (MFR; ASTM D1238, 230° C., load 2.16 Kg) of usually from 0.01 to 200 g/10 min, preferably 0.05 to 100 g/10 min, more preferably 0.05 to 80 g/10 min.

The electric and electronic parts according to the invention are useful in a wide field of application as materials for various electric and electronic parts, which are molded with various processes.

Examples of the electric and electronic parts may include covering materials for electric wires used as electric insulating materials for electric wires; magnetic recording mediums, binders of magnetic recording mediums, and sealants for electric circuits used as tools and materials for treating electronic parts; tools and materials for vessels such as materials for home electric appliances, vessels for microwave ovens; films used for microwave ovens, polymer electrolyte materials and conductive alloy materials.

Further examples of the electric and electronic parts may include connecters, sockets, resistors, relay cases, switches, coil bobbins, condensers, variable condenser cases, light-pick-up cases, light connecters, oscillators, various terminal assembly, transformers, plugs, printed wiring boards, tuners, speakers, microphones, head phones, small-sized motors, magnetic head bases, power modules, housings, semiconductors, liquid crystal display parts, FDD carriages, FDD chassis, HDD parts, motor brush holders, parabola antennas and computer-related materials.

Furthermore, examples of the electric and electronic parts may include parts for home electric appliances, such as VTR parts i.e. television parts, irons, hair dryers, rice cooker parts, microwave oven parts, sound machinery and tool parts i.e. sounder parts, audio-leaser disc-compact discs etc, illuminator parts, refrigerator parts, air conditioner parts, typewriter parts, word processor parts; parts for office electric appliances, office computer-related parts, telephone instrument parts, facsimile-related parts, duplicator-related parts, materials for shielding electromagnetic wave, speaker cone materials and speaker oscillators.

The electric and electronic parts of the invention can be prepared by calender molding, extrusion molding, injection molding, blow molding, press molding or stamping molding in accordance with the objective use in the same manner as the process for preparing the olefin block copolymer (A-1).

The injection-molded articles of the olefin block copolymer (A-1) or the olefin polymer composition (D) are hardly charged and have excellent rigidity, heat resistance, impact resistance, surface gloss, chemical resistance and abrasion resistance, so that they can be widely used for housings of home electric appliances and vessels.

Non-limiting examples the electric and electronic parts prepared using the olefin block copolymers (A-1) according to the invention are described in below.

In the case of using the olefin block copolymers (A-1) as covering materials for electric wires, it is preferred to mold by extrusion molding. The olefin block copolymers (A-1) used herein desirably have the $PO^1$ segment being an α-olefin copolymer. Preferable examples of the α-olefin copolymer are propylene polymers, and more preferable are syndiotactic polypropylene polymers (Mw: 10,000 to 1,000,000) and copolymers of ethylene, a cycloolefin and optionally an α-olefin of 3 or more carbon atoms (ethylene content: 1 to 99 mol %, α-olefin content: 0 to 50 mol %, cycloolefin content: 1 to 50 mol %, Mw: 10,000 to 1,000,000). Preferable examples of the α-olefin of 3 or more carbon atoms are propylene and butene. The above syndiotactic polypropylene may be copolymerized with 49 mol % or less of other α-olefins. In the formula (I), it is preferred that the $g^1$ linkage be an ether linkage and the $B^1$ segment be a (meth)acrylate ester polymer (Mw: 500 to 1,000,000) or aromatic vinyl compound polymer (Mw: 500 to 1,000,000). Examples of the (meth)acrylate ester polymer may include polymethyl methacrylate (PMMA) and examples of the aromatic vinyl compound polymer may include polystyrene. In the case that the $PO^1$ segment is syndiotactic polypropylene as described in the above, the resulting materials have high dielectric strength properties. In the case that the $PO^1$ segment is an ethylene/propylene/cycloolefin copolymer, the copolymers have excellent moldability so that electric wire-covering materials having excellent shape memory properties can be obtained. In the case that the $B^1$ segment is polymethyl methacrylate or polystyrene, the copolymers have excellent moldability and further excellent heat resistance and adhesiveness with inorganic fillers so that electric wire-covering materials having excellent elongation at break can be obtained. These olefin block copolymers may be usually used singly or used simultaneously with inorganic fillers such as magnesium hydroxide or crosslinking agents such as vinyl trimethoxy silane. In the invention, it is preferred to use simultaneously with inorganic fillers such as magnesium hydroxide or crosslinking agents such as vinyl trimethoxy silane.

In the case that the olefin block copolymer (A-1) is used as gasket materials for refrigerators, it is preferable to mold with extrusion molding, contour extrusion molding or expansion molding.

With regard to the olefin block copolymer (A-1), the segment $PO^1$ is preferably an ethylene/α-olefin/nonconjugated polyene copolymer (ethylene content: 50 to 98 mol %, α-olefin content: 1 to 49 mol %, Mw: 10,000 to 1,000,000). Of these, ethylene/propylene/nonconjugated diene copolymer (ethylene content: 50 to 98 mol %, propylene content: 1 to 49 mol %, Mw: 10,000 to 1,000,000) and ethylene/propylene/nonconjugated triene copolymer (ethylene content: 50 to 98 mol %, propylene content: 1 to 49 mol %, Mw: 10,000 to 1,000,000) are preferable. Further, the $g^1$ linkage is preferably an ether linkage and the $B^1$ segment is preferably a (meth)acrylate ester polymer (Mw: 500 to 1,000,000) or aromatic vinyl compound polymer (Mw: 500 to 1,000,000), and further, the $B^1$ segment is preferably polymethylmethacrylate or polystyrene. It is usually preferred that the gasket materials be molded by crosslinking expansion using foaming agents, crosslinking agents or inorganic fillers. When the $PO^1$ segment is ethylene/propylene/nonconjugated diene or ethylene/propylene/nonconjugated triene copolymer, crosslinking expansion molded articles in which cells are foamed uniformly can be prepared, and thereby gasket materials having excellent compression permanent stress and heat resistance can be prepared.

When the $B^1$ segment is polymethylmethacrylate or polystyrene, the copolymers have excellent moldability particularly excellent contour extrusion properties, and further have excellent heat resistance and adhesiveness with inorganic fillers so that gasket materials less susceptible to whitening can be prepared.

In the case that the olefin block copolymers (A-1) are used for optical materials, it is preferable to mold with injection molding or compression molding. With regard to the olefin block copolymer (A-1) used herein, the segment $PO^1$ is preferably an ethylene/cycloolefin copolymer (ethylene content: 50 to 99 mol %, Mw: 10,000 to 1,000,000), the $g^1$ linkage is preferably an amide linkage and the $B^1$ segment is preferably a polymer obtainable by ring opening polymerization of a cyclic amide compound (Mw: 500 to 1,000,000). Examples of the $B^1$ segment may include nylon 6. When the $PO^1$ segment is an ethylene/cycloolefin copolymer and has an ethylene content of 60 mol % or less, the resins having very high rigidity and excellent transparency can be prepared. When the $B^1$ segment is nylon 6, the materials having excellent toughness can be prepared. Generally, the transparency of resins is decreased by blending an ethylene/cycloolefin copolymer and nylon 6. However, using the block copolymers of the invention, nylon 6 is dispersed finely so that materials having excellent transparency and high toughness can be prepared.

In the case of using the olefin block copolymer (A-1) as magnetic recording materials, the olefin block copolymer (A-1) used herein has, for example, the $PO^1$ segment being an ethylene/butene copolymer (ethylene content: 1 to 99 mol %, Mw: 10,000 to 1,000,000), the $g^1$ linkage being an ether linkage and the $B^1$ segment containing side-chain liquid crystals (Mw: 500 to 1,000,000). Examples of the $B^1$ segment containing side-chain liquid crystals may include poly (vinyl-4-(methoxycinnamoyloxy alkyloxy)biphenyl, poly (2-(4'-cyano-4-biphenyloxy)ethylvinylether), etc.

In the use of the olefin block copolymer (A-1) as binders of magnetic recording materials, it is preferred to mold by extrusion molding, coating or multi-layer extrusion molding. With regard to the olefin block copolymer (A-1), the segment $PO^1$ is preferably an ethylene/α-olefin copolymer (ethylene content: 1 to 99 mol %, Mw: 10,000 to 1,000,000), more preferably ethylene/butene copolymer. Further, the $g^1$ linkage is preferably ether linkage and the $B^1$ segment is preferably a polymer of an aromatic vinyl compound (Mw: 500 to 1,000,000), for example, polystyrene. Further, the polystyrene part is preferably graft-modified with a sulfonic acid group, so that the copolymers are improved in adhesion properties as binders. When the $PO^1$ segment is an ethylene/butene copolymer, the binder materials having excellent fluidity and resistance to water absorption can be prepared. The olefin block copolymer (A-1) and magnetic powder are kneaded so that excellent magnetic recording materials can be prepared. In this case, the blending ratio of the olefin block copolymer (A-1) to the magnetic powder (olefin block copolymer (A-1)/magnetic powder: weight ratio) is preferably from 99/1 to 10/90. The materials are also preferably used for stationary such as plastic magnets.

In the case of using the olefin block copolymers (A-1) as polymer electrolytes, the $PO^1$ segment is preferably an ethylene (co)polymer (Mw: 10,000 to 1,000,000), more preferably polyethylene (Mw: 10,000 to 1,000,000) or an ethylene/α-olefin copolymer (ethylene content: 1 to 99 mol %, Mw: 10,000 to 1,000,000). Further, polypropylene (Mw: 10,000 to 1,000,000) and poly-4-methyl-1-pentene (Mw:

10,000 to 1,000,000) are preferably used. The $g^1$ linkage is preferably an ether linkage and the $B^1$ segment is preferably a polymer of (meth)acrylate ester (Mw: 500 to 1,000,000) or polyalkylene glycol (Mw: 500 to 1,000,000), more preferably a polymer of butylacrylate, acrylamide or ethylene oxide. By the addition of a lithium salt-aqueous solution, non-aqueous solution, etc to the olefin block copolymer (A-1), solid electrolyte materials can be prepared. The use of these materials makes gelation, which is usually required, unnecessary.

In the case of using the olefin block copolymers (A-1) as films, sheets and injection molded materials for shielding from electromagnetic waves, it is preferred to mold by extrusion molding or injection molding. The olefin block copolymers (A-1) used herein preferably have the $PO^1$ segment being an ethylene/α-olefin/cycloolefin copolymer (ethylene content: 1 to 98 mol %, α-olefin content: 1 to 50 mol %, cycloolefin content: 1 to 49 mol %, Mw: 10,000 to 1,000,000), and propylene is preferable as the α-olefin. The $g^1$ linkage is preferably an ether linkage. The $B^1$ segment is preferably a polymer of hydroxyalkyl(meth)acrylate (Mw: 500 to 1,000,000), more preferably a polymer of (2-hydroxy-ethyl)acrylate. Further, the olefin block copolymer (A-1) is blended with metal powder such as copper and/or silver by kneading to prepare compositions for shielding electromagnetic waves. The metal powder is preferably contained in such an amount that the blending ratio of the olefin block copolymer (A-1) to the metal powder (olefin block copolymer (A-1)/metal powder: weight ratio) is from 99/1 to 10/90. Then, the compositions are formed into molded articles by various molding methods to prepare the materials for shielding electromagnetic waves.

In the case of using the olefin block copolymers (A-1) of the invention as housings of electric and electronic parts, it is preferable to mold with injection molding, rotary molding, extrusion molding or compression molding. The olefin block copolymer (A-1) used herein preferably has the $PO^1$ segment being a highly stereoregular isotactic polypropylene (Mw: 10,000 to 1,000,000), the $g^1$ linkage being an ether linkage and the $B^1$ segment being a polymer of an aromatic vinyl compound or (meth)acrylate ester (Mw: 500 to 1,000,000), more preferably polymethylmethacrylate or polystyrene. The olefin block copolymers have such constituents so that they have very high rigidity. Further, because the olefin block copolymers (A-1) have block parts of polymethylmethacrylate or polystyrene, the resulting materials have depressed static electricity-charging properties and thereby dust is hardly collected to them. Blending the olefin block copolymers with various flame retardants and inorganic fillers, resins for housings of electric and electronic parts having high rigidity, mar resistance and low collecting of dust can be prepared.

The electric and electronic parts of the present invention satisfy the various requirements for use of electric and electronic parts.

Molded Articles for Medical Care and Sanitation

Next, molded articles for medical care and sanitation are described.

The molded articles for medical care and sanitation according to the invention comprise the olefin block copolymer (A-1) or the olefin polymer composition (D).

In the olefin block copolymer (A-1) and the olefin block copolymer (A-1) contained in the olefin polymer composition (D), forming the molded articles for medical care and sanitation, the $PO^1$ segment desirably has a weight-average molecular weight of usually not less than 2,000, preferably 2,000 to 10,000,000, more preferably 10,000 to 10,000,000, specifically 10,000 to 200,000.

Preferable examples of the $PO^1$ segment are ethylene polymers such as ethylene homopolymer and ethylene/α-olefin copolymer; propylene polymers such as propylene homopolymer, and propylene/α-olefin copolymer; butene polymers such as butene homopolymer and butene/ethylene copolymer; and 4-methyl-1-pentene polymers such as 4-methyl-1-pentene homopolymer.

In the olefin block copolymer (A-1) and that contained in the olefin polymer composition (D), which copolymers form the molded articles for medical care and sanitation, the $g^1$ linkage is an ether linkage, ester linkage or amide linkage, preferably ether linkage.

In the olefin block copolymer (A-1) and that contained in the olefin polymer composition (D), which copolymers form the molded articles for medical care and sanitation, the $B^1$ segment is a functional segment obtainable by chain polymerization, preferably a functional segment comprising repeating units of an unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment preferably comprise different polymers each other.

The $B^1$ segment has a weight-average molecular weight of usually not less than 500, preferably 500 to 1,000,000, more preferably 2,000 to 1,000,000, further preferably 5,000 to 1,000,000, specifically 10,000 to 200,000.

The $B^1$ segment is contained in an amount based on the olefin block copolymer (A-1) of preferably 0.01 to 99.99 wt %, preferably 1 to 99 wt %, more preferably 1 to 95 wt %, specifically 1 to 90 wt %.

The olefin block copolymer (A-1) and that contained in the olefin polymer composition (D), forming the molded articles for medical care and sanitation, desirably have a melt flow rate (MFR as measured in accordance with ASTM D 1238, at 230° under a load of 2.16 Kg) of usually 0.01 to 200 g/10 min, preferably 0.05 to 100 g/10 min, more preferably 0.05 to 80 g/10 min.

The molded articles for medical care and sanitation according to the invention comprise the olefin block copolymer (A-1) or the olefin polymer composition (D). Such molded articles for medical care and sanitation are, for example, sheets, films and hollow molded articles for medical care and sanitation. The sheets, films and hollow molded articles are useful for medical care materials such as tube for medical care, vessels for medical care, liquid-carrying bags, pre-filled syringes, hypodermic syringes, artificial internal organs, artificial muscle or permeable films, and retort pouches, films for keeping freshness, etc.

The sheets or films formed from the olefin block copolymer (A-1) or the olefin polymer composition (D) according to the invention are laminated with a non-woven fabric to prepare a non-oven fabric-laminate. Such a non-oven fabric-laminate is useful for gathers of disposable diapers, sanitary napkins, etc.

Further, a non-woven fabric itself can be formed as molded articles for medical care and sanitation from the olefin block copolymer (A-1) or the olefin polymer composition (D) according to the invention. The non-woven fabric has excellent water resistance, moisture permeability and stretchability so that it can be used as non-woven fabrics of the above non-woven laminate and also the non-woven fabric itself can be used for the above use in disposable diapers, sanitary napkins, etc without forming non-woven fabric laminates.

The molded articles formed from the olefin block copolymer (A-1) or the olefin polymer composition (D) according to the invention can be also used as electrets. The electrets can be prepared by molding the molded articles formed from the olefin block copolymer (A-1) or the olefin polymer composition (D) into a film, non-woven, or reticulate cloth-like shape. The electrets are useful as medical care materials for acceleration of forming callus, and bandages or adhesion plasters for medical care, and also useful as sanitary materials such as dust filters, dust non-woven fabrics, gas filters, brooms, dust clothes, etc.

(Preparation of Molded Articles for Medical Care and Sanitary)

The molded articles for medical care and sanitary according to the invention can be prepared by calender molding, extrusion molding, injection molding, blow molding, press molding or stamping molding in the same manner as, for example, the process for preparing the olefin block copolymers (A-1) in accordance with the objective use. The molded articles for medical care and sanitary thus prepared are sheets, films, hollow molded articles, etc. Further, using the resulting sheets or films, molded articles such as non-woven fabric laminates can be prepared.

Filaments can be prepared by extruding, for example, a molten composition through a spinning nozzle.

Any of the olefin block copolymer (A-1) and the olefin polymer composition (D) can be used for the molded articles for medical care and sanitary in the sheet or film shape. Further, it is preferable to add a heat resistant stabilizer, a lubricant, etc with the olefin block copolymer (A-1) and the olefin polymer composition (D) and mold them with extrusion molding or inflation molding.

With regard to the olefin block copolymer (A-1) used herein, the $PO^1$ segment is preferably any one of an ethylene homopolymer (Mw: 10,000 to 1,000,000), an ethylene/α-olefin copolymer (ethylene content: 50 to 99.9 mol %, Mw: 10,000 to 1,000,000), a propylene homopolymer (Mw: 10,000 to 1,000,000) and a copolymer of propylene and ethylene or α-olefin of 4 or more carbon atoms (propylene content: 50 to 99.9 mol %, Mw: 10,000 to 1,000,000), the $g^1$ linkage is preferably an ether linkage, ester linkage, amide linkage or urethane linkage, and the $B^1$ segment is preferably a styrene homopolymer (Mw: 500 to 1,000,000), methyl methacrylate homopolymer (Mw: 500 to 1,000,000) or styrene/anhydrous maleic acid copolymer (styrene content: 50 to 99.9 mol %, Mw: 500 to 1,000,000).

When the $PO^1$ segment is the polymer as described in the above, the sheets or films for medical care and sanitary are excellent in strength, stretchability and water resistance. When the $B^1$ segment is the above polymer, they are excellent in water absorption, hydrophilicity and electricity charging properties.

The sheets and films are used for medical care use such as liquid-carrying bags, permeable films, etc and sanitary use such as retort pouches, films for keeping freshness etc.

The sheets and films desirably have a thickness, which is not particularly limited and varies depending to the uses, of usually 10 to 3,000 μm, preferably 50 to 2,000 μm.

In the case of using the molded articles for medical care and sanitary as hollow molded articles, any of the olefin block copolymer (A-1) and the olefin polymer composition (D) can be used. Further, it is preferable to add a heat resistant stabilizer and a lubricant thereto and mold them with blow molding or injection blow molding.

With regard to the olefin block copolymer (A-1), the $PO^1$ segment is preferably an ethylene homopolymer (Mw: 10,000 to 1,000,000), ethylene/α-olefin copolymer (ethylene content: 50 to 99.9 mol %, Mw: 10,000 to 1,000,000), a propylene homopolymer (Mw: 10,000 to 1,000,000) or a copolymer of propylene and ethylene or an α-olefin of 4 or more carbon atoms (propylene content: 50 to 99.9 mol %, Mw: 10,000 to 1,000,000), the $g^1$ linkage is preferably an ether linkage, ester linkage or amide linkage and the $B^1$ segment is preferably a styrene homopolymer (Mw: 500 to 1,000,000), methylmethacrylate homopolymer (Mw: 500 to 1,000,000) or styrene/anhydrous maleic acid copolymer (styrene content: 50 to 99.9 mol %, Mw: 500 to 1,000,000).

When the $PO^1$ segment is the polymer as described in the above, the hollow molded articles for medical care and sanitary are excellent in strength, stretchability and water resistance. When the $B^1$ segment is the above polymer, they are excellent in water absorption, hydrophilicity and electricity charging properties.

The hollow molded articles are used for medical care use such as tubes, vessels, syringes, etc.

The hollow molded articles desirably have a thickness, of usually 10 to 3,000 μm, preferably 50 to 2,000 μm, although the thickness thereof varies depending to the uses and is not particularly limited.

In the case of using the molded articles for medical care and sanitary as artificial internal organ or artificial muscle, any of the olefin block copolymer (A-1) and the olefin polymer composition (D) can be used. Further, it is preferable to add a heat resistant stabilizer thereto and mold them with extrusion molding or spinning.

With regard to the olefin block copolymer (A-1) used herein, the $PO^1$ segment is preferably an ethylene homopolymer (Mw: 10,000 to 1,000,000), ethylene/α-olefin copolymer (ethylene content: 50 to 99.9 mol %, Mw: 10,000 to 1,000,000), propylene homopolymer (Mw: 10,000 to 1,000,000) or propylene/α-olefin copolymer (propylene content: 50 to 99.9 mol %, Mw: 10,000 to 1,000,000), the $g^1$ linkage is preferably an ether linkage, ester linkage, amide linkage or urethane linkage and the $B^1$ segment is preferably a styrene homopolymer (Mw: 500 to 1,000,000), methyl methacrylate homopolymer (Mw: 500 to 1,000,000), styrene/anhydrous maleic acid copolymer (styrene content: 50 to 99.9 mol %, Mw: 500 to 1,000,000) or ethylene oxide homopolymer (Mw: 500 to 1,000,000).

When the $PO^1$ segment is the polymer as described in the above, the artificial internal organ and artificial muscle are excellent in strength, stretchability and water resistance. When the $B^1$ segment is the above polymer, they are excellent in antithrombosis properties.

(Non-woven Fabric Laminate)

Using the sheets or films formed from the olefin block copolymer (A-1) and the olefin polymer composition (D) according to the invention, non-woven fabric laminates obtainable by laminating the sheets and non-woven fabrics can be prepared. Hereinafter, the non-woven fabrics constituting the non-woven fabric laminates are described.

(Non-woven Fabric)

As the resin, which is a material of the non-woven fabric constituting the non-woven fabric laminate of the invention, polyolefins are preferably used. Examples of the polyolefins are polyethylene, polypropylene and a copolymer of a monomer thereof and other α-olefin. Examples of the other α-olefin may include those having 3 to 10 carbon atoms, specifically, propylene, 1-butene, 1-pentene, 1-hexene, 4-methyl-1-pentene, 1-octene, etc.

Further, the olefin block copolymer (A-1) or the olefin polymer composition (D) can be used as the material of these non-woven fabrics.

These may be used singly or in combination of two or more.

In the invention, it is preferable to use extensible non-woven fabrics as the non-woven fabrics. The extensible non-woven fabrics of the invention desirably have an extensibility in at least one direction of crosswise and machine directions of 100% or more, preferably 150% or more. The extensibility of 100% or more means that the elongation at which a non-woven fabric is broken is 100% or more in a tensile test.

As the process for preparing the non-woven fabrics according to the invention, any of drying, wet, spun bonding and melt blowing processes may be employed, and further the spun bonding process is preferable in the standpoint of preparing the non-woven fabrics having high strength in high productivity.

An example of the process for preparing the extensible non-woven fabrics is a process of stretching non-woven fabrics prepared by the spun bonding process, in the machine direction. This process can provide a large degree of extension in the crosswise direction. The expression "machine direction" is a direction parallel to the direction of web flowing in forming non-woven fabrics (MD) and the expression "crosswise direction" is a direction perpendicular to the direction of web flowing (CD).

The stretching non-woven fabrics for preparing the extensible non-woven fabrics is preferably carried out in the following conditions. The stretching is carried out in the machine direction in such conditions that the drawing temperature is lower than the melting point of a resin by 20 to 40° C., the draw ratio is 1.1 to 5 times, the drawing length is 2.5 m or less and the lateral shrink is not less than 60%. When the draw ratio does not reach to 1.1 times, the degree of the crosswise extension is too low, while when it is over five times, there is caused strong possibility of stretch breakage of non-woven fabrics. The lateral shrink is determined by the formula: [(Non-woven fabric width before stretching)−(Non-woven fabric width after stretching)]/(Non-woven fabric width before stretching)×100.

Further, the drawing length is a distance between rolls which rotating rates are set to be different during stretching treatment. In the process of heating non-woven fabrics, an oven, hot plate or infrared rays can be used.

The extensible non-woven fabrics preferably used in the invention desirably comprise a core-sheath type or side-by-side type conjugated fiber. That is, the non-woven fabrics desirably comprise conjugated fiber, which comprises one resin and other resin both having different properties, and specifically comprise the core-sheath type conjugated fiber composed of a sheath part of one resin and a core part of other resin, or the side-by-side type conjugated fiber composed of two resin parts of one resin and other resin.

The core-sheath type conjugated fiber may have, in a fibrous section, a concentric form such that a circle core part and a doughnut-like sheath part have the same center point, or an eccentric form such that a circle core part and a doughnut-like sheath part have different center points. Further, it may have an eccentric form such that a core part is partly exposed on the surface of the fiber. Of these, a crimpled conjugated fiber in the eccentric form having excellent extensibility is preferred.

As the resin forming the sheath part of the core-sheath type conjugated fiber, an ethylene polymer is preferred. Examples of the ethylene polymer used in the invention may include an ethylene homopolymer or a copolymer of ethylene and an α-olefin such as propylene, 1-butene, 1-hexene, 4-methyl-1-pentene or 1-octene.

As the resin forming the core part, a propylene polymer is preferred. Examples of the propylene polymer may include a propylene homopolymer or a copolymer of propylene and an α-olefin such as ethylene, 1-butene, 1-hexene, 4-methyl-1-pentene and 1-octene. Of these, particularly preferred is a propylene/ethylene random copolymer, which comprises propylene and a small amount of ethylene and has a content of constituting units derived from ethylene of not more than 5 mol %. Using the copolymer, the conjugated fiber has favorable spinning properties and excellent productivity to prepare non-woven fabrics having favorable flexibility.

In the case that the resin forming the core part of the core-sheath type conjugated fiber is a propylene polymer having a melt flow rate (as measured in accordance with ASTM D 1238, temperature: 230° C., load: 2.16 Kg, referred to as MFRa) of from 0.5 to 100 g/10 min, the resin forming the sheath part preferably used herein is a propylene polymer having a different melt flow rate (as measured in accordance with ASTM D 1238, temperature: 230° C., load: 2.16 Kg, referred to as MFRb) and also satisfying the relation MFRa/MFRb$\geq$1.2 or MFRa/MFRb$\leq$0.8. The crimpled-conjugated fiber is easily prepared by the difference between the melt flow rates.

The weight composition ratio of the resin of the sheath part to the resin of the core part (sheath part/core part) is preferably from 2/8 to 8/2. Further, the fineness of the core-sheath type conjugated fiber is usually 4 d or less, and further desirably 3 d or less in the point of preparing non-woven fabrics having more excellent flexibility.

The side-by-side conjugated fiber comprises one resin part and other resin part having different properties. The resins forming the side-by-side conjugated fiber are each same as the resin of the sheath part and the resin of the core part forming the core-sheath conjugated fiber.

The weight composition ratio of the resin parts of the side-by-side conjugated fiber is preferably from 2/8 to 8/2, and further preferably 3/7 to 7/3 in the point of preparing a crimpled conjugated fiber having excellent extensibility. Further, the fineness of the side-by-side conjugated fiber is usually 4 d or less, and further desirably 3 d or less in the point of preparing non-woven fabrics having more excellent flexibility.

The extensible non-woven fabrics favorably used in the invention are non-woven fabrics formed from the above core-sheath type or side-by-side type conjugated fibers, and are prepared by, for example, the spun bonding process. That is, the resin constituting the core of the core-sheath conjugated fiber and the resin constituting the sheath part are molten separately with extrusions, the melts are each output through spinning dies each having conjugated-spinning nozzles through which the melts form a desired core-sheath structure to spin the core-sheath conjugated fiber. The spun conjugated fiber is cooled upon a fluid for cooling, strain is applied on the conjugated fiber with an air for stretching to make the fiber having the prescribed fineness, and then the fiber, as it is, is collected on a collecting belt to deposit it in the prescribed thickness thereby obtaining a conjugated fiber web. By the process, the non-woven fabric of high strength can be prepared and also the crimpled conjugated fiber of extensibility can be prepared by making the non-woven fiber in the eccentric form.

Thereafter, the fiber is prepared by confounding with heat embossing processing using an embossing roll. In the heat embossing processing, the embossed area proportion (stamping area proportion: the proportion of heat bonded part in a non-woven fabric) is appropriately selected in accordance with the desired use. Usually, if the embossed area proportion is in the range of 5 to 40%, the conjugated fiber non-woven fabrics having excellent flexibility, air permeability and fastness to rubbing, which are well balanced can be prepared.

Further, a non-woven fabric comprised of the side-by-side conjugated fiber of the invention can be prepared using a conjugated spinning nozzle for the side-by-side conjugated fiber in place of the conjugated spinning nozzle for the core-sheath conjugated fiber. This process can prepare the non-woven fabric of high strength and also make it to the crimpled conjugated fiber of extensibility.

The no-woven fabrics which comprise the core-sheath or side-by-side composite fiber, particularly the eccentric core-sheath type crimpled composite fiber or the side-by-side type crimpled conjugated fiber, are treated with stretching in the machine direction by the above process, so that the degree of crosswise extensibility is further improved with low stress, and the fabrics have excellent stretchability such that the fabrics follow the stretch of a laminated elastomeric film, have low residual distortion after extension. In result, non-woven fabric laminates having resistance sufficient for stretching repeated uses can be prepared.

With regard to the non-woven fabrics of the invention, those having a basis weight of not more than 30 $g/m^2$ are suitable for the uses in need of flexibility and further the non-woven fabrics having a high basis weight of over 30 $g/m^2$ may be employable according to the objective use.

(Non-woven Fabric Laminate)

The non-woven fabric laminate of the invention is one obtainable by laminating the above non-woven fabric and a sheet or film, which comprises the olefin block copolymer (A-1) or the olefin polymer composition (D).

Specifically, the non-woven fabric laminate comprises the film or sheet comprising the olefin block copolymer (A-1) or the olefin polymer composition (D) and, on one or both surfaces of the sheet or film, the non-woven fabric laminated. The laminate thus laminated with the film or sheet and non-woven fabric alternatively may be used in one, or two or more layered form. The term "one layer" used herein is the case that the film or sheet is composed of one layer.

The non-woven fabric laminate of the invention is useful in wide fields of medical care and sanitary, for example, sanitary material parts such as gather of disposable diapers, sanitary napkins, and base cloth of pack materials for medical care.

In laminating the non-woven fabrics of the invention, the laminating may be performed according to necessity through a layer of a porous material comprised of an adhesive resin. The porous material is, for example, a non-woven fabric or porous film.

Examples of the adhesive resin may include a copolymer of ethylene and a monomer containing a polar group and a polymer prepared by modifying an ethylene polymer with an unsaturated compound containing a polar group. The copolymer of the ethylene and monomer containing a polar group can be prepared, for example, by radical polymerization of ethylene and the monomer containing a polar group in the presence of an organic peroxide or oxygen at a high temperature under high pressure. Examples of the polar group-containing monomer may include ethyl acrylate, methacrylic acid, methyl methacrylate, vinyl acetate and vinyl chloride. Of these, at least one of the group consisting of ethyl acrylate, methacrylic acid, methyl methacrylate, vinyl acetate is preferable and particularly, ethyl acrylate is further preferable because of having excellent heat resistance and permitting high temperature processing.

Further, a copolymer of ethylene and ethyl acrylate (hereinafter referred to as "EEA") can be used as the adhesive resin. In the copolymer, the ethyl acrylate content is usually from 10 to 40 wt %, preferably 15 to 30 wt % viewed in the light of adhesiveness, cost and moisture permeability. The melt flow rate of the copolymer (measured according to ASTM D 1238, temperature: 190° C. under a load of 2.16 Kg) is usually from 5 to 50 g/10 min, preferably 10 to 30 g/10 min.

The ethyl acrylate content and the melt flow rate are in the above ranges so that the copolymers obtained have excellent moldability and interlaminar strength. Commercially available examples of the copolymers may include Evaflex™-EEA (for example, Grade EEA-707) manufactured by Mitsui Du-Pont Polychemical Co.,Ltd. and the like.

Furthermore, in the invention, a copolymer of ethylene and vinyl acetate (hereinafter referred to as "EVA") can be used as the adhesive resin. In the copolymer, the vinyl acetate content is usually from 10 to 40 wt %, preferably 3 to 10 wt % viewed in the light of adhesiveness, cost and moisture permeability. The melt flow rate of the copolymer (measured according to ASTM D 1238, temperature: 190° C. under a load of 2.16 Kg) is usually from 5 to 200 g/10 min, preferably 10 to 150 g/10 min.

The vinyl acetate content and the melt flow rate are in the above ranges so that the copolymers obtained have excellent moldability and interlaminar strength. Commercially available examples of the copolymers may include Evaflex™-TH (for example, Grade P-2807) manufactured by Mitsui Du-Pont Polychemical Co., Ltd. and the like.

In the invention, a copolymer of ethylene and methacrylic acid can be used as the copolymer of ethylene and the polar group-containing monomer (polar group-containing ethylene copolymer). In the copolymer, the methacrylic acid content is usually from 10 to 40 wt %, preferably 3 to 10 wt % viewed in the light of adhesiveness, cost and moisture permeability. The melt flow rate of the copolymer (measured according to ASTM D 1238, temperature: 190° C. under a load of 2.16 Kg) is usually from 5 to 100 g/10 min, preferably 10 to 80 g/10 min.

The methacrylic acid content and the melt flow rate are in the above ranges so that the copolymers obtained have excellent moldability and interlaminar strength. Commercially available examples of the copolymers may include Newcrel™ manufactured by Mitsui Du-Pont Polychemical Co.,Ltd. and the like.

In the present invention, an ethylene ionomer resin can be also used as the adhesive resin. The term "ionomer" means a thermoplastic resin having the polymer hydrophobic main chain and a small amount of an ion group in the side chain, the end chain or the main chain. The ethylene ionomer resin used in the invention is preferably a metal salt of a copolymer of ethylene and an unsaturated carboxylic acid. Commercially available examples of the resin may include Himiran™ in which methacrylic acid is an acid monomer (manufactured by Mitsui Du-Pont Polychemical Co., Ltd.) and the like.

In the invention, a polymer modified with an unsaturated compound containing a polar group can be also used as the adhesive resin. Examples of the ethylene polymer may include the same as described in the above, and further may include an ethylene/α-olefin copolymer, containing a relatively large amount of α-olefin. These ethylene polymers may be high crystalline or low crystalline. Examples of the polar group-containing unsaturated compound usable for modification of the ethylene polymers may be the above polar group-containing monomer copolymerizable with ethylene, or other polar group-containing unsaturated compounds. Preferable examples of the polar group-containing unsaturated compounds may include an unsaturated carboxylic acid and acid anhydrides thereof. Examples of the unsaturated carboxylic acid are unsaturated carboxylic acids such as maleic acid, fumaric acid, tetrahydrophthalic acid, itaconic acid, citraconic acid, crotonic acid, isocrotonic acid, nadic acid™ (endcis-bicyclo[2,2,1]-hepto-5-ene-2,3-dicarboxylic acid), acrylic acid, methacrylic acid; and derivatives thereof such as acid anhydrides of the above unsaturated carboxylic acids, imide, amide and esters, specifically, maleimide, maleic anhydride, citraconic anhydride, maleic acid mono-methyl, glycidyl maleate, etc. Among these compounds, unsaturated carboxylic acids and anhydride thereof are preferred, and particularly, maleic acid, nadic acid and acid anhydrides thereof are further preferred.

In the invention, a polymer prepared by modifying the copolymer of ethylene and the polar group-containing monomer with the above polar group-containing unsaturated compound may be, further, used as the adhesive resin. For example, it is possible to use a modified resin prepared by modifying the above ethyl acrylate copolymer with an unsaturated carboxylic acid. The use of the modified resin is preferable as compared with the use of unmodified resins, because the interfacial bonding strength between a moisture permeable resin and a non-woven fabric can be improved. The modified resin used in the invention has a graft monomer content showing the modification proportion of usually from 0.01 to 10 wt %, preferably 0.1 to 3 wt %. Commercially available examples of the modified resin may include a resin prepared by modifying EEA with a maleic anhydride.

In the invention, according to necessity, the adhesive resin may be blended with the above olefin block copolymer (A-1), an adherent resin or an inorganic filler and then submitted to use. Examples of the adherent resin may include an alicyclic saturated hydrocarbon resin and a terpene resin, and examples of the inorganic filler may include calcium carbonate, talc, cray and barium sulfate.

The loading of the above olefin block copolymer (A-1) is usually from 5 to 50 parts by weight, preferably 5 to 20 parts by weight, the loading of the adherent resin is usually from 0.5 to 20 parts by weight, preferably 0.5 to 10 parts by weight, and the loading of the inorganic filler is usually from 10 to 60 parts by weight, preferably 20 to 40 parts by weight, based on 100 parts by weight of the adhesive resin.

Further, the adhesive resin may be blended with additives such as a colorant, heat stabilizer, lubricant, nucleating agent and other resins, in addition to the above additives within the limit of not missing the object of the invention.

Next, with regard to the non-woven laminates of the invention, examples of the process for bonding the non-woven fabrics of the invention with the sheet or film comprised of the above olefin block copolymer (A-1) or the olefin polymer composition (D) optionally through the porous material layer comprised of the adhesive resin are described.

Examples of the process may include a process of forming a film comprising the olefin block copolymer (A-1) or the olefin polymer composition (D) and optionally forming a porous material layer, then superimposing the porous material layer on a non-woven fabric, contact bonding them with an embossing roll and further laminating the film on the side of the porous material layer and heating until the temperature necessary for bonding simultaneously bonding with pressure, and a process of superimposing the film, the porous material and the non-woven fabric in this order and bonding in the same manner as described in the above. When the above porous material is a non-woven fabric in the invention, it is possible to employ a process of forming a melt blow non-woven fabric layer comprised of an adhesive resin on the non-woven fabric and thereafter bonding the film with extrusion lamination.

The extrusion lamination eliminates the step of laminating with a hot melt adhesive, and can perform forming the film and bonding with the non-woven fabric simultaneously, to thereby simplify the processing steps and reduce the cost.

The thickness of the non-woven fabric laminate thus prepared differs depending to the objective use and is not limited particularly. For example, the total thickness of the sheet or film layer comprising the olefin block copolymer (A-1) or the olefin polymer composition (D) is preferably from 10% to 90% based on the whole non-woven fabric laminate, and the total thickness of the non-woven fabric layer is preferably from 90 to 10% based on the whole. More desirably, the total thickness of the sheet or film comprising the olefin block copolymer (A-1) or the olefin polymer composition (D) is from 20% to 80% based on the whole, and the total thickness of the non-woven fabric layer is preferably from 80 to 20% based on the whole.

Further, the basis weight of the non-woven fabric differs depending to the use and is not particularly limited, and it is desirable to be usually from 20 to 80 g/m², preferably 25 to 65 g/m².

In the case of using the medical care and sanitary molded articles of the invention as the non-woven laminates, it is possible to use any of the olefin block copolymer (A-1) and the olefin polymer composition (D) and further it is possible to add a heat stabilizer, a lubricant, etc.

With regard to the olefin block copolymer (A-1) preferably used herein, the $PO^1$ segment is any one of an ethylene homopolymer (Mw: 10,000 to 1,000,000), ethylene/α-olefin copolymer (ethylene content: 50 to 99.9 mol %, Mw: 10,000 to 1,000,000), propylene homopolymer (Mw: 10,000 to 1,000,000) and propylene/α-olefin copolymer (propylene content: 50 to 99.9 mol %, Mw: 10,000 to 1,000,000), the $g^1$ linkage is any one of an ether linkage, ester linkage and amide linkage, and the $B^1$ segment is any one of an ethylene oxide homopolymer (Mw: 500 to 1,000,000), styrene homopolymer (Mw: 500 to 1,000,000), methyl methacrylate homopolymer (Mw: 500 to 1,000,000) and styrene/maleic anhydride copolymer (styrene content: 50 to 99.9 mol %, Mw: 500 to 1,000,000).

When the $PO^1$ segment is the above polymer, the non-woven fabric laminate has excellent water resistance, extensibility and flexibility. When the $B^1$ segment is the above polymer, the non-woven fabric laminate has excellent hydrophilicity and moisture permeability.

These non-woven fabric laminates are used for specifically, gather of disposable diapers, sanitary napkins, base cloth of pack materials for medical care, etc.

(Non-woven Fabric)

From the olefin block copolymer (A-1) or the olefin polymer composition (D) according to the invention, non-woven fabrics themselves can be formed as medical care and sanitary molded articles.

In the invention, it is preferable to use extensible non-woven fabrics as such non-woven fabrics similarly in the non-woven fabrics as described in the above-mentioned non-woven fabric laminates. The extensible non-woven fabrics can be prepared by the process same as in the above-mentioned non-woven fabrics.

As the process, any of drying, wet, spun bonding and melt blowing processes may be employed, and further the spun bonding process is preferable in the standpoint of preparing the non-woven fabrics having high strength in high productivity.

An example of the process for preparing the extensible non-woven fabrics is a process of stretching non-woven fabrics prepared by the spun bonding process, in the machine direction. This process can provide a large degree of extension in the crosswise direction.

Further, the basis weight of the non-woven fabrics differs depending to the use and is not particularly limited, and it is desirable to be usually not more than 50 g/m$^2$, preferably not more than 30 g/m$^2$.

In the case of using the medical care and sanitary molded articles of the invention as the non-woven fabrics, it is possible to use any of the olefin block copolymer (A-1) and the olefin polymer composition (D) and further it is possible to add a heat stabilizer, a lubricant, etc. The non-woven fabrics are preferably molded by the spun bonding method or melt blow method.

With regard to the olefin block copolymer (A-1) preferably used herein, the PO$^1$ segment is any one of an ethylene homopolymer (Mw: 10,000 to 1,000,000), ethylene/α-olefin copolymer (ethylene content: 50 to 99.9 mol %, Mw: 10,000 to 1,000,000), propylene homopolymer (Mw: 10,000 to 1,000,000) and propylene/α-olefin copolymer (propylene content: 50 to 99.9 mol %, Mw: 10,000 to 1,000,000), the g$^1$ linkage is any one of an ether linkage, ester linkage, amide linkage and urethane linkage, and the B$^1$ segment is any one of a styrene homopolymer (Mw: 500 to 1,000,000), methyl methacrylate homopolymer (Mw: 500 to 1,000,000), and styrene/maleic anhydride copolymer (styrene content: 50 to 99.9 mol %, Mw: 500 to 1,000,000).

When the PO$^1$ segment is the above polymer, the non-woven fabrics have excellent water resistance, extensibility and flexibility. When the B$^1$ segment is the above polymer, the non-woven fabrics have excellent hydrophilicity and moisture permeability.

These non-woven fabrics are used for non-woven fabrics of the above-mentioned non-woven fabric laminates, and further the non-woven fabrics themselves are used for disposable diapers and sanitary napkins, as described in the above.

(Electrets)

The electrets of the invention comprise the olefin block copolymer (A-1) or the olefin polymer composition (D).

The electrets are charged at room temperature without blending with other polymers or additives such as modified polymers having charge-retention capability so that polyethylene itself can retain electric charge. Further, the olefin block copolymer (A-1) and the olefin polymer composition (D) have excellent molding processability so that they are preferably used as electrets in various forms.

For example, forming the electrets into a film, non-woven fabric or reticulate cloth-like shape, the electrets can be used for, in medical care and sanitary use, materials for acceleration of vital reaction by magnetic field such as medical care materials for acceleration of forming callus, bandages or adhesion plasters, and sanitary materials such as brooms, dust clothes, etc and further used for gas filters such as air filters and condensers, microphones, etc.

The form of the electrets used is selected arbitrarily depending to the uses. It is preferable to use in the temperature range such that the electrets are not molten, because electric charge is disappeared by melting.

The electrets are used preferably at a relatively low temperature range, for example, not higher than room temperature. However, at a higher temperature than the above temperature range, it is possible to retain electric charge to some extent.

When electric charge is lowered, electric charge can be retained by another application with electric charge again.

The shape and form of the electrets of the invention are not particularly limited, and the electrets can be formed in arbitrary shapes and forms in accordance with the form for utilization such as films, sheets, fiber, strands, woven fabrics or non-woven fabrics.

The electret of the invention can be prepared by molding and processing the olefin block copolymer (A-1) or the olefin polymer composition (D) into arbitrary shapes and charging it to electretize it, and optionally post-processing.

Conventionally known processes such as thermal electretization, electro-electretization, radio-electretization, etc are employable as the process of electretization. The thermal electretization is a process of electretizing with heating. In the electro-electretization and radio-electretization, electretization can be also performed at room temperature or a high temperature. Further, known processes, for example, the process described in JP-A-10-174823/1998 may be used as the processing method.

The electretization can be performed in the end-product shape molded and processed. Further, the electret may be prepared by electretizing in the middle molded article shape and thereafter processing into the end-product shape. In this case, the shape of the olefin block copolymer (A-1) or the olefin polymer composition (D) may be any of films, sheets, fiber (filament), non-woven fabrics and woven fabrics. Further, the electretization thereof is preferably performed in the film, fiber (filament) or non-woven fabric-molded shape. In the case of charging on a film, after the charging thereof, the film may be fibrillated into a fibrous shape, or the charged fiber may be molded into a strand or processed into a woven fabric.

In the invention, for a trap site of electric charge in charging, the olefin block copolymer (A-1) or the olefin polymer composition (D) functions as an effective trap site, so that it retains electric charge by electretization and can be charged with electricity permanently.

In the invention, the electrets comprised of the olefin block copolymer (A-1) or the olefin polymer composition (D) each having specific physical properties and composition may be used singly, and further, the electrets of the materials comprised of polymers having different physical properties and compositions can be used. Furthermore, it is possible to the combined used of these electrets and electrets comprised of other materials such as polypropylene, for example, in the textile blend form, and further, the resulting electret in the textile blend form can have the properties both of the electrets spun by textile blending.

The thickness of the electrets thus prepared differs depending to the objective use and is not limited particularly. Usually, the thickness is desirably from 0.05 to 5,000 μm, preferably 0.5 to 50 μm.

In the case of using the medical care and sanitary molded articles of the invention as the electrets, it is possible to use any of the olefin block copolymer (A-1) and the olefin polymer composition (D) and further it is possible to add a heat stabilizer, a lubricant, etc thereto. The molding is preferably conducted by extrusion molding, inflation molding or spinning.

With regard to the olefin block copolymer (A-1) preferably used herein, the $PO^1$ segment is any one of an ethylene homopolymer (Mw: 10,000 to 1,000,000), ethylene/α-olefin copolymer (ethylene content: 50 to 99.9 mol %, Mw: 10,000 to 1,000,000), propylene homopolymer (Mw: 10,000 to 1,000,000) and propylene/α-olefin copolymer (propylene content: 50 to 99.9 mol %, Mw: 10,000 to 1,000,000), the $g^1$ linkage is any one of an ether linkage, ester linkage and amide linkage, and the $B^1$ segment is any one of a styrene homopolymer (Mw: 500 to 1,000,000), methyl methacrylate homopolymer (Mw: 500 to 1,000,000 and styrene/maleic anhydride copolymer (styrene content: 50 to 99.9 mol %, Mw: 500 to 1,000,000).

When the $PO^1$ segment is the above polymer, the electret has excellent moisture permeability, extensibility, flexibility and strength. When the $B^1$ segment is the above polymer, the electret has excellent dust collecting properties and adhesion properties.

These electrets are used for specifically, in medical care uses, materials for acceleration of vital reaction by magnetic field such as medical care materials for acceleration of forming callus, bandages, adhesion plasters, dust collecting filters and non-woven fabrics for dust collection, and in sanitary materials, for brooms, dust clothes, etc and further used for gas filters such as air filters, etc and condensers, microphones, etc.

The molded articles for medical care and sanitary satisfy various requirements for medical care and sanitary uses.

Molded Articles for Miscellaneous Goods

Next, the molded articles for miscellaneous goods of the invention will be described.

The molded articles for miscellaneous goods according to the invention comprise the olefin block copolymer (A-1) or the olefin polymer composition (D).

In the olefin block copolymer (A-1) and the olefin block copolymer (A-1) contained in the olefin polymer composition (D), which copolymers form the molded articles for miscellaneous goods, the $PO^1$ segment desirably has a weight-average molecular weight of usually not less than 2,000, preferably 10,000 to 10,000,000. When the molecular weight of the polyolefin segment is in the above range, the copolymers have excellent balance between mechanical strength and moldability.

Preferable examples of the $PO^1$ segment are ethylene polymers such as ethylene homopolymer and ethylene/α-olefin copolymer; propylene polymers such as propylene homopolymer and propylene/α-olefin copolymer; butene polymers such as butene homopolymer and butene/ethylene copolymer; and 4-methyl-1-pentene polymers such as 4-methyl-1-pentene homopolymer. Of these, ethylene polymer and propylene polymer are preferred.

In the olefin block copolymer (A-1) and that contained in the olefin polymer composition (D), which copolymers form the molded articles for miscellaneous goods, the $g^1$ linkage is an ether linkage, ester linkage or amide linkage, preferably ether linkage.

In the olefin block copolymer (A-1) and that contained in the olefin polymer composition (D), which copolymers form the miscellaneous goods, the $B^1$ segment is a functional segment obtainable by chain polymerization, preferably a functional segment comprising repeating units of an unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment preferably comprise different polymers each other.

The $B^1$ segment has a weight-average molecular weight of usually not less than 500, preferably 2,000 to 500,000. When the molecular weight of the functional segment is in the above range, the molded articles have excellent printability.

The $B^1$ segment is contained in an amount based on the olefin block copolymer (A-1) of preferably 0.01 to 99.99 wt %, preferably 1 to 99 wt %, more preferably 1 to 95 wt %. When the proportion of the functional segment in the olefin block copolymer (A-1) is in the above range, the molded articles have excellent balanced properties in printability, adhesiveness and mechanical properties.

The olefin block copolymer (A-1) and that contained in the olefin polymer composition (D), forming the molded articles for miscellaneous goods, desirably have a melt flow rate (MFR as measured in accordance with ASTM D 1238, at 230° C. under a load of 2.16 Kg) of usually 0.01 to 200 g/10 min, preferably 0.05 to 100 g/10 min, more preferably 0.05 to 80 g/10 min.

Of various additives which may be mixed with the olefin block copolymer (A-1) and the olefin polymer composition (D), the inorganic fillers preferably used may include powdery fillers, for example, natural silicic acids or silicates such as fine powdery talc, kaolinite, calcined clay, pyrophyllite, sericite or wollastonite, carbonates such as precipitated calcium carbonate, ground limestone or magnesium carbonate, hydroxides such as aluminum hydroxide or magnesium hydroxide, oxides such as zinc oxide, zinc white or magnesium oxide, and synthetic silicic acids or silicates such as water-containing calcium silicate, water-containing aluminum silicate, water-containing silicate or silicic anhydride; flake fillers such as mica; fibrous fillers such as basic magnesium sulfate whisker, calcium titanate whisker, aluminum borate whisker, sepiolite, PMF (processed mineral fiber), xonotlite, potassium titanate or ellestadite; and balloon fillers such as glass balloon or fly ash balloon.

Of these, talc is preferably used in the invention and particularly, fine powdery talc having an average particle diameter of from 0.01 to 10 μm is preferably used. The average particle diameter is measured by the liquid phase sedimentation method.

The inorganic fillers used in the invention, particularly, talc may be untreated or surface-treated previously. Examples of the surface treatment may include chemical or physical treatments using a treating agent such as silane coupling agents, higher fatty acids, metal salts of fatty acid, unsaturated organic acids, organic titanates, resin acids or polyethylene glycol. The use of the surface-treated talc can prepare molded articles having excellent weld strength, coating properties and molding processability.

The above inorganic fillers may be used in combination with two or more.

Further, in the invention, the organic fillers such as high styrene, lignin or reclaimed rubber may be used with the inorganic fillers.

(Molding Method)

The miscellaneous goods of the invention can be prepared by using the olefin block copolymer (A-1) and the olefin polymer composition (D) in the same manner as the process for preparing the olefin block copolymer (A-1) with extrusion molding, injection molding, blow molding, press molding or stamping molding.

The injection molded articles comprised of the olefin block copolymer (A-1) or the olefin polymer composition (D) are hardly charged and have excellent rigidity, heat resistance, impact resistance, surface gloss, chemical resistance and abrasion resistance.

In the injection blow molding, the above composition is injected at a resin temperature of from 100 to 300° C. into a parison mold to mold a parison, the parison is retained on a mold having a desired shape and then air is blown to attach it on the mold, thereby preparing a hollow molded article.

The blow molded articles formed from the olefin block copolymer (A-1) or the olefin polymer composition (D) have excellent transparency, rigidity, heat resistance and impact resistance, and also excellent moisture resistance.

The olefin block copolymer (A-1) and the olefin polymer composition (D) have transparency and high rigidity, and even if containing elastomer components, they have sufficiently high rigidity, so that they can be used for various uses requiring high rigidity.

The olefin block copolymer (A-1) and the olefin polymer composition (D) are suitably used for the following miscellaneous goods.

Examples thereof are stationary such as desk mats, cutting mats, rulers, holders, grips and caps of pens, grips of scissors or cutters, magnet sheets, pen cases, paper folders, binders, label seals, tapes or white boards;

miscellaneous goods for daily use such as clothes, curtains, sheets, carpets, entrance mats, bath mats, buckets, hoses, bags, planters, filters of air conditioners or exhaust funs, table ware, trays, cups, lunch boxes, funnels for coffee siphon, glasses frames, containers, storage cases, hangers, ropes or laundry nets;

sports goods such as shoes, goggles, ski boards, rackets, balls, tents, water goggles, flippers, fishing rods, cooler boxes, leisure sheets or nets for sports;

toys such as blocks or cards;

vessels such as kerosene cans, drum cans or bottles for detergents or shampoo; and signs such as sign-boards, pylons or plastic chains.

In the case of using the olefin block copolymer (A-1) or the olefin polymer composition (D) as an insole of shoes (mid sole), preferable examples of the $PO^1$ segment are an α-olefin homopolymer, copolymer of ethylene and an α-olefin of 3 or more carbon atoms and copolymer of ethylene and a cycloolefin and optionally an α-olefin of 3 or more carbon atoms. Particularly, a preferable example thereof is the copolymer of ethylene and an α-olefin of 3 or more carbon atoms.

The copolymer of ethylene and an α-olefin of 3 or more carbon atoms has a proportion (molar ratio) of ethylene units and units of α-olefins of 3 or more carbon atoms, which is not particularly limited, of usually about from 95/5 to 75/25.

The copolymer of ethylene and a cycloolefin and optionally an α-olefin of 3 or more carbon atoms has a proportion (molar ratio) of the total of ethylene units and units of α-olefins of 3 or more carbon atoms, to cycloolefin units, which is not particularly limited, of usually from 100/0 to 50/50 providing that 100/0 is excluded.

Preferable examples of the $B^1$ segment are polymers prepared from (meth)acrylic acid or ester thereof.

In the above case, the molded articles have excellent adhesion properties and improved touch.

In the molded articles for this use, it is particularly preferred to conduct crosslinking and foaming. Further, it is preferred to use an organic peroxide for the crosslinking and to use an organic foaming agent for the foaming.

In the case of using the olefin block copolymer (A-1) or the olefin polymer composition (D) as desk mats, preferable examples of the $PO^1$ segment are a copolymer of ethylene and an α-olefin of 3 or more carbon atoms and a copolymer of ethylene, a cycloolefin and optionally an α-olefin of 3 or more carbon atoms.

The copolymer of ethylene and an α-olefin of 3 or more carbon atoms has a proportion (molar ratio) of ethylene units and units of α-olefins of 3 or more carbon atoms, which is not particularly limited, of usually about from 100/0 to 75/25 providing that 100/0 is excluded.

The copolymer of ethylene, a cycloolefin and optionally an α-olefin of 3 or more carbon atoms has a proportion (molar ratio) of the total of ethylene units and units of α-olefins of 3 or more carbon atoms, to cycloolefin units, which is not particularly limited, of usually from/but not 100/0 to 50/50 providing that 100/0 is excluded.

A preferable example of the $B^1$ segment is a polymer obtainable by ring opening polymerization of a cyclic amide.

In the case, the molded articles have excellent mar resistance and transparency.

In the case of using the copolymers of the invention as toys, preferable examples of the $PO^1$ segment are α-olefin homopolymer or copolymer, more preferable examples are ethylene polymer and propylene polymer, and further more preferable examples are ethylene homopolymer, copolymer of ethylene and an α-olefin of 3 or more carbon atoms, propylene homopolymer, propylene/ethylene copolymer and copolymer of propylene and an α-olefin of 4 or more carbon atoms.

The above ethylene polymer preferably has a proportion (molar ratio) of ethylene units and units of α-olefins of 3 or more carbon atoms, which is not particularly limited, of usually about from 100/0 to 80/20.

The above propylene polymer preferably has a proportion (molar ratio) of propylene units to ethylene units and units of α-olefins of 4 or more carbon atoms, which is not particularly limited, of usually from 100/0 to 60/40.

Preferable examples of the $B^1$ segment are polymers of (meth)acrylic acid and ester thereof.

In the above case, the molded articles have excellent printability and mar resistance.

In the case of using the olefin block copolymer (A-1) or the olefin polymer composition (D) as bottles, preferable examples of the $PO^1$ segment are an ethylene copolymer, ethylene/cycloolefin copolymer and propylene polymer.

The ethylene/cycloolefin copolymer has a proportion (molar ratio) of ethylene units to cycloolefin units, which is not particularly limited, of usually about from 99/1 to 50/50.

Preferable examples of the $B^1$ segment are polymers containing constituting units derived from acrylonitrile and constituting units of at least one of (meth)acrylic acid and (meth)acrylate ester.

In this case, the molded articles have excellent mar resistance and printability.

In the case of using the olefin block copolymer (A-1) or the olefin polymer composition (D) as trays for food, preferable examples of the $PO^1$ segment are copolymers of ethylene, a cycloolefin and optionally an α-olefin of 3 or more carbon atoms, and atactic polypropylene.

The copolymer of ethylene, cycloolefin and optionally α-olefin of 3 or more carbon atoms has a proportion (molar ratio) of the total of ethylene units and units of α-olefins of 3 or more carbon atoms to cycloolefin units, which is not particularly limited, of usually about from 100/0 to 50/50 providing that 100/0 is excluded.

Preferable examples of the $B^1$ segment are polymers obtainable by ring opening polymerization of a cyclic amide.

In this case, the molded articles have excellent shape memory properties.

In the case of using the copolymer of the invention as easy printing molded articles, preferable examples of the $PO^1$ segment are copolymers of ethylene, a cycloolefin and optionally an α-olefin of 3 or more carbon atoms.

The copolymers of ethylene, a cycloolefin and optionally an α-olefin of 3 or more carbon atoms have a proportion (molar ratio) of the total of ethylene units and units of α-olefins of 3 or more carbon atoms to cycloolefin units, which is not particularly limited, of usually about from 100/0 to 50/50 providing that 100/0 is excluded.

Preferable examples of the $B^1$ segment are polymers containing constituting units of at least one of (meth)acrylic acid and (meth)acrylate ester. The block copolymers containing them may be crosslinked before use. The crosslinking can be conducted by an organic peroxide or electron rays.

In this case, the molded articles have excellent coating properties and printability.

In the case of using the olefin block copolymer (A-1) or the olefin polymer composition (D) as foamed articles for food, preferable examples of the $PO^1$ segment are an α-olefin homopolymer or copolymer, more preferable examples are an ethylene polymer and propylene polymer, and further more preferable examples are ethylene homopolymer, copolymer of ethylene and an α-olefin of 3 or more carbon atoms, propylene homopolymer, propylene/ethylene copolymer and copolymer of propylene and an α-olefin of 4 or more carbon atoms.

The ethylene polymer has a proportion (molar ratio) of ethylene units to units of α-olefins of 3 or more carbon atoms, which is not particularly limited, of usually about from 100/0 to 80/20. The ethylene polymer may be optionally copolymerized with a cycloolefin, and has a proportion (molar ratio) of the total of ethylene units and units of α-olefins of 3 or more carbon atoms to cycloolefin units, which is not particularly limited, of usually about from 100/0 to 50/50, providing that 100/0 is excluded.

The propylene polymer has a proportion (molar ratio) of propylene units to the total of ethylene units and units of α-olefins of 4 or more carbon atoms, which is not particularly limited, of usually about from 100/0 to 60/40.

Further, copolymers of ethylene, α-olefin of 3 or more carbon atoms and conjugated polyene or non-conjugated polyene are also preferred, and have a content of conjugated polyene or non-conjugated polyene, which is not particularly limited, of usually from 0.2 to 10 mol %.

Preferable examples of the $B^1$ segment are polymers containing an aromatic vinyl compound.

Further, polymers obtainable by ring opening polymerization of an ester-containing cyclic monomer or amide-containing cyclic monomer are also preferred.

In this case, the molded articles are improved in moldability, foaming properties, printability and coating properties.

The miscellaneous molded articles of the invention have excellent properties of any one of impact resistance, heat resistance, mar resistance, transparency, coating properties, printability, adhesion properties and low-temperature flexibility.

Environmentally Degradable Resin Molded Articles

In the next place, the environmentally degradable resin molded articles of the invention are described.

The environmentally degradable resin molded articles according to the invention comprise the olefin block copolymer (A-1) or the olefin polymer composition (D).

In the olefin block copolymer (A-1) and the olefin block copolymer (A-1) contained in the olefin polymer composition (D), forming the environmentally degradable resin molded articles, the $PO^1$ segment desirably has a weight-average molecular weight of usually not less than 2,000, preferably 2,000 to 10,000,000, more preferably 10,000 to 10,000,000, specifically 10,000 to 200,000.

Preferable examples of the $PO^1$ segment are ethylene polymers such as ethylene homopolymer and ethylene/α-olefin copolymer; propylene polymers such as propylene homopolymer and propylene/α-olefin copolymer; butene polymers such as butene homopolymer and butene/ethylene copolymer; and 4-methyl-1-pentene polymers such as 4-methyl-1-pentene homopolymer.

In the olefin block copolymer (A-1) and the olefin block copolymer (A-1) contained in the olefin polymer composition (D), which copolymer and composition form the environmentally degradable resin molded articles, the $g^1$ linkage is an ether linkage, ester linkage or amide linkage, preferably ether linkage.

In the olefin block copolymer (A-1) and that contained in the olefin polymer composition (D), forming the environmentally degradable resin molded articles, the $B^1$ segment is a functional segment obtainable by chain polymerization, preferably a functional segment comprising repeating units of an unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment preferably comprise different polymers each other.

The $B^1$ segment has a weight-average molecular weight of usually not less than 500, preferably 500 to 1,000,000, more preferably 2,000 to 1,000,000, most preferably 10,000 to 200,000.

The $B^1$ segment is contained in an amount based on the olefin block copolymer (A-1) of preferably 0.01 to 99.99 wt %, preferably 1 to 99 wt %, more preferably 1 to 95 wt %, specifically 10 to 90 wt %.

The olefin block copolymer (A-1) and that contained in the olefin polymer composition (D), forming the environmentally degradable resin molded articles, desirably have a melt flow rate (MFR as measured in accordance with ASTM D 1238, at 230° C. under a load of 2.16 Kg) of usually 0.01 to 200 g/10 min, preferably 0.05 to 100 g/10 min, more preferably 0.05 to 80 g/10 min.

In the olefin block copolymer (A-1) and that contained in the olefin polymer composition (D), forming the environmentally degradable resin molded articles, the $PO^1$ segment is preferably polypropylene, polyethylene, a random copolymer of ethylene and α-olefin of 3 or more carbon atoms or random copolymer of propylene and α-olefin of 4 or more carbon atoms, more preferably polypropylene having a content of co-monomers selected from ethylene and an α-olefin of 4 or more carbon atoms of less than 10 mol %, polyethylene having a content of co-monomers selected from an α-olefin of 3 or more carbon atoms of less than 10 mol %, a random copolymer having an ethylene content of from 10 to 90 mol % and a content of α-olefin of 3 or more carbon atoms of from 90 to 10 mol % or a random copolymer having a propylene content of 10 to 90 mol % and a content of α-olefin of 4 or more carbon atoms of 90 to 10 mol %, the $g^1$ linkage is preferably an ether linkage or ester linkage, and the $B^1$ segment is preferably a functional segment obtainable by ring opening polymerization such as a poly-lactic acid, poly-glycol acid, ε-polycaprolactone or polyethylene glycol.

In the case that the environmentally degradable resin molded articles comprises the olefin polymer composition (D), as a thermoplastic resin (C) forming the composition (D), preferred is the combined use of a polyolefin (C-1) such as polyethylene, polypropylene or ethylene/propylene copolymer, and an aliphatic polyester (C-2) such as polylactic acid, polyglycol acid, poly-ε-caprolactone or polybutylene succinate.

It is preferred to use, for the polyolefin (C-1), at least one kind of polyolefins having a high crystallization rate (Mw: 5,000 to 1,000,000) selected from polyethylene, isotactic polypropylene and isotactic block polypropylene, and for the aliphatic polyester (C-2), at least one kind of aliphatic polyesters having a relatively low crystallization rate (Mw: 2,000 to 1,000,000) selected from poly-lactic acid, and poly-glycol acid. In this case, the $PO^1$ segment of the olefin block copolymer (A-1) is preferably the same kind of polyolefin as the polyolefin (C-1) and the $B^1$ segment is preferably the same kind of aliphatic polyester as the aliphatic polyester (C-2).

It is further preferred to use, for the polyolefin (C-1), an ethylene/α-olefin copolymer (α-olefin content: 2 to 98 mol %, Mw: 5,000 to 1,000,000) such as ethylene/propylene copolymer, ethylene/butene copolymer or ethylene/octene copolymer, or a soft polyolefin (content of ethylene or α-olefin of 4 or more carbon atoms: 2 to 98 mol %, Mw: 2,000 to 1,000,000) such as propylene/ethylene copolymer or propylene/butene copolymer, and for the aliphatic polyester (C-2), a high rigidity aliphatic polyester (Mw: 2,000 to 1,000,000) such as poly-lactic acid, and poly-glycol acid. In this case, the $PO^1$ segment of the olefin block copolymer (A-1) is preferably the same kind of polyolefin as the polyolefin (C-1) and the $B^1$ segment is preferably the same kind of aliphatic polyester as the aliphatic polyester (C-2).

It is furthermore preferred to use, for the polyolefin (C-1), a polyolefin having a high melting point (Mw: 5,000 to 1,000,000) such as high-density polyethylene, middle-density polyethylene, isotactic polypropylene or poly-4-methyl-1-pentene, and for the aliphatic polyester (C-2), a soft aliphatic polyester(Mw: 2,000 to 1,000,000) such as poly-ε-caproractone or a hydrophilic polyether (Mw: 2,000 to 1,000,000) such as polyethylene glycol. In this case, the $PO^1$ segment of the olefin block copolymer (A-1) is preferably the same kind of polyolefin as the polyolefin (C-1) and the $B^1$ segment is preferably the same kind of aliphatic polyester as the aliphatic polyester (C-2).

Using the copolymers having the above compositions, environmentally degradable resin molded articles having environmental degradation properties and further having practical properties such as excellent heat resistance and mechanical strength can be prepared.

In the olefin polymer composition (D) used in the invention which comprises the olefin block copolymer (A-1), the polyolefin (C-1) and the aliphatic polyester (C-2), the olefin polymer composition (D) preferably comprises 1 to 98 parts by weight of the olefin block copolymer (A-1), 1 to 70 parts by weight of the polyolefin (C-1) and 98 to 1 parts by weight of the aliphatic polyester (C-2) provided that total amount of (A-1), (C-1) and (C-2) is 100 parts by weight. Particularly, the olefin polymer composition (D) preferably comprises 5 to 50 parts by weight of the olefin block copolymer (A-1), 5 to 50 parts by weight of the polyolefin (C-1) and 90 to 45 parts by weight of the aliphatic polyester (C-2) provided that total amount of (A-1), (C-1) and (C-2) is 100 parts by weight.

The environmentally degradable resin molded articles according to the invention disintegrate by organismic metabolism, heat, light, etc in the environment not to keep their shapes. After disintegration of the molded articles, a part of the resins forming the molded articles remains in the environment.

(Molding Method)

The process for molding the environmentally degradable resin molded articles according to the invention is not particularly limited. For example, the environmentally degradable resin molded articles can be prepared by calender molding, extrusion molding, injection molding, blow molding, press molding or stamping molding in the same manner as the process for preparing the olefin block copolymer (A-1).

(Use)

The environmentally degradable resin molded articles according to the invention have facility for degradation in the environment, and excellent rigidity, heat resistance and impact resistance, so that they can be used in a wide variety of fields such as outdoor goods, disposable vessels, etc.

The environmentally degradable resin molded articles, for example, can be used for vessels for fresh foods on sale at supermarket such as fish or meats, vegetables, eggs, etc; takeout vessels for food such as lunch, dish, etc; beverage cups or vessels for noodles such as Chinese noodle; vessels for outdoor use such as disposable plates; bags such as packaging bags for foods, plastic bags for use at supermarkets, garbage bags, kitchen garbage bags, etc; films for agriculture such as gardening green house, tunnel type green house, etc; fishing goods such as fish nets, fishing lines, fish hook, etc; cloth for outdoor goods such as rain coats, tents, etc; and water-retention materials or films having facility for degradation in the environment.

The environmentally degradable resin molded articles of the invention have excellent mechanical strength such as modulus, or impact resistance and excellent heat resistance, are easily degradable in the environment. Therefore, the environmentally degradable resin molded articles are used in the fields where the use of conventional biodegradable polymers is insufficient for practically.

The environmentally degradable resin molded articles, further have more excellent balanced properties in strength, transparency or the like as compared with conventional molded articles of compositions comprised of biodegradable polymers and polyolefin resins.

Films and Sheets

In the next place, the films and sheets according to the invention are described.

The films and sheets according to the invention comprise the above olefin block copolymer (A-1) or the above olefin polymer composition (D).

In the olefin block copolymer (A-1) and the olefin block copolymer (A-1) contained in the olefin polymer composition (D), which copolymer and composition form the sheets or films, the $PO^1$ segment desirably has a weight-average molecular weight of usually not less than 2,000, preferably 2,000 to 10,000,000, more preferably 10,000 to 1,000,000.

Preferable examples of the $PO^1$ segment are:

ethylene polymers such as ethylene homopolymer and ethylene/α-olefin copolymer, ethylene/propylene/vinyl norbornene copolymer, ethylene/propylene/DMDT copolymer, ethylene/cycoolefin/propylene/DMDT copolymer, ethylene/cycloolefin/propylene/conjugated diene copolymer, ethylene/cycloolefin/propylene/conjugated polyene copolymer, ethylene/aromatic vinyl copolymer, ethylene/aromatic vinyl/conjugated polyene copolymer, etc;

propylene polymers such as propylene homopolymer, syndiotactic propylene/ethylene copolymer, atactic propylene/ethylene copolymer, propylene/α-olefin copolymer, etc;

butene polymers such as butene homopolymer and butene/ethylene copolymer; and 4-methyl-1-pentene polymers such as 4-methyl-1-pentene homopolymer.

In the olefin block copolymers (A-1) and the olefin block copolymers (A-1) contained in the olefin polymer composition (D), which copolymers form films and sheets, the $g^1$ linkage is ether linkage, ester linkage or amide linkage, preferably ether linkage.

In the olefin block copolymers (A-1) and the olefin block copolymers (A-1) contained in the olefin polymer composition (D), which copolymers form films and sheets, the $B^1$ segment is a functional segment obtainable by chain polymerization, preferably a functional segment comprising repeating units of an unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment preferably comprise different polymers each other.

The $B^1$ segment has a weight-average molecular weight of usually not less than 500, preferably 500 to 1,000,000, more preferably 2,000 to 1,000,000.

The $B^1$ segment is contained in an amount based on the olefin block copolymer (A-1) of preferably 0.01 to 99.99 wt %, preferably 1 to 99 wt %, more preferably 1 to 95 wt %.

The olefin block copolymer (A-1) and that contained in the olefin polymer composition (D), forming the films and sheets, desirably have a melt flow rate (MFR as measured in accordance with ASTM D 1238, at 230° C. under a load of 2.16 Kg) of usually 0.01 to 200 g/10 min, preferably 0.05 to 100 g/10 min, more preferably 0.05 to 80 g/10 min.

When the sheets and films of the invention are used for agriculture, in the olefin block copolymer (A-1) and that contained in the olefin polymer composition (D), the $PO^1$ segment desirably is an ethylene polymer or propylene polymer, for example, a copolymer of ethylene and an α-olefin of 3 or more carbon atoms. The polyolefin segment, which comprises a copolymer of ethylene and an α-olefin of 3 or more carbon atoms, desirably has a molar ratio of ethylene to an α-olefin of 3 or more carbon atoms of about from 99.9/0.1 to 80/20. The polyolefin segment desirably has a weight-average molecular weight, determined by GPC, of from 10,000 to 1,000,000, preferably 30,000 to 800,000.

Further, the $g^1$ linkage is preferably an ether linkage, ester linkage or amide linkage.

Furthermore, the $B^1$ segment is preferably an acrylic acid ester polymer, methacrylic acid ester polymer, cyclic ester polymer, cyclic amide polymer, cyclic ether polymer or oxazoline polymer, more preferably polyalkylene glycol, particularly polyethylene glycol. The functional segment desirably has a weight-average molecular weight, determined by GPC, of from 500 to 500,000, preferably 2,000 to 300,000.

The agricultural films and sheets obtainable by using the olefin block copolymers (A-1) satisfying the above conditions are preferable because of having excellent transparency, heat resistance and fog resistance.

When the sheets and films of the invention are used for lapping or stretch sheets and films, in the olefin block copolymers (A-1), the $PO^1$ segment desirably is preferably an ethylene polymer, propylene polymer or 4-methyl-1-pentene polymer, more preferably a copolymer of propylene and ethylene or an α-olefin of 4 or more carbon atoms. The polyolefin segment, which comprises a copolymer of propylene and ethylene or an α-olefin of 4 or more carbon atoms, desirably has a molar ratio of propylene to ethylene or an α-olefin of 4 or more carbon atoms of from 100/0 to 80/20, preferably 98/2 to 85/15. The polyolefin segment desirably has a weight-average molecular weight, determined by GPC, of from 10,000 to 1,000,000, preferably 50,000 to 500,000.

Further, the $g^1$ linkage is preferably an ether linkage, ester linkage or amide linkage.

Furthermore, the $B^1$ segment is preferably a styrene polymer, acrylic acid ester polymer, methacrylic acid ester polymer, cyclic ester polymer, cyclic amide polymer, cyclic ether polymer or oxazoline polymer, more preferably (meth) acrylic acid ester polymer, particularly butyl acrylate copolymer. The functional segment desirably has a weight-average molecular weight, determined by GPC, of from 500 to 500,000, preferably 2,000 to 300,000.

The lapping or stretch films and sheets obtainable by using the olefin block copolymers (A-1) satisfying the above conditions are preferable because of having excellent transparency, memory properties and tear properties.

When the sheets and films of the invention are sheets and films for protection, in the olefin block copolymers (A-1), the $PO^1$ segment desirably is an ethylene polymer, propylene polymer or 4-methyl-1-pentene polymer, preferably a copolymer of ethylene, propylene or 4-methyl-1-pentene with a linear α-olefin of 2–10 carbon atoms and/or a cycloolefin, particularly ethylene copolymer or propylene copolymer such as a copolymer of ethylene and an α-olefin of 3 or more carbon atoms.

The polyolefin segment, which comprises a copolymer of ethylene and an α-olefin of 3 or more carbon atoms, desirably has a molar ratio of ethylene to α-olefin of 3 or more carbon atoms of about from 99.9/0.1 to 70/30.

Further, the polyolefin segment, which comprises a copolymer of ethylene, an α-olefin of 3 or more carbon atoms and a cycloolefin, desirably has a molar ratio of ethylene to α-olefin of 3 or more carbon atoms of from 100/0 to 50/50, and a molar ratio of ethylene to cycloolefin of from 100/0 to 50/50.

Furthermore, the polyolefin segment, which comprises a copolymer of propylene and ethylene or an α-olefin of 4 or more carbon atoms, desirably has a molar ratio of propylene to other α-olefin of about from 100/0 to 70/30. The polyolefin segment desirably has a weight-average molecular weight, determined by GPC, of from 10,000 to 800,000, preferably 30,000 to 500,000.

Further, the $g^1$ linkage is preferably an ether linkage, ester linkage or amide linkage.

Furthermore, the $B^1$ segment is preferably an acrylic acid ester polymer, methacrylic acid ester polymer, cyclic ester polymer, cyclic ether polymer or oxazoline polymer, more preferably a polymer obtainable by ring opening polymerization of a cyclic ester, particularly a polymer of caprolactone. The functional segment desirably has a weight-average molecular weight, determined by GPC, of from 500 to 500,000, preferably 2,000 to 400,000.

The protection films and sheets obtainable by using the olefin block copolymers (A-1) satisfying the above conditions are preferable because of having excellent transparency, adhesiveness and mar resistance.

When the sheets and films of the invention are sheets and films for shrink films or sheets, in the olefin block copolymers (A-1), the $PO^1$ segment desirably is an ethylene polymer or propylene polymer, preferably a copolymer of ethylene or propylene with a linear α-olefin of 2–10 carbon atoms and/or a cycloolefin.

The polyolefin segment, which comprises a copolymer of ethylene and an α-olefin of 3 or more carbon atoms, desirably has a molar ratio of ethylene to an α-olefin of 3 or more carbon atoms of about from 100/0 to 70/30.

Further, the $PO^1$ polyolefin segment, which comprises a copolymer of ethylene, an α-olefin of 3 or more carbon atoms and a cycloolefin, desirably has a molar ratio of ethylene to an α-olefin of 3 or more carbon atoms of from 100/0 to 50/50, and a molar ratio of ethylene to cycloolefin of from 100/0 to 50/50.

Furthermore, the $PO^1$ polyolefin segment, which comprises a copolymer of propylene and ethylene or an α-olefin of 4 or more carbon atoms, desirably has a molar ratio of propylene to other α-olefin of about from 100/0 to 50/50. The $PO^1$ polyolefin segment desirably has a weight-average molecular weight, determined by GPC, of from 10,000 to 1,000,000, preferably 50,000 to 700,000.

Further, the $g^1$ linkage is preferably an ether linkage, ester linkage or amide linkage.

Furthermore, the $B^1$ segment is preferably an acrylic acid ester polymer, methacrylic acid ester polymer, acrylic acid amide polymer, cyclic ester polymer, cyclic ether polymer or fluorine-containing polymer, more preferably a polymer obtainable from (meth)acrylic acid ester. The functional segment desirably has a weight-average molecular weight, determined by GPC, of from 500 to 500,000, preferably 2,000 to 300,000.

The shrink films and sheets obtainable by using the olefin block copolymers (A-1) satisfying the above conditions are preferable because of having excellent transparency and shrink properties.

Film and Sheet

The films and sheets of the olefin block copolymer (A-1) or the olefin polymer composition (D) according to the invention may be stretched or un-stretched, and can be formed appropriately using conventionally known processes.

Examples of the processes for molding the films and sheets of the invention may include extrusion molding, injection molding, inflation moling, blow molding, extrusion blow molding, injection blow molding, press molding, vacuum forming, calender molding and expansion molding.

In preparing the films and sheets of the olefin block copolymer (A-1) or the olefin polymer composition (D) according to the invention with the extrusion molding, conventionally known extrusion apparatuses and molding conditions can be employed. For example, using a single screw extruder, kneading extruder, ram extruder or gear extruder, the molten olefin block copolymer (A-1) or olefin polymer composition (D) is extruded from a T die, etc to mold an un-stretched film or sheet.

The films and sheets of the invention may be prepared by the inflation molding. The films and sheets of the olefin block copolymer (A-1) or the olefin polymer composition (D) according to the invention are molded by the inflation molding so that draw-down is hardly caused.

In preparing the films and sheets of the olefin block copolymer (A-1) or the olefin polymer composition (D) according to the invention with the injection molding, conventionally known injection molding apparatuses and molding conditions can be employed. The olefin block copolymer (A-1) or olefin polymer composition (D) is injection-molded into a desired form and thickness to prepare the films or sheets. The films or sheets thus prepared by the injection molding, further, may be molded with stretching.

The stretched films or sheets can be prepared by stretching un-stretched films or sheets such as the above-mentioned extruded films or sheets, by known stretching methods such as a tenter method (lengthwise-cross wise stretching, crosswise-lengthwise stretching), biaxial co-stretching method or uniaxial stretching method.

In stretching the unstretched film or sheet, the stretching ratio depends on the thickness of the unstretched film or sheet. In the biaxial stretching, the desirable stretching ratio is usually about from 20 to 70 times. In the uniaxial stretching, the desirable stretching ratio is usually about from 2 to 10 times. The stretched film or sheet after stretching has a thickness, although depending to the use, of preferably about from 5 to 200 μm.

Film and Sheet Having a Multi-layered Structure

Next, the films and sheets, which comprise two or more layers having different compositions, according to the invention (hereinafter referred to as "laminates") will be described.

The multi-layered films and sheets of the invention are multi-layered films and sheets which comprise two or more layers having different composition each other and at least one of the layers may comprise the above olefin block copolymer (A-1). Further, the films and sheets of the invention are multi-layered films or sheets, which comprise two or more layers having different compositions, and at least one of the layers may comprise the above olefin polymer composition (D).

The multi-layered films and sheets of the invention preferably comprise a layer (a) of the olefin block copolymer (A-1) and a thermoplastic resin layer (c), or the thermoplastic resin layer (c) and a layer (d) of the above olefin polymer composition (D).

The laminates of the invention are multi-layered films or sheets which comprise two or more layers having different compositions, and at least one of the layers comprises the above olefin block copolymer (A-1) or the above olefin polymer composition (D).

The laminates preferably comprise
(a) the layer of the olefin block copolymer (A-1) and
(c) the thermoplastic resin layer, or
(c) the thermoplastic resin layer and
(d) the layer of the olefin copolymer composition (D).

In the multi-layered films and sheets, examples of the thermoplastic resin constituting the thermoplastic resin layer (c) may include any of the thermoplastic resins (C) as described in the above, such as polyolefin, polyamide, polyester, polyacetal, polystyrene, acrylonitrile/butadiene/styrene copolymer (ABS), polycarbonate, polyphenylene oxide, polyacrylate or polyvinyl chloride can be used singly or in combination.

The thermoplastic resin layer (c) preferably comprises at least one thermoplastic resin selected from polyolefin, polyamide, polyester, polyacetal, polyvinyl chloride, polystyrene, acrylonitrile/butadiene/styrene copolymer (ABS) and polycarbonate, and more preferably, polyolefin, ethylene/polar group-containing vinyl copolymer, polyester, polycarbonate and polyamide.

The polyester resin comprises:

dihydroxy compound units derived from aliphatic glycols such as ethylene glycol, propylene glycol, 1,4-butane diol, neopentyl glycol, hexamethylene glycol, alicyclic glycols such as cyclohexane dimethanol, aromatic dihydroxy compounds such as bisphenol, or dihydroxy compounds of two or more of the above;

and dicarboxylic acid units derived from aromatic dicarboxylic acids such as terephthalic acid, isophthalic acid, 2,6-naphthalene dicarboxylic acid, aliphatic dicarboxylic acids such as oxalic acid, succinic acid, adipic acid, sebacic acid, undecadicarboxylic acid, alicyclic dicarboxylic acids such as hexahydroterephthalic acid or dicarboxylic acids of two of the above. It may be copolymerized with a small amount of a tri or more-valent polyhydroxy compound or polycarboxylic acid such as triol, tricarboxylic acid as long as it exhibits thermoplasticity.

Examples of the thermoplastic polyester resins preferably used may include polyethylene terephthalate, polybutylene terephthalate, polyethylene isophthalate/terephthalate copolymer.

Examples of the polycarbonate resins may include various polycarbonates and copolycarbonates obtainable by allowing a dihydroxy compound to react with phosgene or diphenyl carbonate with a known method.

Examples of the dihydroxy compounds may include hydroquinone, resorcinol, 4,4'dihydroxy-diphenyl-methane, 4,4'-dihydroxy-diphenyl-ethane, 4,4'-dihydroxy-diphenyl-n-butane, 4,4'-dihydroxy-diphenyl-heptane, 4,4'-dihydroxy-diphenyl-phenyl-methane, 4,4'-dihydroxy-diphenyl-2,2-propane(bisphenol A), 4,4'-dihydroxy-3,3'-dimethyl-diphenyl-2,2-propane, 4,4'-dihydroxy-3,3'-diphenyl-diphenyl-2,2-propane, 4,4'-dihydroxy-dichloro-diphenyl-2,2-propane, 4,4'-dihydroxy-diphenyl-1,1-cyclopentane, 4,4'-dihydroxy-diphenyl-1,1-cyclohexane, 4,4'-dihydroxy-diphenyl-methyl-phenyl-methane, 4,4'-dihydroxy-diphenyl-ethyl-phenyl-methane, 4,4'-dihydroxy-diphenyl-2,2,2-trichloro-1,1-ethane, 2,2'-dihydroxydiphenyl, 2,6-dihydroxynaphthalene, 4,4'-dihydroxydiphenylether, 4,4'-dihydroxy-3,3'-dichlorodiphenylether and 4,4'-dihydroxy-2,5-diethoxyphenylether.

Of these, polycarbonates prepared using 4,4'-dihydroxy-diphenyl-2,2-propane(bisphenol A) are preferred because of having excellent mechanical properties and transparency.

Examples of the polyamide resins may include various polyamides obtainable by ring opening polymerization of caprolactam or polycondensation of diamine and dicarboxylic acids with known methods and copolyamides. Of these, nylon-6, nylon-66 and methaxylene diamine-adipic acid condensed polymer are preferably used.

Examples of the polyolefins may include ethylene polymers, propylene polymers, butene polymers, 4-methyl-1-pentene polymer, 3-methyl-1-butene polymer and hexene polymers. Further, of these, preferable examples are ethylene polymers, propylene polymers and 4-methyl-1-pentene polymer. Of these, preferable ethylene polymers are ethylene/vinyl acetate copolymer, ethylene/vinyl acetate copolymer saponificated products.

The ethylene/vinyl acetate copolymer has an ethylene content of from 15 to 60 mol %, preferably 25 to 50 mol %. The ethylene/vinyl acetate copolymer desirably has a melt flow rate, as measured at 190° C., of from 0.1 to 500 g/10 min, preferably 0.1 to 400 g/10 min, more preferably 0.1 to 300 g/10 min.

Further, the ethylene/vinyl acetate copolymer saponificated products used preferably are prepared by saponificating an ethylene/vinyl acetate copolymer having an ethylene content of from 15 to 60 mol %, preferably 25 to 50 mol % at a saponification degree of not less than 50%, preferably not less than 90%. When the ethylene content is in the above range, the thermal decomposition of the resins hardly takes place, and the resins have facility in melt molding and excellent extensibility and water resistance and also have excellent gas permeability resistance. The saponification degree is preferably not less than 50%, because the resins have excellent gas permeability resistance.

In the laminates of the invention, for example, an ethylene polymer or propylene polymer prepared by graft copolymerization of maleic anhydride may be interposed between the thermoplastic resin layer (c) and the layer (a) of the olefin block copolymer (A-1) or the layer (d) of the olefin copolymer composition (D).

The multi-layered films and sheets (laminates) according to the invention may be prepared by any processes. Examples of the processes may include a process of conducting one-piece molding by co-extruding materials for each layer simultaneously to mold a film or sheet-like laminate, a process of forming a film or sheet like layer using a material for one layer of the multi-layered structure, and, thereon, molding other layer by a material for the other layer to form a film or sheet-like laminate, or a process of molding film or sheet-like layers separately using materials for each layers and then laminating the layers with contact bonding, fusing or bonding.

The laminates of the invention desirably comprise the layer (a) of the olefin block copolymer (A-1) or the layer (d) of the olefin copolymer composition (D) and (c) the thermoplastic resin layer. With regard to preparation of the laminates, the thermoplastic resin (C) for the thermoplastic resin layer (c) and the olefin block copolymer (A-1) or the olefin copolymer composition (D) are separately molten with each extruders, are fed to a two or three layered die and co-extruded with a co-extrusion molding method so that the intermediate layer comprises the adhesive resin composition, to mold a film or sheet-like laminate. Further, a sandwich laminating method can be employed, for instance, previously, the thermoplastic resin layer (c) and the layer (a) of the olefin block copolymer (A-1) or the layer (d) of the olefin copolymer composition (D) are separately molded and the adhesive resin composition is molten-extruded into between the layers.

Of these preparation methods, the co-extrusion molding method is preferred in the viewpoint of interlaminar strength. Examples of the co-extrusion molding method are a T-die method using a flat die and an inflation method using a circular die. Any of a single manifold die using a black box and multi-manifold die may be employable as the flat die. Any known dies may be employable as the dies used in the inflation method.

The thickness of each layer of the laminates may be determined in accordance with the objective use. In the sheet or film-like laminates, it is generally preferred that the thermoplastic resin layer (c) have a thickness of from 0.01 to 1 mm, the adhesive layer as an adhesive have a thickness of from 0.005 to 1 mm, and the layer (a) of the olefin block copolymer (A-1) or the layer (d) of the olefin copolymer composition (D) have a thickness of about from 0.01 to 5 mm.

The laminates of the invention, which comprise the layer (a) of the olefin block copolymer (A-1) and the thermoplastic resin layer (c), may have a structure, for example, (a)/(c) two layered structure, (a)/(c)/(a) structure of providing layers (a) on the both sides, or (a)/(c)/(x)/(c)/(a), (x)/(a)/(c) or (x)/(c)/(a) structure of having another layer (x) such as polyolefin layer, etc.

The films or sheets having at least one layer of the layer (a) of the olefin block copolymer (A-1) or the layer (d) of the olefin copolymer composition (D) according to the invention are suitably applied for the use such as agriculture, lapping, shrink wrap, protection and the like uses. Further, the films or sheets of the invention are suitably used for selective separating membranes such as membranes of separating blood plasma components, water selective pervaporation membranes, ion exchange membranes, battery separators, optical parting membranes, etc.

The sheets and films of the invention, further, can be applied in a variety of uses including microcapsules, PTP packaging, chemical pulp and further drag delivery system.

The present invention can provide films and sheets having excellent properties such as flexibility, adhesiveness, fog resistance, heat resistance, etc.

Modifier

The modifier of the invention comprises the olefin block copolymer (A-1).

The kinds of the modifier are various modifying agents such as modifiers for resins, modifiers for rubbers, modifiers for lubricating oils, modifiers for waxes, modifiers for cement, modifiers for ink and paints, etc, and dispersibility-improving agents such as filler-dispersibility improvers, etc.

At first, the modifiers for various modifying agents are described.

In the olefin block copolymer (A-1) used for the various modifying agents, the $PO^1$ segment desirably has a weight-average molecular weight of usually not less than 2,000, preferably 2,000 to 1,000,000, more preferably 10,000 to 800,000, especially 50,000 to 500,000.

Preferable examples of the $PO^1$ segment of the olefin block copolymer (A-1) used for the various modifying agents are ethylene polymers such as ethylene homopolymer and ethylene/α-olefin copolymer; propylene polymers such as propylene homopolymer and propylene/α-olefin copolymer; butene polymers such as butene homopolymer and butene/ethylene copolymer; and 4-methyl-1-pentene polymers such as 4-methyl-1-pentene homopolymer.

Further, the $PO^1$ segment preferably comprises repeating units derived from at least one of the above linear or branched α-olefins and the above cycloolefins, more preferably one selected from ethylene polymers such as ethylene homopolymer, and ethylene/α-olefin copolymer, and propylene polymers such as propylene homopolymer, propylene/ethylene copolymer and propylene/α-olefin copolymer, most preferably ethylene polymers. When the $PO^1$ segment is the above polymer, the olefin block copolymers (A-1) have excellent improving effects in impact resistance, heat resistance and weathering resistance.

In the olefin block copolymer (A-1) used for the various modifying agents, the $g^1$ linkage is preferably an ether linkage, ester linkage or amide linkage, further preferably ether linkage.

In the olefin block copolymer (A-1) used for the various modifying agents, the $B^1$ segment is a functional segment obtainable by chain polymerization, preferably a functional segment comprising repeating units of unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment each preferably comprise different polymers.

The $B^1$ segment has a weight-average molecular weight of usually not less than 500, preferably 500 to 1,000,000, more preferably 5,000 to 800,000, specifically 10,000 to 500,000.

The $B^1$ segment is contained in an amount based on the olefin block copolymer (A-1) of preferably 0.01 to 99.99 wt %, preferably 1 to 99 wt %, more preferably 1 to 95 wt %, specifically 1 to 92 wt %.

The olefin block copolymers (A-1) used for various modifying agents desirably have a melt flow rate (MFR as measured in accordance with ASTM D 1238, at 230° C. under a load of 2.16 Kg) of usually 0.01 to 200 g/10 min, preferably 0.05 to 100 g/10 min, more preferably 0.05 to 80 g/10 min.

The modifiers for various kinds of the modifying agents according to the invention may be an olefin polymer composition (F) comprising the olefin block copolymer (A-1), a resin (e-1), a rubber (e-2), a base material for lubricating oils (e-3), a wax (e-4), cement (e-5) or inks and coatings (e-6).

Resin (e-1)

In the case of using the olefin block copolymer (A-1) as the resin modifiers or rubber modifiers, the copolymer (A-1) may be mixed with the resin (e-1) other than the copolymer (A-1) for use. Examples of the resin (e-1) used herein may include thermoplastic resins such as polyolefin, polyamide, polyester, polyacetal, polystyrene, acrylonitrile/butadiene/styrene copolymer (ABS), polycarbonate, polyphenylene oxide or polyacrylate, and thermosetting resins such as phenol resin, epoxy resin, unsaturated polyester, urea resin, melamine resin or polyurethane. Of these, the thermoplastic resins are the same as those of the thermoplastic resins (C) as described in the above.

The phenol resin may include a combination of phenol and formaldehyde and, as a catalyst, hexamethylene diamine.

The epoxy resin may include a combination of glycidyl ether and amine, and further it is preferred to use, as glycidyl ether, one prepared by condensation of bisphenol A and epichlorohydrin.

The unsaturated polyester may include a combination of an unsaturated dibasic acid, polyvalent alcohol and organic peroxide. It is preferable to use maleic anhydride or fumaric acid as the unsaturated dibasic acid, and ethylene glycol or propylene glycol as the polyvalent alcohol.

It is preferred to use urea and formaldehyde as the urea resin.

It is preferred to use melamine and formaldehyde as the melamine resin.

Examples of the polyurethane may include a combination of toluene diisocyanate or diphenylmethane diisocyanate and polyol and an amine catalyst.

The above resins (e-1) may be used singly or in combination with two or more.

In blending the olefin block copolymer (A-1) with the resin (e-1), the olefin block copolymers (A-1) are used in an amount preferably from 5 to 99 parts by weight, more preferably 10 to 99 parts by weight based on the total amount of the copolymer (A-1) and the resin (e-1).

Rubber (e-2)

In the case of using the olefin block copolymer (A-1) as the resin modifiers or rubber modifiers, the copolymer (A-1) may be mixed with the rubber (e-2) for use. Examples of the rubber (e-2) used herein may include cross-linked rubbers such as natural rubber (NR), isoprene rubber (IR), butadiene rubber (BR), styrene/butadiene rubber (SBR), chloroprene rubber (CR), acrylonitrile/butadiene rubber (NBR), butyl rubber (IIR), ethylene/propylene rubber (EPM, EPDM), chlorosulfonated polyethylene (CSM), acrylic rubber (ACM, ANM, etc), epichlorohydrin rubber (CO, ECO, etc), silicone rubber (Q) or fluoro-rubber (FKM, etc); and thermoplastic rubbers such as styrene, olefin, urethane, ester, amide or vinyl chloride rubbers.

It is preferred to use natural rubber, and diene rubbers such as butadiene rubber or styrene/butadiene rubber as the rubber.

The above rubbers (e-2) may be used singly or in combination with two or more.

In blending the olefin block copolymer (A-1) with the rubber (e-2), the olefin block copolymers (A-1) are used in an amount preferably from 10 to 99 parts by weight, more preferably 20 to 99 parts by weight based on the total amount of the copolymer (A-1) and the rubber (e-2).

Base Material of Lubricating Oil (e-3)

In the case of using the olefin block copolymer (A-1) as the modifier of lubricating oils, the copolymer (A-1) may be mixed with the base material of lubricating oil (e-3) for use. Examples of the base material of lubricating oil (e-3) used herein may include mineral oils, poly-α-olefin diesters such as polyol ester, dioctyl phthalate or dioctyl sebacate, synthetic oils such as polyalkylene glycohol. It is preferred to use mineral oils or a blend of mineral oil and synthetic oil. The mineral oils are generally used after the purification process such as dewaxing, etc. The mineral oils have some classes due to the methods of purification. Generally, a mineral oil containing 0.5 to 10% of wax components is used. Further, a mineral oil having a dynamic viscosity at 40° C. of 10 to 200 cSt is used.

The above base material of lubricating oil (e-3) may be used singly or in combination with two or more.

In blending the olefin block copolymer (A-1) with the base material of lubricating oil (e-3), the olefin block copolymers (A-1) are used in an amount preferably from 5 to 99 parts by weight, more preferably 10 to 99 parts by weight based on the total amount of the copolymer (A-1) and the base material of lubricating oil (e-3).

The modifier comprising the olefin polymer compositions (F), which comprise the olefin block copolymer (A-1) and the base material of lubricating oil (e-3), have excellent modifying effects in heat resistance, low-temperature properties, lubricating properties at high temperatures and dispersibility.

Wax (e-4)

In the case of using the olefin block copolymer (A-1) as the wax modifier, the copolymer (A-1) may be mixed with the wax (e-4) for use. Examples of the wax (e-4) used herein may include mineral waxes such as montan wax, peat wax, ozokerite/ceresin wax, petroleum wax, etc, synthetic waxes such as polyethylene, Fischer-Tropsch wax, chemical modified hydrocarbon wax, substituted amide wax, etc, vegetable waxes and animal waxes.

Of the above waxes, synthetic waxes such as polyethylene and chemical modified hydrocarbon wax are preferred.

The above waxes (e-4) may be used singly or in combination with two or more.

In blending the olefin block copolymer (A-1) with the wax (e-4), the olefin block copolymers (A-1) are used in an amount preferably from 10 to 99 parts by weight, more preferably 20 to 99 parts by weight based on the total amount of the copolymer (A-1) and the wax (e-4).

The modifiers of the olefin polymer compositions (F), which comprise the olefin block copolymer (A-1) and the wax (e-4), have excellent modifying effects in heat resistance, low-temperature properties and dispersibility.

Cement (e-5)

In the case of using the olefin block copolymer (A-1) as the cement modifier, the copolymer (A-1) may be mixed with the cement (e-5) for use. Examples of the cement (e-5) used herein may include air hardening cements such as lime, gypsum or magnesia cement; hydraulic cements such as Roman cement, natural cement, Portland cement, alumina cement, high sulfate slag cement, etc, and special cements such as acid proof cement, refractory cement, water glass cement, dental cement, etc.

The above cements (e-5) may be used singly or in combination with two or more.

In blending the olefin block copolymer (A-1) with the cement (e-5), the olefin block copolymers (A-1) are used in an amount preferably from 0.5 to 99 parts by weight, more preferably 1 to 99 parts by weight based on the total amount of the copolymer (A-1) and the cement (e-5).

The modifiers of the olefin polymer compositions (F), which comprise the olefin block copolymer (A-1) and the cement (e-5), have excellent modifying effects in impact resistance and rigidity.

Inks and Coatings (e-6)

In the case of using the olefin block copolymer (A-1) as the modifier for inks and paints, the copolymer (A-1) may be mixed with the inks and coatings (e-6) for use. Examples of the inks and coatings (e-6) used herein may include inks such as letterpress printing ink, lithography ink, flexographic ink, rotogravure ink, etc, oil paint, cellulose derivative paint, synthetic resin coating, aqueous baking coating, powdery aqueous coating, Japanese lacquer and other special coatings.

The above inks and coatings (e-6) may be used singly or in combination with two or more.

In blending the olefin block copolymer (A-1) with the inks and coatings (e-6), the olefin block copolymers (A-1) are used in an amount preferably from 0.5 to 99 parts by weight, more preferably 1 to 99 parts by weight based on the total amount of the copolymer (A-1) and the inks and coatings (e-6).

The modifiers of the olefin polymer compositions (F), which comprise the olefin block copolymer (A-1) and the inks and coatings (e-6), have excellent modifying effects -in heat resistance, dispersibility and fixing properties.

In addition to the olefin block copolymer (A-1), the thermoplastic resin (e-1), rubber (e-2), base material for lubricating oils (e-3), wax (e-4), cement (e-5) or inks and paints (e-6), the olefin polymer compositions (F) may contain conventionally known components such as a crosslinking agent, filler, crosslinking accelerator, crosslinking assistant, softener, tackifier, anti-aging agent, foaming agent, processing aid, adhesion-imparting agent, inorganic filler, organic filler, crystalline nucleating agent, heat stabilizer, weathering stabilizer, anti-oxidizing agent, antistatic agent, colorant, lubricant, flame retardant, blooming-inhibitor, rust preventive, detergent, anti-foaming agent, withstand load-addition agent, dispersant, drying agent, neutralizer, etc. The olefin polymer composition, further, may be mixed with foreign materials such as reinforcing fibers. Exemplary crosslinking agent, crosslinking accelerator, crosslinking assistant, softener, tackifier, anti-aging agent, foaming agent, processing aid, adhesion-imparting agent, inorganic filler, organic filler and crystalline nucleating agent are the same as described in the above. The loadings of the crosslinking agent and crosslinking accelerator are in the same ranges as described in the above.

The crosslinking agent loadings are in the above range, so that the crosslinking of the olefin block copolymer (A-1) or the olefin polymer composition (F) is properly carried out, and the resulting crosslinked products have excellent rubbery properties such as strain recovery, impact resilience, etc and excellent mechanical strength. In extrusion sheet molding thereof, the molded sheet is free from surface roughening and has good appearance, and further, the molecular weight of the olefin block copolymer (A-1) or the olefin polymer composition (F) hardly lowers and the composition (molded article) shows a tendency to be excellent in mechanical strength.

The crosslinking treated compositions have evident rubbery properties such as excellent tensile strength and tear strength, and low surface hardness and low permanent set, and further have excellent balanced physical properties as elastomers in comparison with compositions obtained only by usual melt kneading.

In preparing the crosslinked products from un-crosslinked composition containing a crosslinking agent, the un-crosslinked composition containing a crosslinking agent is prepared in advance and then the composition is molded into a desired shape and thereafter is subjected to crosslinking with heating, in the same manner as crosslinking of usual rubbers.

Whether a composition is crosslinked is determined in such a way that the composition is boiled in boiling xylene for 4 hours or more and filtered with a 400 mesh metal net to obtain a residue and the crosslinking thereof is judged by the residue amount being 10 parts by weight or more or not based on the 100 parts by weight of the composition.

Examples of the inorganic filler for mixing with the olefin block copolymer (A-1) or the olefin polymer composition (F) may include powdery fillers, e.g. natural silicic acid or silicate such as finely powdery talc, kaolinite, calcined clay, pyrophyllite, sericite, wollastonite, etc, carbonates such as precipitated calcium carbonate, ground limestone, magnesium carbonate, etc, hydroxides such as aluminum hydroxide, magnesium hydroxide, etc, oxides such as zinc oxide, zinc white, magnesium oxide, etc, synthetic silicic acid or silicate such as water containing calcium silicate, water containing aluminum silicate, water containing silicic acid, anhydrous silicic acid, etc;

flake fillers such as mica, etc;

fibrous fillers such as basic magnesium sulfate whisker, calcium titanate whicker, aluminum borate whisker, sepiolite, PMF (Processes Mineral Fiber), xonotlite, potassium titanate, ellestadite, etc; and balloon fillers such as glass balloon, fly ash balloon, etc.

In the invention, of these, it is preferred to use talc, and particularly fine powdery talc having an average particle diameter of 0.01 to 10 μm.

The inorganic fillers used in the invention, particularly talc may be untreated or previously surface-treated. Examples of the surface treatment may include chemical or physical treatments using an agent for treatment such as silane coupling agents, higher fatty acids, metal salts of fatty acids, unsaturated organic acids, organic titanates, resin acids, polyethylene glycols, etc.

The above inorganic fillers may be used in combination with two or more.

Further, in the invention, organic fillers such as high styrenes, lignin, reclaimed rubbers, etc can be used with these inorganic fillers.

(Use)

The olefin block copolymer (A-1) and the olefin polymer composition (F) are useful for various uses of modifying, for example, resin modifiers, rubber modifiers, lubricating oil modifiers, wax modifiers, cement modifiers, ink and coating modifiers, etc.

In the case of using the olefin block copolymer (A-1) or the olefin polymer composition (F) as the resin modifier, the olefin block copolymer (A-1) and the olefin polymer composition (F) containing the copolymer (A-1) preferably have:

the $PO^1$ segment, which is preferably an α-olefin polymer, more preferably an α-olefin homopolymer, a copolymer of ethylene and an α-olefin of 3 or more carbon atoms (molar ratio of ethylene units to α-olefin units of from 99/1 to 60/40), a propylene/ethylene copolymer (molar ratio of propylene units to ethylene units of from 99/1 to 70/30) or a copolymer of propylene and an α-olefin of 4 or more carbon atoms (molar ratio of propylene units to α-olefin units of from 99/1 to 70/30), the $g^1$ linkage which is an ether linkage or amide linkage, and the $B^1$ segment which is preferably a polymer obtainable from (meth)acrylic acid or ester thereof, a polymer obtainable from aromatic vinyl compounds or polyalkylene glycol.

In the case of using the olefin block copolymer (A-1) or the olefin polymer composition (F) as the resin modifier, the olefin block copolymer (A-1) is preferably used in an amount of 1 to 50 wt % based on the total amount of the copolymer (A-1) or the olefin polymer composition (F) and the resin for modifying.

In the case of using the olefin block copolymer (A-1) or the olefin polymer composition (F) as the rubber modifier, the olefin block copolymer (A-1) and the olefin polymer composition (F) containing the copolymer (A-1) preferably have:

the $PO^1$ segment, which is preferably an α-olefin/conjugated polyene copolymer or α-olefin/non-conjugated polyene copolymer, more preferably a copolymer of ethylene, an α-olefin of 3 or more carbon atoms and non-conjugated polyene (molar ratio of ethylene units to α-olefin units of from 95/5 to 55/45), the $g^1$ linkage which is an ether linkage or amide linkage, and the $B^1$ segment which is preferably a polymer obtainable from aromatic vinyl compounds, or a polymer or copolymer obtainable from hetero cyclic compound residue-containing vinyl compounds.

In the case of using the olefin block copolymer (A-1) or the olefin polymer composition (F) as the rubber modifier, the olefin block copolymer (A-1) is preferably used in an amount of 3 to 50 wt % based on the total amount of the copolymer (A-1) or the olefin polymer composition (F) and the rubber for modifying.

In the case of using the olefin block copolymer (A-1) or the olefin polymer composition (F) as the lubricating oil modifier, the olefin block copolymer (A-1) and the olefin polymer composition (F) containing the copolymer (A-1) preferably have:

the $PO^1$ segment, which is preferably an α-olefin copolymer, more preferably a copolymer of ethylene and an α-olefin of 3 or more carbon atoms (molar ratio of ethylene units to α-olefin units of from 95/5 to 50/50), the $g^1$ linkage which is an ether linkage or amide linkage, and the $B^1$ segment which is preferably a polymer obtainable from (meth)acrylic acid or ester thereof.

In the case of using the olefin block copolymer (A-1) or the olefin polymer composition (F) as the lubricating oil modifier, the olefin block copolymer (A-1) is preferably used in an amount of 0.5 to 20 wt % based on the total amount of the copolymer (A-1) or the olefin polymer composition (F) and the lubricating oil for modifying.

In the case of using the olefin block copolymer (A-1) or the olefin polymer composition (F) as the wax modifier, the olefin block copolymer (A-1) and the olefin polymer composition (F) containing the copolymer (A-1) preferably have:

the $PO^1$ segment, which is preferably an α-olefin polymer, more preferably an α-olefin homopolymer, a copolymer of ethylene and an α-olefin of 3 or more carbon atoms (molar ratio of ethylene units to α-olefin units of from 99/1 to 75/25), a propylene/ethylene copolymer (molar ratio of propylene units to ethylene units of from 99/1 to 70/30) or a copolymer of propylene and an α-olefin of 4 or more carbon atoms (molar ratio of propylene units to α-olefin units of from 99/1 to 70/30), the $g^1$ linkage which is an ether linkage or amide linkage, and the $B^1$ segment which is preferably a polymer obtainable from (meth)acrylic acid or ester thereof, a polymer obtainable from aromatic vinyl compounds or polyalkylene glycol.

In the case of using the olefin block copolymer (A-1) or the olefin polymer composition (F) as the wax modifier, the olefin block copolymer (A-1) is preferably used in an amount of 0.5 to 50 wt % based on the total amount of the copolymer (A-1) or the olefin polymer composition (F) and the wax for modifying.

In the case of using the olefin block copolymer (A-1) or the olefin polymer composition (F) as the cement modifier, the olefin block copolymer (A-1) and the olefin polymer composition (F) containing the copolymer (A-1) preferably have:

the $PO^1$ segment, which is preferably an α-olefin homopolymer, a copolymer of ethylene and an α-olefin of 3 or more carbon atoms (molar ratio of ethylene units to α-olefin units of from 99/1 to 60/40), a propylene/ethylene copolymer (molar ratio of propylene units to ethylene units of from 99/1 to 70/30) or a copolymer of propylene and an α-olefin of 4 or more carbon atoms (molar ratio of propylene units to α-olefin units of from 99/1 to 70/30), the $g^1$ linkage which is an ether linkage or amide linkage, and the $B^1$ segment which is preferably a polymer obtainable from (meth)acrylic acid or ester thereof, or polyalkylene glycol.

In the case of using the olefin block copolymer (A-1) or the olefin polymer composition (F) as the cement modifier, the olefin block copolymer (A-1) is preferably used in an amount of 0.2 to 30 wt % based on the total amount of the copolymer (A-1) or the olefin polymer composition (F) and the cement for modifying.

In the case of using the olefin block copolymer (A-1) or the olefin polymer composition (F) as the ink and coating modifier, the olefin block copolymer (A-1) and the olefin polymer composition (F) containing the copolymer (A-1) preferably have:

the $PO^1$ segment, which is preferably an α-olefin polymer, more preferably an α-olefin homopolymer, a copolymer of ethylene and an α-olefin of 3 or more carbon atoms (molar ratio of ethylene units to α-olefin units of from 99/1 to 60/40), a propylene/ethylene copolymer (molar ratio of propylene units to ethylene units of from 99/1 to 70/30) or a copolymer of propylene and an α-olefin of 4 or more carbon atoms (molar ratio of propylene units to α-olefin units of from 99/1 to 70/30), the $g^1$ linkage which is an ether linkage or amide linkage, and the $B^1$ segment which is preferably a polymer obtainable by aromatic vinyl compounds or a polymer obtainable from (meth)acrylic acid or ester thereof.

In the case of using the olefin block copolymer (A-1) or the olefin polymer composition (F) as the ink and coating modifier, the olefin block copolymer (A-1) is preferably used in an amount of 0.1 to 20 wt % based on the total amount of the copolymer (A-1) or the olefin polymer composition (F) and the ink or coating for modifying.

Filler-dispersibility Improver

Next, the filler dispersibility improver will be described. The filler dispersibility-improver of the invention comprises the above olefin block copolymer (A-1).

In the olefin block copolymer (A-1) as the filler dispersibility improver, the $PO^1$ segment desirably has a weight-average molecular weight of usually not less than 2,000, preferably 2,000 to 1,000,000, more preferably 2,000 to 500,000, especially 5,000 to 100,000.

Preferable examples of the $PO^1$ segment of the olefin block copolymer (A-1) as the filler dispersibility improver are ethylene polymers such as ethylene homopolymer or ethylene/α-olefin copolymer; propylene polymers such as propylene homopolymer or propylene/α-olefin copolymer; butene polymers such as butene homopolymer or butene/ethylene copolymer; and 4-methyl-1-pentene polymers such as 4-methyl-1-pentene homopolymer, etc.

The $g^1$ linkage of the olefin block copolymer (A-1) as the filler dispersibility improver is preferably an ether linkage, ester linkage or amide linkage, further preferably ether linkage.

The $B^1$ segment of the olefin block copolymer (A-1) as the filler dispersibility improver is a functional segment obtainable by chain polymerization, preferably a functional segment comprising repeating units of an unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment each preferably comprise different polymers.

The $B^1$ segment has a weight-average molecular weight of usually not less than 500, preferably 500 to 1,000,000, more preferably 500 to 500,000, further preferably 1,000 to 500,000.

The B$^1$ segment is contained in an amount based on the olefin block copolymer (A-1) of preferably 0.01 to 99.99 wt %, preferably 1 to 99 wt %, more preferably 1 to 95 wt %, specifically 5 to 90 wt %.

The olefin block copolymer (A-1) as the filler dispersibility improver has a melt flow rate (MFR as measured in accordance with ASTM D 1238, at 230° C. under a load of 2.16 Kg) of usually 0.01 to 2000 g/10 min, preferably 0.05 to 1000 g/10 min, more preferably 0.1 to 1000 g/10 min.

Specifically, in the olefin block copolymer (A-1), the PO$^1$ segment is preferably polypropylene, polyethylene, a random copolymer of ethylene and an α-olefin of 3 or more carbon atoms or random copolymer of propylene and an α-olefin of 4 or more carbon atoms, more preferably polypropylene having a content of co-monomers selected from ethylene and an α-olefin of 4 or more carbon atoms of less than 10 mol %, polyethylene having a content of co-monomers selected from an α-olefin of 3 or more carbon atoms of less than 10 mol %, a random copolymer having an ethylene content of from 10 to 90 mol %, and a content of α-olefin of 3 or more carbon atoms of from 90 to 10 mol % or a random copolymer having a propylene content of from 10 to 90 mol %, and a content of α-olefin of 4 or more carbon atoms of from 90 to 10 mol %, the g$^1$ linkage is preferably an ether linkage or ester linkage, and the B$^1$ segment is preferably a segment having a solubility parameter $\delta(cal/cm)^{0.5}$ of 9 or more, preferably 10 or more. Examples of the segment having a solubility parameter $\delta(cal/cm)^{0.5}$ of 9 or more may include polyethyl methacrylate, polymethyl acrylate and poly-ε-caprolactam.

The solubility parameter is easily determined by defining the primary structure of a polymer chain with known methods or database, for example, Polymer Handbook, Fourth Edition, VII, p675. The olefin block copolymer (A-1) desirably has the PO$^1$ segment that is an ethylene/α-olefin copolymer or polypropylene, the g$^1$ linkage that is an ether linkage and the B$^1$ segment that is polyethyl methacrylate, styrene/maleic anhydride copolymer or nylon-6 in view of filler dispersibility and affinity with fillers.

More specifically, preferably examples of the olefin block copolymer (A-1) as the filler dispersibility improver may include:

a block copolymer wherein the PO$^1$ segment is an ethylene/propylene copolymer (propylene content: 10 to 90 mol %, Mw: 2,000 to 500,000), the g$^1$ linkage is an ether linkage and the B$^1$ segment is polyethyl methacrylate (Mw: 500 to 500,000), a block copolymer wherein the PO$^1$ segment is polypropylene (Mw: 2,000 to 500,000), the g$^1$ linkage is an ether linkage and the B$^1$ segment is a styrene/maleic anhydride copolymer (Mw: 500 to 500,000) and a block copolymer wherein the PO$^1$ segment is polypropylene (Mw: 2,000 to 500,000), the g$^1$ linkage is an ether linkage and the B$^1$ segment is nylon-6 (Mw: 500 to 500,000).

The filler dispersibility improvers of the above olefin block copolymers (A-1) are used in, for example, mixing thermoplastic resins with fillers. Examples of the thermoplastic resins may include the thermoplastic resins (C) as described in the above, preferably polyolefins.

The loadings of the filler dispersibility improvers are not particularly limited, for example, from 0.01 to 100 parts by weight, preferably 0.1 to 20 parts by weight based on 100 parts by weight of the thermoplastic resins.

The filler dispersibility improvers of the invention have high affinity with the fillers so that they can improve the dispersibility of the fillers. Using such filler dispersibility improvers, the thermoplastic resin compositions containing the fillers can be improved in mechanical properties including rigidity, hardness, heat resistance, impact resistance and elongation.

(Filler-containing Resin Composition)

The filler-containing resin compositions of the invention comprise the olefin block copolymer (A-1) and the following fillers.

The fillers used in the invention are inorganic fillers and organic fillers.

Examples of the inorganic fillers used preferably may include silica, diatomaceous earth, alumina, titanium oxide, magnesium oxide, pumice powder, pumice balloon, aluminum hydroxide, magnesium hydroxide, basic magnesium carbonate, dolomite, calcium sulfate, calcium titanate, barium sulfate, calcium sulfite, talc, clay, mica, asbestos, glass fiber, glass flake, glass beads, calcium silicate, montmorillonite, bentonite, boron fiber, carbon fiber, carbon black, carbon nano-fiber, aluminum powder and molybdenum sulfide. Further examples thereof may include those prepared by chemically linking of the above inorganic fillers with an organic matter.

Examples of the organic fillers used preferably may include fibers such as all aromatic polyamide fibers, aliphatic polyamide fibers, polyester fibers and cellulose fibers, and fine dispersions such as liquid crystal polyester and polyamide.

Of these fillers, layered compounds are preferable and further, phyllosilicates having bloating tendency or cleavage properties to a dispersion medium such as water and alcohol are more preferable.

The phyllosilicates are classified into a type having a two-layered structure comprising a silica tetrahedral layer and, on the upper side thereof, an octahedral layer having a central metal of aluminum or magnesium, and a type having a three-layered structure comprising two silica tetrahedral layers and, between thereof, an octahedral layer having a central metal of aluminum or magnesium. The former phyllosilicates having the two-layered structure are, for example, kaolinites, antigorites, etc, and the latter phyllosilicates having the three-layered structure are, for example, smectites, vermiculites, micas, etc having different number of cations which present between the layers.

Specific examples of the phyllosilicates may include kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, mica fluoride, margarite, talc, vermiculite, phlogopite, xanthophyllite and chlorite.

Further, in the invention, those prepared by treating the phyllosilicates with an organic matter (hereinafter, sometimes referred to as "organic modified silicates") can be used as the phyllosilicate.

Of the above phyllosilicates, the phyllosilicates suitably used for treatment with an organic matter are preferably smectites, vermiculites and micas, further preferably smectites, in viewpoint of bloating tendency and cleavage properties. Examples of the smectites may include montmorillonite, beidellite, nontronite, saponite, sauconite, stevensite and hectorite.

The organic modified silicates can be prepared, for example, by immersing the phyllosilicates in a dispersion medium to bloat or cleave them and organizing ions present between the layers of the phyllosilicates.

Examples of the dispersion medium for bloating or cleaving the phyllosilicates may include alcohols such as methanol, ethanol, propanol, isopropanol, ethylene glycol or diethylene glycol, water, dimethyl formamide, dimethyl sulfoxide and acetone, and preferably alcohols such as methanol, and water.

The phyllosilicates thus bloated or cleaved organize interlaminar ions. When the interlaminar ions are cations such as sodium ion, it is preferred to exchange the cations with organic ammonium ions. Examples of compounds used for the exchange reaction may include 12-aminododecanic acid, dimethyl dioctadecyl ammonium chloride, etc.

The filler-containing resin compositions of the invention comprise the olefin block copolymers (A-1) in an amount of usually from 10 to 90 parts by weight, preferably 20 to 80 parts by weight, and the fillers in an amount of usually from 90 to 10 parts by weight, preferably 80 to 20 parts by weight.

The filler-containing resin compositions of the invention may comprise two or more kinds of the olefin block copolymers and two or more kinds of the fillers.

The filler-containing resin compositions of the invention, further, may comprise the above thermoplastic resins (C), a nucleating agent and conventionally known additives used for other synthetic resins in proper proportions. The thermoplastic resins (C) may be used singly or in combination with two or more.

The loadings are not limited particularly, for example, based on 100 parts by weight of the thermoplastic resin (C), it is usual to use 0.01 to 150 parts by weight of the olefin block copolymer (A-1) and 0.01 to 300 parts by weight of the filler. It is preferred to use 0.1 to 20 parts by weight of the olefin block copolymer (A-1) and 0.1 to 40 parts by weight of the filler. It is further preferred to use 0.5 to 10 parts by weight of the olefin block copolymer (A-1) and 0.5 to 20 parts by weight of the filler.

In the case of blending the filler-containing resin compounds with the thermoplastic resins, the filler-containing resin compounds are used in an amount of 0.01 to 450 parts by weight, preferably 0.1 to 60 parts by weight, more preferably 1 to 30 parts by weight based on 100 parts by weight of the thermoplastic resins.

(Process for Preparing the Filler-containing Resin Composition)

The filler-containing resin composition of the invention can be prepared by mixing the olefin block copolymers (A-1) and the fillers.

All the mixing methods are employable as the process for mixing them. Examples thereof may include a method of dispersing the olefin block copolymers (A-1) and the fillers in a solvent and thereafter removing the solvent, a method of melt mixing the olefin block copolymers (A-1) and the fillers using a device such as a roll, extruder or Brabender and a method of mixing the olefin block copolymers (A-1) and the fillers, in powdery states, using Henschel mixer or ribbon blender.

Further, as the process for preparing the filler-containing resin compositions, there is a method that olefins of 2 to 20 carbon atoms are polymerized or copolymerized and thereafter, chain-polymerizable monomers such as radically polymerizable monomers, ring opening polymerizable monomers or ionically polymerizable monomers are polymerized or copolymerized in the presence of the resulting polyolefin prepared the above polymerization and the fillers. In the process for preparing the olefin block copolymer (A-1) as described above, radical polymerization, ring opening polymerization or ionic polymerization is carried out in the presence of the fillers.

The fillers used in the methods are preferably layered compounds having bloating tendency and cleavage properties, more preferably organic modified silicates, particularly preferably organic modified silicates having interlaminar ions exchanged with organic ammonium ions. The organic modified silicates used herein may be impregnated with radically polymerizable monomers or ring opening polymerizable monomers or polymerization solvents such as toluene, xylene, hexane and decane.

The filler-containing resin compositions prepared by the methods, in which the fillers are very favorably dispersed in the olefin block copolymers (A-1), have excellent interfacial adhesion between the olefin block copolymers (A-1) and the fillers, and have excellent physical properties such as elastic modulus and heat resistance.

(Use)

The filler dispersibility improvers of the invention can be used for thermoplastic resins and thermosetting resin both containing the fillers, and are preferably used for polyolefins.

Further, the thermoplastic resins and thermosetting resin compositions both containing the filler dispersibility improvers, and the filler-containing resin compositions according to the invention can be molded by all of known methods.

For example, calender molding, extrusion molding, injection molding, blow molding, press molding, stamping molding, etc can prepare them.

The extrusion molding can mold sheets or films (un-stretched), pipes, tubes or electric wires.

Stretched films can be prepared by stretching the above extruded sheets or extruded films (un-stretched) with, for example, a tenter method (lengthwise-crosswise stretching, crosswise-lengthwise stretching), biaxial co-stretching method or uniaxial stretching method, and further inflation films can be prepared in the same manner.

Filaments can be prepared by extruding, for example, molten compositions through a spinning nozzle.

Injection molded articles can be prepared by injection molding compositions into various shapes using conventionally known injection molding devices in known conditions.

Blow molded articles can be prepared using conventionally known blow molding devices in known conditions.

Stamping molded articles are prepared by stamping molding.

The molded articles prepared by the above methods are in wide use including from home use to industrial use. The molded articles prepared such methods are, for example, electric parts, electronic parts, vehicle parts, mechanical machinery parts, food vessels, films, sheets, fibers, etc.

Example thereof may include office supplies and OA machinery such as printer, personal computer, word processor, keyboard, PDA (personal digital assistance), telephone, facsimile, copying machine, ECR (electronic cash resister), electronic calculator, electronic pocket notebook, electronic dictionary, card, holder, stationary, etc;

home electric appliances such as washing machine, refrigerator, vacuum-cleaner, microwave oven, light, game machine, iron, kotatsu, etc;

AV appliances such as TV, VTR, video camera, a combination tape recorder and radio, tape recorder, mini disc, CD player, speaker, liquid crystal display, etc;

electric and electronic parts and communication apparatus such as connector, relay, condenser, switch, printed circuit board, coil bobbin, semi-conductor sealant materials, electric wire, cable, trans, deflected yoke, distributing board, watch, etc.

Further examples thereof may include materials for automobile, vehicle, ship, airplane, and construction such as seat (pad, surface fabric, etc), belt, ceiling fabric, convertible top, arm rest, door trim, rear package tray, carpet, mat, sun visor, wheel cover, mattress cover, air bag, insulate, hanger, hanger belt, electric wire covering materials, electric insulate, coatings, coating materials, facing materials, floor materials, corner wall, deck panel, covers, veneers, ceiling plate, partition plate, side wall, carpet, wallpaper, wall materials, facing materials, interior materials, roof materials, sound insulation plate, heat insulating plate, window materials; and daily and sport goods such as clothing, curtain, sheets, veneers, synthetic fiber plate, carpet, entrance mat, sheets, bucket, hose, vessel, glasses, bag, case, goggle, ski plate, racket, tent, musical instrument, etc.

Furthermore examples thereof may include bottles for shampoo or detergent, spice bottles for edible oil or soy source, bottles for beverages such as mineral water or juice, lunch box, heat resistant vessels such as chawan-mushi bowl, tableware such as dish, chopsticks, etc, and other various food containers, packaging film and packaging bag.

The filler dispersibility improvers of the invention have higher affinity with the fillers as compared with conventionally known polyolefins and can enhance the dispersibility of the fillers.

The filler-containing resin compositions of the invention have mechanical properties such as rigidity, hardness, heat resistance, impact resistance and elongation. Further, the filler-containing resin compositions of the invention have high dispersibility to polyolefins particularly. When the filler-containing resin compositions of the invention, even in a small amount are blended with resins, for example, polyolefins, the mechanical properties of the polyolefins can be improved. For example, when the filler-containing resin compositions are used for polypropylene alloys for injection molding, ethylene/propylene rubber or polyethylene for electric wires, the moldability thereof is improved, and the mechanical properties such as rigidity, hardness, heat resistance, impact resistance and elongation are improved.

According to the process for preparing the filler-containing resin compositions of the invention, the fillers are finely dispersed in the resins so that the compositions having excellent affinity between the fillers and the resins can be prepred. Adding the compositions thus prepared even in a small amount to polyolefin resins, the mechanical properties thereof can be improved.

Dispersion

The dispersions of the invention comprise the above olefin block copolymer (A-1) or olefin polymer composition (D), which are dispersed in a liquid phase.

The dispersions may include an aqueous resin dispersion in which the olefin block copolymer (A-1) or olefin polymer composition (D) are dispersed in water and an oily resin dispersion in which the olefin block copolymer (A-1) or olefin polymer composition (D) are dispersed in an organic medium.

Aqueous Resin Dispersion

First, the aqueous resin dispersion will be described.

In the aqueous resin dispersion, the olefin block copolymer (A-1) or olefin polymer compositions (D) are dispersed in water.

In the olefin block copolymers (A-1) or that contained in the olefin polymer composition (D), used in the aqueous resin dispersion, the $PO^1$ segment desirably has a weight-average molecular weight of usually not less than 2,000, preferably 2,000 to 1,000,000, more preferably 10,000 to 800,000, especially 50,000 to 500,000.

Preferable examples of the $PO^1$ segment are ethylene polymers such as ethylene homopolymer and ethylene/α-olefin copolymer; propylene polymers such as propylene homopolymer and propylene/α-olefin copolymer; butene polymers such as butene homopolymer and butene/ethylene copolymer; and 4-methyl-1-pentene polymers such as 4-methyl-1-pentene homopolymer.

In the olefin block copolymer (A-1) and that contained in the olefin polymer composition (D), used in the aqueous resin dispersion, the $g^1$ linkage is preferably an ether linkage, ester linkage or amide linkage, further preferably ether linkage.

In the olefin block copolymer (A-1) and that contained in the olefin polymer composition (D), used in the aqueous resin dispersion, the $B^1$ segment is a functional segment obtainable by chain polymerization, preferably a functional segment comprising repeating units of an unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment preferably comprise different polymers each other.

The $B^1$ segment has a weight-average molecular weight of usually not less than 500, preferably 500 to 1,000,000, more preferably 2,000 to 800,000, specifically 10,000 to 500,000.

The $B^1$ segment is contained in an amount based on the olefin block copolymer (A-1) of preferably 0.01 to 99.99 wt %, preferably 1 to 99 wt %, more preferably 1 to 95 wt %, specifically 1 to 90 wt %.

The olefin block copolymer (A-1) and that contained in the olefin polymer composition (D), used in the aqueous resin dispersion, have a melt flow rate (MFR as measured in accordance with ASTM D 1238, at 230° C. under a load of 2.16 Kg) of usually 0.01 to 200 g/10 min, preferably 0.05 to 100 g/10 min, more preferably 0.05 to 80 g/10 min.

In viewpoint of good aqueous dispersibility and excellent heat sealing properties with polyolefins, the olefin block copolymer (A-1) and that contained in the olefin polymer composition (D), used in the aqueous resin dispersion desirably comprise:

the $PO^1$ segment which is an ethylene homopolymer, a random copolymer of ethylene and α-olefin having 3 to 20 carbon atoms (α-olefin of 3 to 20 carbon atoms content: less than 10 mol %), propylene homopolymer, propylene/ethylene random copolymer (ethylene content: less than 10 mol %), random copolymer of propylene and α-olefin having 4 to 20 carbon atoms (α-olefin of 4 to 20 carbon atoms content: less than 10 mol %), random copolymer of ethylene and α-olefin having 3 to 20 carbon atoms (ethylene content: 10 to 90 mol %, α-olefin of 3 to 20 carbon atoms content: 90 to 10 mol %) or random copolymer of propylene and α-olefin having 4 or more carbon atoms (propylene content: 10 to 90 mol %, α-olefin of 4 to 20 carbon atoms content: 90 to 10 mol %), and the $B^1$ segment which is a homopolymer of (meth)acrylic acid and derivative thereof such as polymethyl methacrylate, copolymer of at least two monomers selected from (meth) acrylic acid and derivative thereof, polyalkylene glycols of 2 to 4 carbon atoms such as polyethylene glycol or polypropylene glycol, polyvinyl alcohol or polyhydroxyalkyl (meth) acrylates such as poly(2-hydroxyalkyl methacrylate).

More specifically, preferably examples of the olefin block copolymers (A-1) may include:

a block copolymer wherein the $PO^1$ segment is polyethylene (Mw: 2,000 to 1,000,000), the $g^1$ linkage is an ether linkage and the $B^1$ segment is polyethylene glycol (Mw: 500 to 1,000,000), a block copolymer wherein the $PO^1$ segment is polyethylene (Mw: 2,000 to 1,000,000), the $g^1$ linkage is an ether linkage and the $B^1$ segment is poly(2-hydroxyethyl methacrylate (Mw: 500 to 1,000,000), a block copolymer wherein the $PO^1$ segment is polyethylene (Mw: 2,000 to 1,000,000), the $g^1$ linkage is an ether linkage and the $B^1$ segment is polyvinyl alcohol (Mw: 500 to 1,000,000), a block copolymer wherein the $PO^1$ segment is polypropylene (Mw: 2,000 to 1,000,000), the $g^1$ linkage is an ether linkage and the $B^1$ segment is polyethylene glycol (Mw: 500 to 1,000,000), a block copolymer wherein the $PO^1$ segment is an ethylene/butene copolymer (butene content: 0.1 to 30 mol %, Mw: 2,000 to 1,000,000), the $g^1$ linkage is an ether linkage and the $B^1$ segment is polyethylene glycol (Mw: 500 to 1,000,000), a block copolymer wherein the $PO^1$ segment is homopolypropylene (Mw: 2,000 to 1,000,000), the $g^1$ linkage is an ether linkage and the $B^1$ segment is poly(hydroxyethyl acrylate) (Mw: 500 to 1,000,000), a block copolymer wherein the $PO^1$ segment is LLDPE (Mw: 2,000 to 1,000,000), the $g^1$ linkage is an ether linkage and the $B^1$ segment is poly(vinyl pyrrolidone) (Mw: 500 to 1,000,000), and a block copolymer wherein the $PO^1$ segment is an ethylene/octene copolymer (Mw: 2,000 to 1,000,000), the $g^1$ linkage is an ether linkage and the $B^1$ segment is poly(acrylamide) (Mw: 500 to 1,000,000).

Using the olefin block copolymers (A-1) or the olefin polymer compositions (D), as described in the above, dispersions having a smaller dispersion particle diameter and a narrower particle size distribution can be prepared as compared with using conventionally known modified polyolefins prepared by modifying polyolefins with a polar monomer.

The aqueous resin dispersions of the invention comprise the olefin block copolymers (A-1) or the olefin polymer compositions (D), dispersed in water.

The aqueous resin dispersions of the invention may optionally contain a modified polyolefin and/or a surfactant within the limit of not missing the object of the invention.

(Modified Polyolefins)

The modified polyolefins are prepared by graft modifying polymers prepared from α-olefins of 2 to 20 carbon atoms with an ethylenically unsaturated carboxylic acid compound.

The polyolefins (raw material polyolefins), which are raw materials for the modified polyolefins, have a viscosity average molecular weight of generally from 1,000 to 50,000, preferably 2,000 to 30,000, more preferably 5,000 to 10,000. Further, the polyolefins have a melt viscosity measured at 180° C. of generally 10 to 5,000 cps, preferably 20 to 2,000 cps, more preferably 30 to 1,000 cps in order to attain good emulsification.

Such raw material polyolefins can be prepared by conventionally known various methods. Example thereof may include a method that α-olefins are polymerized using the above-described transition metal catalysts such as metallocene catalyst, to have the prescribed molecular weight and a method that polyolefins having a high molecular weight are polymerized by using the transition metal catalysts and degraded with heating.

The ethylenically unsaturated carboxylic acid compounds used in graft modifying the raw material polyolefins may include compounds having an ethylenically unsaturated bonding in molecule, and having a carboxylic acid and carboxylic anhydride, and derivatives of the compounds.

Examples thereof may include:

ethylenically unsaturated carboxylic acids such as acrylic acid, methacrylic acid, α-ethyl acrylic acid, maleic acid, fumaric acid, itaconic acid, sitraconic acid, tetrahydrophthalic acid, methyl tetrahydrophthalic acid, endocis-bicyclo[2,2,1]hepto-5-ene-2,3-dicarboxylic acid (nadic acid™) or methyl-endocis-bicyclo[2,2,1]hepto-5-ene-2,3-dicarboxylic acid (methyl nadic acid™), and ethylenically unsaturated carboxylic acid derivatives such as acid halide, amide, imide, acid anhydride or ester thereof. Examples of the ethylenically unsaturated carboxylic acid derivatives may include malenyl chloride, maleimide, maleic anhydride, citraconic anhydride, maleic acid monomethyl and maleic acid dimethyl.

Of these, preferred are acrylic acid, methacrylic acid, maleic anhydride, methylacrylate, ethyl acrylate, methyl methacrylate and ethyl methacrylate.

These ethylenically unsaturated carboxylic acid compounds may be used singly or in combination with two or more, and further, may be used in combination with other monomers within the limit of not missing the effect of the invention.

Examples of the monomers used in combination with the ethylenically unsaturated carboxylic acid compounds may include:

amino group-containing ethylenically unsaturated compounds such as dimethylamino ethylacrylate, acrylamine, aminoethyl methacrylate, dimethylaminoethyl methacrylate, aminopropyl methacrylate, N,N-dimethyl aminopropylacryl amide, or aminostyrene;

hydroxy group-containing ethylenically unsaturated compounds such as 2-hydroxyethyl acrylate, 2-hydroxypropyl acrylate, 2-hydroxyethyl methacrylate or allyl alcohol; and styrene hydrocarbon compounds such as styrene, α-methyl styrene, o-methyl styrene, m-methyl styrene, p-methyl styrene, m-ethyl styrene, p-ethyl styrene, o-isopropyl styrene, m-isopropyl styrene or p-isopropyl styrene.

The proportion of the ethylenically unsaturated carboxylic acid compounds contained in all the graft monomer components is preferably not less than 50.

The preparation of the modified polyolefins can be carried out in accordance with known processes, for example, the process as described in JP-B-52-22988/1977.

Specifically, the raw material polyolefin is molten with heat at a temperature higher than the softening point thereof, and the ethylenically unsaturated carboxylic acid compound and a peroxide are simultaneously added dropwise to it successively with stirring to perform graft polymerization.

The modified polyolefins have a viscosity average molecular weight of generally 1,000 to 50,000, preferably 2,000 to 20,000, more preferably 5,000 to 10,000.

The amount of the ethylenically unsaturated carboxylic acid compound units contained in the modified polyolefins is generally $1.0 \times 10^{-3}$ to 0.2 equivalent mole, preferably $5.0 \times 10^{-3}$ to 0.15 equivalent mole, more preferably 0.01 to 0.1 equivalent mole, per 100 g of the modified polyolefins.

The modified polyolefins may be used singly or in combination with two more kinds.

(Surfactant)

Examples of the surfactants may include:

sulfonic acid or carbonic acid type anionic surfactants such as alkyl naphthalene sulfonate, Na salt of naphthalene sulfonic acid formaldehyde condensate, Na salt of cresol/schaffer acid formaldehyde condensate, Na salt of alkyl diphenyl ether disulfonic acid, Ca salt of lignin sulfonic acid, Na salt of melanin resin sulfonic acid, special polyacrylate, gluconic acid salt, olefin/maleate copolymer, Na salt of carboxymethyl cellulose, metallic soaps(Zn, Al, Na or K salt), K salt of oleic acid (potassium oleate), Na salt of oleic acid (sodium oleate), K salt of stearic acid (potassium stearate), Na salt of stearic acid (sodium stearate), K salt of beef tallow acid, Na salt of beef tallow acid or triethanol amine strearate;

nonionic surfactants such as fatty acid monoglyceride, sorbitan fatty acid ester, sugar fatty acid partial ester, polyglycerin fatty acid partial ester, polyoxy ethylene alkylether, polyoxyethylene alkylphenyl ether, polyoxy ethylene sorbitan fatty acid partial ester, polyoxyethylene sorbitol fatty acid partial ester, polyoxy ethylene glycerin fatty acid partial ester, polyoxyethylene fatty amine, polyoxy ethylene (hardened)castor oil, polyoxy ethylene glycohol fatty acid ester, polyoxyethylene polyoxy propylene/block polymer, hydroxyethyl cellulose, polyvinyl alcohol, polyvinyl pyrrolidone or methyl cellulose;

cationic surfactants such as alkylammonium chloride, trimethylalkyl ammonium bromide or alkylpyridinium chloride; and ampholytic surfactants such as dimethylalkyl betaine and alkyl glycine.

Of these, it is preferred to use the anionic surfactants, more preferably, higher fatty acids, further preferably saturated or unsaturated higher fatty acid salts of 10 to 20 carbon atoms, specifically alkali metal salts because of preparing the more stable aqueous resin dispersions.

Examples of the alkali metal salts may include capric acid, undecanoic acid, lauric acid, myristic acid, palmitic acid, margaric acid, stearic acid, arachic acid, linderic acid, tsuzuic acid, petroselinic acid, oleic acid, linolic acid, linoleic acid, arachidonic acid and beef tallow acid.

The above surfactants can be used singly or in combination with two or more.

(Process for Preparing Aqueous Resin Dispersions)

For example, the aqueous resin dispersions of the invention can be prepared by dispersing, in an aqueous disperse medium, the olefin block copolymer (A-1) or the olefin polymer composition (D), and optionally the modified polyolefin, the surfactants and various compounding agents.

Examples of the process are the following processes (1) and (2).

(1) A process that the olefin block copolymer (A-1) or the olefin polymer composition (D) is dissolved in an organic medium such as toluene and xylene to have a concentration of 10 to 50 wt %, are added to water together with an hydrophilic medium such as methyl alcohol, ethyl alcohol or isopropyl alcohol, and an emulsifier, and stirred with a homo-mixer, etc to prepare an emulsified product and subsequently the organic medium and the emulsifier are removed with an evaporator, etc.

(2) A process of a step of melt kneading the olefin block copolymer (A-1) or the olefin polymer composition (D) and thereafter adding water to the resulting kneadate so as to knead the resin in a molten state with water, and a step, if the modified polyolefin is un-neutralized, of simultaneously or successively adding a basic substance thereto.

Of these, it is preferred to prepare the aqueous resin dispersions by the process (2).

The process (2) will be described in more detail in below. First, the olefin block copolymers (A-1) or the olefin polymer compositions (D) are melt kneaded. The temperature in the melt kneading is not lower than the melting point of the olefin block copolymers (A-1) or not lower than the highest melting point of resins contained in the olefin polymer composition (D), preferably not lower than temperature such that the melt viscosity is $10^5$ poise or less.

Next, water is added to the melt kneadate, and the resins in a molten state and water are kneaded so that the resin solid components are dispersed particles. In the case of using un-neutralized and/or un-saponificated modified polyolefins, a basic substance can be added for the sake of neutralization thereof in this step.

Examples of the basic substance are substances for acting as a base in water such as alkali metals, alkali earth metals, ammonia or amine; alkali metal oxides, hydroxides, weak acid salts or hydrogenated products; substances for acting as a base in water such as alkali earth metal oxides, hydroxides, weak acid salts, hydrogenated products; and alkoxides of these metals. These substances are exemplified in below.

Examples of alkali metals are sodium and potassium.

Examples of alkali earth metals are calcium, strontium and barium.

Examples of amines are inorganic amines such as hydroxy amine or hydrazine, methyl amine, ethyl amine, ethanol amine and cyclohexyl amine.

Examples of alkali metal and alkali earth metal oxides, hydroxides, hydrogenated products are sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydrogenated, potassium hydrogenated and calcium hydrogenated.

Examples of alkali metal and alkali earth metal weak acid salts are sodium carbonate, potassium carbonate, sodium hydrocarbon, potassium hydrocarbon, calcium hydrocarbon, sodium acetate, potassium acetate and calcium acetate.

Examples of ammonia and amine compounds are quaternary ammonium compounds such as ammonium hydroxide and tetra-methyl ammonium hydroxide.

The basic substances may be added as they are, preferably in an aqueous state.

The step of making the resin solid components into dispersed particles and the step of neutralizing un-neutralized and/or un-saponificated modified polyolefin may be carried out successively or simultaneously.

The melt kneading means may be any of conventionally known methods, for example, suitably, kneader, Banbury mixer and multi-screw extruder.

The molten resin-dispersed aqueous dispersions prepared by melt kneading with successive addition of water are cooled to room temperature naturally or forcedly. In this cooling, the dispersed particles solidify to become stable aqueous resin dispersions.

In the preparation of the aqueous resin dispersions of the invention, of course, use made of various assistant materials usable for usual aqueous resin dispersions, for example, stabilizers, wetting agents, foaming agents, anti-foam agents, coagulating agents, gelatinizing agents, anti-aging agents, plasticizers, fillers, colorants, re-odorants, surface tack eliminators and release agents.

The dispersed particles contained in the aqueous resin dispersion of the invention thus prepared are usually spherical, but they are not always necessary to be spherical.

The average particle diameter of the dispersed particles is not particularly limited, usually from 1 to 20 µm, preferably 5 to 15 µm. Further, the particle concentration in the aqueous resin dispersions (solid component concentration) is not particularly limited, usually, from 5 to 40 wt %.

(Use)

The aqueous resin dispersions of the invention are suitable for bonding to polyolefins such as polyethylene, polypropylene, etc, which bonding has been difficult conventionally, and effective in bonding between polyolefins each other or between polyolefins and other materials.

Examples of the other materials may include any one of cloth, fibers, plastics, papers and metals.

Examples of cloth or fibers are natural fibers such as cotton and linen; inorganic fibers such as glass fiber, carbon fiber, asbestos fiber and metal fiber; regenerated fibers such as viscose rayon and cupra; semi-synthetic fibers such as di- or triacetate fibers; nylon-6, nylon-66, and polyester (polyethylene terephthalate) fiber; aromatic polyamide fiber, acrylic fiber, polyvinyl chloride fiber, polyolefin fiber, and in-solubilized or sparingly solubilized polyvinyl alcohol fibers. When the fibers are short, they are applicable for bonding by flocking.

Examples of plastics are, in addition to polyolefins, polyvinyl chloride, ABS, polyester, polyamide, polycarbonate, epoxy resin and the like, and the shapes thereof applicable for bonding are sheet, film and other molded articles.

The aqueous resin dispersions of the invention are applied on the adherend surface in the same manner as conventional aqueous dispersion adhesives, and optionally dried with heat to perform bonding thereof.

The aqueous resin dispersions of the invention can act as an adhesive of excellent adhesive strength for polyolefins.

Oily Resin Dispersions

Next, the oily resin dispersions are described.

The oily resin dispersions of the invention comprise the olefin block copolymer (A-1) or the olefin polymer composition (D), which is dispersed in an organic medium.

In the olefin block copolymer (A-1) and that contained in the olefin polymer composition (D), which are used for the oily resin dispersions, the $PO^1$ segment desirably has a weight-average molecular weight of usually not less than 2,000, preferably 2,000 to 1,000,000, more preferably 10,000 to 800,000, especially 50,000 to 500,000.

Preferable examples of the $PO^1$ segment are ethylene polymers such as ethylene homopolymer and ethylene/α-olefin copolymer; propylene polymers such as propylene homopolymer and propylene/α-olefin copolymer; butene polymers such as butene homopolymer and butene/ethylene copolymer; and 4-methyl-1-pentene polymers such as 4-methyl-1-pentene homopolymer.

In the olefin block copolymer (A-1) and that contained in the olefin polymer composition (D), which are used for the oily resin dispersions, the $g^1$ linkage is preferably an ether linkage, ester linkage or amide linkage, further preferably ether linkage.

In the olefin block copolymer (A-1) and that contained in the olefin polymer composition (D), which are used for the oily resin dispersions, the $B^1$ segment is a segment obtainable by chain polymerization, preferably a functional segment comprising repeating units of an unsaturated hydrocarbon and/or repeating units of a hetero atom, more preferably a functional segment obtainable by radical polymerization, ring opening polymerization or ionic polymerization, specifically, a functional segment obtainable by radical polymerization or ring opening polymerization.

Examples of the functional segment may include the same as in the above. The $PO^1$ segment and the $B^1$ segment each preferably comprise different polymers.

The $B^1$ segment has a weight-average molecular weight of usually not less than 500, preferably 500 to 1,000,000, more preferably 2,000 to 800,000, specifically 10,000 to 500,000.

The $B^1$ segment is contained in an amount based on the olefin block copolymer (A-1) of preferably 0.01 to 99.99 wt %, preferably 1 to 99 wt %, more preferably 1 to 95 wt %, specifically 1 to 90 wt %.

The olefin block copolymer (A-1) and that contained in the olefin polymer composition (D), which are used for the oily resin dispersions, desirably have a melt flow rate (MFR as measured in accordance with ASTM D 1238, at 230° C. under a load of 2.16 Kg) of usually 0.01 to 200 g/10 min, preferably 0.05 to 100 g/10 min, more preferably 0.05 to 80 g/10 min.

In the olefin block copolymer (A-1) and that contained in the olefin polymer composition (D), used in the oily resin dispersion, in view of good dispersibility to solvents and excellent heat seal properties with polyolefins, the $PO^1$ segment is preferably an ethylene homopolymer, a random copolymer of ethylene and α-olefin of 3 to 20 carbon atoms (α-olefin of 3 to 20 carbon atoms content: less than 10 mol %), propylene homopolymer, propylene/ethylene random copolymer (ethylene content: less than 10 mol %), a random copolymer of propylene and α-olefin of 4 to 20 carbon atoms (α-olefin of 4 to 20 carbon atoms content: less than 10 mol %), a random copolymer of ethylene and α-olefin of 3 to 20 carbon atoms (ethylene content: 10 to 90 mol %, α-olefin of 3 to 20 carbon atoms content: 90 to 10 mol %) or a random copolymer of propylene and α-olefin of 4 or more carbon atoms (propylene content: 10 to 90 mol %, α-olefin of 4 to 20 carbon atoms content: 90 to 10 mol %), and the $B^1$ segment is preferably a homopolymer of (meth) acrylic acids and derivatives thereof such as polymethyl methacrylate, a copolymer of two or more monomers selected from (meth)acrylic acids and derivatives thereof, polyalkylene glycols of 2 to 4 carbon atoms such as polyethylene glycol, polypropylene glycol and polyvinyl alcohol, or polyhydroxy alkyl(meth)acrylates such as poly(2-hydroxyalkylmethacrylate).

In the olefin block copolymer (A-1) and that contained in the olefin polymer composition (D), used in the oily resin dispersion, in view of stable dispersibility and good heat seal properties, the $PO^1$ segment is preferably an ethylene homopolymer, a random copolymer of ethylene and α-olefin of 3 to 20 carbon atoms (α-olefin of 3 to 20 carbon atoms content: less than 10 mol %), a propylene homopolymer, a propylene/ethylene random copolymer (ethylene content: less than 10 mol %), a random copolymer of propylene and α-olefin of 4 to 20 carbon atoms (α-olefin of 4 to 20 carbon atoms content: less than 10 mol %), a random copolymer of ethylene and α-olefin of 3 to 20 carbon atoms (ethylene content: 10 to 90 mol %, α-olefin of 3 to 20 carbon atoms content: 90 to 10 mol %) or a random copolymer of propylene and α-olefin of 4 or more carbon atoms (propylene content: 10 to 90 mol %, α-olefin of 4 to 20 carbon atoms content: 90 to 10 mol %), and the $B^1$ segment is preferably a homopolymer of (meth) acrylic acids and derivatives thereof such as polymethyl methacrylate, a copolymer of two or more monomers selected from (meth)acrylic acids and derivatives thereof or polycyclic esters such as polycaprolactone.

More specifically, preferable examples of the olefin block copolymers (A-1) may include:

a block copolymer wherein the $PO^1$ segment is polypropylene (Mw: 2,000 to 1,000,000), the $g^1$ linkage is an ether linkage and the $B^1$ segment is poly(2-hydroxyethylmethacrylate) (Mw: 500 to 1,000,000), a block copolymer wherein the $PO^1$ segment is polypropylene(Mw: 2,000 to 1,000,000), the $g^1$ linkage is an ether linkage and the $B^1$ segment is polyethylene glycol (Mw: 500 to 1,000,000), a block copolymer wherein the $PO^1$ segment is an ethylene/butene copolymer(butene content: 0.1 to 30 mol %, Mw: 2,000 to 1,000,000), the $g^1$ linkage is an ether linkage and the $B^1$ segment is polycaprolactone (Mw: 500 to 1,000,000), a block copolymer wherein the $PO^1$ is an ethylene/octene copolymer (octene content: 0.1 to 30 mol %, Mw: 2,000 to 1,000,000), the $g^1$ linkage is an ether linkage and the $B^1$ segment is polycaprolactone (Mw: 500 to 1,000,000), a block copolymer wherein the $PO^1$ segment is an ethylene/octene copolymer (octene content: 0.1 to 30 mol %, Mw: 2,000 to 1,000,000), the $g^1$ linkage is an ether linkage and the $B^1$ segment is polymethyl methacrylate (Mw: 500 to 1,000,000), a block copolymer wherein the $PO^1$ segment is an ethylene/octene copolymer(octene content: 0.1 to 30 mol %, Mw: 2,000 to 1,000,000), the $g^1$ linkage is an ether linkage and the $B^1$ segment is polycaprolactone (Mw: 500 to 1,000,000), and a block copolymer wherein the $PO^1$ segment is an ethylene/octene copolymer (octene content: 0.1 to 30 mol %, Mw: 2,000 to 1,000,000), the $g^1$ linkage is an ether linkage and the $B^1$ segment is a styrene/maleic anhydride copolymer (Mw: 500 to 1,000,000).

When the olefin block copolymer (A-1) or that contained in the olefin polymer composition (D) is used in the oily resin dispersion, the resulting dispersion has excellent dispersibility to an organic medium and when it is used as a primer for propylene coating, it has excellent adhesion with coatings, as compared with using modified polyolefins prepared by modifying known polyolefins with a polar monomer.

The oily resin dispersion of the invention comprises the olefin block copolymer (A-1) or the olefin polymer composition (D) in a solid state dispersed in an organic medium.

The organic medium is a good solvent to polyolefins and examples thereof may include aromatic hydrocarbons such as benzene, toluene or xylene; aliphatic hydrocarbons such as hexane, heptane, octane or decane; alycyclic hydrocarbons such as cyclohexane, cyclohexene or methylcyclohexane; aliphatic alcohol such as ethanol or isopropanol; ketone solvents such as acetone, methyl isobutyl ketone or methyl ethyl ketone; halogenated hydrocarbons such as trichloroethylene, dichloroethylene or chlorobenzene.

Further, the organic medium is a poor solvent to polyolefins, and may include, for example, alcohols, ketones, ethers, esters or cellosolves.

Specific examples thereof may include methanol, ethanol, propanol, butanol, pentanol, hexanol, propanediol, phenol, diethyl ether, dipropyl ether, dibutyl ether, anisole, dioxane, tetrahydrofurane, acetone, methyl ethyl ketone, methylisobutyl ketone, pentanone, hexanone, isophorone, acetophenone, acetic anhydride, acetic methyl, acetic ethyl, acetic butyl, methyl propionate, butyl formate, ethyl cellosolve and methyl cellosolve.

These may be used singly or in combination with two or more, particularly the combined use of the good solvent and poor solvent is preferred from the standpoint of low temperature fluidity and dispersion stability in the oily resin dispersion. The proportion of the good solvent and the poor solvent is not limited particularly.

The oily resin dispersion of the invention may be optionally blended with known pigments, fillers, stabilizers and other compounding agents within the limit of not missing the object of the invention.

(Preparation of Oily Resin Dispersion)

For preparing the oily resin dispersion of the invention, for example, the olefin block copolymer (A-1) or the olefin polymer composition (D) is mixed with the above organic medium and dissolved with heat completely. The temperature in the dissolution is usually from 100° C. to 150° C.

Then, the resulting solution is cooled to deposit the olefin block copolymer (A-1) or the olefin polymer composition (D). For this deposition, the composition of the organic medium is set previously so that they are deposited at a temperature of 60 to 100° C., and it is preferred to regulate the average cooling rate to from 1 to 20° C./hour, preferably 2 to 10° C./hour.

Further, the olefin block copolymer (A-1) or the olefin polymer composition (D) may be dissolved in the organic medium comprising only the good solvent, and after the deposition, the poor solvent may be added thereto to further deposit them.

The dispersed particles contained in the oily resin dispersion of the invention thus prepared are generally spherical, but they are not always necessary to be spherical.

The dispersed particles have an average particle diameter, which is not particularly limited, of usually 1 to 20 μm, preferably 5 to 15 μm. The particle concentration of the resin dispersion (solid component concentration), which is not particularly limited, is usually from 5 to 40 wt %.

(Use)

The oily resin dispersions of the invention have excellent bond performance as adhesives or heat-sealing agents suitable for metals to metals, polyolefins to polyolefins, or metals and polyolefins so that they are effectively used to adhesives for PTP packaging of medicine, adhesives for lamination, and raw materials and primers for coatings.

The oily resin dispersion of the invention have excellent dispersion stability to the organic mediums and excellent adhesion in bonding between polyolefins and metals or polar resins.

EXAMPLES

The present invention is described in detail with reference to the following examples, but it should be construed that the invention is in no way limited to those examples.

Example 1

[Preparation of Catalyst Solution]

10.0 mg of bis(1,3-dimethylcyclopentadienyl)zirconium dichloride was weighed and placed in a glass flask purged thoroughly with nitrogen, and a toluene solution of 17.2 mmol in terms of aluminum atom of methylaluminoxane was added thereto. The solution was sonicated at 23° C. for 15 min. An appropriate amount of toluene was added to the solution, and a total amount of 50 ml of the solution was obtained. This solution was used as a catalyst solution.

[Copolymerization of Ethylene/Norbornene]

In a nitrogen atmosphere at room temperature, 600 ml of a cyclohexane solution containing 20 g of norbornene was placed in a 1-liter stainless steel autoclave purged thoroughly with nitrogen. 0.6 mmol of triisobutylaluminum was added to the autoclave, and nitrogen in the autoclave was replaced with ethylene. The inside of the autoclave was pressurized with ethylene, and then the temperature in the autoclave was raised so that the temperature and the pressure in the autoclave were 70° C. and 0.7 MPa, respectively. 12.8 ml of the prepared catalyst solution was forced into the autoclave with pressurized nitrogen to initiate the polymerization. Thereafter, with supplying only ethylene, the polymerization was conducted at a pressure of 0.7 MPa and a temperature of 70° C. for 5 min. After 5 min from the initiation of the polymerization, 5 ml of isopropanol (IPA) was forced into the autoclave with pressurized nitrogen to terminate the polymerization.

After decompression, the polymer solution was taken out. With vigorously agitating by a homomixer, the polymer solution was brought into contact with an aqueous solution prepared by adding 5 ml of concentrated hydrochloric acid based on 1 liter of water at a ratio of 1 to 1, and the catalyst residue was passed into the water phase. The contacted mixed solution was allowed to stand still, and then the water phase was removed with separation. The polymer solution was washed twice with water to purify the same, and the phase of the polymer solution was separated.

The purified and separated polymer solution was allowed to contact with acetone, which was three times as much as the polymer solution, with vigorously agitating. After the precipitation of the copolymer, the solid product (copolymer) was collected by filtration and was thoroughly washed with acetone. To extract unreacted norbornene remaining in the polymer, the solid product was put in acetone so as to be a concentration of 40 g/liter, and the extraction was conducted at 60° C. for 2 hr. After the extraction, the solid product was collected by filtration and was dried under reduced pressure in flowing nitrogen at 130° C. and 350 mmHg for 12 hr.

The yield of the obtained ethylene/norbornene copolymer (referred to as P(Et/NBR)) was 25.7 g. Thus, the catalytic activity was 41.8 kg/mmol-Zr·hr. As a result of IR analysis, the norbornene content was 8.5 mol %, and it was confirmed that there was an unsaturated bond in the terminal position of the polymer molecule. According to the measurement by gel permeation chromatography (GPC), the weight-average molecular weight (referred to as Mw) was 140,000.

[Hydroboration]

In a dry box filled with argon, 20 g of the ethylene/norbornene copolymer, which had an unsaturated bond in the terminal position, was suspended in 100 ml of degassed and dried tetrahydrofuran (THF), and the suspension was placed in a glass flask with a magnetic stirrer. 2.3 ml of a THF solution of 9-borabicyclo [3.3.1]nonane (referred to as 9-BBN) (0.5 M) was added to the suspension. In the dry box, the slurry was stirred at 55° C. for 5 hr and then was filtered. The filter cake was washed with degassed and dried IPA and was dried under reduced pressure, and an ethylene/norbornene copolymer having boron in the terminal position (referred to as P(Et/NBR)-B) was obtained.

[Polymerization of Styrene]

20 g of the copolymer of P(Et/NBR)-B was placed in a sealed flask and was suspended by the addition of 11.4 g of dried styrene (referred to as St) and 80 ml of THF. 1.5 ml of dried oxygen was blown through to initiate the reaction, followed by stirring at room temperature for 135 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of (ethylene/norbornene copolymer)-O-polystyrene (referred to as P(Et/NBR)-O-PSt).

The weight-average molecular weight ($Mw_2$) of the polystyrene (referred to as PSt) moiety, which was estimated according to the following equation, was 50,000.

$$Mw_2 = Mw_1 \cdot (W_2 - W_1)/W_1$$

wherein:

$Mw_1$ is a weight-average molecular weight of the P(Et/NBR) moiety, $Mw_2$ is a weight-average molecular weight of the PSt moiety, $W_1$ is an amount of the copolymer of P(Et/NBR)-B used in the polymerization of styrene, and $W_2$ is an yield of the diblock copolymer.

The prepared diblock copolymer had a melt flow rate (MFR, measured at 230° C.) of 0.5 g/10 min and a molecular distribution (Mw/Mn) of 2.2.

Example 2

[Copolymerization of Ethylene/Propylene/Triene]

In a nitrogen atmosphere at room temperature, 651 ml of purified heptane, 24 ml of 4,8-dimethyl-1,4,8-decatriene (referred to as DMDT), a heptane solution of 0.75 mmol in terms of aluminum atom of triisobutylaluminum and a toluene solution of 0.021 mmol in terms of boron atom of triphenylcarbeniumtetrakis (pentafluorophenyl)borate were placed in a 2-liter stainless steel autoclave purged thoroughly with nitrogen. After the addition of 9 liters of propylene, the temperature in the autoclave was raised. When the temperature went up to 60° C., the inside of the autoclave was pressurized to 0.9 MPa by supplying ethylene. When the temperature and the pressure in the autoclave went up to 70° C. and 0.9 MPa, respectively, a toluene solution of 0.00105 mmol in terms of titanium atom of [(N-t-butylamido)(tetramethyl-$\eta^5$-cyclopentadienyl)dimethylsilane]titanium dichloride was forced into the autoclave with pressurized nitrogen to initiate the polymerization. The polymerization was conducted for 30 min with maintaining at a pressure of 0.9 MPa and a temperature of 70° C. After 30 min from the initiation of the polymerization, 50 ml of methanol was added to terminate the polymerization. After cooling and decompression, the polymer solution was taken out. The polymer solution was poured into about 3 liters of methanol to precipitate the polymer. The polymer was cut by a mixer and then was washed with about 2 liters of methanol by a mixer. The polymer was dried under reduced pressure in flowing nitrogen at 100° C. and 400 mmHg for 12 hr.

The yield of the obtained ethylene/propylene/triene copolymer (referred to as EPT) was 31.6 g. Thus, the catalytic activity was 60.2 kg/mmol-Ti·hr. As a result of IR analysis, the contents of ethylene, propylene and DMDT were 69 mol %, 28 mol % and 3 mol %, respectively. According to the measurement by GPC, Mw was 180,200.

[Hydroboration]

In a dry box filled with argon, 20 g of the copolymer of EPT was suspended in 100 ml of degassed and dried THF, and the suspension was placed in a glass flask with a magnetic stirrer. 1.8 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and a copolymer of EPT having boron in the terminal position (referred to as EPT-B) was obtained.

[Copolymerization of Styrene/Vinylpyridine]

20 g of the copolymer of EPT-B was placed in a sealed flask and was suspended by the addition of 8.9 g of dried styrene (St), 0.9 g of dried vinylpyridine (referred to as VPy) and 80 ml of THF. 1.1 ml of dried oxygen was blown through to initiate the reaction, followed by stirring at room temperature for 30 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of EPT-O-(styrene/vinylpyridine copolymer) (referred to as EPT-O-P(St/VPy)).

The weight-average molecular weight ($Mw_2$) of the styrene/vinylpyridine copolymer (referred to as P(St/VPy)) moiety, which was estimated according to the following equation, was 10,000.

$$Mw_2 = Mw_1 \cdot (W_2 - W_1)/W_1$$

wherein:

$Mw_1$ is a weight-average molecular weight of the EPT moiety, $Mw_2$ is a weight-average molecular weight of the P(St/VPy) moiety, $W_1$ is an amount of the copolymer of EPT-B used in the copolymerization of styrene/vinylpyridine, and $W_2$ is an yield of the diblock copolymer.

Example 3

[Polymerization of Olefin]

1 liter of purified 4-methyl-1-pentene (referred to as 4MP-1) was placed in a 2-liter stainless steel autoclave purged thoroughly with nitrogen, and nitrogen in the autoclave was replaced with ethylene. A toluene solution of 5.0 mmol-Al in terms of aluminum atom of methylaluminoxane was added. The temperature in the autoclave was raised to 40° C., and $5.0 \times 10^{-4}$ mmol-Zr in terms of zirconium atom of biscyclopentadienylzirconium dichloride was added. Ethylene was fed to initiate the polymerization at a pressure of 0.8 MPa. Thereafter, with supplying only ethylene, the polymerization was conducted at a pressure of 0.8 MPa and a temperature of 45° C. for 1 hr.

After completion of the polymerization, a small amount of methanol was added to the obtained slurry, and then the total amount of the slurry was poured into 4 liters of methanol. The precipitated polymer was filtered off and was dried at 80° C. overnight. The yield of the obtained polymer was 54 g. The catalytic activity based on zirconium atom was 108 kg/mmol-Zr. The obtained polymer had MFR of 1.73 g/10 min and Mw of 78,000. As a result of IR analysis, the content of 4MP-1 was 8 mol %, and it was confirmed that there was an unsaturated bond in the terminal position of the polymer molecule.

[Hydroboration]

In a dry box filled with argon, 8.5 g of the ethylene/4MP-1 copolymer, which had an unsaturated bond in the terminal position, was suspended in 100 ml of degassed and dried THF, and the suspension was placed in a glass flask with a magnetic stirrer. 1.8 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and an ethylene/4MP-1 copolymer having boron in the terminal position (referred to as P(Et/4MP-1)-B) was obtained.

[Polymerization of Methylmethacrylate]

8.5 g of the copolymer of P(Et/4MP-1)-B was placed in a sealed flask and was suspended by the addition of 8.4 g of dried methylmethacrylate (referred to as MMA) and 80 ml of THF. 1.1 ml of dried oxygen was blown through to initiate the reaction, followed by stirring at room temperature for 4 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of (ethylene/4MP-1 copolymer)-O-polymethylmethacrylate (referred to as P(Et/4MP-1)-O-PMMA).

The weight-average molecular weight ($Mw_2$) of the polymethylmethacrylate (referred to as PMMA) moiety, which was estimated according to the following equation, was 11,000.

$$Mw_2 = Mw_1 \cdot (W_2 - W_1)/W_1$$

wherein:

$Mw_1$ is a weight-average molecular weight of the P(Et/4MP-1) moiety, $Mw_2$ is a weight-average molecular weight of the PMMA moiety, $W_1$ is an amount of the copolymer of P(Et/4MP-1)-B used in the polymerization of MMA, and $W_2$ is an yield of the diblock copolymer.

Example 4

The diblock copolymer (P(Et/NBR)-O-PSt) obtained in Example 1 was molded by press molding or tube extrusion into specimens at 200° C. The various properties were measured by the use of the specimens as follows. The results are shown in Table 1.

Hardness (JIS A)

The hardness (JIS A) was measured in accordance with JIS K7215.

Tensile Strength

The tensile strength was measured at a span of 20 mm, a tensile speed of 500 mm/min and a temperature of 23° C. by the use of JIS No. 3 dumbbell shape in accordance with JIS K6251.

Adhesion Testing

Adhesion testing was conducted in accordance with JIS K6256.

Thermomechanical Analysis (TMA, Penetration Temperature: Heat Resistance)

The penetration temperature was measured by the use of a penetrator of 1.8 mm in diameter under the conditions of a load of 2 kg/cm² and a temperature rise rate of 5° C./min.

Surface Hardness (Shore Hardness A)

The Shore hardness A was measured in accordance with ASTM D676.

Mar Resistance (Martens Hardness)

The press molded specimen was marred by a diamond indenter with a load of 20 g. The scratch width was measured, and the Martens hardness was determined by a reciprocal of the scratch width.

Repeated Impulse

An inner conductor layer comprising a single-wire of 1 mm in diameter was sheathed with an insulating layer (1.5 mm thick) of the testing copolymer. With respect to the cable, lightening impulse test (impressed a voltage of 100 kV at a 5 min interval) was conducted.

Dielectric Breakdown Voltage

The breakdown voltage was measured by the use of the pressed sheet 1 mm thick at 25° C. in accordance with ASTM D149.

Comparative Example 1

The various properties were measured in the same manner as in Example 4, except that an ethylene/butene copolymer (ethylene content: 88 mol %; density: 885 kg/m$^3$; Mw: 155,000; and Mw/Mn: 1.87) was used. The results are shown in Table 1.

TABLE 1

|  | Example 4 | Comp. Ex. 1 |
| --- | --- | --- |
| Sample | P(Et/NBR)-O-PSt diblock copolymer | ethylene/butene copolymer |
| TMA (° C.) | 110 | 80 |
| Shore hardness | 73 | 88 |
| Martens hardness (1/mm) | 19 | 9 |
| Repeated impulse (ratio of the breakdown frequency) | 9 | 3 |
| Dielectric breakdown voltage (kV/mm) | 62 | 58 |

The sample in Example 4 was excellent in heat resistance, flexibility, mar resistance, repeated impulse and dielectric breakdown voltage.

Example 5

30 parts by weight of the diblock copolymer (EPT-O-P (St/VPy)) prepared in Example 2, 70 parts by weight of a styrene/butadiene random copolymer (trade name: Nipol 1502, available from Zeon Corp.), 3 parts by weight of two kinds of zinc oxides, 1 part by weight by stearic acid, 50 parts by weight of HAF carbon black (trade name: SEAST #3, available from Tokai Carbon Co., LTD.), 1.5 parts by weight of N-cyclohexyl-2-benzothiazyl sulfenamide (trade name: Sanceler CM, available from Sanshin Chemical Industry) and 1.75 parts by weight of sulfur were kneaded by an open roll having a roll diameter of 6 inches (F/B=50° C./50° C.) to obtain an unvulcanized rubber sheet. The sheet was vulcanized by press curing at 160° C. for 20 min.

The hardness (JIS A) of the composition was 72. The tensile strength and elongation at break of the composition were 23.1 MPa and 390%, respectively.

The adhesive (trade name: Chemlok607, available from Load Corp.) was applied to a surface of a sheet, 0.5 mm thick and 25 mm wide, comprising nylon 12 (trade name: DAIAMID L2101, available from Daicel Chemical Industries, Ltd.). The adhesive was dried at ordinary temperature and was bonded to the unvulcanized rubber sheet as described above by press curing at 160° C. for 20 min. The adhesive properties of the adhesive-bonded specimen were evaluated with the result of breakage of the base material of the rubber.

Example 6

A press molded piece 3 mm or 1 mm thick was prepared by the use of the diblock copolymer (P(Et/4MP-1)-O-PMMA) obtained in Example 3. The Martens hardness was measured by the use of the piece 3 mm thick, and tensile test was conducted by the use of the piece 1 mm thick.

The Martens hardness was 13.5/ mm, the Young's modulus determined by the tensile test was 170 MPa, and the tensile elongation at break was 950%.

To evaluate the coating properties, a pressed sheet 2 mm thick was used. The surface of the sheet was washed with a dishwashing detergent (available from Kao Corp., trade name: Mama-Lemon). After washing with water and drying at 80° C. for 10 min, a primer (available from Nippon Bee Chemical Co., Ltd., trade name: RB150) was applied in a thickness of 10 μm on the sheet and was dried at 80° C. for 10 min. Thereafter, two-pack urethane metallic (available from Nippon Bee Chemical Co., Ltd., trade name: R212) was applied in a thickness of about 20 μm, and two-pack urethane clear (available from Nippon Bee Chemical Co., Ltd., trade name: R213) was further applied in a thickness of about 50 μm. The sheet was dried at 80° C. for 45 min.

The surface of the coated sheet was crosshatched by drawing 11 parallel lines at 2 mm intervals and 11 parallel lines perpendicular thereto at 2 mm intervals by using a single-edge razor to make 100 squares. A cellophane adhesive tape (JIS Z1522) was adhered to the crosshatched film with sufficient pressure and was rapidly stripped off upward. As a result of observation of the squares, there was no peeling spot on the surface.

Example 7

[Polymerization of Olefin]

500 ml of purified toluene was placed in a 1-liter glass reactor purged thoroughly with nitrogen, and ethylene and propylene were passed through at rates of 70 liters per hour and 215 liters per hour, respectively. With stirring at 600 revolutions per minute, a solution in the reactor was maintained at 40° C. for 10 min. 2.5 mmol in terms of aluminum atom of methylaluminoxane and 0.08 mmol in terms of zirconium atom of biscyclopentadienylzirconium dichloride were added. The polymerization was conducted at 40° C. and ordinary pressure for 1 hr, and a small amount of methanol was added to terminate the polymerization. After completion of the polymerization, the reaction solution was poured into 500 ml of a methanol solution of dilute hydrochloric acid, and was stirred. The solvent was removed by an evaporator. The polymer was washed twice with methanol and then the obtained polymer was dried under reduced pressure at 130° C. overnight. The yield of the obtained ethylene/propylene copolymer (referred to as EPR) was 24.5 g. The catalytic activity was 310 g/mmol-Zr·h. As a result of IR analysis, the ethylene content was 68 mol %, and it was confirmed that there was an unsaturated bond in the terminal position of the polymer molecule. Mw was 1,500.

[Hydroboration]

In a dry box filled with argon, 2 g of the copolymer of EPR, which had an unsaturated bond in the terminal position, was suspended in 100 ml of degassed and dried THF, and the suspension was placed in a glass flask with a magnetic stirrer. 24 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried IPA and was dried under reduced pressure, and an ethylene/propylene copolymer having boron in the terminal position (referred to as EPR-B) was obtained.

[Polymerization of Methylmethacrylate]

0.23 g of the copolymer of EPR-B was placed in a sealed flask and was suspended by the addition of 11.5 g of dried methylmethacrylate (MMA) and 80 ml of THF. 1.6 ml of dried oxygen was blown through to initiate the reaction, followed by stirring at room temperature for 8 hr. 100 ml of methanol was added to terminate the reaction. The precipitated polymer was extracted with acetone by the Soxhelt extractor in a nitrogen atmosphere over a period of 24 hr to obtain an insoluble diblock copolymer of (ethylene/propylene copolymer)-O-polymethylmethacrylate (referred to as EPR-O-PMMA).

The weight-average molecular weight ($Mw_2$) of the polymethylmethacrylate (PMMA) moiety, which was estimated according to the following equation, was 20,000.

$$Mw_2 = Mw_1 \cdot (W_2 - W_1)/W_1$$

wherein:

$Mw_1$ is a weight-average molecular weight of the EPR moiety, $Mw_2$ is a weight-average molecular weight of the PMMA moiety, $W_1$ is an amount of the copolymer of EPR-B used in the polymerization of MMA, and $W_2$ is an yield of the diblock copolymer.

Example 8

[Preparation of Catalyst Solution]

0.23 mmol in terms of zirconium atom of bis(pentamethyl-$\eta^5$-cyclopentadienyl)dimethylzirconium was weighed and placed in a glass flask purged thoroughly with nitrogen, and a toluene solution of 0.92 mmol in terms of boron atom of tris(pentafluorophenyl)borane was added thereto. An appropriate amount of toluene was added to the solution, and a total amount of 50 ml of the solution was obtained. A catalyst solution having a zirconium concentration of 0.0046 mmol/ml was prepared.

[Polymerization of Olefin]

225 ml of purified toluene was placed in a 500 ml glass reactor purged thoroughly with nitrogen, and ethylene was passed through at a rate of 200 liters per hour. With stirring at 600 revolutions per minute, a solution in the reactor was maintained at 45° C. for 10 min. Then, 7.5 mmol in terms of aluminum atom of triisobutylaluminum was added. Further, 6.5 mmol of 9-BBN was added, and then 0.075 mmol in terms of zirconium atom of the preactivated catalyst solution was added. The polymerization was conducted at 50° C. and ordinary pressure for 5 min, and a small amount of absolute methanol was added to terminate the polymerization. After completion of the polymerization, the solvent was removed by an evaporator, and then the polymer was washed with THF. The obtained polymer was dried under reduced pressure at 50° C. overnight. The yield of the obtained polyethylene (referred to as PE) was 0.61 g. The catalytic activity was 98 g/mmol·Zr·h.

[Confirmation of Molecular Weight and Terminal Position of the Polymer]

0.5 g of the obtained polymer of PE was added to 25 ml of absolute THF. In a nitrogen atmosphere at room temperature, 3 g of NaOH dissolved in 15 ml of water and 3.75 ml of methanol were added thereto. Then, 12 ml of 30% $H_2O_2$ was added dropwise at 0° C. The reaction was conducted at 40° C. for 6 hr, and then the reaction solution was poured into 2 liters of a methanol solution to precipitate a polymer. The obtained polymer was refluxed with 50 ml of methanol for 2 hr and then was dried under reduced pressure at 50° C. for 8 hr. Mw determined by GPC analysis was 1,800. As a result of IR analysis, it was confirmed that a terminal position of the polymer molecule was modified by a hydroxyl group so that there was no unsaturated bond in the terminal position. Thus, it was confirmed that the terminal position of the polymer obtained in the section of [polymerization of olefin] was modified by boron.

[Polymerization of Ethylene Oxide]

18 g of the above polymer having boron in the terminal position (referred to as PE-B), and 62 mg of tetrakis[tris(dimethylamino)phosphoranylideneamino]phosphonium hydroxide {[($Me_2N)_3P$=N]$_4P^+OH^-$} which was synthesized in the same manner as described on page 32 in European Patent Publication No. 0791600 were placed in a 1500 ml autoclave equipped with a tube for a thermometer, a pressure gage, a stirrer and a inlet tube for ethylene oxide. Air in the autoclave was replaced with dried nitrogen, and the contents of the reactor were heated to a temperature of 125° C. The reaction was conducted at the same temperature for 12 hr with intermittently supplying 9.1 g of ethylene oxide in order to maintain the pressure (absolute pressure) at about 0.5 MPa during the reaction. Residual unreacted ethylene oxide was distilled out under reduced pressure, and 23 g of a diblock polymer of polyethylene-O-(polyethylene glycol) (referred to as PE-O-PEG) was obtained.

The weight-average molecular weight ($Mw_2$) of the polyethylene glycol (referred to as PEG) moiety, which was estimated according to the following equation, was 500.

$$Mw_2 = Mw_1 \cdot (W_2 - W_1)/W_1$$

wherein:

$Mw_1$ is a weight-average molecular weight of the PE moiety, $Mw_2$ is a weight-average molecular weight of the PEG moiety, $W_1$ is an amount of the polymer of PE-B used in the polymerization of ethylene oxide, and $W_2$ is an yield of the diblock copolymer.

Example 9

0.1 part by weight of Irganox™1076 (trade name, available from Ciba Specialty Chemicals K.K.) and 0.05 part by weight of calcium stearate were added to 94.1 parts by weight of a commercial polymethylmethacrylate resin (trade name: ACRYPET MD, available from Mitsubishi Rayon Co., Ltd.), 4.9 parts by weight of an ethylene/propylene copolymer (ethylene content: 80 mol %; and melt flow index measured at 190° C.: 7.5 g/10 min) and 1 part by weight of the diblock copolymer (EPR-O-PMMA) obtained in Example 7. In a nitrogen atmosphere, the resins were melt blended by a twin-screw extruder having a screw diameter of 20 mm at a cylinder temperature of 190° C., and pellets were prepared to evaluate the various properties. The obtained pellets were injection molded into specimens for the evaluations of the various properties under the conditions of a cylinder temperature of 190° C., a mold temperature of 30° C. and an injection pressure of 1000 kg/cm². With respect to the obtained specimens, the various properties were measured as follows. The results are shown in Table 2.

Flexural Modulus (FM)

The flexural modulus was measured at 23° C. by the use of the specimen 5 inches long, a half-inch wide and an eighth inch thick, which was obtained by injection molding, in accordance with ASTM D638.

Izod Impact Strength (IZ)

The Izod impact strength was measured at 23° C. by the use of the specimen (post-notch) a quarter inch thick, which was obtained by injection molding, in accordance with ASTM D258.

Transparency (HAZE)

The haze was measured by the use of the colored plate 1 mm thick, which was obtained by injection molding, in accordance with JIS K6714.

Comparative Example 2

In the same manner as in Example 9, pellets were prepared, and the various properties were measured, except that 95 parts by weight of a polymethylmethacrylate resin and 5.0 parts by weight of the ethylene/propylene copolymer were blended and that the diblock copolymer (EPR-O-PMMA) was not blended. The results are shown in Table 2.

TABLE 2

|  | Example 9 | Comp. Ex. 2 |
|---|---|---|
| FM (MPa) | 2280 | 2300 |
| IZ (J/m) | 48 | 30 |
| HAZE (%) | 10 | 79 |

Example 10

2.5 parts by weight of the diblock copolymer (PE-P-PEG) obtained in Example 8 was added to 97.5 parts by weight of linear low-density polyethylene (melt flow index measured at 190° C.: 4 g/10 min; density: 0.920 g/cm$^3$; and 1-hexene copolymer), and the mixture was dried thoroughly. Further, 0.1 part by weight of Irganox™1076, 0.1 part by weight of Irgaphos™168 (trade name, available from Ciba Specialty Chemicals K.K.) and 0.1 part by weight of calcium stearate were added to the mixture. In a nitrogen atmosphere, the resins were melt blended by a twin-screw extruder having a screw diameter of 20 mm at a cylinder temperature of 180° C., and pellets were prepared.

A film 30 μm thick was prepared by blown-film extrusion of the obtained pellets by a single-screw extruder having a screw diameter of 20 mm, which had the gap of 0.7 mm between die lips of 25 mm in diameter and a single-slit air ring, under the conditions of an air flow rate of 90 liters/min, an extruder output of 9 g/min, a blow-up ratio of 1.8, a take-off speed of 2.4 m/min and a processing temperature of 200° C. The antifogging properties and the transparency were evaluated as follows. The evaluated results are shown in Table 3.

Antifogging Properties and Stability, and Transparency

The top of a 200 ml beaker containing 50 ml of warm water of 70° C. was capped with the film. The beaker with the film was placed in a refrigerator of 5° C. for 1 hr to evaluate the antifogging properties according to the following scales. On the other hand, the film was immersed in recycled warm water of 50° C. for 100 hr and then was dried at least once. The top of a 200 ml beaker containing 50 ml of warm water of 70° C. was capped with the film. The beaker with the film was placed in a refrigerator of 5° C. for 1 hr to evaluate the antifogging stability according to the following scales.

AA: The film is not fogged, and it is possible to observe the inside of the beaker clearly through the film.

BB: The film is fogged, and it is impossible to observe the inside of the beaker clearly through the film.

Further, before and after the antifogging stability test, under the dried conditions, the transparency (haze) of the film was evaluated by a haze measuring equipment manufactured by Nippon Denshoku Industries Co., Ltd.

Comparative Example 3

The pelletization, the blown-film extrusion and the evaluation of the properties were conducted in the same manner as in Example 10, except that 2.5 parts by weight of a commercial antifogging agent (mixture of mono-, di-, and tri-stearic acid glyceryl esters) was added to 97.5 parts by weight of linear low-density polyethylene and that 0.1 part by weight of Irganox™1076, 0.1 part by weight of Irgaphos™168 and 0.1 part by weight of calcium stearate were further added. The results are shown in Table 3.

TABLE 3

|  | Example 10 | Comp. Ex. 3 |
|---|---|---|
| Antifogging properties | AA | AA |
| Antifogging stability | AA | BB |
| Initial transparency | 6 | 7 |
| Transparency after testing | 15 | 31 |

Example 11

[Preparation of Catalyst Solution]

Methylaluminoxane and diphenylsilylenebis(2,7-dimethyl-4-isopropylindenyl)zirconium dichloride were mixed in toluene (an appropriate amount of toluene may be optionally added) so that the concentration of zirconium was 0.00011 mmol/liter and the molar ratio of aluminum to zirconium was 350. The solution was preactivated by stirring for 15 min to prepare a catalyst solution.

[Polymerization of Propylene]

400 ml of purified toluene was placed in a 500 ml glass reactor purged thoroughly with nitrogen, and propylene was passed through at a rate of 100 liters per hour. With stirring at 600 revolutions per minute, a solution in the reactor was maintained at 45° C. for 10 min. Subsequently 19.4 mg in terms of aluminum atom of triisobutylaluminum was added. Further, 0.36 mg in terms of zirconium atom of the preactivated catalyst solution was added, and the temperature in the reactor was raised to 50° C. The polymerization was conducted at 50° C. and ordinary pressure for 20 min. A small amount of isopropanol was added to terminate the polymerization. After completion of the polymerization, the reaction solution was poured into 2 liters of a methanol solution of dilute hydrochloric acid to precipitate a polymer. The polymer was washed twice with methanol, and then the obtained polymer was dried under reduced pressure at 80° C. overnight.

The yield of the obtained polypropylene (referred to as PP) was 21.8 g. The catalytic activity was 16.4 kg/mmol-Zr·h. The melting point (Tm) measured by a differential scanning calorimeter (DSC) was 149.1° C. Mw measured by GPC was 106,000. As a result of IR analysis, it was confirmed that there was an unsaturated bond in the terminal position of the polymer molecule.

[Hydroboration]

In a dry box filled with argon, 20 g of the above polypropylene, which had an unsaturated bond in the terminal position, was suspended in 100 ml of degassed and dried THF, and the suspension was placed in a glass flask with a magnetic stirrer. 3.0 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried isopropanol (IPA) and was dried under reduced pressure, and polypropylene having boron in the terminal position (referred to as PP-B) was obtained.

[Copolymerization of Styrene/Maleic Anhydride]

20 g of the polymer of PP-B was placed in a sealed flask and was suspended by the addition of 10 g of dried styrene (St), 10 g of maleic anhydride (referred to as MAH) and 80 ml of THF. 1.9 ml of dried oxygen was blown through to initiate the reaction, followed by stirring at 45° C. for 25 min. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of polypropylene-O-(styrene/maleic anhydride copolymer) (referred to as PP-O-P(St/MAH)).

With respect to the copolymer, the weight-average molecular weight ($Mw_2$) of the styrene/maleic anhydride copolymer (referred to as P(St/MAH)) moiety, which was estimated according to the following equation, was 400.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the P(St/MAH) moiety, $W_1$ is an amount of the polymer of PP-B used in the copolymerization of styrene/maleic anhydride, and $W_2$ is an yield of the diblock copolymer.

Example 12

[Preparation of Solid Catalyst Component]

3.0 g of silica dried at 250° C. for 10 hr was suspended in 50 ml of toluene, and then the suspension was cooled to 0° C. 17.8 ml of a toluene solution of methylaluminoxane (Al=1.29 mmol/ml) was added dropwise over a period of 30 min with maintaining at 0° C., followed by reacting at 0° C. for 30 min. The temperature was raised to 95° C. over a period of 30 min, and the reaction was conducted for 4 hr at the same temperature. Thereafter, the temperature was lowered to 60° C., and the supernatant liquid was removed by decantation.

The obtained solid component was washed twice with toluene and then was resuspended in 50 ml of toluene. 11.1 ml of a toluene solution of bis(1-n-butyl-3-methylcyclopentadienyl)zirconium dichloride (Zr=0.0103 mmol/ml) was added dropwise to the suspension at 20° C. over a period of 30 min. The temperature in the reactor was raised to 80° C., and the reaction was conducted for 2 hr at the same temperature. The supernatant liquid was removed, and the precipitate was washed twice with hexane to obtain a solid catalyst. The obtained solid catalyst included 2.3 mg of zirconium based on 1 g of the solid catalyst.

[Preparation of Prepolymerized Catalyst]

4 g of the obtained solid catalyst was resuspended in 400 ml of hexane. 5.0 ml of a decane solution of triisobutylaluminum (1 mmol/ml) and 0.36 g of 1-hexene were added to the suspension, and the prepolymerization of ethylene was conducted at 35° C. for 2 hr. After the removal of the supernatant liquid, the precipitate was washed three times with hexane to obtain a prepolymerized catalyst including 2.2 mg of zirconium and with which 3 g of polyethylene was prepolymerized, based on 1 g of the solid catalyst.

[Polymerization of Olefin]

1 liter of purified hexane and 40 ml of purified 1-hexene were placed in a 2-liter stainless steel autoclave purged thoroughly with nitrogen, and nitrogen in the autoclave was replaced with ethylene.

The temperature in the autoclave was raised to 60° C., and 1.5 mmol of triisobutylaluminum and 0.24 mg in terms of zirconium atom of the prepolymerized catalyst were added.

Ethylene was fed to initiate the polymerization at a pressure of 0.9 MPa. Thereafter, with supplying only ethylene, the polymerization was conducted at a pressure of 0.9 MPa and a temperature of 80° C. for 1.5 hr.

After completion of the polymerization, the polymer was filtered off and was dried at 80° C. overnight. The yield of the obtained polymer was 200 g. The catalytic activity based on a zirconium atom was 77 kg/mmol-Zr. The density of the obtained ethylene/1-hexene copolymer (referred to as P(Et/Hex)) was 0.925 g/cm$^3$. As a result of IR analysis, the 1-hexene content was 2.5 mol %, and it was confirmed that there was an unsaturated bond in the terminal position of the ethylene/1-hexene copolymer. Mw measured by GPC was 144,000.

[Hydroboration]

In a dry box filled with argon, 20 g of the above polymer (Mw=144,000), which had an unsaturated bond in the terminal position, was suspended in 100 ml of degassed and dried THF, and the suspension was placed in a glass flask with a magnetic stirrer. 2.2 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and an ethylene/1-hexene copolymer having boron in the terminal position (referred to as P(Et/Hex)-B) was obtained.

[Polymerization of 2-hydroxyethylacrylate]

20 g of the copolymer of P(Et/Hex)-B was placed in a sealed flask and was suspended by the addition of 12.4 g of dried 2-hydroxyethyl acrylate (referred to as HEA) and 80 ml of THF. 1.9 ml of dried oxygen was blown through to initiate the reaction, followed by stirring at room temperature for 15 min. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of (ethylene/1-hexene copolymer)-O-(poly-2-hydroxyethyl acrylate) (referred to as P(Et/Hex)-O-PHEA).

The weight-average molecular weight ($Mw_2$) of the poly-2-hydroxyethyl acrylate (referred to as PHEA) moiety, which was estimated according to the following equation, was 400.

$$Mw_2 = Mw_1 \cdot (W_2 - W_1)/W_1$$

wherein:

$Mw_1$ is a weight-average molecular weight of the P(Et/Hex) moiety, $Mw_2$ is a weight-average molecular weight of the PHEA moiety, $W_1$ is an amount of the copolymer of P(Et/Hex)-B used in the polymerization of HEA, and $W_2$ is an yield of the diblock copolymer.

[Evaluation of Properties]

A film was prepared by the use of the olefin block copolymers obtained in Examples 11 and 12 as follows. The adhesive strength to an aluminum sheet and the initial antifogging properties were evaluated.

As a result, with respect to the diblock copolymer (PP-O-P(St/MAH)) obtained in Example 11, the adhesive strength to aluminum sheet was 2.5 kg/15 mm. The initial antifogging properties of the diblock copolymer (P(Et/Hex)-O-PHEA) obtained in Example 12 were the evaluation of "AA".

Adhesive Strength to an Aluminum Sheet

Preparation of film: An aluminum sheet 0.1 mm thick and an aluminum sheet 100 μm thick of which the central area was cut off in a square of 15 cm×15 cm were put on a press plate in this order. 3.3 g of the sample (the diblock copolymer) was put on the central space (where was cut off) A polyethylene terephthalate sheet, an aluminum sheet and a press plate were further superimposed in this order.

The above sample interposed between the press plates was placed in a hot press of 200° C. and was preheated for about 7 min. Thereafter, the compression (at 50 kg/cm²-G) and the decompression were repeated several times to remove bubbles in the sample. The pressure was raised to 100 kg/cm²-G, and the sample was heated under pressure for 2 min. After decompression, the press plates were taken out from the hot press and were placed into another press of which area for contact bonding was maintained at a temperature of 0° C. After the cooling under pressure at 100 kg/cm²-G for 4 min, the sample was decompressed and was taken out. The obtained laminate comprising the aluminum sheet and the diblock copolymer sheet was used to measure the adhesive strength.

Measurement of adhesive strength: The obtained laminate was cut in a strip of 15 cm×2 cm. An aluminum sheet (50 μm thick) of 15 cm×2 cm was put thereon. The laminate and the sheet were adhered by a heat-sealing tester in which the temperatures of the top heater and the bottom sheet were preset at 200° C. and 70° C., respectively. The obtained laminate was cut in a strip 15 cm wide. The upper aluminum sheet (50 μm thick) was peeled off the diblock copolymer film in the direction of 180° at the adhesive interface to measure the peel strength.

Evaluation of Initial Antifogging Properties

Preparation of film: A polyethylene terephthalate sheet and an aluminum sheet 100 μm thick of which the central area was cut off in a square of 15 cm×15 cm were put on a press plate in this order. 3.3 g of the sample (the diblock copolymer) was put on the central space (where was cut off). A polyethylene terephthalate sheet, an aluminum sheet and a press plate were further superimposed in this order.

The above sample interposed between the press plates was placed in a hot press of 200° C. and was preheated for about 7 min. Thereafter, the compression (at 50 kg/cm²-G) and the decompression were repeated several times to remove bubbles in the sample. The pressure was raised to 100 kg/cm²-G, and the sample was heated under pressure for 2 min. After decompression, the press plates were taken out from the hot press and were placed into another press of which area for contact bonding was maintained at a temperature of 0° C. After the cooling under pressure at 100 kg/cm²-G for 4 min, the sample was decompressed and was taken out. The obtained film of the diblock copolymer was used to evaluate the initial antifogging properties.

Evaluation of initial antifogging properties: The top of a 100 ml beaker containing 70 ml of water was capped with the sample film. With placing the beaker in a constant temperature water bath of 50° C., the beaker was allowed to stand in a constant temperature chamber of 20° C. The fogging degree of the inside of the sample film was observed after 24 hr to evaluate the degree according to the following scales.

Scales for Evaluation;

AA: The film has an anti-stick quality, and it is impossible to observe a water drop.

BB: Large water drops attach to the film partially.

CC: Fine water droplets attach to the almost all over the surface of the film.

Example 13

[Preactivation of Catalyst]

0.023 mmol in terms of titanium atom of [(N-t-butylamido)(tetramethyl-$\eta^5$-cyclopentadienyl)dimethylsilane]titanium dichloride was weighed and placed in a glass flask purged thoroughly with nitrogen, and a toluene solution of 0.69 mmol in terms of boron atom of triphenylmethyltetrakis(pentafluorophenyl)borate was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 50 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.00075 mmol in terms of titanium atom of the preactivated catalyst were added. Ethylene was fed to initiate the polymerization at a pressure of 0.9 MPa. Thereafter, only ethylene was supplied. During the polymerization when the temperature rose rapidly, the operation such that the supply of ethylene was stopped until the temperature dropped to 70° C. was carried out twice. The polymerization was conducted at a pressure of 0.5 to 0.9 MPa and a temperature of 70 to 85° C. for 6 min.

After the elapse of prescribed time, isopropanol (IPA) was added to terminate the reaction.

After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained polymer was 47.5 g. The catalytic activity was 630 kg/mmol-Ti·h. As a result of IR analysis of the polymer, the octene content was 18.6 mol %, and it was confirmed that there was an unsaturated bond in the terminal position of the polymer molecule. The intrinsic viscosity of the copolymer (ethylene/octene random copolymer (referred to as EOR)) was 1.49 dl/g. Mw was 115,700.

[Hydroboration]

In a dry box filled with argon, 20 g of the copolymer of EOR, which had an unsaturated bond in the terminal position, was suspended in 100 ml of degassed and dried THF, and the suspension was placed in a glass flask with a magnetic stirrer. 2.8 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried IPA and was dried under reduced pressure, and an ethylene/octene random copolymer having boron in the terminal position (referred to as EOR-B) was obtained.

[Polymerization of 2-hydroxyethylacrylate]

18 g of the copolymer of EOR-B was placed in a sealed flask and was suspended by the addition of 16.8 g of dried 2-hydroxyethyl acrylate (HEA) and 80 ml of THF. 1.9 ml of dried oxygen was blown through to initiate the reaction. The suspension was stirred at room temperature for 17 min and then was filtered. The filter cake was washed with degassed and dried IPA and was dried under reduced pressure to obtain a diblock copolymer of EOR-O-(poly-2-hydroxyethyl acrylate) having boron in the terminal position (referred to as EOR-O-PHEA-B).

[Transformation to Functional Group in Terminal Position]

50 ml of heptane was added to 15 g of the diblock copolymer (EOR-O-PHEA-B) at room temperature, and 5 ml of pyridine was added at 70° C. 30 g of carbon tetrabromide was added at 40° C., and then 18 ml of a benzene solution of bromine of 0.2 M was added at 25° C. The solution was stirred until the exothermic did not occur. After the reaction, the mixture was poured into 1 liter of methanol and was filtered. The filter cake was washed with methanol to collect the polymer. 50 ml of dimethylformamide (DMF) and 0.75 mmol of sodium azide were added to the obtained polymer, and the reaction was conducted at 80° C. for 4 hr. After the reaction, the mixture was allowed to stand for cooling and was poured into 1 liter of methanol. The mixture was filtered, and the filter cake was washed with methanol to collect the polymer. 50 ml of THF and 0.75 mmol of triphenylphosphine were added to the obtained polymer, and the reaction was conducted at room temperature for 6 hr. After the reaction, 10 ml of acetic acid, 10 ml of water and a catalytic amount of trifluoroacetic acid were added, and the reflux was conducted for 24 hr. The reaction product was washed with water, and dried under vacuum.

According to IR analysis, it was confirmed that the terminal position of the obtained copolymer was transformed to an amino group. The weight-average molecular weight ($Mw_2$) of the PHEA moiety, which was estimated according to the following equation, was 480.

$$Mw_2 = Mw_1 \cdot (W_2 - W_1)/W_1$$

wherein:

$Mw_1$ is a weight-average molecular weight of the EOR moiety, $Mw_2$ is a weight-average molecular weight of the PHEA moiety, $W_1$ is an amount of the copolymer of EOR-B used in the polymerization of HEA, and $W_2$ is an yield of the diblock copolymer.

[Adhesive Properties of the EOR-O-PHEA Aminated in the Terminal Position]

A film was prepared by the use of the copolymer of EOR-O-PHEA aminated in the terminal (the modified diblock copolymer) as follows. The adhesive strength to polyethylene terephthalate (PET) was measured as follows.

[Preparation of Film]

An aluminum sheet 0.1 mm thick, a Teflon sheet and an aluminum sheet 100 μm thick of which the central area was cut off in a square of 15 cm×15 cm were put on a press plate in this order. 3.3 g of the sample was put on the central space (where was cut off). A Teflon sheet, an aluminum sheet and a press plate were further superimposed in this order.

The above sample interposed between the press plates was placed in a hot press of 150° C. and was preheated for about 7 min. Thereafter, the compression (at 50 kg/cm²-G) and the decompression were repeated several times to remove bubbles in the sample. The pressure was raised to 100 kg/cm²-G, and the sample was heated under pressure for 2 min. After decompression, the press plates were taken out from the hot press and were placed into another press of which area for contact bonding was maintained at a temperature of 0° C. After the cooling under pressure at 100 kg/cm²-G for 4 min, the sample was decompressed and was taken out. Of the obtained film (the modified diblock copolymer film), the part having a uniform thickness of about 120 to 130 μm was used to measure the adhesive strength to PET.

[Measurement of Adhesive Strength to PET]

The modified diblock copolymer film was interposed between two sheets of PET film (200 μm thick) 15 cm square, and the modified diblock copolymer film was adhered to the PET films under the same press conditions as in the section of [Preparation of film]. The obtained laminate was cut in a strip 15 cm wide. The PET film was peeled off the diblock copolymer film in the direction of 180° at the adhesive interface to measure the peel strength at 23° C. The peel strength was 800 g/cm², and the diblock copolymer was excellent in adhesive properties.

Example 14

[Preparation of Solid Catalyst]

3.0 g of silica dried at 250° C. for 10 hr was suspended in 50 ml of toluene, and then the suspension was cooled to 0° C. 17.8 ml of a toluene solution of methylaluminoxane (Al=1.29 mmol/ml) was added dropwise over a period of 30 min with maintaining at 0° C., followed by the reaction at 0° C. for 30 min. The temperature was raised to 95° C. over a period of 30 min, and the reaction was conducted for 4 hr at the same temperature. Thereafter, the temperature was lowered to 60° C., and the supernatant liquid was removed by decantation.

The obtained solid component was washed twice with toluene and then was resuspended in 50 ml of toluene. 11.1 ml of a toluene solution of bis(1-n-butyl-3-methylcyclopentadienyl)zirconium dichloride (Zr=0.0103 mmol/ml) was added dropwise to the suspension at 20° C. over a period of 30 min. The temperature in the reactor was raised to 80° C., and the reaction was conducted for 2 hr at the same temperature. The supernatant liquid was removed, and the precipitate was washed twice with hexane to obtain a solid catalyst. The obtained catalyst included 2.3 mg of zirconium based on 1 g of the solid catalyst.

[Preparation of Prepolymerized Catalyst]

4 g of the obtained solid catalyst was resuspended in 400 ml of hexane. 5.0 ml of a decane solution of triisobutylaluminum (1 mmol/ml) and 0.36 g of 1-hexene were added to the suspension, and the prepolymerization of ethylene was conducted at 35° C. for 2 hr. After the removal of the supernatant liquid, the precipitate was washed three times with hexane to obtain a prepolymerized catalyst including 2.2 mg of zirconium and with which 3 g of polyethylene was prepolymerized, based on 1 g of the solid catalyst.

[Polymerization of Olefin]

1 liter of purified hexane and 40 ml of purified 1-hexene were placed in a 2-liter stainless steel autoclave purged thoroughly with nitrogen, and nitrogen in the autoclave was replaced with ethylene. The temperature in the autoclave was raised to 60° C., and 1.5 mmol of triisobutylaluminum and 0.24 mg in terms of zirconium atom of the prepolymerized catalyst were added. Ethylene was fed to initiate the polymerization at a pressure of 0.9 MPa. Thereafter, with supplying only ethylene, the polymerization was conducted at a pressure of 0.9 MPa and a temperature of 80° C. for 1.5 hr.

After completion of the polymerization, the polymer solution was filtered, and the obtained solid product was dried at 80° C. overnight. The yield of the obtained polymer was 200 g. The catalytic activity based on a zirconium atom was 77 kg/mmol-Zr. As a result of IR analysis of the obtained polymer, the 1-hexene content was 2.5 mol %, and it was confirmed that there was an unsaturated bond in the terminal position of the polymer molecule. The density of the polymer (ethylene/1-hexene copolymer (P(Et/Hex))) was 0.925 g/cm$^3$. According to the measurement by GPC, Mw was 144,000 and Mw/Mn was 2.2.

[Transformation in Terminal Position of the Ethylene/1-hexene Copolymer]

In a dry box filled with argon, 20 g of the ethylene/1-hexene copolymer, which had an unsaturated bond in the terminal position, was suspended in 100 ml of degassed and dried THF, and the suspension was placed in a glass flask with a magnetic stirrer. 2.2 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure.

10 g of the obtained copolymer was added to 25 ml of degassed and dried THF. In a nitrogen atmosphere at room temperature, 0.2 g of NaOH dissolved in 1 ml of water and 0.3 ml of methanol were added thereto. 0.8 ml of 30% $H_2O_2$ was added dropwise at 0° C. The reaction was conducted at 40° C. for 6 hr, and then the reaction solution was poured into 2 liters of methanol to precipitate a polymer. The obtained copolymer was refluxed with 100 ml of methanol for 2 hr and then was dried under reduced pressure at 50° C. for 8 hr. As a result of IR analysis, it was confirmed that a terminal position of the copolymer molecule was modified by a hydroxyl group so that there was no unsaturated bond in the terminal position.

150 ml of toluene and 0.25 mmol of potassium permanganate were added to 8 g of the obtained ethylene/1-hexene copolymer, which had a hydroxyl group in the terminal position (P(Et/Hex)-OH). The reaction was conducted at 40° C. for 2 hr, and then the reaction solution was poured into 2 liters of methanol to precipitate a polymer. The obtained copolymer was washed with methanol and then was dried under reduced pressure at 50° for 8 hr. According to IR analysis, it was confirmed that the hydroxyl group in the terminal position was substituted to a carboxyl group.

[Coupling Reaction with Polar Segment]

100 ml of N-methylpyrrolidone, 50 g of polyethylene glycol (PEG, Mv=100,000) available from Aldrich, and catalytic amounts of tetra-n-butyl titanate and butylhydroxyltin oxide were added to 15 g of the obtained ethylene/1-hexene copolymer, which had a carboxyl group in the terminal position. The reaction was conducted at 200° C. for 48 hr. After the reaction, the reaction solution was allowed to stand for cooling and was poured into 2 liters of methanol. The obtained polymer was refluxed with 100 ml of methanol for 2 hr and then was dried under reduced pressure at 50° C. for 8 hr.

According to NMR analysis, it was confirmed that the obtained polymer had a structure such that the segment of ethylene/1-hexene copolymer linked with the PEG segment via an ester linkage.

[Higher-order Structure of the Diblock Copolymer of (Ethylene/1-hexene Random Copolymer)/Polyethylene Glycol]

A pressed sheet (1 mm thick) 8 cm×8 cm square was prepared at 150° C. by the use of the obtained diblock copolymer in the same manner as in Example 13. The surface of the pressed sheet was dyed by the use of ruthenic acid and then was observed by a scanning electron microscope. A pseudo-mosaic structure of an average cord length of 0.1 µm was observed.

Example 15

[Preparation of Catalyst Solution]

Methylaluminoxane and diphenylsilylenebis(2,7-dimethyl-4-isopropylindenyl)zirconium dichloride were mixed in toluene (an appropriate amount of toluene may be optionally added) so that the concentration of zirconium was 0.00011 mmol/liter and the molar ratio of aluminum to zirconium was 350. The solution was preactivated by stirring for 15 min to prepare a catalyst solution.

[Polymerization]

400 ml of purified toluene was placed in a 500 ml glass reactor purged thoroughly with nitrogen, and propylene was passed through at a rate of 100 liters per hour. With stirring at 600 revolutions per minute, a solution in the reactor was maintained at 45° C. for 10 min. 19.4 mg in terms of aluminum atom of triisobutylaluminum was added. 0.36 mg in terms of zirconium atom of the above catalyst solution was added, and the temperature in the reactor was raised to 50° C. The polymerization was conducted at 50° C. and ordinary pressure for 20 min. A small amount of IPA was added to terminate the polymerization. After completion of the polymerization, the reaction solution was poured into 2 liters of a methanol solution of dilute hydrochloric acid to precipitate a polymer. The precipitated polymer was washed twice with methanol, and then the obtained polymer was dried under reduced pressure at 80° C. overnight. The yield of the obtained polypropylene was 21.8 g. The catalytic activity was 16.4 kg/mmol-Zr·h. The melting point (Tm) measured by DSC was 149.1° C. Mw measured by GPC was 106,000. As a result of IR analysis, it was confirmed that there was an unsaturated bond in the terminal position of the polymer molecule.

[Hydroboration]

In a dry box filled with argon, 20 g of the above polypropylene, which had an unsaturated bond in the terminal position, was suspended in 100 ml of degassed and dried THF, and the suspension was placed in a glass flask with a magnetic stirrer. 3.0 ml of a THF solution of 9-BBN (0.5 M) was added to the suspension. In the dry box, the slurry was stirred at 55° C. for 5 hr and then was filtered. The obtained solid product was washed with degassed and dried IPA and was dried under reduced pressure, and polypropylene having boron in the terminal position (PP-B) was obtained.

[Polymerization of Methylmethacrylate]

16 g of the polymer of PP-B was placed in a sealed flask and was suspended by the addition of 11.5 g of dried methylmethacrylate (MMA) and 80 ml of THF. 1.6 ml of dried oxygen was blown through to initiate the reaction. The suspension was stirred at room temperature for 4 hr and then was filtered in a nitrogen atmosphere. The filter cake was washed with degassed and dried IPA and was dried under reduced pressure. 7.5 g of the obtained polymer was added to 25 ml of degassed and dried THF. In a nitrogen atmosphere at room temperature, 0.2 g of NaOH dissolved in 1 ml of water and 0.3 ml of methanol were added thereto. 0.8 ml of 30% $H_2O_2$ was added dropwise at 0° C. The reaction was conducted at 40° C. for 6 hr, and then the reaction solution was poured into 2 liters of methanol to precipitate a polymer. The obtained polymer was refluxed with 100 ml of methanol for 2 hr and then was extracted with acetone and heptane over a period of 24 hr. The insoluble component was dried under reduced pressure at 50° C. for 8 hr to obtain a diblock copolymer of PP-O-polymethylmethacrylate (referred to as PP-O-PMMA). As a result of IR analysis, it was confirmed that there was a hydroxyl group in the terminal position of the polymer molecule.

The weight-average molecular weight ($Mw_2$) of the PMMA moiety, which was estimated according to the following equation, was 10,000.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the PMMA moiety, $W_1$ is an amount of the polymer of PP-B used in the polymerization of MMA, and $W_2$ is an yield of the diblock copolymer.

[Synthesis of Nylon-6]

In a stream of nitrogen, a mixed solution of 50 g of ε-caprolactam and 2.0 g of a 50% ε-aminocaproic acid aqueous solution was heated at 280° C. for 40 min. The solution was cooled to room temperature and was washed with water. Mw of the obtained polymer (nylon-6) was 2,000.

[Coupling Reaction]

150 ml of N-methylpyrrolidone, 0.5 g of the above nylon-6 and catalytic amounts of tetra-n-butyl titanate and butylhydroxyltin oxide were added to 30 g of the copolymer of PP-O-PMMA, which had a hydroxyl group in the terminal position. The reaction was conducted at 200° C. for 72 hr. After the reaction, the reaction solution was poured into 2 liters of methanol. The obtained polymer was refluxed with 100 ml of methanol for 2 hr and then was dried under reduced pressure at 50° C. for 8 hr.

According to NMR analysis, it was confirmed that the obtained polymer had a structure such that the PMMA segment linked with the nylon-6 segment via an ester linkage.

[Physical and Coating Properties of the Polypropylene/polymethylmethacrylate/nylon-6 Block Copolymer]

A pressed sheet 1 mm thick was prepared at 240° C. in the same manner as in Example 13.

The flexural modulus (FM) was measured by the use of the above pressed sheet at a temperature of 23° C. and a crosshead speed of 10 mm/min in accordance with ASTM D790. FM of the block copolymer was 2,500 MPa.

The coating properties were evaluated by cross-cut adhesion test with respect to the specimens prepared in such a manner that the coatings were individually applied onto the above pressed sheets as follows. Before the coatings were applied, the surfaces of the pressed sheets were wiped with cloths impregnated isopropanol.

(a) Two-pack urethane coating (tradename: R-271, available from Nippon Bee Chemical Co., Ltd.) was applied by an air gun so that the thickness of the dry film was 60 μm. The baking was conducted at 100° C. for 30 min.

(b) Melamine resin coating (trade name: Flexene #105, available from Nippon Bee Chemical Co., Ltd.) was applied by an air gun so that the thickness of the dry film was 60 μm. The baking was conducted at 120° C. for 30 min.

Cross-cut Adhesion Test

Cross-cut adhesion test was conducted in accordance with JIS K5400 as follows. The surface of the coated pressed sheet as described above was crosshatched to obtain a specimen. A cellophane adhesive tape (trade name: CT-18, available from Nichiban Co., Ltd.) was adhered to the specimen and then was rapidly stripped off in the direction of 90°. The number of the coated squares remaining on the specimen was counted and was regarded as an index of the adhesive properties. When the above block copolymer was used, the number of the peeled squares was zero.

Example 16

[Preparation of Catalyst Solution]

Methylaluminoxane and dimethylsilylenebis(indenyl)zirconium dichloride were mixed in toluene (an appropriate amount of toluene may be optionally added) so that the concentration of zirconium was 0.00011 mmol/liter and the molar ratio of aluminum to zirconium was 350. The solution was preactivated by stirring for 15 min to prepare a catalyst solution.

[Polymerization]

750 ml of purified heptane was placed in a 2-liter stainless steel autoclave purged thoroughly with nitrogen, and nitrogen in the autoclave was replaced with propylene. The temperature in the autoclave was raised to 40° C., and 0.263 mmol of triisobutylaluminum and 0.00050 mmol in terms of zirconium atom of the preactivated catalyst were added.

The propylene gas in the autoclave was replaced with the mixed gas consisting essentially of propylene of 91.3 mol %, ethylene of 1.2 mol % and butene of 7.5 mol %, and the temperature in the autoclave was raised with pressurizing by the mixed gas. The time when the temperature and the pressure went up to 0.8 MPa and 70° C., respectively, was regarded as the initiation of the polymerization. The polymerization was conducted for 30 min with maintaining at the same pressure and the same temperature. After 30 min, the supply of the mixed gas was stopped to terminate the polymerization. After decompression and cooling, the slurry was taken out, and the solid product was collected by filtration. The solid product was dried under reduced pressure in flowing nitrogen at 80° C. and 500 mmHg for 12 hr.

The yield of the obtained polymer was 43.7 g. According to the measurement by GPC, Mw was 30,000 and Mw/Mn was 2.2. As a result of IR analysis, the ethylene content was 3 mol % and the butene content was 3 mol %, and it was confirmed that there was an unsaturated bond in the terminal position of the polymer molecule.

[Transformation in Terminal Position of the Polymer]

In a dry box filled with argon, 8.7 g of the propylene/ethylene/butene random copolymer, which had an unsaturated bond in the terminal position, was suspended in 100 ml of degassed and dried THF, and the suspension was placed in a glass flask with a magnetic stirrer. 4.6 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure to obtain a propylene/ethylene/butene random copolymer having boron in the terminal position (referred to as PEBR-B).

2.1 g of the obtained copolymer was added to 25 ml of degassed and dried THF. In a nitrogen atmosphere at room temperature, 0.2 g of NaOH dissolved in 1 ml of water and 0.3 ml of methanol were added thereto. 0.8 ml of 30% $H_2O_2$ was added dropwise at 0° C. The reaction was conducted at 40° C. for 6 hr, and then the reaction solution was poured into 2 liters of methanol to precipitate a copolymer. The obtained copolymer was refluxed with 100 ml of methanol for 2 hr and then was dried under reduced pressure at 50° C. for 8 hr. 50 ml of toluene, 0.35 mmol of ethanolamine and a catalytic amount of sulfuric acid were added to the obtained copolymer, and the reaction was conducted at 100° C. for 12 hr. 1 liter of methanol was added to the reaction solution, and the solid product was filtered off. The solid product was washed twice with methanol and then was dried at 50° C. for 8 hr.

50 ml of a methanol solution of 10% hydrochloric acid was added to the polymer, and the reaction was conducted at 30° C. for 1 hr. The solid product was filtered off by a fritted-glass filter. The obtained copolymer was washed with acetone and was dried under reduced pressure at 50° C. for 8 hr. 75 ml of absolute tetralin was added to the obtained copolymer, and the suspension was heated to 180° C. The temperature was maintained at the same temperature for 24 hr with supplying phosgene at a rate of 5 g per hour. After the reaction, the copolymer was filtered off and was washed with acetone. As a result of IR analysis, it was confirmed that a terminal position of the copolymer molecule was modified by an isocyanate group.

[Coupling Reaction]

In a nitrogen atmosphere, 40 ml of chlorobenzene, 160 ml of o-dichlorobenzene and 1.75 g of polytetramethylene glycol (referred to as PTMG, Mn=2,900) available from Aldrich were added to 18 g of the obtained propylene/ethylene/butene random copolymer, which had an isocyanate group in the terminal position. The reflux was conducted for 8 hr. The solution was cooled to room temperature and was poured into 2 liters of methanol to precipitate a polymer. The obtained polymer was refluxed with 100 ml of methanol for 2 hr and then was dried under reduced pressure at 50° C. for 8 hr.

According to NMR analysis, it was confirmed that the obtained polymer was an ABA block copolymer having a structure such that the segment of propylene/ethylene/butene random copolymer linked with the PTMG segment via a urethane linkage (PEBR-PTMG-PEBR).

[Properties of the Block Copolymer (PEBR-PTMG-PEBR)]

A pressed sheet 1 mm thick was prepared at 200° C. in the same manner as in Example 13.

The flexural modulus (FM) was measured by the use of the above pressed sheet at a temperature of 23° C. and a crosshead speed of 10 mm/min in accordance with ASTM D790. FM of the block copolymer (PEBR-PTMG-PEBR) was 1,200 MPa. With respect to the above pressed sheet, the haze value was measured by a digital turbidimeter (NDH-20D) manufactured by Nippon Denshoku Industries Co., Ltd. The haze value was 25%.

Example 17

[Preparation of Catalyst Solution]

Methylaluminoxane and dimethylsilylenebis(indenyl)zirconium dichloride were mixed in toluene (an appropriate amount of toluene may be optionally added) so that the concentration of zirconium was 0.00011 mmol/liter and the molar ratio of aluminum to zirconium was 350. The solution was preactivated by stirring for 15 min to prepare a catalyst solution.

[Polymerization]

750 ml of purified heptane was placed in a 2-liter stainless steel autoclave purged thoroughly with nitrogen, and nitrogen in the autoclave was replaced with propylene. The temperature in the autoclave was raised to 40° C., and 0.263 mmol of triisobutylaluminum and 0.00050 mmol in terms of zirconium atom of the above catalyst solution were added. The temperature in the autoclave was raised with pressurizing by propylene. The time when the temperature and the pressure went up to 0.7 MPa and 75° C., respectively, was regarded as the initiation of the polymerization. The polymerization was conducted for 40 min with maintaining at the same pressure and the same temperature. After 30 min, the supply of propylene was stopped to terminate the polymerization. After decompression and cooling, the slurry was taken out, and the solid product was collected by filtration. The solid product was dried under reduced pressure in flowing nitrogen at 80° C. and 500 mmHg for 12 hr.

The yield of the obtained polypropylene was 37.0 g. Mw measured by GPC was 32,000. As a result of IR analysis, it was confirmed that there was an unsaturated bond in the terminal position of the polymer molecule.

[Hydroboration]

In a dry box filled with argon, 9.3 g of the above polypropylene, which had an unsaturated bond in the terminal position, was suspended in 100 ml of degassed and dried THF, and the suspension was placed in a glass flask with a magnetic stirrer. 4.6 ml of a THF solution of 9-BBN (0.5 M) was added to the suspension. In the dry box, the slurry was stirred at 55° C. for 5 hr and then was filtered. The solid product was washed with degassed and dried IPA and was dried under reduced pressure, and polypropylene having boron in the terminal position (PP-B) was obtained.

[Polymerization of Butylacrylate]

22 g of the polymer of PP-B was placed in a sealed flask and was resuspended by the addition of 66.2 g of dried butylacrylate (referred to as BA) and 80 ml of THF. 7.0 ml of dried oxygen was blown through to initiate the reaction. The suspension was stirred at room temperature for 56 hr and then was filtered in a nitrogen atmosphere. The filter cake was washed with degassed and dried IPA and was dried under reduced pressure.

22 g of the obtained polymer was added to 250 ml of degassed and dried THF. In a nitrogen atmosphere at room temperature, 2 g of NaOH dissolved in 10 ml of water and 3 ml of methanol were added thereto. 8 ml of 30% $H_2O_2$ was added dropwise to the solution at 0° C. The reaction was conducted at 40° C. for 6 hr, and then the reaction solution was poured into 2 liters of methanol to precipitate a polymer. The obtained polymer was refluxed with 100 ml of methanol for 2 hr and then was extracted with acetone and heptane over a period of 24 hr. The insoluble component was dried under reduced pressure at 50° C. for 8 hr to obtain a diblock copolymer of polypropylene-O-polybutylacrylate (referred to as PP-O-PBA). As a result of IR analysis, it was confirmed that there was a hydroxyl group in the terminal position of the copolymer molecule.

The weight-average molecular weight ($Mw_2$) of the PBA moiety, which was estimated according to the following equation, was 100,000.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the PBA moiety, $W_1$ is an amount of the polymer of PP-B used in the polymerization of BA, and $W_2$ is an yield of the diblock copolymer.

[Coupling Reaction]

In a nitrogen atmosphere, 40 ml of chlorobenzene, 160 ml of o-dichlorobenzene and 33 mg of hexamethylenediisocyanate were added to 26 g of the obtained diblock copolymer of PP-O-PBA having a hydroxyl group in the terminal position. The reflux was conducted for 24 hr. The solution was cooled to room temperature and was poured into 2 liters of methanol to precipitate a polymer. The obtained polymer was refluxed with 100 ml of methanol for 2 hr and then was dried under reduced pressure at 50° C. for 8 hr. According to NMR analysis, it was confirmed that the obtained polymer was a block copolymer ((PP-O-PBA)-hexamethylene-(PP-O-PBA)) having a structure such that the PP-O-PBA segment linked with the hexamethylene segment via a urethane linkage.

[Properties of the Block Copolymer ((PP-O-PBA)-hexamethylene-(PP-O-PBA))]

A pressed sheet was prepared at 190° C. in the same manner as in Example 13. The following tests were conducted by the use of the obtained block copolymer sheet.

Tensile Test

Tensile test was conducted at a temperature of 23° C., a span of 30 mm and a tensile speed of 30 mm/min by the use of a dumbbell specimen punched out of the pressed sheet 1 mm thick in accordance with ATSM D638.

Young's modulus of the obtained block copolymer sheet was 10 MPa, and the tensile elongation at break was 250%.

Oil Resistance ($\Delta V$)

The rectangular sheet 3 mm thick of the block copolymer was immersed in JIS No. 3 oil at 50° C. for 7 days in accordance with JIS K6301. The increasing change (percent) in the volume of the sheet given between before and after the immersion was measured. The increasing change in volume of the block copolymer sheet was 30%.

Rubber Elasticity (PS)

In accordance with JIS K6301, a dumbbell specimen punched out of the block copolymer sheet 1 mm thick was maintained at a temperature of 23° C. and an extension of 100% for 10 min by a tensile tester, and the permanent strain after 10 min from unloading was measured.

PS of the block copolymer sheet was 20%.

Example 18

[Preparation of Catalyst Solution]

Methylaluminoxane and meso-dimethylsilylenebis(2-methyl-4-phenylindenyl)zirconium dichloride were mixed in toluene (an appropriate amount of toluene may be optionally added) so that the concentration of zirconium was 0.00011 mmol/liter and the molar ratio of aluminum to zirconium was 350. The solution was preactivated by stirring for 15 min to prepare a catalyst solution.

[Polymerization]

250 ml of purified toluene was placed in a 500 ml glass reactor purged thoroughly with nitrogen, and ethylene and propylene were passed through at rates of 75 liters per hour and 125 liters per hour, respectively. With stirring at 600 revolutions per minute, a solution in the reactor was maintained at 80° C. for 10 min. 0.045 mg (0.0005 mmol) in terms of zirconium atom of the preactivated catalyst solution was added. The polymerization was conducted at 80° C. and ordinary pressure for 60 min. A small amount of isopropanol was added to terminate the polymerization. After completion of the polymerization, the reaction solution was poured into 2 liters of a methanol solution of dilute hydrochloric acid to precipitate a polymer. The polymer was washed twice with methanol and then the obtained polymer was dried under reduced pressure at 130° C. overnight. The yield of the obtained polymer (ethylene/propylene random copolymer (referred to as EPR)) was 3.2 g. As a result of IR analysis, the ethylene content was 70.7 mol %, and it was confirmed that there was an unsaturated bond in the terminal position of the polymer molecule. Mw was 1,500.

[Hydroboration]

In a dry box filled with argon, 4.9 g of the copolymer of EPR, which had an unsaturated bond in the terminal position, was suspended in 100 ml of degassed and dried THF, and the suspension was placed in a glass flask with a magnetic stirrer. 14.2 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and an ethylene/propylene random copolymer having boron in the terminal position (referred to as EPR-B) was obtained.

[Polymerization of Butylacrylate]

1.5 g of the copolymer of EPR-B was placed in a sealed flask and was suspended by the addition of 9.8 g of dried butylacrylate (BA) and 80 ml of THF. 1.0 ml of dried oxygen was blown through to initiate the reaction. The suspension was stirred at room temperature for 40 min and then was filtered. The filter cake was washed with degassed and dried IPA and was dried under reduced pressure to obtain a diblock copolymer of PP-O-polybutylacrylate (referred to as PBA) having boron in the terminal position (referred to as PP-O-PBA-B).

[Transformation in Terminal Position of the Polymer]

1.7 g of the obtained diblock copolymer was added to 250 ml of degassed and dried THF. In a nitrogen atmosphere at room temperature, 2 g of NaOH dissolved in 10 ml of water and 3 ml of methanol were added thereto. 8 ml of 30% $H_2O_2$ was added dropwise at 0° C. The reaction was conducted at 40° C. for 6 hr, and then the reaction solution was poured into 2 liters of methanol to precipitate a copolymer. The obtained copolymer was refluxed with 100 ml of methanol for 2 hr and then was dried under reduced pressure at 50° C. for 8 hr. As a result of IR analysis, it was confirmed that there was a hydroxyl group in the terminal position of the copolymer molecule.

250 ml of toluene, 3.5 mmol of ethanolamine and a catalytic amount of sulfuric acid were added to 1.7 g of the obtained copolymer of PP-O-PBA having a hydroxyl group in the terminal position, and the reaction was conducted at 100° C. for 12 hr. 1 liter of methanol was added to the reaction solution, and the solid product was filtered off. The solid product was washed twice with methanol and then was dried at 50° C. for 8 hr.

50 ml of a methanol solution of 10% hydrochloric acid was added to the polymer, and the reaction was conducted at 30° C. for 1 hr. The solid product was filtered off by a fritted-glass filter. The obtained copolymer was washed with acetone and was dried under reduced pressure at 50° C. for 8 hr. 500 ml of absolute tetralin was added to the obtained copolymer, and the suspension was heated at 180° C. The suspension was maintained at the same temperature for 24 hr with supplying phosgene at a rate of 50 g per hour. As a result of IR analysis, it was confirmed that the terminal position of the copolymer molecule was modified by an isocyanate group.

The weight-average molecular weight ($Mw_2$) of the PBA moiety, which was estimated according to the following equation, was 1,000.

$$Mw_2 = Mw_1 \cdot (W_2 - W_1)/W_1$$

wherein:

$Mw_1$ is a weight-average molecular weight of the EPR moiety, $Mw_2$ is a weight-average molecular weight of the PBA moiety, $W_1$ is an amount of the copolymer of EPR-B used in the polymerization of BA, and $W_2$ is an yield of the diblock copolymer.

[Coupling Reaction]

In a nitrogen atmosphere, 40 ml of chlorobenzene, 160 ml of o-dichlorobenzene and 1.6 g of pentaerythritol ethoxylate (15/4=EO/OH; and Mn=797) available from Aldrich were added to 5 g of the obtained diblock copolymer of PP-O-PBA, which had an isocyanate group in the terminal position. The reflux was conducted for 8 hr. The solution was cooled to room temperature and was poured into 2 liters of methanol to precipitate a polymer. The obtained polymer was refluxed with 100 ml of methanol for 2 hr and then was dried under reduced pressure at 50° C. for 8 hr.

According to NMR analysis, it was confirmed that the obtained polymer was a star block copolymer such as the segment of (PP-O-PBA-) linked with pentaerythritol ethoxylate via a urethane linkage. Further, since the residual pentaerythritol ethoxylate contained a trace amount of the hydroxyl group, it was assumed that the obtained block copolymer was a star block copolymer.

[Evaluation of Adhesive Properties of the Star Block Copolymer]

A star block copolymer film (a thickness of 120 to 130 μm) prepared in the same manner as in Example 13 was interposed between two sheets of PET film (200 μm thick) 15 cm square and was adhered under a press condition of 80° C. The obtained laminate was cut in a strip 15 cm wide. The PET film was peeled off the modified diblock copolymer film in the direction of 180° at the adhesive interface to measure the peel strength at 23° C.

The peel strength was 410 g/cm², and the diblock copolymer was excellent in adhesive properties.

Further, 3 g of the star block copolymer was interposed between PP films, and the same evaluation was conducted.

The peel strength was 320 g/cm², and the diblock copolymer was excellent in adhesive properties.

Example 19

[Preparation of Solid Titanium Catalyst Component]

7.14 g (75 mmol) of anhydrous magnesium chloride, 37.5 ml of decane and 35.1 ml (225 mmol) of 2-ethylhexylalcohol were allowed to react with heating at 130° C. for 2 hr, and the homogeneous solution was obtained. 1.67 g (11.3 mmol) of phthalic anhydride was added to the solution, and the solution was mixed with stirring at 130° C. for 1 hr to dissolve phthalic anhydride in the homogeneous solution. The obtained homogeneous solution was cooled to room temperature, and then a total amount of the solution was added dropwise to 200 ml (1.8 mol) of titanium tetrachloride maintained at a temperature of −20° C. over a period of 1 hr. After the addition, the temperature of the mixed solution was raised to 110° C. over a period of 4 hr. When the temperature went up to 110° C., 5.03 ml (18.8 mmol) of diisobutylphthalate (referred to as DIBP) was added, and then the solution was maintained for 2 hr at the same temperature with stirring. The solid product was collected by hot-filtration. The solid product was resuspended in 275 ml of titanium tetrachloride, and then the reaction was conducted with heating at 110° C. for 2 hr. After completion of the reaction, the solid product was collected by hot-filtration again and had been washed thoroughly with decane of 110° C. and hexane of room temperature until the free titanium compound was not detected in the washings. While the solid titanium catalyst component synthesized in the above manner was preserved as a slurry in hexane, part of the component was dried to examine the constituents of the catalyst. The constituents of the obtained solid titanium catalyst component were Ti of 2.1% by weight, Cl of 58% by weight, Mg of 18% by weight and DIBP of 10.9% by weight.

[Polymerization of Propylene]

A 500 ml glass autoclave was purged with nitrogen, and 250 ml of decane was placed in the autoclave. Nitrogen in the autoclave was replaced with propylene. With flowing propylene and stirring, the temperature in the autoclave was raised to 100° C., and 5 mmol of triethylaluminum, 0.5 mmol of cyclohexylmethyldimethoxysilane and 0.1 mmol-Ti in terms of titanium atom of the solid titanium catalyst component were added in this order. With controlling the flow rate of propylene to prevent unreacted gas from flowing out from a bubbling tube connected to a purge line and to prevent the pressure in the reactor from reducing, the polymerization was conducted at 100° C. for 1 hr. Propylene in the autoclave was replaced with nitrogen.

[Hydroxylation in Terminal Position]

With maintaining the above slurry of the polymer at 100° C. and passing dried air passed through molecular sieve at a rate of 200 liters/hr, the reaction was conducted at the same temperature for 5 hr. After completion of the reaction, the slurry was poured into a mixture of 2 liters of methanol and 2 liters of acetone and was allowed to stand still overnight. The fibrous polymer adhered to the agitating blade was discarded.

A small amount of hydrochloric acid was added to the slurry given after standing, and the slurry was filtered to obtain a white polymer.

The obtained polymer was washed with methanol and then was dried under reduced pressure at 80° C. for 10 hr. The yield of the obtained polymer was 2.5 g. According to $^{13}$C-NMR analysis, it was confirmed that 52 mol % of one side of terminal positions of the polymer molecule had hydroxyl group. According to the measurement by gel permeation chromatography (GPC), the weight-average molecular weight (Mw) was 170,000, and Mw/Mn was 11.2.

[Lithiation in Terminal Position]

30 ml of toluene was added to 2.5 g of the above polypropylene having a hydroxyl group, and 1 ml of a hexane solution of n-butyllithium of 1.6 M was added. The solution was stirred at room temperature for 24 hr. The slurry given after the reaction was cooled to −20° C., and the polypropylene filtered off was washed several times with toluene, while cooling at −20° C. According to $^1$H-NMR analysis, it was confirmed that the terminal position of the polymer molecule was lithiated.

[Anionic Polymerization]

30 ml of benzene and 30 ml of methylmethacrylate (MMA) were added to 2.0 g of the obtained polypropylene, which had lithium in the terminal position. The reaction was conducted at 20° C. for 100 hr with stirring by a magnetic stirrer. Methanol was added to terminate the reaction. The polymer was thoroughly washed with hexane and then was dried under reduced pressure at 45° C.

The conversion of MMA was 10.5%, and the triad tacticity of the poly-MMA segment of the obtained block copolymer was 77%. According to $^{13}$C-NMR analysis, it was confirmed that the obtained block copolymer was a block copolymer such that polypropylene linked with poly-MMA via oxygen of an ether linkage.

Example 20

[Anionic Polymerization]

30 ml of benzene, 28.9 ml of methylmethacrylate (MMA) and 1.6 ml of 2-methoxyethylmethacrylate (referred to as MEMA) were added to 2.0 g of the polypropylene which had lithium in the terminal position obtained in the same manner as in Example 19. The reaction was conducted at 20° C. for 100 hr with stirring them by a magnetic stirrer. Methanol was added to terminate the reaction. The polymer was thoroughly washed with hexane and was dried under reduced pressure at 45° C.

The conversions of MMA and MEMA were 5.1% and 7.1%, respectively. According to $^{13}$C-NMR analysis, it was confirmed that the obtained block copolymer was a block copolymer such that polypropylene linked with MMA/MEMA copolymer via oxygen of an ether linkage.

Example 21

[Preactivation of Catalyst]

0.023 mmol in terms of titanium atom of [(N-t-butylamido)(tetramethyl-η$^5$-cyclopentadienyl)dimethylsilane]titanium dichloride was weighed and placed in a glass flask purged thoroughly with nitrogen, and a toluene solution of 0.092 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared at a titanium concentration of 0.00046 mmol/ml.

[Polymerization of Olefin]

750 ml of purified heptane and 175 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.000375 mmol in terms of titanium atom of the above catalyst solution were added. Ethylene was fed to initiate the polymerization at a pressure of 0.9 MPa. After the initiation of the polymerization, only ethylene was supplied. The polymerization was conducted for 60 min with maintaining at a pressure of 0.9 MPa and a temperature of 25° C. After the elapse of a prescribed time, isopropanol (IPA) was added to terminate the reaction. After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained ethylene/octene random copolymer (EOR) was 24.1 g. The catalytic activity was 64 kg/mmol-Ti·hr. As a result of IR analysis of the copolymer, the octene content was 34.2 mol %, and it was confirmed that there was an unsaturated bond in the terminal position of the polymer molecule. Mw was 212,400.

[Hydroboration]

In a dry box filled with argon, 20 g of the copolymer of EOR, which had an unsaturated bond in the terminal position, was suspended in 100 ml of degassed and dried tetrahydrofuran (THF), and the suspension was placed in a glass flask with a magnetic stirrer. 1.5 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried IPA and was dried under reduced pressure, and an ethylene/octene random copolymer having boron in the terminal position (EOR-B) was obtained.

[Methylmethacrylate]

20 g of the copolymer of EOR-B was placed in a sealed flask and was suspended by the addition of 7.2 g of dried methylmethacrylate (MMA) and 80 ml of THF. 1.0 ml of dried oxygen was blown through to initiate the reaction, followed by stirring at room temperature for 2 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of (ethylene/octene random copolymer)-O-polymethylmethacrylate (referred to as EOR-O-PMMA, MFR measured at 230° C.: 0.5 g/10 min).

With respect to the diblock copolymer, the weight-average molecular weight (Mw$_2$) of the polymethylmethacrylate (PMMA) moiety, which was estimated according to the following equation, was 5,000.

$$Mw_2 = Mw_1 \cdot (W_2 - W_1)/W_1$$

wherein:

Mw$_1$ is a weight-average molecular weight of the EOR moiety,

Mw$_2$ is a weight-average molecular weight of the PMMA moiety, $W_1$ is an amount of the copolymer of EOR-B used in the polymerization of MMA, and $W_2$ is an yield of the diblock copolymer.

Example 22

[Preparation of Catalyst Solution]

Methylaluminoxane and diphenylsilylenebis(2,7-dimethyl-4-isopropylindenyl)zirconium dichloride were mixed in toluene (an appropriate amount of toluene may be optionally added) so that the concentration of zirconium was 0.00011 mmol/liter and the molar ratio of aluminum to zirconium (Al/Zr)was 350. The solution was preactivated by stirring for 15 min to prepare a catalyst solution.

[Polymerization]

400 ml of purified toluene was placed in a 500 ml glass reactor purged thoroughly with nitrogen, and propylene was passed through at a rate of 100 liters per hour. With stirring at 600 revolutions per minute, a solution in the reactor was maintained at 45° C. for 10 min. 19.4 mg in terms of aluminum atom of triisobutylaluminum was added. 0.36 mg in terms of zirconium atom of the above catalyst solution was added, and the temperature in the reactor was raised to 50° C. The polymerization was conducted at 50° C. and ordinary pressure for 20 min. A small amount of isopropanol was added to terminate the polymerization. After completion of the polymerization, the reaction solution was poured into 2 liters of a methanol solution of dilute hydrochloric acid to precipitate a polymer. The polymer was washed twice with methanol, and then the obtained polymer was dried under reduced pressure at 80° C. overnight.

The yield of the obtained polypropylene (PP) was 21.8 g. The catalytic activity was 16.4 kg/mmol-Zr·h. The melting point (Tm) measured by DSC was 149.1° C. Mw measured by GPC was 106,000. As a result of IR analysis, it was confirmed that there was an unsaturated bond in the terminal position of the polymer molecule.

[Hydroboration]

In a dry box filled with argon, 20 g of the above polymer of PP, which had an unsaturated bond in the terminal position, was suspended in 100 ml of degassed and dried THF, and the suspension was placed in a glass flask with a magnetic stirrer. 3.0 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and polypropylene having boron in the terminal position (PP-B) was obtained.

[Polymerization of Butylacrylate]

20 g of the polymer of PP-B was placed in a sealed flask and was suspended by the addition of 18.5 g of dried butylacrylate (BA) and 80 ml of THF. 1.9 ml of dried oxygen was blown through to initiate the reaction, followed by stirring at room temperature for 5 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of polypropylene-O-polybutylacrylate (PP-O-PBA, MFR measured at 230° C.: 100 g/10 min).

With respect to the diblock copolymer, the weight-average molecular weight ($Mw_2$) of the polybutylacrylate (PBA) moiety, which was estimated according to the following equation, was 10,000.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the PBA moiety, $W_1$ is an amount of the polymer of PP-B used in the polymerization of BA, and $W_2$ is an yield of the diblock copolymer.

Example 23

40 g of the diblock copolymer (EOR-O-PMMA) polymerized in Example 21, 40 g of an aliphatic petroleum resin (trade name: Hi-rez T-500X, available from Mitsui Chemicals Inc.) as an adhesion-imparting resin and 20 g of Sasol wax (trade name: Sasol™ H1, imported by S. Kato & Co.) as a low-molecular-weight polyolefin were blended and were kneaded by a labo plastomill at 180° C. for 15 min to prepare a hot-melt adhesive composition.

The obtained hot-melt adhesive composition was applied onto aluminum foils (50 µm thick) in a thickness of 25 µm, and then the each coated surfaces were attached to the other. Heat sealing was conducted under the conditions of an upper bar temperature of 120° C., a lower bar temperature of 120° C., an pressure of 3 kg/cm² and a heating time of 10 sec. The laminate was cut in a width of 25 mm to prepare a specimen. The specimen was used for T-peel test at a measuring temperature of 23° C. to measure (at a tensile speed of 300 mm/min) the adhesive strength (in accordance with JIS K6854).

Further, in the same manner as described above, the hot-melt adhesive composition was applied onto aluminum foils, and the each coated surfaces were attached to the other in a width of 10 mm. Heat sealing was conducted under the same conditions as described above, and then the laminate was cut in a width of 25 mm to prepare a specimen. Both sides of the specimen were individually pinched with jigs. One side was fixed, and another side was exerted a load of 500 g by hanging a weight. The atmospheric temperature was raised at a rate of 25° C./hr, and the temperature was measured when the weight fell to measure the thermal-resistant creep characteristic. FIG. 1 shows the schematic diagram of the method to measure the thermal-resistant creep characteristic. In the figure, "1" indicates a specimen, "2" and shaded area indicate heat-sealed part, "4" and "5" indicate jigs and "7" indicates a weight. The results are shown in Table 4.

Example 24

In the same manner as in Example 23, a hot-melt adhesive composition was prepared, and the adhesive strength and the thermal-resistant creep characteristic were measured, except that the block copolymer (PP-O-PBA) obtained in Example 22 was used as a base polymer. The results are shown in Table 4.

TABLE 4

|  | Example 23 | Example 24 |
|---|---|---|
| Adhesive strength (g/25 mm) | 650 | 600 |
| Thermal-resistant creep characteristic | 115° C. | 130° C. |

Example 25

[Preactivation of Catalyst]

10.0 mg of bis(1,3-dimethylcyclopentadienyl)zirconium dichloride was weighed and placed in a glass flask purged thoroughly with nitrogen, and a toluene solution of 17.2 mmol in terms of aluminum atom of methylaluminoxane was added thereto. The solution was sonicated at 23° C. for 15 min. An appropriate amount of toluene was added to the solution, and a total amount of 50 ml of the solution was obtained. This solution was used as a catalyst solution.

[Copolymerization of Ethylene/Norbornene]

In a nitrogen atmosphere at room temperature, 600 ml of a cyclohexane solution containing 20 g of norbornene was placed in a 1-liter stainless steel autoclave purged thoroughly with nitrogen. 0.6 mmol of triisobutylaluminum was added, and nitrogen in the autoclave was replaced with ethylene. The inside of the autoclave was pressurized with ethylene, and then the temperature in the autoclave was raised so that the temperature and the pressure in the autoclave were 70° C. and 0.7 MPa, respectively. 12.8 ml of the above catalyst solution was forced into the autoclave with pressurized nitrogen to initiate the polymerization. After the initiation of the polymerization, with supplying only ethylene, the polymerization was conducted at a pressure of 0.7 MPa and a temperature of 70° C. for 5 min. After 5 min from the initiation of the polymerization, 5 ml of isopropanol was forced into the autoclave with pressurized nitrogen to terminate the polymerization. After decompression, the polymer solution was taken out. With vigorously agitating by a homomixer, the polymer solution was brought into contact with an aqueous solution adding 5 ml of concentrated hydrochloric acid based on 1 liter of water at a ratio of 1 to 1, and the catalyst residue was passed into the water phase. The contacted mixed solution was allowed to stand still, and then the water phase was removed. The polymer solution was washed twice with water to purify the same, and the phase of the polymer solution was separated. The purified and separated polymer solution was allowed to contact with acetone, which was three times as much as the polymer solution, with vigorously agitating. After the precipitation of the copolymer, the solid product (copolymer) was collected by filtration and was thoroughly washed with acetone. To extract unreacted norbornene remaining in the polymer, the solid product was put in acetone so as to be a concentration of 40 g/liter, and the extraction was conducted at 60° C. for 2 hr. After the extraction, the solid product was collected by filtration and was dried under reduced pressure in flowing nitrogen at 130° C. and 350 mmHg for 12 hr.

The yield of the obtained ethylene/norbornene random copolymer (referred to as P(Et/NBR)) was 25.7 g. Thus, the catalytic activity was 41.8 kg/mmol-Zr·hr. As a result of IR analysis, the norbornene content was 8.5 mol %, and it was confirmed that there was an unsaturated bond in the terminal position of the polymer molecule. According to the measurement by GPC, Mw was 140,000.

[Hydroboration]

In a dry box filled with argon, 20 g of the copolymer of P(Et/NBR), which had an unsaturated bond in the terminal position, was suspended in 100 ml of degassed and dried THF, and the suspension was placed in a glass flask with a magnetic stirrer. 2.3 ml of a tetrahydrofuran (THF) solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried isopropanol (IPA) and was dried under reduced pressure, and an ethylene/norbornene random copolymer having boron in the terminal position (P(Et/NBR)-B) was obtained.

[Polymerization of Styrene]

20 g of the copolymer of P(Et/NBR)-B was placed in a sealed flask and was suspended by the addition of 11.4 g of dried styrene (St) and 80 ml of THF. 1.5 ml of dried oxygen was blown through to initiate the reaction, followed by stirring at room temperature for 14 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of (ethylene/norbornene random copolymer)-O-polystyrene (referred to as P(Et/NBR)-O-PSt).

With respect to the diblock copolymer, the weight-average molecular weight ($Mw_2$) of the polystyrene (PSt) moiety, which was estimated according to the following equation, was 5,000.

$$Mw_2 = Mw_1 \cdot (W_2 - W_1)/W_1$$

wherein:

$Mw_1$ is a weight-average molecular weight of the P(Et/NBR) moiety, $Mw_2$ is a weight-average molecular weight of the PSt moiety, $W_1$ is an amount of the copolymer of P(Et/NBR)-B used in the polymerization of styrene, and $W_2$ is an yield of the diblock copolymer.

Example 26

[Copolymerization of Ethylene/Propylene/Triene]

In a nitrogen atmosphere at room temperature, 651 ml of purified heptane, 24 ml of 4,8-dimethyl-1,4,8-decatriene (referred to as DMDT), a heptane solution of 0.75 mmol in terms of aluminum atom of triisobutylaluminum and a toluene solution of 0.021 mmol in terms of boron atom of triphenylcarbeniumtetrakis(pentafluorophenyl)borate were placed in a 2-liter stainless steel autoclave purged thoroughly with nitrogen.

After the addition of 9 liters of propylene, the temperature in the autoclave was raised. When the temperature went up to 60° C., the inside of the autoclave was pressurized to 0.9 MPa by supplying ethylene. When the temperature and the pressure in the autoclave went up to 70° C. and 0.9 MPa, respectively, a toluene solution of 0.00105 mmol in terms of titanium atom of [(N-t-butylamido)(tetramethyl-$\eta^5$-cyclopentadienyl)dimethylsilane]titanium dichloride was forced into the autoclave with pressurized nitrogen to initiate the polymerization. The polymerization was conducted for 30 min with maintaining at a pressure of 0.9 MPa and a temperature of 70° C. After 30 min from the initiation of the polymerization, 50 ml of methanol was added to terminate the polymerization. After cooling and decompression, the polymer solution was taken out. The polymer solution poured into about 3 liters of methanol to precipitate the polymer. The polymer was cut by a mixer and then was washed with about 2 liters of methanol by a mixer. The polymer was dried under reduced pressure in flowing nitrogen at 100° C. and 400 mmHg for 12 hr.

The yield of the obtained ethylene/propylene/triene copolymer (EPT) was 31.6 g. Thus, the catalytic activity was 60.2 kg/mmol-Ti·hr. As a result of IR analysis, the contents of ethylene and DMDT were 69 mol % and 3 mol %, respectively. Mw was 180,200.

[Hydroboration]

In a dry box filled with argon, 20 g of the copolymer of EPT was suspended in 100 ml of degassed and dried THF, and the suspension was placed in a glass flask with a magnetic stirrer. 1.8 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and an ethylene/propylene/triene copolymer having boron in the terminal position (EPT-B) was obtained.

[Polymerization of Methylmethacrylate]

20 g of the copolymer of EPT-B was placed in a sealed flask and was suspended by the addition of 8.5 g of dried methylmethacrylate (MMA) and 80 ml of THF. 1.1 ml of dried oxygen was blown through to initiate the reaction, followed by stirring at room temperature for 2 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of (ethylene/propylene/triene copolymer)-O-polymethylmethacrylate (referred to as EPT-O-PMMA).

With respect to the diblock copolymer, the weight-average molecular weight ($Mw_2$) of the polymethylmethacrylate (PMMA) moiety, which was estimated according to the following equation, was 5,000.

$$Mw_2 = Mw_1 \cdot (W_2 - W_1)/W_1$$

wherein:

$Mw_1$ is a weight-average molecular weight of the EPT moiety, $Mw_2$ is a weight-average molecular weight of the PMMA moiety, $W_1$ is an amount of the copolymer of EPT-B used in the polymerization of MMA, and $W_2$ is an yield of the diblock copolymer.

Example 27

100 parts of the diblock copolymer (P(Et/NBR)-O-PSt) polymerized in Example 25, 200 parts of magnesium hydroxide, 10 parts of calcium stearate and 3 parts of titanium white were blended and were kneaded by an open roll (front roll/back roll: 120/120° C. and 16/18 rpm) to obtain a blend. The blend was press molded into specimens at 200° C. With respect to the specimen, the kneading properties, the surface hardness, the heat resistance and the mar resistance were evaluated as follows. The results are shown in Table 5.

Kneading Properties

Rating:

AA: a specimen capable of being kneaded without a problem

BB: a specimen adherent to rolls and incapable of peeling

CC: a specimen non-adherent to rolls and incapable of being kneaded thoroughly

TMA (Penetration Temperature: Heat Resistance)

The penetration temperature was measured by the use of a penetrator of 1.8 mm in diameter under the conditions of a load of 2 kg/cm$^2$ and a temperature rise rate of 5° C./min.

Surface Hardness

The surface hardness was measured in accordance with ASTM D676.

Mar Resistance

By the Martens scratch hardness tester manufactured by Tokyo Koki Co., Ltd., a scratching indenter exerted a load of 20 g scratched the specimen 3 mm thick. The resulting scratch width was measured, and the reciprocal of the scratch width was calculated.

Comparative Example 4

In the same manner as in Example 27, specimens were prepared, except that ethylene/butene random copolymer (ethylene content: 88 mol %; density: 885 kg/m$^3$; Mw: 155,000; and Mw/Mn: 1.87) was used. With respect to the specimen, the kneading properties, the surface hardness, the heat resistance and the mar resistance were evaluated in the same manner as in Example 27. The results are shown in Table 5.

TABLE 5

|  | Example 27 | Comp. Ex. 4 |
| --- | --- | --- |
| Kneading properties | AA | BB |
| TMA (° C.) | 110 | 80 |
| Shore hardness | 75 | 90 |
| Martens hardness (1/mm) | 18 | 9 |

The specimen using the diblock copolymer according to the present invention was excellent in heat resistance, flexibility, mar resistance and kneading properties.

Example 28

The diblock copolymer (EPT-O-PMMA) polymerized in Example 26, zinc oxide, stearic acid, FEF carbon black, naphthenic oil, a vulcanizing accelerator and sulfur were blended according to Table 6 and were kneaded by an open roll (front roll/backroll: 70/70° C. and 16/18 rpm) to obtain an unvulcanized compounded rubber.

The obtained unvulcanized compounded rubber was heated for 20 min by a press heated at 160° C. to prepare a vulcanized sheet. With the respect to the sheet, the following tests were conducted. The results are shown in Table 6.

Tensile Test

The tensile strength (referred to as TB) and elongation (referred to as EB) were measured in accordance with JIS K6301.

Hardness Test

The hardness (JIS A) (referred to as HS) was measured in accordance with JIS K6301.

Ozone Resistance Test

Ozone resistance test was conducted in a bath for ozone test under the static conditions of an ozone concentration of 80 ppm, an extension of 80%, a temperature of 40° C. and a time of 96 hr. The ozone resistance was evaluated by the degree of deterioration of the surface in accordance with the scales in JIS K6301. The degree of deterioration of the surface was scaled as follows, for example, was indicated as "C-5".

(The Number of Ozone Crack)
  A: a small number of the crack
  B: a large number of the crack
  C: uncountable cracks (The Size and the Depth of Ozone Crack)
  1: cracks invisible but determinable by using a loupe magnifying 10 diameters
  2: visible cracks
  3: deep and comparatively large cracks (less than 1 mm)
  4: deep and large cracks (1 mm or above, and less than 3 mm)
  5: cracks of a size of 3 mm or above, or the specimen likely to be rent Vibration-damping Properties The dynamic viscoelasticity was measured by RDSII manufactured by Rheometric Scientific F.E. Ltd. at a frequency of 2.5 rad/sec and a temperature of 25° C. to measure a damping factor (tan δ). The specimen having a large value of tan δ is excellent in vibration-damping properties.

Comparative Example 5

In the same manner as in Example 28, a vulcanized sheet was prepared, and the tests were conducted, except that ethylene/propylene/5-ethylidene-2-norbornene copolymer (ethylene/propylene (molar ratio): 68/32; intrinsic viscosity [η]: 1.7 dl/g; and iodine value: 12) was used instead of the diblock copolymer (EPT-O-PMMA) obtained in Example 26, and that the blending amounts of various constituents were altered as described in Table 6. The results are shown in Table 6.

TABLE 6

|  | Example 28 | Comp. Ex. 5 |
| --- | --- | --- |
| Constituents (part by weight) | | |
| the copolymer | 100 | 100 |
| carbon black | 40 | 60 |
| naphthenic oil | 50 | 50 |
| zinc oxide | 5 | 5 |
| stearic acid | 1 | 1 |
| sulfur | 2.5 | 2.5 |
| vulcanizing accelerator | | |
| CBS | 1.5 | — |
| MBT | — | 3.0 |
| ZnBDC | — | 1.5 |
| TMTD | — | 0.75 |
| Properties | | |
| TB (MPa) | 16 | 12 |
| EB (%) | 430 | 540 |
| HS (JIS A) | 63 | 54 |
| Ozone resistance | A-1 | A-1 |
| tan δ | 0.76 | 0.18 | wherein:
CBS is N-cyclohexyl-2-benzothiazole sulfenamide;
MBT is 2-mercaptobenzothiazol;
ZnBDC is zinc di-n-butyldithiocarbamate; and
MTD is tetramethylthiuramdisulfide.

Example 29

[Preactivation of Catalyst Component]

Methylaluminoxane and dimethylsilylenebis (2-ethyl-4-phenylindenyl)zirconium dichloride were mixed in toluene so that the concentration of zirconium was 0.00011 mmol/liter and the molar ratio of aluminum to zirconium was 350. The solution was preactivated by stirring for 15 min.

[Polymerization]

400 ml of purified toluene was placed in a 500 ml glass reactor purged thoroughly with nitrogen, and propylene was passed through at a rate of 100 liters per hour. With stirring at 600 revolutions per minute, a solution in the reactor was maintained at 45° C. for 10 min. 3.9 mg in terms of aluminum atom of triisobutylaluminum was added. 0.073 mg in terms of zirconium atom of the preactivated catalyst solution was added. The polymerization was conducted at 50° C. and ordinary pressure for 5 min. A small amount of isopropanol was added to terminate the polymerization.

After completion of the polymerization, the reaction solution was poured into 2 liters of a methanol solution of dilute hydrochloric acid to precipitate a polymer (polypropylene). The polymer was washed twice with methanol, and then the obtained polymer was dried under reduced pressure at 80° C. overnight. The yield of the obtained polypropylene was 14.1 g. The catalytic activity was 212 kg/mmol-Zr·hr. As a result of $^{13}$C-NMR analysis, the meso-pentad fraction (mmmm) of the polypropylene was 97.8%. Mw measured by GPC was 133,000. As a result of IR analysis, it was confirmed that there was an unsaturated bond in the terminal position of the polymer molecule.

[Hydroboration]

In a dry box filled with argon, 20 g of the above polymer (Mw=133,000), which had an unsaturated bond in the terminal position, was suspended in 100 ml of degassed and dried tetrahydrofuran (THF), and the suspension was placed in a glass flask with a magnetic stirrer. 2.4 ml of a THF solution of 9-BBN (0.5 M) was added to the suspension. In the dry box, the slurry was stirred at 55° C. for 5 hr and then was filtered. The filter cake was washed with degassed and dried isopropanol (IPA) and was dried under reduced pressure, and polypropylene having boron in the terminal position (PP-B) was obtained.

[Polymerization of Methylmethacrylate]

20 g of the obtained polymer of PP-B was placed in a sealed flask and was suspended by the addition of 11.5 g of dried methylmethacrylate (MMA) and 80 ml of THF. 1.6 ml of dried oxygen was blown through to initiate the reaction, followed by stirring at room temperature for 8 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of polypropylene-O-polymethylmethacrylate (PP-O-PMMA).

With respect to the obtained polymer, the weight-average molecular weight ($Mw_2$) of the polymethylmethacrylate (PMMA) moiety, which was estimated according to the following equation, was 20,000.

$$Mw_2 = Mw_1 \cdot (W_2 - W_1)/W_1$$

wherein:
  $Mw_1$ is a weight-average molecular weight of the PP moiety,
  $Mw_2$ is a weight-average molecular weight of the PMMA moiety,
  $W_1$ is an amount of the polymer of PP-B used in the polymerization of MMA, and
  $W_2$ is an yield of the diblock copolymer.

Example 30

[Preparation of Solid Catalyst Component]

3.0 g of silica dried at 250° C. for 10 hr was suspended in 50 ml of toluene, and then the suspension was cooled to 0° C. 17.8 ml of a toluene solution of methylaluminoxane (Al=1.29 mmol/ml) was added dropwise to the suspension over a period of 30 min with maintaining at 0° C., followed by reacting at 0° C. for 30 min. The temperature was raised to 95° C. over a period of 30 min, and the reaction was conducted for 4 hr at the same temperature. The temperature was lowered to 60° C., and the supernatant liquid was removed by decantation.

The obtained solid component was washed twice with toluene and then was resuspended in 50 ml of toluene. 11.1 ml of a toluene solution of bis(1-n-butyl-3-methylcyclopentadienyl)zirconium dichloride (Zr=0.0103 mmol/ml) was added dropwise to the suspension at 20° C. over a period of 30 min. The temperature in the reactor was raised to 80° C., and the reaction was conducted for 2 hr at the same temperature. The supernatant liquid was removed, and the precipitate was washed twice with hexane to obtain a solid catalyst. The obtained catalyst included 2.3 mg of zirconium based on 1 g of the solid catalyst.

[Preparation of Prepolymerized Catalyst]

4 g of the obtained solid catalyst was resuspended in 400 ml of hexane. 5.0 ml of a decane solution of triisobutylaluminum (1 mmol/ml) and 0.36 g of 1-hexene were added to the suspension, and the prepolymerization of ethylene was conducted at 35° C. for 2 hr. After the removal of the supernatant liquid, the precipitate was washed three times with hexane to obtain a prepolymerized catalyst including 2.2 mg of zirconium and with 3 g of polyethylene which was prepolymerized, based on 1 g of the solid catalyst.

[Polymerization of Olefin]

1 liter of dehydrated and purified heptane was placed in a 2-liter stainless steel autoclave purged thoroughly with nitrogen, and nitrogen in the autoclave was replaced with ethylene. The temperature in the autoclave was raised to 60° C., and 1.5 mmol of triisobutylaluminum and 0.91 mg in terms of zirconium atom of the prepolymerized catalyst were added. Ethylene was fed to initiate the polymerization at a pressure of 0.9 MPa. Thereafter, with supplying only ethylene, the polymerization was conducted at a pressure of 0.9 MPa and a temperature of 80° C. for 1.5 hr.

After completion of the polymerization, the polymer was filtered off and was dried at 80° C. overnight. The yield of the obtained polymer was 106 g. In the above polymerization, the catalytic activity based on a zirconium atom was 11 kg/mmol-Zr. The obtained polymer had MFR of 0.08 g/10 min, a density of 0.96 g/cm$^3$ and Mw of 183,000. As a result of IR analysis, it was confirmed that there was an unsaturated bond in the terminal position of the polymer molecule.

[Hydroboration]

In a dry box filled with argon, 20 g of the above polymer (Mw=183,000), which had an unsaturated bond in the terminal position, was suspended in 100 ml of degassed and dried THF, and the suspension was placed in a glass flask with a magnetic stirrer. 1.8 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and homopolyethylene having boron in the terminal position (referred to as HDPE-B) was obtained.

[Polymerization of Methylmethacrylate]

20 g of the obtained polymer of HDPE-B was placed in a sealed flask and was suspended by the addition of 8.4 g of dried MMA and 80 ml of THF. 1.1 ml of dried oxygen was blown through to initiate the reaction, followed by stirring at room temperature for 4 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of polyethylene-O-polymethylmethacrylate (referred to as HDPE-O-PMMA).

With respect to the obtained polymer, the weight-average molecular weight ($Mw_2$) of the polymethylmethacrylate (PMMA) moiety, which was estimated according to the following equation, was 10,000.

$$Mw_2 = Mw_1 \cdot (W_2 - W_1)/W_1$$

wherein:

$Mw_1$ is a weight-average molecular weight of the HDPE moiety, $Mw_2$ is a weight-average molecular weight of the PMMA moiety, $W_1$ is an amount of the polymer of HDPE-B used in the polymerization of MMA, and $W_2$ is an yield of the diblock copolymer.

Example 31

0.023 mmol in terms of titanium atom of [(N-t-butylamido)(tetramethyl-$\eta^5$-cyclopentadienyl)dimethylsilane]titanium dichloride was weighed and placed in a glass flask purged thoroughly with nitrogen, and a toluene solution of 0.092 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 175 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.000375 mmol in terms of titanium atom of the preactivated catalyst were added. Ethylene was fed to initiate the polymerization at a pressure of 0.9 MPa. Thereafter, only ethylene was supplied. The polymerization was conducted for 60 min with maintaining at a pressure of 0.9 MPa and a temperature of 25° C. After the elapse of prescribed time, isopropanol was added to terminate the reaction. After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained copolymer was 24.1 g. The catalytic activity was 64 kg/mmol-Ti·hr. As a result of IR analysis of the ethylene/octene copolymer, the contents of ethylene and octene were 65.8 mol % and 34.2 mol %, respectively, and it was confirmed that there was an unsaturated bond in the terminal position of the polymer molecule. Mw was 212,400.

[Hydroboration]

In a dry box filled with argon, 20 g of the above polymer (Mw=212,400), which had an unsaturated bond in the terminal position, was suspended in 100 ml of degassed and dried THF, and the suspension was placed in a glass flask with a magnetic stirrer. 1.5 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried IPA and was dried under reduced pressure, and an ethylene/octene copolymer having boron in the terminal position (referred to as EOR-B) was obtained.

[Polymerization of Methylmethacrylate]

20 g of the copolymer of EOR-B was placed in a sealed flask and was suspended by the addition of 7.2 g of dried MMA and 80 ml of THF. 1.0 ml of dried oxygen was blown through to initiate the reaction, followed by stirring at room temperature for 11 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of (ethylene/octene rubber)-O-polymethylmethacrylate (referred to as EOR-O-PMMA).

The weight-average molecular weight ($Mw_2$) of the polymethylmethacrylate (PMMA) moiety, which was estimated according to the following equation, was 25,000.

$$Mw_2 = Mw_1 \cdot (W_2 - W_1)/W_1$$

wherein:

$Mw_1$ is a weight-average molecular weight of the EOR moiety, $Mw_2$ is a weight-average molecular weight of the PMMA moiety, $W_1$ is an amount of the copolymer of EOR-B used in the polymerization of MMA, and $W_2$ is an yield of the diblock copolymer.

Example 32

[Preactivation of Catalyst]

10.0 mg of bis(1,3-dimethylcyclopentadienyl)zirconium dichloride was weighed and placed in a glass flask purged thoroughly with nitrogen, and a toluene solution of 17.2 mmol in terms of aluminum atom of methylaluminoxane was added thereto. The solution was sonicated at 23° C. for 15 min. An appropriate amount of toluene was added to the solution, and a total amount of 50 ml of the solution was obtained. This solution was used as a catalyst solution.

[Copolymerization of Ethylene/Norbornene]

In a nitrogen atmosphere at room temperature, 600 ml of a cyclohexane solution containing 20 g of norbornene was placed in a 1-liter stainless steel autoclave purged thoroughly with nitrogen.

0.6 mmol of triisobutylaluminum was added, and nitrogen in the autoclave was replaced with ethylene. The inside of the autoclave was pressurized with ethylene, and then the temperature in the autoclave was raised so that the temperature and the pressure in the autoclave were 70° C. and 0.7 MPa, respectively. 12.8 ml of the prepared catalyst solution was forced into the autoclave with pressurized nitrogen to initiate the polymerization. Thereafter, with supplying only ethylene, the polymerization was conducted at a pressure of 0.7 MPa and a temperature of 70° C. for 5 min.

After 5 min from the initiation of the polymerization, 5 ml of isopropanol was forced into the autoclave with pressurized nitrogen to terminate the polymerization.

After decompression, the polymer solution was taken out. With vigorously agitating by a homomixer, the polymer solution was brought into contact with an aqueous solution prepared by adding 5 ml of concentrated hydrochloric acid based on 1 liter of water at a ratio of 1 to 1, and the catalyst residue was passed into the water phase. The contacted mixed solution was allowed to stand still, and then the water phase was removed. The polymer solution was washed twice with water to purify the same, and the phase of the polymer solution was separated.

The purified and separated polymer solution was allowed to contact with acetone, which was three times as much as the polymer solution, with vigorously agitating. After the precipitation of the copolymer, the solid product (copolymer) was collected by filtration and was thoroughly washed with acetone. To extract unreacted norbornene remained in the polymer, the solid product was put in acetone so as to be a concentration of 40 g/liter, and the extraction was conducted at 60° C. for 2 hr. After the extraction, the solid product was collected by filtration and was dried under reduced pressure in flowing nitrogen at 130° C. and 350 mmHg for 12 hr.

The yield of the obtained ethylene/norbornene copolymer (P(Et/NBR)) was 25.7 g. Thus, the catalytic activity was 41.8 kg/mmol-Zr·hr. As a result of IR analysis, the contents of ethylene and norbornene were 91.5 mol % and 8.5 mol %, respectively, and it was confirmed that there was an unsaturated bond in the terminal position of the polymer molecule. According to the measurement by GPC, Mw was 140,000.

[Hydroboration]

In a dry box filled with argon, 20 g of the above polymer (Mw=140,000), which had an unsaturated bond in the terminal position, was suspended in 100 ml of degassed and dried THF, and the suspension was placed in a glass flask with a magnetic stirrer. 2.3 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and an ethylene/norbornene copolymer having boron in the terminal position (P(Et/NBR)-B) was obtained.

[Polymerization of Methylmethacrylate]

20 g of the copolymer of P(Et/NBR)-B was placed in a sealed flask and was suspended by the addition of 11.0 g of dried MMA and 80 ml of THF. 1.5 ml of dried oxygen was blown through to initiate the reaction, followed by stirring at room-temperature for 21 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of (ethylene/norbornene copolymer)-O-polymethylmethacrylate (referred to as P(Et/NBR)-O-PMMA).

With respect to the polymer, the weight-average molecular weight ($Mw_2$) of the polymethylmethacrylate (PMMA) moiety, which was estimated according to the following equation, was 50,000.

$$Mw_2 = Mw_1 \cdot (W_2 - W_1)/W_1$$

wherein:

$Mw_1$ is a weight-average molecular weight of the P(Et/NBR) moiety, $Mw_2$ is a weight-average molecular weight of the PMMA moiety, $W_1$ is an amount of the copolymer of P(Et/NBR)-B used in the polymerization of MMA, and $W_2$ is an yield of the diblock copolymer.

In Examples 33 to 37, the various properties were measured as follows.

Hardness (JIS A)

The hardness (JIS A) was measured in accordance with JIS K7215.

Modulus in Tension

The modulus in tension was measured at a span of 30 mm, a tensile speed of 30 mm/min and a temperature of 23° C. by the use of JIS No. 3 dumbbell shape in accordance with JIS K6301.

Flexural Modulus (FM)

The flexural modulus was measured at a span of 51 mm and a flexure speed of 20 mm/min by the use of the specimen an eighth inch thick in accordance with ASTM D790.

Izod Impact Strength (IZ)

The Izod impact strength was measured at 23° C. by the use of the specimen (post-notch) a quarter inch thick in accordance with ASTM D256.

Rockwell Hardness (HR)

The Rockwell hardness was measured by the use of a square plate 2 mm thick, 120 mm long and 130 mm wide in accordance with ASTM D785.

Oil Resistance

The change ($\Delta V$) in the volume of a specimen given between before and after immersion in JIS No. 3 oil at 50° C. for 336 hr was measured in accordance with JIS K6258.

Pencil Hardness

The pencil hardness was measured at 23° C. by the use of the specimen an eighth inch thick in accordance with JIS K5401.

Heat Distortion Temperature (HDT)

The heat distortion temperature was measured by the use of the specimen a quarter inch thick in accordance with ASTM D648 (at a load of 4.6 kg/cm$^2$).

Martens Hardness

By the Martens scratch hardness tester manufactured by Tokyo Koki Co., Ltd., a scratching indenter exerted a load of 20 g scratched the specimen 3 mm thick. The resulting scratch width was measured, and the reciprocal of the scratch width was calculated.

Example 33

The diblock copolymer (PP-O-PMMA) obtained in Example 29 was molded by a 55t injection press (IS55EPN, manufactured by Toshiba Machine Co., Ltd.) at a cylinder temperature of 200° C. and a mold temperature of 40° C.

The moldings had a flexural modulus (FM) of 2330 MPa, a surface hardness (HR) of 115, a heat distortion temperature (HDT) of 135° C. and a pencil hardness of "H".

Example 34

The diblock copolymer (HDPE-O-PMMA) obtained in Example 30 was press molded at a press temperature of 200° C.

The moldings had a flexural modulus (FM) of 1300 MPa, a heat distortion temperature (HDT) of 100° C. and an oil resistance ($\Delta V$) of 0%.

Example 35

The diblock copolymer (EOR-O-PMMA) obtained in Example 31 was press molded at a press temperature of 200° C.

The moldings had a modulus in tension of 10 MPa and a hardness (JIS A) of 60.

Example 36

80 parts by weight of the block copolymer (HDPE-O-PMMA) obtained in Example 30 and 20 parts by weight of the block copolymer (EOR-O-PMMA) obtained in Example 31 were melt kneaded and then were molded by a 55t injection press (IS55EPN, manufactured by Toshiba Machine Co., Ltd.) at a cylinder temperature of 200° C. and a mold temperature of 40° C.

The moldings had a flexural modulus (FM) of 1400 MPa, an impact strength (IZ) of 400 J/m and a surface hardness (HR) of 85.

Example 37

0.1 part by weight of PH25B (available from NOF Corp.) and 0.2 part by weight of divinylbenzene were added to 100 parts by weight of the diblock copolymer (P(Et/NBR)-O-PMMA) obtained in Example 32 and were impregnated by a roll mill at 40° C.

The obtained composition was press molded at a press temperature of 200° C.

The moldings had a modulus in tension of 50 MPa, a Martens hardness of 30 and a penetration temperature of 85° C.

Example 38

[Preactivation of Catalyst]

0.23 mmol in terms of zirconium atom of bis(tetramethyl-$\eta^5$-cyclopentadienyl)dimethylzirconium was weighed and placed in a glass flask purged thoroughly with nitrogen, and a toluene solution of 0.92 mmol in terms of boron atom of tris(pentafluorophenyl)borane was added thereto. An appropriate amount of toluene was added to the mixed solution, and a total amount of 50 ml of the solution was obtained. A catalyst solution was prepared in a zirconium concentration of 0.0046 mmol/ml.

[Polymerization of Olefin]

225 ml of purified toluene was placed in a 500 ml glass reactor purged thoroughly with nitrogen, and ethylene was passed through at a rate of 200 liters per hour. With stirring at 600 revolutions per minute, a solution in the reactor was maintained at 45° C. for 10 min. 7.5 mmol in terms of aluminum atom of triisobutylaluminum was added. 6.0 mmol of 9-BBN was added, and then 0.075 mmol in terms of zirconium atom of the preactivated catalyst solution was added. The polymerization was conducted at 50° C. and ordinary pressure for 5 min. A small amount of absolute methanol was added to terminate the polymerization. After completion of the polymerization, the polymer was washed with absolute THF. The obtained polymer was dried under reduced pressure at 50° C. overnight. The obtained polymer was 1.4 g of polyethylene. The catalytic activity was 224 g/mmol-Zr·h.

[Confirmation of Molecular Weight and Terminal Position of the Polymer]

1.0 g of the obtained polymer was added to 25 ml of absolute THF. In a nitrogen atmosphere at room temperature, a solution prepared by dissolving 0.2 g of NaOH in 1 ml of water and 0.25 ml of methanol were added to the THF solution. 0.8 ml of 30% H$_2$O$_2$ was added dropwise at 0° C. The reaction was conducted at 40° C. for 6 hr, and then the reaction solution was poured into 2 liters of a methanol solution to precipitate a polymer. The obtained polymer was refluxed with 50 ml of methanol for 2 hr and then was dried under reduced pressure at 50° C. for 8 hr. Mw determined by GPC analysis was 14,800. As a result of IR analysis, it was confirmed that a terminal position of the polymer molecule was modified by a hydroxyl group so that there was no unsaturated bond in the terminal position. Thus, it was confirmed that the terminal position of the polymer obtained in the section of [polymerization of olefin] was modified by boron.

[Polymerization of Butylacrylate]

10 g of the homopolyethylene (HDPE-B) (obtained by the polymerization of olefin, which had boron in the terminal position, was placed in a sealed flask and was resuspended by the addition of 66.2 g of dried BA (butylacrylate) and 80 ml of THF. 7.0 ml of dried oxygen was blown through to initiate the reaction, followed by stirring at room temperature for 156 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of polyethylene-O-polybutylacrylate (referred to as HDPE-O-PBA). The weight-average molecular weight (Mw$_2$) of the polybutylacrylate (PBA) moiety, which was estimated according to the following equation, was 300,000.

$$Mw_2 = Mw_1 \cdot (W_2 - W_1)/Mw_1$$

wherein:

Mw$_1$ is a weight-average molecular weight of the HDPE moiety,

Mw$_2$ is a weight-average molecular weight of the PBA moiety,

W$_1$ is an amount of the polymer of HDPE-B used in the polymerization of BA, and W$_2$ is an yield of the diblock copolymer.

Example 39

[Preactivation of Catalyst Component]

Methylaluminoxane and dimethylsilylenebis(2-ethyl-4-phenylindenyl)zirconium dichloride were mixed in toluene (an appropriate amount of toluene may be optionally added) so that the concentration of zirconium was 0.00011 mmol/liter and the molar ratio of aluminum to zirconium was 350. The solution was preactivated by stirring for 15 min.

[Polymerization]

400 ml of purified toluene was placed in a 500 ml glass reactor purged thoroughly with nitrogen, and propylene was passed through at a rate of 100 liters per hour. With stirring at 600 revolutions per minute, a solution in the reactor was maintained at 45° C. for 10 min. 3.9 mg in terms of aluminum atom of triisobutylaluminum was added. 0.073 mg in terms of zirconium atom of the preactivated catalyst solution was added. The polymerization was conducted at 50° C. and ordinary pressure for 5 min. A small amount of isopropanol was added to terminate the polymerization. After completion of the polymerization, the reaction solution was poured into 2 liters of a methanol solution of dilute hydrochloric acid to precipitate a polymer. The polymer was washed twice with methanol, and then the obtained polymer was dried under reduced pressure at 80° C. overnight. The yield of the obtained polypropylene was 14.1 g. The catalytic activity was 212 kg/mmol-Zr·h. As a result of $^{13}$C-NMR analysis, the meso-pentad fraction (mmmm) of the polypropylene was 97.8%. Mw measured by GPC was 133,000. As a result of IR analysis, it was confirmed that there was an unsaturated bond in the terminal position of the polymer molecule.

[Hydroboration]

In a dry box filled with argon, 20 g of the above polymer (Mw=133,000), which had an unsaturated bond in the terminal position, was suspended in 100 ml of degassed and dried THF, and the suspension was placed in a glass flask with a magnetic stirrer. 2.4 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and polypropylene (PP) having boron in the terminal position was obtained.

[Polymerization of Methylmethacrylate]

20 g of the above polymer of PP having boron in the terminal position was placed in a sealed flask and was suspended by the addition of 11.5 g of dried MMA (methylmethacrylate) and 80 ml of THF. 1.6 ml of dried oxygen was blown through to initiate the reaction, followed by stirring at room temperature for 4 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of polypropylene-O-polymethylmethacrylate (PP-O-PMMA).

The obtained diblock copolymer had MFR (measured at 230° C.) of 20 g/10 min, a molecular weight of the polypropylene segment of 150,000, an mmmm of 0.98, Mw/Mn of 4.3 and a molecular weight of the PMMA moiety of 10,000.

Example 40

The diblock copolymer (P(Et/NBR)-O-PSt) prepared in Example 1 was molded by press molding and tube extrusion into specimens of wire tube at 200° C. With respect to the specimen, TMA, the Shore hardness, the Martens hardness, the repeated impulse and the dielectric breakdown voltage were measured as follows. The results are shown in Table 7.

TMA (Penetration Temperature: Heat Resistance)

The penetration temperature was measured by the use of a penetrator of 1.8 mm in diameter under the conditions of a load of 2 kg/cm$^2$ and a temperature rise rate of 5° C./min.

Surface Hardness

The surface hardness was measured in accordance with ASTM D676.

Mar Resistance (Martens Hardness)

A diamond indenter exerted a load of 20 g marred the press molded specimen. The scratch width was measured, and the Martens hardness was determined by the reciprocal of the scratch width.

Repeated Impulse

To prepare a testing cable, an inner conductor layer comprising a single-wire of 1 mm in diameter was sheathed with an insulating layer (1.5 mm thick) of the testing copolymer. With respect to the cable, lightening impulse test (impressed a voltage of 100 kV for 5 min) was conducted.

Dielectric Breakdown Voltage

The breakdown voltage was measured by the use of the pressed sheet 1 mm thick at 25° C. in accordance with ASTM D149.

Comparative Example 6

Specimens were prepared in the same manner as in Example 40, except that an ethylene/butene copolymer (ethylene content: 88 mol %; density: 885 kg/m$^3$; Mw: 155,000; and Mw/Mn: 1.87) was used instead of the diblock copolymer (P(Et/NBR)-O-PSt). With respect to the obtained specimen, the tests were conducted in the same manner as in Example 40. The results are shown in Table 7.

TABLE 7

| | Example 40 | Comp. Ex. 6 |
|---|---|---|
| Sample | diblock copolymer (P(Et/NBR)-O-PSt) | ethylene/butene copolymer |
| TMA (° C.) | 110 | 80 |
| Shore hardness | 73 | 88 |
| Martens hardness (1/mm) | 19 | 9 |
| Repeated impulse (ratio of the breakdown frequency) | 9 | 3 |
| Dielectric breakdown voltage (kV/mm) | 62 | 58 |

As can be seen from Table 7, the wire tube of the diblock copolymer A was excellent in all of heat resistance, flexibility, mar resistance, repeated impulse and dielectric breakdown voltage with respect to the tube specimen.

Example 41

2 mol % of metal salt of Group Ia of the Periodic Table (LiN(CF$_3$SO$_2$)$_2$) based on the isobutylacrylate segment and 0.3% by weight of Perloyl L (available from NOF Corp.) based on the diblock copolymer were added to the diblock copolymer (HDPE-O-PBA) obtained in Example 38. The mixture was melt kneaded by an open roll (front roll/back roll: 120/120° C. and 16/18 rpm) to obtain a blend. The blend was press molded into a specimen for a solid polyelectrolyte in an inert gas atmosphere at 140° C.

The specimen for the solid polyelectrolyte was punched in a disk of 10 mm in diameter. The disk was jammed between electrodes fitted in the holders for conductometry. With maintaining the electrodes at 25° C. by using a Peltier element, the complex impedance was measured (at a voltage of 10 mV) by an impedance analyzer (HP4285A) to determine the ionic conductivity analytically.

The ionic conductivity was so good as to be $8.9 \times 10^{-4}$ (S/cm).

Example 42

The diblock copolymer (PP-O-PMMA) prepared in Example 39 was press molded into specimens for a housing at 200° C. With respect to the specimen, the ionic conductance measured in the same manner as in Example 41 was so good as to be $8.9 \times 10^{-4}$ (S/cm).

With respect to the specimen, the flexural modulus (FM), the Rockwell hardness (HR), the pencil hardness and the heat distortion temperature (HDT) were measured as follows. The results are shown in Table 8.

Flexural Modulus (FM)

The flexural modulus was measured at a span of 30 mm and a flexure speed of 20 mm/min by the use of the specimen 1 mm thick in accordance with ASTM C790.

Rockwell Hardness (HR)

The Rockwell hardness was measured by the use of two-ply pressed sheets 1 mm thick respectively in accordance with ASTM D785.

Pencil Hardness

The pencil hardness was measured at 23° C. by the use of the specimen 1 mm thick in accordance with JIS K5401.

Heat Distortion Temperature (HDT)

The heat distortion temperature was measured by the use of a pressed sheet 3 mm thick in accordance with ASTM D648 (at a load of 4.6 kg/cm$^2$).

Comparative Example 7

Tests were conducted in the same manner as in Example 42, except that polypropylene (MFR (measured at 230° C.): 20 g/10 min; molecular weight: 200,000; mmmm: 0.98; and Mw/Mn: 4.3) was used instead of the diblock copolymer (PP-O-PMMA). The results are shown in Table 8.

TABLE 8

| | Example 42 | Comp. Ex. 7 |
|---|---|---|
| Sample | diblock copolymer (PP-O-PMMA) | polypropylene |
| FM (MPa) | 2500 | 1800 |
| HR (M-scale) | 55 | 35 |
| Pencil hardness | 2H | HB |
| HDT (° C.) | 138 | 123 |

As can be seen from Table 8, the housing of the diblock copolymer (PP-O-PMMA) was excellent in hardness, rigidity and heat resistance. The block copolymer was excellent in affinity with inorganic fillers.

Example 43

[Preactivation of Catalyst]

[(N-t-butylamido)(tetramethyl-$\eta^5$-cyclopentadienyl)dimethylsilane]titanium dichloride (0.023 mmol in terms of titanium atom) was placed in a glass flask purged thoroughly with nitrogen, and a toluene solution of triphenylmethylpentakis(pentafluorophenyl)borate (0.69 mmol in terms of boron atom) was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 35 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and the preactivated catalyst (0.00075 mmol in terms of titanium atom) were added. Ethylene was fed to initiate the polymerization at a pressure of 0.9 MPa. Thereafter, only ethylene was supplied. During the polymerization, the operation such that the supply of ethylene was stopped and thereby the temperature dropped to about 70° C. was carried out twice to prevent the temperature from rising rapidly. The polymerization was conducted at a pressure of 0.5 to 0.9 MPa and a temperature of 70 to 85° C. for 6 min. Isopropanol was added to terminate the polymerization. After decompression, the solution containing the polymer was taken out and was poured into 4 liters of methanol. The solution was stirred thoroughly. The solid product in the methanol was collected by filtration and was washed with methanol. The solid product was dried in flowing nitrogen at 120° C. and 500 mmHg for 12 hr.

The yield of the obtained ethylene/octene copolymer (referred to as EOR) was 66.0 g. The catalytic activity was 880 kg/mmol-Ti·h.

As a result of IR analysis, the octene content of the copolymer was 12.6 mol %, and it was confirmed that there was an unsaturated bond in the terminal position of the polymer molecule. Mw was 132,400.

[Transformation in Terminal Position of the Polymer]

In a dry box filled with argon, 20 g of the above polymer (Mw=132,400), which had an unsaturated bond in the terminal position, was suspended in 100 ml of degassed and dried tetrahydrofuran (THF), and the suspension was placed in a glass flask with a magnetic stirrer. 2.2 ml of a THF solution of 9-borabicyclo[3.3.1]nonane (9-BBN) (0.5 M) was added to the suspension. In the dry box, the slurry was stirred at 55° C. for 5 hr, and then the obtained solution was filtered. The filter cake was washed with degassed and dried isopropanol (IPA) and was dried under reduced pressure.

10 g of the obtained polymer was added to 25 ml of degassed and dried THF. In a nitrogen atmosphere at room temperature, 0.2 g of NaOH dissolved in 1 ml of water and 0.3 ml of methanol were added to the THF solution. 0.8 ml of 30% $H_2O_2$ was added dropwise at 0° C. The reaction was conducted at 40° C. for 6 hr with stirring the solution, and then the reaction solution was poured into 2 liters of a methanol solution to precipitate a polymer. The obtained polymer was refluxed with 100 ml of methanol for 2 hr and then was dried under reduced pressure at 50° C. for 8 hr. As a result of IR analysis, it was confirmed that a terminal position of the polymer molecule was modified by a hydroxyl group so that there was no unsaturated bond in the terminal position.

Polymerization of Ethylene Oxide]

713 g of the above polymer having a hydroxyl group in the terminal position (referred to as EOR-OH) and 31.0 mg of tetrakis[tris(dimethylamino)phosphoranylideneamino] phosphonium hydroxide $\{[(Me_2N)_3P=N]_4P^+OH^-\}$ which was synthesized in the manner as described on page 32 in European Patent Publication No. 0791600 were placed in a 1500 ml autoclave equipped with a tube for a thermometer, a pressure gage, a stirrer and a inlet tube for ethylene oxide. Air in the autoclave was replaced with dried nitrogen, and the contents of the reactor were heated to a temperature of 125° C. The reaction was conducted at the same temperature for 12 hr with intermittently supplying 30 g of ethylene oxide in order to maintain the pressure (absolute pressure) at about 0.5 MPa during the reaction. Residual unreacted ethylene oxide was distilled out under reduced pressure, and 738 g of a diblock copolymer was obtained.

The obtained diblock copolymer was a diblock copolymer of EOR-O-(polyethylene glycol) (referred to as EOR-O-PEG). MFR (measured at 230° C.) was 1.1 g/10 min, the molecular weight of the ethylene/octene copolymer segment was 132,400, the octene content of the ethylene/octene copolymer segment was 12.6 mol % and the molecular weight of the polyethylene glycol segment was 5,000. The weight-average molecular weight ($Mw_2$) of the polyethylene glycol segment (PEG) was estimated according to the following equation.

$$Mw_2 = Mw_1 \cdot (W_2 - W_1)/W_1$$

wherein:

$Mw_1$ is a weight-average molecular weight of the EOR moiety, $Mw_2$ is a weight-average molecular weight of the PEG moiety, $W_1$ is an amount of the copolymer of EOR-OH used in the polymerization, and $W_2$ is an yield of the diblock copolymer.

Example 44

[Preactivation of Catalyst Component]

Methylaluminoxane and diphenylsilylenebis(2,7-dimethyl-4-isopropylindenyl)zirconium dichloride were mixed in toluene (an appropriate amount of toluene may be optionally added) so that the concentration of zirconium was 0.00011 mmol/liter and the molar ratio of aluminum to zirconium was 350. The solution was preactivated by stirring for 15 min.

[Polymerization]

400 ml of purified toluene was placed in a 500 ml glass reactor purged thoroughly with nitrogen, and propylene was passed through at a rate of 100 liters per hour. With stirring at 600 revolutions per minute, a solution in the reactor was maintained at 45° C. for 10 min. 19.4 mg in terms of aluminum atom of triisobutylaluminum was added. 0.36 mg in terms of zirconium atom of the preactivated catalyst solution was added, and the temperature in the reactor was raised to 50° C. The polymerization was conducted at 50° C. and ordinary pressure for 20 min. A small amount of isopropanol was added to terminate the polymerization. After completion of the polymerization, the reaction solution was poured into 2 liters of a methanol solution of dilute hydrochloric acid to precipitate a polymer. The polymer was washed twice with methanol, and then the obtained polymer was dried under reduced pressure at 80° C. overnight. The yield of the obtained polypropylene was 21.8 g. The catalytic activity was 16.4 kg/mmol-Zr·h. The melting point (Tm) measured by DSC was 149.1° C. Mw measured by GPC was 106,000. As a result of IR analysis, it was confirmed that there was an unsaturated bond in the terminal position of the polymer molecule.

[Hydroboration]

In a dry box filled with argon, 20 g of the above polymer (Mw=106,000), which had an unsaturated bond in the terminal position, was suspended in 100 ml of degassed and dried THF, and the suspension was placed in a glass flask with a magnetic stirrer. 3.0 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and polypropylene having boron in the terminal position (PP-B) was obtained

[Copolymerization of Styrene/Maleic Anhydride]

20 g of the polymer of PP-B was placed in a sealed flask and was suspended by the addition of 10 g of dried styrene (St), 10 g of maleic anhydride (MAH) and 80 ml of THF. 1.9 ml of dried oxygen was blown through to initiate the reaction, followed by stirring at 45° C. for 5 hr. 100 ml of methanol was added to terminate the reaction. The precipitated polymer was extracted with acetone and heptane by the Soxhelt extractor in a nitrogen atmosphere over a period of 24 hr to obtain an insoluble block copolymer of PP-O-(styrene/maleic anhydride copolymer (P(St/MAH))).

The obtained diblock copolymer (PP-O-P(St/MAH)) had MFR (measured at 230° C.) of 150 g/10 min, a molecular weight of the polypropylene segment of 100,000, Mw/Mn of 2.2, a molecular weight of the P(St/MAH) segment of 5,000 and a MAH content of 0.3% by weight. The weight-average molecular weight ($Mw_2$) of the P(St/MAH) moiety of the obtained block copolymer was 5,000, which was estimated according to the following equation.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the P(St/MAH) moiety, $W_1$ is an amount of the polymer of PP-B used in the copolymerization of styrene/maleic anhydride, and $W_2$ is an yield of the diblock copolymer.

<Evaluation Methods of Properties of Nonwoven Fabric>

The properties of the nonwoven fabrics obtained in Examples 45 and 46, and Comparative Example 8 were evaluated by the following methods.

Tensile Properties

In accordance with JIS L1906, with respect to the specimen 25 mm wide, tensile test was conducted by a tensile tester at room temperature, a distance between grips of 100 mm and a tensile speed of 100 mm/min. The loads at various extensions, and the maximum tensile strength and elongation at break were determined.

Permanent Strain Under Tension

In the same manner as in the tensile test, the specimen 25 mm wide was held at a distance between grips of 100 mm by a tensile tester and was elongated to a extension of 50% or 100% at room temperature and a tensile speed of 100 mm/min. The specimen was returned at the same speed, and the permanent strain was determined by the extension at a stress of zero.

Interlaminar Strength

With respect to part of the laminate of the nonwoven fabric cut in a strip of 25 mm wide, the nonwoven fabric layer was previously peeled off the film layer in the longer direction from the edge of the laminate. The both peeled layers were fitted on jigs of a tester (MODEL 2005, manufactured by INTESCO Co., Ltd.) at a distance between chucks of 50 mm so as to form the shape of "T". The peeling was conducted under the conditions of a peel angle of 180° and a peel rate of 100 mm/min to measure the each interlaminar peel strength, and the interlaminar strength was determined by the peel strength.

Water Vapor Permeability

The water vapor permeability was measured in accordance with the cup method in JIS Z0208. Water vapor was allowed to permeate through a sample with a water vapor permeation area of 25 $cm^2$ or above from the atmosphere of a temperature of 40° C. and a relative humidity of 90%. The amount of water vapor permeated for 24 hr was measured to convert into the amount based on 1 $m^2$ of the sample. The atmosphere on the side of water vapor permeation had been dried with a hygroscopic agent.

Water Pressure Resistance

The resistance to water pressure was measured in accordance with Method A in JIS L1072 (low-water pressure method). 4 pieces of the specimen of about 15 cm×15 cm were cut out, and the specimen was fitted on a water pressure resistance tester (manufactured by Tester Sangyo Co., Ltd.) so that the surface of the specimen met to water. A water level apparatus wherein water of ordinary temperature was placed was elevated at a rate of 60±3 cm/min or 10±0.5 cm/min to exert a water pressure on the surface of the specimen. A water level was measured when water began to leak from three spots on the opposite side of the specimen. The water pressure resistance was determined by the water pressure.

Example 45

[Production of Spun Bond Nonwoven Fabric]

By the use of polypropylene/ethylene random copolymer which had a density of 0.90 $g/cm^3$; MFR (measured at 230° C. and a load of 2.16 kg in accordance with ASTM D1238) of 50 g/10 min; and an ethylene content of 4.7 mol %, and ethylene/1-butene random copolymer which had a density of 0.948 $g/cm^3$; MFR (measured at 190° C. and a load of 2.16 kg in accordance with ASTM D1238) of 30 g/10 min; and a 1-butene content of 4.0 mol %, the conjugated melt spinning was conducted. The concentric core-sheath type conjugated fibers, wherein the core and the sheath (ratio of core to sheath: 1/4 by weight) consisting essentially of the propylene/ethylene random copolymer and the ethylene/1-butene random copolymer, respectively, were deposited on a collection face to produce a spun bond nonwoven fabric of a base weight of 18 $g/m^2$ (fineness of the composite fiber: 2.7d; tensile strength (MD): 1500 g/25 mm; and tensile strength (CD): 500 g/25 mm).

[Formation of Nonwoven Fabric Layer for Porous Material Comprising Adhesive Resin]

TAFMER A (trade name, available from Mitsui Chemicals Inc.) and MIRASON 11P (trade name, available from Du Pont-Mitsui Polychemical Co., Ltd.) were blended at a ratio of 92/8 by weight, and the blended resin was modified with maleic acid to obtain a modified material (MFR (measured at a temperature of 190° C. and a load of 2.16 kg in accordance with ASTM D1238) was 28 g/10 min; and modification fraction by acid was 0.1% by weight.). 100 parts by weight of the modified material as an adhesive resin and 15 parts by weight of ARKON P125(trade name, available from Arakawa Chemical Industries, Ltd.) as a tackifier were blended. By an extruder, the blend was melted and was extruded from a nozzle for melt blown spinning with blowing heated air at the outlet of the nozzle. The melt blown fibers of the adhesive resin were directly deposited on the obtained spun bond nonwoven fabric to prepare a sheet of a laminate comprising the layer of the melt blown nonwoven fabric of a base weight of 5 $g/m^2$ and the spun bond nonwoven fabric.

[Extrusion Laminating]

The diblock copolymer (EOR-O-PEG) obtained in Example 43 was extruded by an extruder (pattern of extrusion temperature: 170° C./200° C./200° C.) and was blown-film extruded into a diblock copolymer film of a base weight of 30 g/m² through a blown-film die (at a temperature of 220° C.) On the other hand, the obtained laminated sheet comprising the layer of melt blown nonwoven fabric and the spun bond nonwoven fabric was fed at 50 m/min, and a corona discharge treatment of the sheet was conducted at 30 W/m². The laminated sheet was led between a nip roll (embossing roll; and fraction of embossing area: 7%) and a chill roll, and the laminated sheet comprising the layer of melt blown nonwoven fabric and the spun bond nonwoven fabric was laminated to the diblock copolymer film to obtain a nonwoven fabric laminate. The rolling conditions were a temperature of 30° C., a speed of 50 m/min and a nip linear pressure of 40 kg/cm.

Interlaminar strength: 500 g/inch

Water vapor permeability: 1500 g/cm²·day

Water pressure resistance: more than 2000 mmAq

Example 46

[Preparation of Electret]

Figure 2:
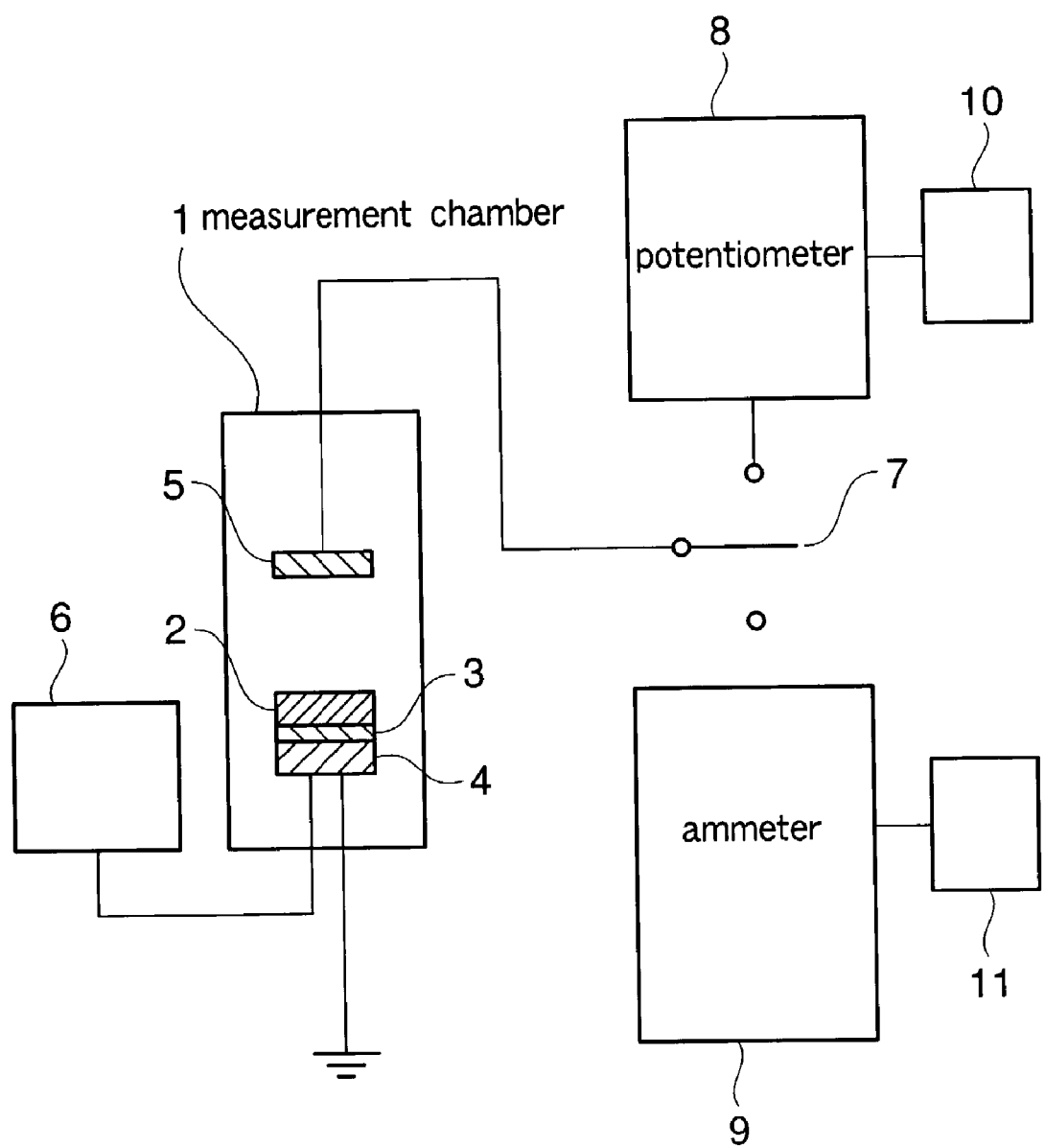
FIG. 2 is a block diagram showing measuring equipments for use in Example 46.

The preparation of electret is described as follow with reference to FIG. 2. In FIG. 2, "1" indicates a measurement chamber, "2" indicates a specimen, "3" indicates a bismuth electrode, "4" indicates a supporting electrode, "5" indicates a grid electrode, "6" indicates a temperature recorder, "7" indicates a change-over switch, "8" indicates a potentiometer, "9" indicates an ammeter, and "10" and "11" indicate recorders.

[Preparation of Specimen]

The diblock copolymer (PP-O-P(St/MAH)) obtained in Example 44 was press molded into a film 30 μm thick. A circular specimen of 25 mm in diameter cut out from the film and a thin film of bismuth was metallized on a side of the specimen as an electrode.

[Method of Electrification]

The specimen 2 (diblock copolymer (PP-O-P(St/MAH)) was fitted in the measurement chamber 1 of the measurement apparatus shown in FIG. 2, and a corona discharge was conducted in atmospheric pressure and room temperature for 3 min. In the process, the charged quantity (indicated as surface potential) of the specimen 2 was controlled by the grid voltage (500 V) impressed to the grid electrode 5 which was set at a height of about 2 mm over the film surface without the bismuth electrode 3.

[Measurement of Surface Potential Decay]

Figure 3:
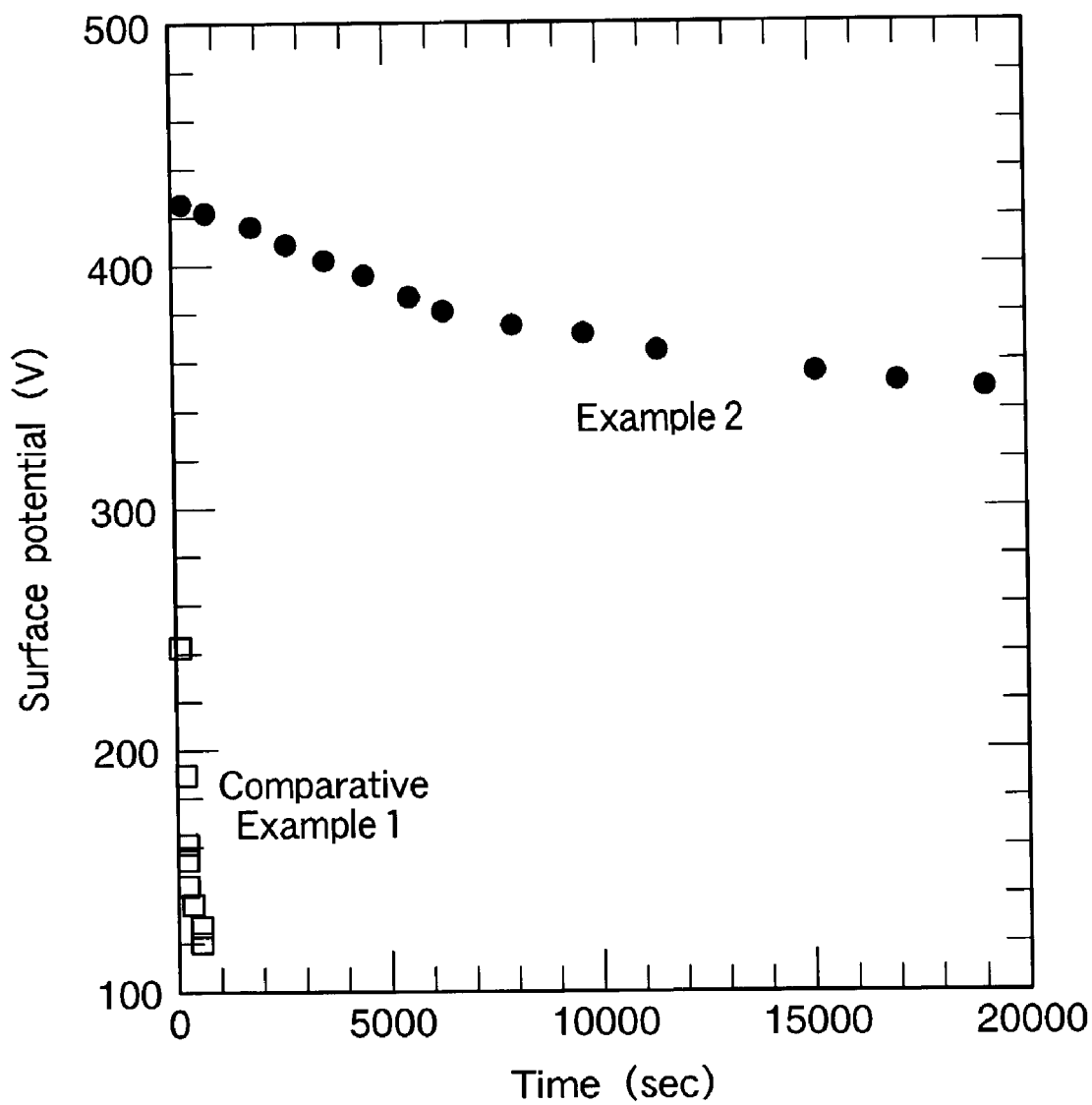
FIG. 3 is a graph showing the results of attenuation in surface electric potential measured in Example 46 and Comparative Example 8.

With the charged specimen 2 fitted in the measurement chamber 1 shown in FIG. 2, the change-over switch 7 was connected to the potentiometer 8, and the surface potential was measured at room temperature in an atmosphere. The used potentiometer 8 was a vibrating reed electrometer (TR-8411) manufactured by Advantest Corp., Ltd. The results of the surface potential decay are shown in FIG. 3.

[Measurement of Thermally Stimulated Current Spectrum (Referred to as TSC)]

Figure 4:
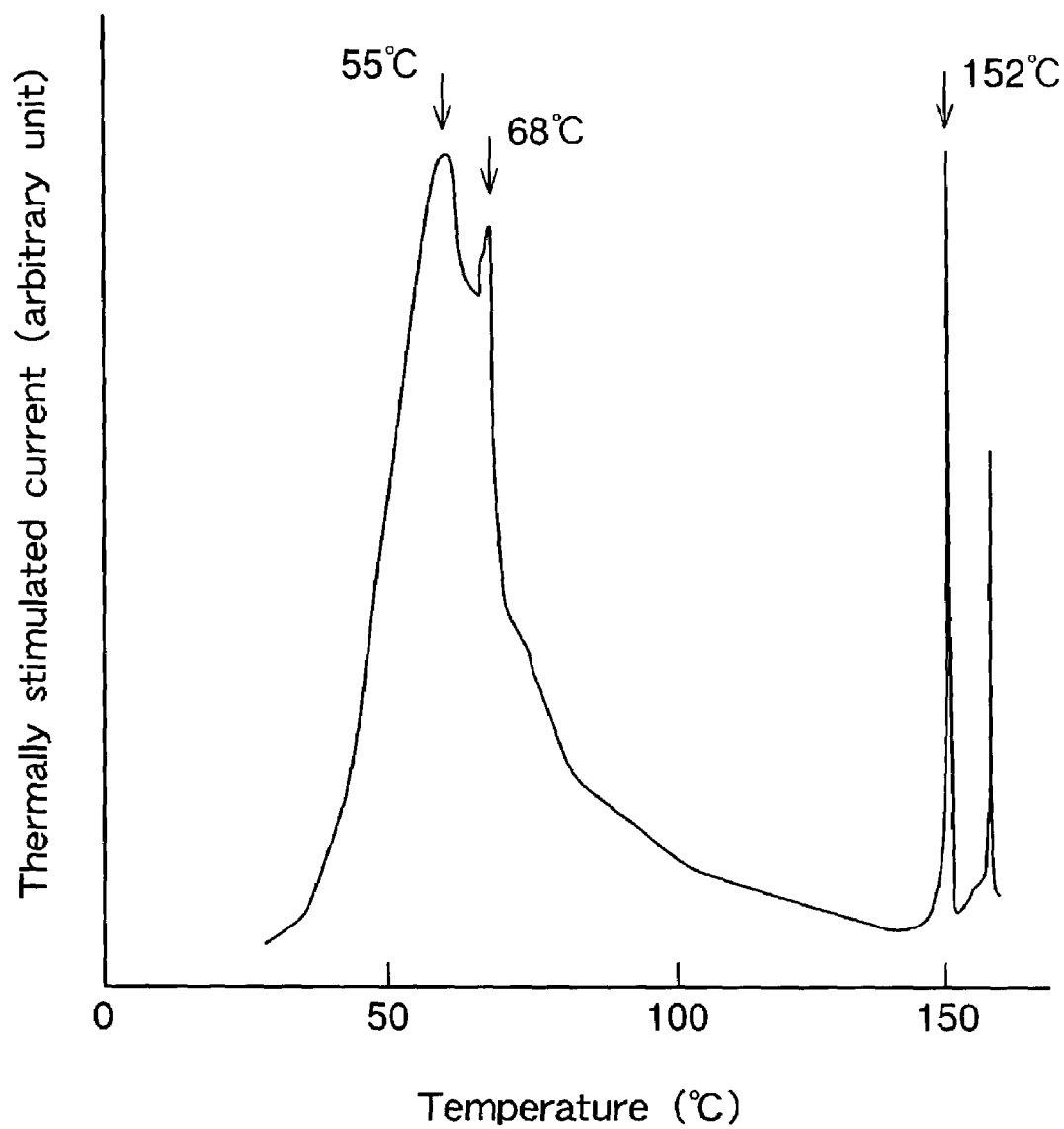
FIG. 4 shows a heat-induced current spectrum measured in Example 46.

The change-over switch 7 was turned off and connected to the ammeter 9. With respect to the specimen give after the measurement of the surface potential, the temperature was raised at a rate of 3° C. per minute from room temperature to a temperature in the vicinity of the melting temperature. TSC was measured by the contactless method. The ammeter 9 was a low-current electrometer (614 electrometer) manufactured by Keithley Instruments, Inc. The TSC spectrum is shown in FIG. 4, and the peak temperature and strength ratio are shown in Table 9.

According to the following results, it was confirmed that the specimen including the diblock copolymer obtained in Example 44 had ability to hold an electric charge.

Comparative Example 8

Figure 5:
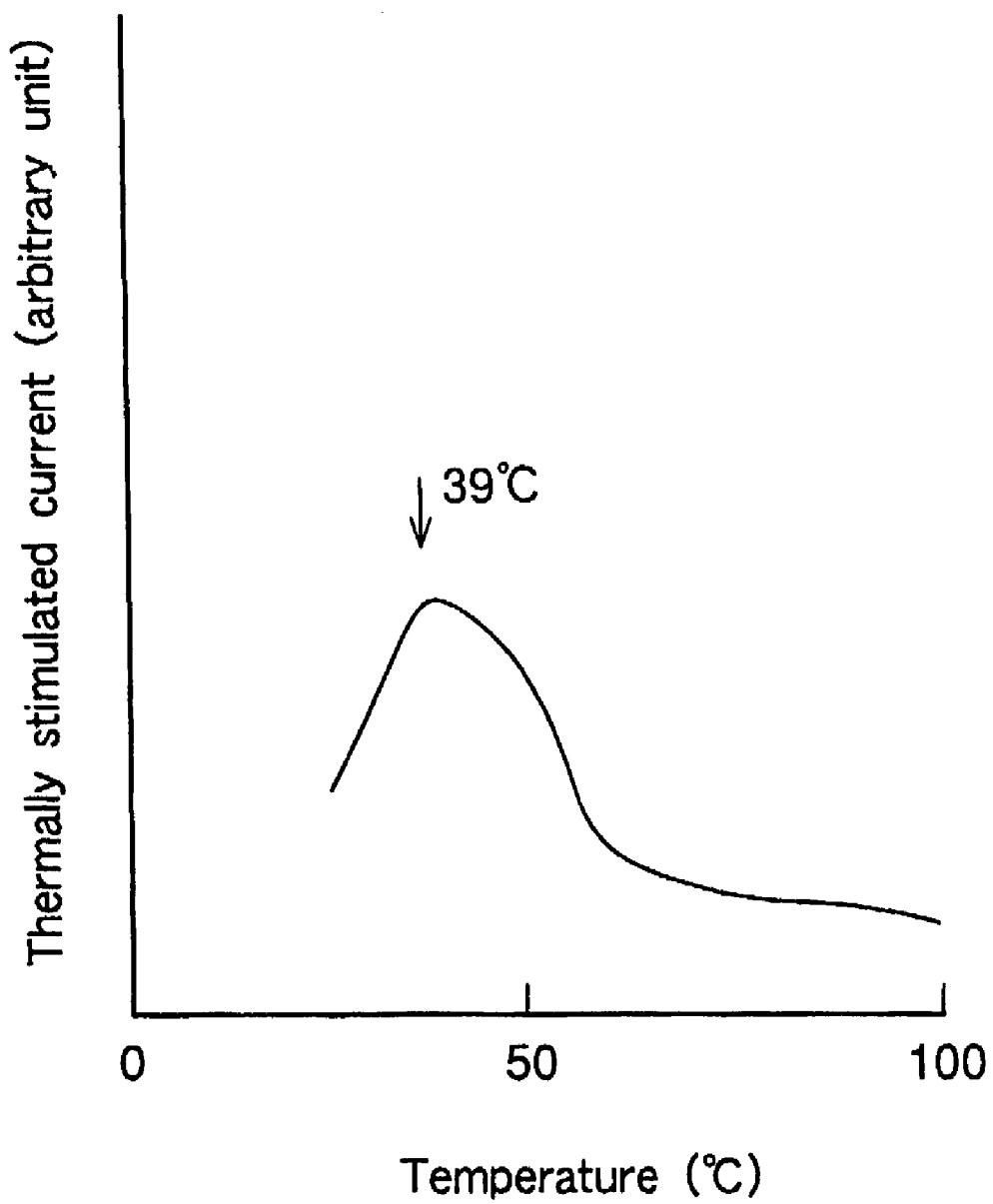
FIG. 5 shows a heat-induced current spectrum measured in Comparative Example 8.

With respect to low-density polyethylene (MFR: 3 g/10 min; melting point: 111° C.; and density: 0.920 g/cm³) produced by the use of the Ziegler catalyst in the high-pressure process, the surface potential decay and TSC were measured in the same manner as in Example 46. The results of the surface potential decay is shown in FIG. 3, TSC spectrum is shown in FIG. 5, and the peak temperature is shown in Table 9.

TABLE 9

| | Sample resin | Peak temperature of TSC spectrum | | | Ratio of peak strength |
| --- | --- | --- | --- | --- | --- |
| | | P1 | P2 | P3 | P1/P2 |
| Example 46 | diblock copolymer | 55 | 68 | 152 | 1.08 |
| Comp. Ex. 8 | low-density polyethylene | 39 | — | — | — |

Example 47

[Preparation of Catalyst Solution]

10.0 mg of bis(1,3-dimethylcyclopentadienyl)zirconium dichloride was weighed and placed in a glass flask purged thoroughly with nitrogen, and a toluene solution of 17.2 mmol in terms of aluminum atom of methylaluminoxane was added thereto. The solution was sonicated at 23° C. for 15 min. An appropriate amount of toluene was added to the solution, and a total amount of 50 ml of the solution was obtained. This solution was used as a catalyst solution.

[Copolymerization of Ethylene/Norbornene]

In a nitrogen atmosphere at room temperature, 600 ml of a cyclohexane solution containing 20 g of norbornene was placed in a 1-liter stainless steel autoclave purged thoroughly with nitrogen. 0.6 mmol of triisobutylaluminum was added, and nitrogen in the autoclave was replaced with ethylene. The inside of the autoclave was pressurized with ethylene, and then the temperature in the autoclave was raised so that the temperature and the pressure in the autoclave were 70° C. and 0.7 MPa, respectively. 12.8 ml of the above catalyst solution was forced into the autoclave with pressurized nitrogen to initiate the polymerization. After the initiation of the polymerization, with supplying only ethylene, the polymerization was conducted at a pressure of 0.7 MPa and a temperature of 70° C. for 5 min. After 5 min from the initiation of the polymerization, 5 ml of isopropanol (IPA) was forced into the autoclave with pressurized nitrogen to terminate the polymerization. After decompression, the polymer solution was taken out. With vigorously agitating by a homomixer, the polymer solution was brought into contact with an aqueous solution prepared by adding 5 ml of concentrated hydrochloric acid based on 1 liter of water at a ratio of 1 to 1, and the catalyst residue was passed into the water phase. The contacted mixed solution was allowed to stand still, and then the water phase was removed. The polymer solution was washed twice with water to purify the same, and the phase of the polymer solution was separated. The purified and separated polymer solution was allowed to contact with acetone, which was three times as much as the polymer solution, with vigorously agitating. After the precipitation of the copolymer, the solid product (copolymer) was collected by filtration and was thoroughly washed with acetone. To extract unreacted norbornene remained in the polymer, the solid product was put in acetone so as to be a concentration of 40 g/liter, and the extraction was conducted at 60° C. for 2 hr. After the extraction, the solid product was collected by filtration and was dried under reduced pressure in flowing nitrogen at 130° C. and 350 mmHg for 12 hr.

The yield of the obtained ethylene/norbornene random copolymer (P(Et/NBR)) was 25.7 g. Thus, the catalytic activity was 41.8 kg/mmol-Zr·hr. As a result of IR analysis, the norbornene content was 8.5 mol %, and it was confirmed that there was an unsaturated bond in the terminal position of the polymer molecule. According to the measurement by GPC, Mw was 140,000.

[Hydroboration]

In a dry box filled with argon, 20 g of the above polymer (Mw=140,000), which had an unsaturated bond in the terminal position, was suspended in 100 ml of degassed and dried THF, and the suspension was placed in a glass flask with a magnetic stirrer. 2.3 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried IPA and was dried under reduced pressure, and an ethylene/norbornene copolymer having boron in the terminal position (P(Et/NBR)-B) was obtained.

[Polymerization of Methylmethacrylate]

20 g of the copolymer of P(Et/NBR)-B was placed in a sealed flask and was suspended by the addition of 11.0 g of dried methylmethacrylate (MMA) and 80 ml of THF. 1.5 ml of dried oxygen was blown through to initiate the reaction, followed by stirring at room temperature for 4 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of P(Et/NBR)-O-polymethylmethacrylate (P(Et/NBR)-O-PMMA).

With respect to the diblock copolymer, the weight-average molecular weight ($Mw_2$) of the polymethylmethacrylate (PMMA) moiety, which was estimated according to the following equation, was 10,000.

$$Mw_2 = Mw_1 \cdot (W_2 - W_1)/W_1$$

wherein:

$Mw_1$ is a weight-average molecular weight of the P(Et/NBR) moiety, $Mw_2$ is a weight-average molecular weight of the PMMA moiety, $W_1$ is an amount of the copolymer of P(Et/NBR)-B used in the polymerization of MMA, and $W_2$ is an yield of the diblock copolymer.

Example 48

[Preparation of Catalyst Solution]

0.023 mmol in terms of titanium atom of [(N-t-butylamido)(tetramethyl-$\eta^5$-cyclopentadienyl)dimethylsilane]titanium dichloride was weighed and placed in a glass flask purged thoroughly with nitrogen, and a toluene solution of 0.14 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 25 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.00075 mmol in terms of titanium atom of the above catalyst solution were added. Ethylene was fed to initiate the polymerization at a pressure of 0.9 MPa. Thereafter, only ethylene was supplied. The polymerization was conducted for 20 min with maintaining at a pressure of 0.9 MPa and a temperature of 70° C. After the elapse of prescribed time, isopropanol was added to terminate the reaction. After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained ethylene/octene random copolymer was 37.4 g. The catalytic activity was 150 kg/mmol-Ti·h. As a result of IR analysis of the ethylene/octene random copolymer (EOR), the 1-octene content was 9.3 mol %, and it was confirmed that there was an unsaturated bond in the terminal position of the polymer molecule. The intrinsic viscosity [η] measured at 135° C. in Decalin was 2.30 dl/g. Mw was 205,400.

[Hydroboration]

In a dry box filled with argon, 20 g of the copolymer of EOR, which had an unsaturated bond in the terminal position, was suspended in 100 ml of degassed and dried THF, and the suspension was placed in a glass flask with a magnetic stirrer. 1.6 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and an ethylene/octene random copolymer having boron in the terminal position (EOR-B) was obtained.

[Polymerization of Methylmethacrylate]

20 g of the copolymer of EOR-B was placed in a sealed flask and was suspended by the addition of 7.5 g of dried MMA and 80 ml of THF. 1.0 ml of dried oxygen was blown through to initiate the reaction, followed by stirring at room temperature for 4 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of EOR-O-polymethylmethacrylate (EOR-O-PMMA).

With respect to the diblock copolymer, the weight-average molecular weight ($Mw_2$) of the PMMA moiety, which was estimated according to the following equation, was 10,000.

$$Mw_2 = Mw_1 \cdot (W_2 - W_1)/W_1$$

wherein:

$Mw_1$ is a weight-average molecular weight of the EOR moiety, $Mw_2$ is a weight-average molecular weight of the PMMA moiety, $W_1$ is an amount of the copolymer of EOR-B used in the polymerization of MMA, and $W_2$ is an yield of the diblock copolymer.

Example 49

[Preparation of Catalyst Solution]

Methylaluminoxane and dimethylsilylenebis(2-i-butyl-4-naphthylindenyl)zirconium dichloride were mixed in toluene (an appropriate amount of toluene may be optionally added) so that the concentration of zirconium was 0.00011 mmol/liter and the molar ratio of aluminum to zirconium (Al/Zr) was 350. The solution was preactivated by stirring for 15 min to prepare a catalyst solution.

[Polymerization]

400 ml of purified toluene was placed in a 500 ml glass reactor purged thoroughly with nitrogen, and propylene was passed through at a rate of 100 liters per hour. With stirring at 600 revolutions per minute, a solution in the reactor was maintained at 45° C. for 10 min. 9.71 mg in terms of aluminum atom of triisobutylaluminum was added. 0.18 mg in terms of zirconium atom of the above catalyst solution was added. The polymerization was conducted at 50° C. and ordinary pressure for 5 min. A small amount of isopropanol was added to terminate the polymerization. After completion of the polymerization, the reaction solution was poured into 2 liter of a methanol solution of dilute hydrochloric acid to precipitate a polymer. The polymer was washed twice with methanol, and then the obtained polymer was dried under reduced pressure at 80° C. overnight.

The yield of the obtained polypropylene (PP) was 11.0 g. The catalytic activity was 66.0 kg/mmol-Zr·hr. The melting point (Tm) measured by DSC was 157.6° C. Mw measured by GPC was 220,000. As a result of IR analysis, it was confirmed that there was an unsaturated bond in the terminal position of the polymer molecule. The endothermic curve was measured by DSC to obtain the melting point (Tm), and the temperature at a maximum peak point was regarded as Tm. The melting point was measured as follows. The sample was loaded into an aluminum pan, and the temperature was raised to 200° C. at a rate of 100° C./min. The temperature was maintained at 200° C. for 5 min and then was lowered to −150° C. at a rate of 10° C./min. The melting point was determined by the endothermic curve obtained when the temperature was raised at a rate of 10° C./min.

[Hydroboration]

In a dry box filled with argon, 20 g of the above polypropylene, which had an unsaturated bond in the terminal position, was suspended in 100 ml of degassed and dried THF, and the suspension was placed in a glass flask with a magnetic stirrer. 1.5 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and polypropylene having boron in the terminal position (PP-B) was obtained.

[Polymerization of Methylmethacrylate]

20 g of the polymer of PP-B was placed in a sealed flask and was suspended by the addition of 7.0 g of dried MMA and 80 ml of THF. 0.9 ml of dried oxygen was blown through to initiate the reaction, followed by stirring at room temperature for 4 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of PP-O-polymethylmethacrylate (PP-O-PMMA).

With respect to the diblock copolymer, the weight-average molecular weight ($Mw_2$) of the PMMA moiety, which was estimated according to the following equation, was 10,000.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the PMMA moiety, $W_1$ is an amount of the polymer of PP-B used in the polymerization of MMA, and $W_2$ is an yield of the diblock copolymer.

In Examples 50 to 53, the various properties were measured as follows.

Rockwell Hardness (HR)

The Rockwell hardness was measured by the use of a square plate 2 mm thick, 120 mm long and 130 mm wide in accordance with ASTM D785.

Flexural Modulus (FM)

The flexural modulus was measured at a span of 51 mm and a flexure speed of 20 mm/min by the use of a specimen an eighth inch thick in accordance with ASTM D790.

Heat Distortion Temperature (HDT)

The heat distortion temperature was measured by the use of a specimen a quarter inch thick in accordance with ASTM D648 (at a load of 4.6 kg/cm$^2$).

Adhesion Testing

Adhesion testing was conducted in accordance with JIS K6256.

Viscoelasticity (Tan δ)

A sheet 2 mm thick was prepared. Viscoelasticity test was conducted by a viscoelasticity tester (Model RDS-2) manufactured by Rheometric Scientific F.E. Ltd. at a measurement temperature of 25° C., a frequency of 10 Hz and a strain of 1%, and the loss tangent was measured.

Mar Resistance

The appearance of the film given after scratching at 23° C. was evaluated as follows.

AA: Few scratches were observed.

BB: Undistinguished scratches were observed.

CC: Distinguished scratches were observed.

Appearance

Non-uniformity of the thickness of the weld was visibly observed and was evaluated by the following scales.

AA: Uniformity of the thickness was observed.

BB: Few non-uniformities of the thickness were observed.

CC: Non-uniformities of the thickness were observed slightly distinguishedly.

DD: Non-uniformities of the thickness were observed very distinguishedly.

Printability

Ink (available from Osaka Printing Inks Mfg. Co., Ltd, trade name: NRX) was applied to the surface of a specimen. A commercial cellophane adhesive tape (available from Nichiban Co., Ltd., trade name: Cellotape, 25 mm wide) was adhered to the printed surface at 50 mm long and was stripped off to evaluate the printability according to the following scales.

Good printability: The ink was not peeled off from the sample film.

Failed printability: The ink was peeled off from the sample film and was adhered to the cellophane adhesive tape.

Example 50

The diblock copolymer (P(Et/NBR)-O-PMMA) obtained in Example 47 was extruded by a single-screw extruder having a screw diameter of 30 mm at a die temperature of 230° C., a roll temperature of 40° C. and a take-off speed of 5 m/min, and the extruder output was varied to obtain a cast film with a desired thickness. With respect to the film, the mar resistance was the evaluation of "AA", and the viscoelasticity (tan δ) was 0.17.

Example 51

100 parts by weight of the diblock copolymer (EOR-O-PMMA) prepared in Example 48, 0.7 part by weight of dicumylperoxide and 10 parts by weight azodicarbonamide (trade name: VINYFOR SE#30, available from Eiwa Chemical Ind. Co., Ltd.) were kneaded by a indoor mill (trade name: Labo plastomill) at 140° C. for 5 min and then were crosslinked by a hot press at 160° C. for 15 min to obtain a foam with a density of 0.086.

A primer (trade name: UNISTOLE P802, available from Mitsui Chemicals Inc.) and a urethane adhesive (trade name: BOND ACE W-01, available from Dongsung Chemical Co., Ltd.) were applied to the foam and dried in order. A sheet 3 mm thick of soft polyvinylchloride (trade name: Vinychlon SI-2000, available from Plas Tech Corp.) was adhered to the foam. As a result of adhesion testing, a base breakage of the foam occurred.

Example 52

The diblock copolymer (HDPE-O-PMMA) obtained in Example 30 was blow molded into a 200 ml bottle by a blow molding press at 180° C. with mold water-chilling. The appearance and the mar resistance of the moldings were the evaluations of "AA" and "AA", respectively, and the printability was good.

Example 53

The diblock copolymer (PP-O-PMMA) obtained in Example 49 was molded by a 55t injection press (IS55EPN, manufactured by Toshiba Machine Co., Ltd.) at a cylinder temperature of 200° C. and a mold temperature of 40° C. The obtained moldings had a flexural modulus (FM) of 1350 MPa, a hardness (HR) of 95 and a heat distortion temperature of 105° C.

To evaluate the coating properties, an injection molded sheet 2 mm thick was used. A surface of the sheet was washed with a dishwashing detergent (trade name: Mama-Lemon, available from Kao Corp.). After washing with water and drying at 80° C. for 10 min, a primer (available from Nippon Bee Chemical Co., Ltd., trade name: RB150) was applied in a thickness of about 10 μm and was dried at 80° C. for 10 min. Two-pack urethane metallic (available from Nippon Bee Chemical Co., Ltd., trade name: R212) was applied in a thickness of about 20 μm, and two-pack urethane clear (available from Nippon Bee Chemical Co., Ltd., trade name: R213) was further applied in a thickness of about 50 μm. The sheet was dried at 80° C. for 45 min.

The surface of the coated sheet was crosshatched by drawing 11 parallel lines at 2 mm intervals and 11 parallel lines perpendicular thereto at 2 mm intervals by using a single-edge razor to make 100 squares. A cellophane adhesive tape (JIS Z1522) was adhered to the crosshatched film with sufficient pressure and was rapidly stripped off upward. As a result of an observation of the squares, there was no peeling square on the surface.

Example 54

[Preparation of Catalyst Solution]

Methylaluminoxane and rac-dimethylsilylenebis(2-ethyl-4-naphthylindenyl)zirconium dichloride were mixed in toluene (an appropriate amount of toluene may be optionally added) so that the concentration of zirconium was 0.00011 mmol/liter and the molar ratio of aluminum to zirconium (Al/Zr) was 350. The solution was preactivated by stirring for 15 min to prepare a catalyst solution.

[Polymerization of Olefin]

250 ml of purified toluene was placed in a 500 ml glass reactor purged thoroughly with nitrogen, and ethylene and propylene were passed through at rates of 80 liter per hour and 120 liter per hour, respectively. With stirring by using a magnetic stirrer at 600 revolutions per minute, a solution in the reactor was maintained at 45° C. for 10 min. 6.7 mg in terms of aluminum atom of triisobutylaluminum was placed in the reactor. 0.045 mg (0.0005 mmol) in terms of zirconium atom of the above catalyst solution was added. The polymerization was conducted at 50° C. and ordinary pressure for 20 min. A small amount of isopropanol (IPA) was added to terminate the polymerization. After completion of the polymerization, the reaction solution was poured into 2 liter of a methanol solution of dilute hydrochloric acid to precipitate a polymer. The precipitated polymer was washed twice with methanol, and then the obtained polymer was dried under reduced pressure at 130° C. overnight.

The yield of the obtained ethylene/propylene random copolymer (EPR) was 28.8 g. The catalytic activity was 172.8 g/mmol-Zr·hr. As a result of IR analysis, the ethylene content was 81.7 mol %, and it was confirmed that there was an unsaturated bond in the terminal position of the polymer molecule. Mw was 55,000.

[Hydroboration]

In a dry box filled with argon, 20 g of the copolymer of EPR was suspended in 100 ml of degassed and dried THF, and the suspension was placed in a glass flask with a magnetic stirrer. 5.8 ml of a THF solution of 9-borabicyclo[3.3.1]nonane (9-BBN) (0.5 M) was added to the suspension. In the dry box, the slurry was stirred at 55° C. for 5 hr and then was filtered. The obtained filter cake was washed with degassed and dried IPA and was dried under reduced pressure, and a copolymer of EPR having boron in the terminal position (EPR-B) was obtained.

[Hydroxylation]

10 g of the copolymer of EPR-B was suspended in 50 ml of degassed and dried THF. In a nitrogen atmosphere, 2.3 ml of an aqueous solution containing 0.5 g of NaOH and 0.6 ml of methanol were added. The suspension was cooled to 0° C., and 1.8 ml of H$_2$O$_2$ (30%) aqueous solution was added dropwise. The reaction was conducted at 40° C. for 6 hr, and then 100 ml of methanol was added to terminate the reaction. The obtained polymer was filtered off. The obtained filter cake was heat-refluxed with 100 ml of methanol for 2 hr and then was filtered off again. The obtained filer cake was dried under reduced pressure at 50° C. for 8 hr to obtain a copolymer of EPR having a hydroxyl group in the terminal position (referred to as EPR-OH).

[Polymerization of Lactide]

In a dry box, 3.5 g of the copolymer of EPR-OH was suspended in dried toluene. Excess n-butyllithium was added thereto, and the suspension was stirred for 12 hr. The filtration and washing with toluene were repeated to obtain a copolymer of EPR having lithium oxide in the terminal position. The copolymer of EPR having lithium oxide in the terminal position was suspended in toluene. 3 equivalents of diethylaluminum chloride was added, and the reaction was conducted for 12 hr to obtain a copolymer of EPR having aluminum oxide in terminal position (referred to as EPR-OAlEt$_2$). The copolymer of EPR-OAlEt$_2$ was washed with toluene and hexane and was filtered off. The filter cake was resuspended in 80ml of toluene. 156.2 g of purified lactide was added, and the reaction was conducted at room temperature for 64 hr. 100 ml of methanol was added to terminate the reaction, and then the polymer was precipitated in acidic methanol. The wastes in the polymer were removed by extraction with acetone by the Soxhelt extractor to obtain a diblock copolymer of (ethylene/propylene random copolymer)-O-polylactide (referred to as EPR-O-PLa).

With respect to the diblock copolymer, the weight-average molecular weight (Mw$_2$) of the polylactide moiety, which was estimated according to the following equation, was 150,000.

$$Mw_2 = Mw_1 \cdot (W_2 - W_1)/W_1$$

wherein:

Mw$_1$ is a weight-average molecular weight of the EPR moiety,

Mw$_2$ is a weight-average molecular weight of the PLa moiety,

W$_1$ is an amount of the copolymer of EPR-OAlEt$_2$ used in the polymerization of lactide, and W$_2$ is an yield of the diblock copolymer.

Example 55

[Preparation of Catalyst Solution]

Methylaluminoxane and dimethylsilylenebis(indenyl)zirconium dichloride were mixed in toluene (an appropriate amount of toluene may be optionally added) so that the concentration of zirconium was 0.00011 mmol/liter and the molar ratio of aluminum to zirconium (Al/Zr) was 350. The solution was preactivated by stirring for 15 min to prepare a catalyst solution.

[Polymerization]

750 ml of purified heptane was placed in a 2-liter stainless steel autoclave purged thoroughly with nitrogen, and nitrogen in the autoclave was replaced with propylene. The temperature in the autoclave was raised to 40° C., and 0.263 mmol of triisobutylaluminum and 0.00050 mmol in terms of zirconium atom of the above catalyst solution were added. The temperature in the autoclave was raised with pressurizing by propylene. The time when the temperature and the pressure went up to 0.8 MPa and 70° C., respectively, was regarded as the initiation of the polymerization. The polymerization was conducted for 30 min with maintaining at the same pressure and the same temperature. After 30 min, the supply of propylene was stopped to terminate the polymerization. After decompression and cooling, the slurry was taken out, and the solid product was collected by filtration. The solid product was dried under reduced pressure in flowing nitrogen at 80° C. and 500 mmHg for 12 hr.

The yield of the obtained polypropylene (PP) was 39.8 g. The catalytic activity was 161 kg/mmol-Zr·hr. With respect to the polypropylene, Mw measured by GPC was 69,000. The melting point (Tm) measured by DSC was 139.1° C. The meso-pentad fraction (mmmm) measured by $^{13}$C-NMR was 90.8%. As a result of IR analysis, it was confirmed that there was an unsaturated bond in the terminal position of the polymer molecule.

[Hydroboration]

In a dry box filled with argon, 20 g of the above polypropylene, which had an unsaturated bond in the terminal position, was suspended in 100 ml of degassed and dried THF, and the suspension was placed in a glass flask with a magnetic stirrer. 4.6 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and polypropylene having boron in the terminal position (PP-B) was obtained.

[Hydroxylation]

10 g of the polymer of PP-B was suspended in 50 ml of degassed and dried THF. In a nitrogen atmosphere, 1.8 ml of an aqueous solution containing 0.4 g of NaOH and 0.5 ml of methanol were added. The suspension was cooled to 0° C., and 1.5 ml of H$_2$O$_2$ (30%) aqueous solution was added dropwise. The reaction was conducted at 40° C. for 6 hr, and then 100 ml of methanol was added to terminate the reaction. The obtained polymer was filtered off. The obtained filter cake was heat-refluxed with 100 ml of methanol for 2 hr and then was filtered off again. The obtained filer cake was dried under reduced pressure at 50° C. for 8 hr to obtain a polymer of PP having a hydroxyl group in the terminal position (referred to as PP-OH).

[Polymerization of Lactide]

In a dry box, 3.5 g of the polymer of PP-OH was suspended in dried toluene. Excess n-butyllithium was added thereto, and the suspension was stirred for 12 hr. The filtration and washing with toluene were repeated to obtain a polymer of PP having lithium oxide in the terminal position. The polymer of PP having lithium oxide in the terminal position was suspended in toluene. 3 equivalents of diethylaluminum chloride was added, and the reaction was conducted for 12 hr to obtain a polymer of PP having aluminum oxide in terminal position (referred to as PP-OAlEt$_2$). The polymer of PP-OAlEt$_2$ was washed with toluene and hexane and was filtered off. The obtained filter cake was resuspended in 80 ml of toluene. 124.1 g of purified lactide was added, and the reaction was conducted at room temperature for 64 hr. 100 ml of methanol was added to terminate the reaction, and then the polymer was precipitated in acidic methanol. The wastes in the polymer were removed by extraction with acetone by the Soxhelt extractor to obtain a diblock copolymer of polypropylene-O-polylactide (referred to as PP-O-PLa).

With respect to the diblock copolymer, the weight-average molecular weight (Mw$_2$) of the polylactide moiety, which was estimated according to the following equation, was 150,000.

$$Mw_2 = Mw_1 \cdot (W_2 - W_1)/W_1$$

wherein:

Mw$_1$ is a weight-average molecular weight of the PP moiety,

Mw$_2$ is a weight-average molecular weight of the PLa moiety,

W$_1$ is an amount of the polymer of PP-OAlEt$_2$ used in the polymerization of lactide, and W$_2$ is an yield of the diblock copolymer.

Example 56

[Preparation of Catalyst Solution]

0.23 mmol in terms of zirconium atom of bis(pentamethyl-η$^5$-cyclopentadienyl)dimethylzirconium was weighed and placed in a glass flask purged thoroughly with nitrogen, and a toluene solution of 0.92 mmol in terms of boron atom of tris(pentafluorophenyl)borane was added thereto. An appropriate amount of toluene was added to the solution, and a total amount of 50 ml of the solution was obtained. A catalyst solution was prepared in a zirconium concentration of 0.0046 mmol/ml.

[Polymerization of Olefin]

225 ml of purified toluene was placed in a 500 ml glass reactor purged thoroughly with nitrogen, and ethylene was passed through at a rate of 200 liter per hour. With stirring by using a magnetic stirrer at 600 revolutions per minute, a solution in the reactor was maintained at 45° C. for 10 min. 7.5 mmol in terms of aluminum atom of triisobutylaluminum was placed in the reactor. 3 mmol of 9-BBN was added, and then 0.075 mmol in terms of zirconium atom of the above catalyst solution was added. The polymerization was conducted at 50° C. and ordinary pressure for 5 min. A small amount of absolute methanol was added to terminate the polymerization. After completion of the polymerization, the polymer was washed with absolute THF. The obtained polymer was dried under reduced pressure at 50° C. overnight. The yield of the obtained polyethylene was 5.1 g. The catalytic activity was 816 g/mmol-Zr·hr.

[Confirmation of Molecular Weight and Terminal Position of the Polymer]

1.0 g of the obtained polyethylene was added to 25 ml of absolute THF. In a nitrogen atmosphere at room temperature, 1 ml of an aqueous solution containing 0.2 g of NaOH and 0.25 ml of methanol were added thereto. 0.8 ml of 30% H$_2$O$_2$ was added dropwise at 0° C. The reaction was conducted at 40° C. for 6 hr, and then the reaction solution was poured into 2 liters of a methanol solution to precipitate a polymer. The obtained polymer was refluxed with 50 ml of methanol for 2 hr and then was dried under reduced pressure at 50° C. for 8 hr. Mw determined by GPC analysis was 52,400. As a result of IR analysis, it was confirmed that a terminal position of the polymer molecule was modified by a hydroxyl group so that there was no unsaturated bond in the terminal position. Thus, it was confirmed that the terminal position of the above polyethylene was modified by boron.

[Hydroxylation]

20 g of the above polyethylene having boron in the terminal position was suspended in 50 ml of degassed and dried THF. In a nitrogen atmosphere, 2.4 ml of an aqueous solution containing 0.5 g of NaOH and 0.6 ml of methanol were added. The suspension was cooled to 0° C., and 1.9 ml of H$_2$O$_2$ (30%) aqueous solution was added dropwise. The reaction was conducted at 40° C. for 6 hr, and then 100 ml of methanol was added to terminate the reaction. The obtained polymer was filtered off. The filter cake was heat-refluxed with 100 ml of methanol for 2 hr and then was filtered off again. The obtained filer cake was dried under reduced pressure at 50° C. for 8 hr to obtain homopolyethylene having a hydroxyl group in the terminal position (referred to as HDPE-OH).

[Polymerization of Caprolactone]

In a dry box, 3.5 g of the polymer of HDPE-OH was suspended in dried toluene. Excess n-butyllithium was added thereto, and the suspension was stirred for 12 hr. The filtration and washing with toluene were repeated to obtain a polymer of HDPE having lithium oxide in the terminal position. The polymer of HDPE having lithium oxide in the terminal position was suspended in toluene. 3 equivalents of diethylaluminum chloride was added, and the reaction was conducted for 12 hr to obtain a polymer of HDPE having aluminum oxide in terminal position (referred to as HDPE-OAlEt$_2$). The polymer of HDPE-OAlEt$_2$ was washed with toluene and hexane and was filtered off. The obtained filter cake was resuspended in 80 ml of toluene. 127.2 g of purified caprolactone was added, and the reaction was conducted at room temperature for 76 hr. 100 ml of methanol was added to terminate the reaction, and then the polymer was precipitated in acidic methanol. The wastes in the precipitated polymer were removed by extraction with acetone by the Soxhelt extractor to obtain a diblock copolymer of polyethylene-O-polycaprolactone (referred to as PE-O-PCL).

With respect to the diblock copolymer, the weight-average molecular weight (Mw$_2$) of the polycaprolactone (referred to as PCL) moiety, which was estimated according to the following equation, was 150,000.

$$Mw_2 = Mw_1 \cdot (W_2 - W_1)/W_1$$

wherein:

Mw$_1$ is a weight-average molecular weight of the HDPE moiety,

Mw$_2$ is a weight-average molecular weight of the PCL moiety,

W$_1$ is an amount of the polymer of HDPE-OAlEt$_2$ used in the polymerization of caprolactone, and W$_2$ is an yield of the diblock copolymer.

Example 57

The diblock copolymer (EPR-O-PLa) obtained in Example 54 was powdered and then was thoroughly dried by a vacuum dryer. 0.1 part by weight of Irganox™1010 was added to 100 parts by weight of the dried powder of the diblock copolymer. A small blow molded container with a volume of 50 ml and a weight of 15 g was produced by direct blow molding in a nitrogen atmosphere under the conditions of a cylinder temperature of 200° C. and a mold temperature of 10° C.

With respect to the obtained small blow molded container, the drop test was conducted, and the transparency and the environmental degradation properties were evaluated. The results are shown in Table 10.

The drop test of the small blow molded container was conducted as follows. The small blow molded container filled with 40 ml of water was sealed off. The container was allowed to stand at a temperature of 23° C. for 48 hr and then was dropped on the surface of a concrete from a height of 1 m at 23° C. Whether the bottle broke or not was observed.

The transparency of the small blow molded container was determined by the haze value of a side (200 μm thick) of the small blow molded container.

The environmental degradation properties of the small blow molded container were evaluated as follows. A specimen 5 cm long and 1 cm wide was cut out from the side of the small blow molded container and was laid in a manure (components: rice hulls, wet refuses, chicken droppings, ordure, etc.) of a temperature of 58° C. and a moisture content of 60% by weight for 3 months. The variation in the specimen between before and after the laying in the manure was observed.

Example 58

The diblock copolymer (EPR-O-PLa) obtained in Example 54 was powdered. 10 parts by weight of the diblock copolymer powder, 60 parts by weight of polylactic acid (B1) (Mw in terms of polystyrene: 150,000) and 30 parts by weight of ethylene/propylene random copolymer (C1) (MFR measured at 190° C.: 5.2 g/10 min; and propylene content: 20 mol %) were thoroughly dried by a vacuum dryer individually. 0.1 part by weight of Irganox™1010 was added. The resin was blended by a twin-screw extruder having a screw diameter of 20 mm in a nitrogen atmosphere at a cylinder temperature of 200° C. and was pelletized. The obtained pellets were thoroughly dried by a vacuum dryer. In the same manner as in Example 57, the pellets were blow molded, and with respect to the obtained small blow molded container, the drop test was conducted and the transparency and the environmental degradation properties were evaluated. The results are shown in Table 10.

Comparative Example 9

In the same manner as in Example 57, the blow molding was conducted, and with respect to the obtained small blow molded container, the drop test was conducted and the transparency and the environmental degradation properties were evaluated, except that 100 parts by weight of polylactic acid (B1) and 0.1 part by weight of Irganox™1010 were used. The results are shown in Table 10.

Comparative Example 10

In the same manner as in Example 58, 67 parts by weight of polylactic acid (B1), 33 parts by weight of ethylene/propylene random copolymer (C1) and 0.1 part by weight of Irganox™1010 were melt blended and were palletized. In the same manner as in Example 57, the pellets were blow molded, and with respect to the obtained small blow molded container, the drop test was conducted and the transparency and the environmental degradation properties were evaluated. The results are shown in Table 10.

TABLE 10

|  | Ex. 57 | Ex. 58 | Comp. Ex. 9 | Comp. Ex. 10 |
| --- | --- | --- | --- | --- |
| Drop test* | 5 | 5 | 1 | 2 |
| Transparency (Haze) (%) | 18 | 55 | 11 | 75 |
| Environmental degradation properties** | AA | AA | Breakup | AA |

*the number of the bottle which did not break in 5 tests
**AA: The specimen was easily broken by handling.

Example 59

The diblock copolymer (PP-O-PLa) obtained in Example 55 was powdered and then was thoroughly dried by a vacuum dryer. 0.1 part by weight of Irganox™1010 was added to 100 parts by weight of the dried powder of the diblock copolymer. A cup with a volume of 30 ml and a weight of 10 g was produced by injection molding in a nitrogen atmosphere under the conditions of a cylinder temperature of 200° C. and a mold temperature of 10° C.

With respect to the obtained cup, the heat resistance and the environmental degradation properties were evaluated. The results are shown in Table 11.

The heat resistance of the cup was evaluated as follows. The cup was allowed to stand at a temperature of 23° C. for 48 hr, and then 20 ml of hot water of 70° C. was placed in the cup. The cup was allowed to stand at 23° C. for 1 hr, and whether the moldings distorted or not was visibly observed.

The environmental degradation properties of the cup were evaluated as follows. A specimen was cut out from the cup. In the same manner as in Example 57, the specimen was laid in a manure (components: rice hulls, wet refuses, chicken droppings, ordure, etc.) of a temperature of 58° C. and a moisture content of 60% by weight for 3 months, and then the variation in the specimen between before and after the laying in the manure was observed.

Example 60

The diblock copolymer (PP-O-PLa) obtained in Example 55 was powdered. 10 parts by weight of the diblock copolymer powder, 60 parts by weight of polylactic acid (B1) and 30 parts by weight of propylene/ethylene block copolymer (C2) (MFR measured at 230° C.: 25 g/10 min; and quantity of a decane-soluble component: 11.5 mol %) were thoroughly dried by a vacuum dryer individually. 0.1 part by weight of Irganox™1010 was added. The resin was blended by a twin-screw extruder having a screw diameter of 20 mm in a nitrogen atmosphere at a cylinder temperature of 200° C. and was pelletized. The obtained pellets were thoroughly dried by a vacuum dryer. In the same manner as in Example 59, the pellets were injection molded, and with respect to the obtained cup, the heat resistance and the environmental degradation properties were evaluated. The results are shown in Table 11.

Comparative Example 11

In the same manner as in Example 59, the injection molding was conducted, and with respect to the obtained cup, the heat resistance and the environmental degradation properties were evaluated, except that 100 parts by weight of polylactic acid (B1) and 0.1 part by weight of Irganox™1010 were used. The results are shown in Table 11.

Comparative Example 12

In the same manner as in Example 60, 67 parts by weight of polylactic acid (B1), 33 parts by weight of propylene/ethylene block copolymer (C2) and 0.1 part by weight of Irganox™1010 were melt blended and were pelletized. In the same manner as in Example 59, the pellets were injection molded, and with respect to the obtained cup, the heat resistance and the environmental degradation properties were evaluated. The results are shown in Table 11.

TABLE 11

|  | Ex. 59 | Ex. 60 | Comp. Ex. 11 | Comp. Ex. 12 |
|---|---|---|---|---|
| Heat resistance* | AA | AA | CC | BB |
| Environmental degradation properties** | AA | AA | Breakup | AA |

*the degree of variation
AA: The variation was not recognized at all.
BB: The slight variation was recognized.
CC: The variation was recognized.
**AA: The specimen was easily broken by handling.

Example 61

100 parts by weight of the diblock copolymer (PE-O-PCL) obtained in Example 56 was powdered. A solution prepared dissolving 0.1 part by weight of Irganox™1010 in acetone was sprinkled on the powder. The mixture was stirred thoroughly and was dried by a vacuum dryer. The mixture was press molded into a film 100 μm thick under the conditions of a heating temperature of 200° C. and a cooling temperature of 20° C.

With respect to the obtained film, the heat resistance and the environmental degradation properties were evaluated. The results are shown in Table 12.

The heat resistance of the film was evaluated as follows. A stripped specimen 2 mm wide and 2 cm long was cut out from the film. Creep test was conducted by TMA (manufactured by Seiko Instruments & Electronics Ltd.) in flowing nitrogen at a load of 10 kgf/cm$^2$ and a temperature rise rate of 2° C./min. The temperature at a permanent strain of 5% was regarded as the distortion temperature, and the heat resistance was evaluated by the distortion temperature.

The environmental degradation properties of the film were evaluated as follows. A specimen 5 cm long and 1 cm wide was cut out from the film and was laid in a manure (components: rice hulls, wet refuses, chicken droppings, ordure, etc.) of a temperature of 58° C. and a moisture content of 60% by weight for 3 months. The variation in the specimen between before and after the laying in the manure was observed.

Example 62

The diblock copolymer (PE-O-PCL) obtained in Example 56 was powdered. 10 parts by weight of the diblock copolymer powder, 60 parts by weight of polycaprolactone (B2) (Mw in terms of polystyrene: 130,000) and 30 parts by weight of high-density polyethylene (C3) (MFR measured at 190° C.: 5.2 g/10 min; and density: 0.968 g/cm$^3$) were thoroughly dried by a vacuum dryer individually. 0.1 part by weight of Irganox™1010 was added. The resin was blended by a twin-screw extruder having a screw diameter of 20 mm in a nitrogen atmosphere at a cylinder temperature of 200° C. and was pelletized. The obtained pellets were thoroughly dried by a vacuum dryer. In the same manner as in Example 61, the pellets were press molded, and with respect to the obtained film, the heat resistance and the environmental degradation properties were evaluated. The results are shown in Table 12.

Comparative Example 13

In the same manner as in Example 61, the blowing of film was conducted, and with respect to the obtained film, the heat resistance and the environmental degradation properties were evaluated, except that 100 parts by weight of polycaprolactone (B2) and 0.1 part by weight of Irganox™1010 were used. The results are shown in Table 12.

Comparative Example 14

In the same manner as in Example 62, 67 parts by weight of polycaprolactone (B2), 33 parts by weight of high-density polyethylene (C3) and 0.1 part by weight of Irganox™1010 were melt blended and were pelletized. In the same manner as in Example 61, the pellets were brown-film extruded into a film, and with respect to the obtained film, the heat resistance and the environmental degradation properties were evaluated. The results are shown in Table 12.

TABLE 12

|  | Ex. 61 | Ex. 62 | Comp. Ex. 13 | Comp. Ex. 14 |
|---|---|---|---|---|
| TMA distortion temperature | 75 | 85 | 45 | 52 |
| Biodegradability* | AA | AA | Breakup | AA |

AA: The specimen was easily broken by handling.
BB:
CC: The form was retained.

Example 63

[Preparation of Solid Catalyst Component]

3.0 g of silica dried at 250° C. for 10 hr was suspended in 50 ml of toluene, and then the suspension was cooled to 0° C. 17.8 ml of a toluene solution of methylaluminoxane (Al=1.29 mmol/ml) was added dropwise over a period of 30 min with maintaining at 0° C., followed by the reaction at 0° C. for 30 min. The temperature was raised to 95° C. over a period of 30 min, and the reaction was conducted for 4 hr at the same temperature. The temperature was lowered to 60° C., and the supernatant liquid was removed by decantation.

The obtained solid component was washed twice with toluene and then was resuspended in 50 ml of toluene. 11.1 ml of a toluene solution of bis(1-n-butyl-3-methylcyclopentadienyl)zirconium dichloride (Zr=0.0103 mmol/ml) was added dropwise to the suspension at 20° C. over a period of 30 min. The temperature in the reactor was raised to 80° C., and the reaction was conducted for 2 hr at the same temperature. The supernatant liquid was removed, and the precipitate was washed twice with hexane to obtain a solid catalyst. The obtained catalyst included 2.3 mg of zirconium based on 1 g of the solid catalyst.

[Preparation of Prepolymerized Catalyst]

4 g of the obtained solid catalyst was resuspended in 400 ml of hexane. 5.0 ml of a decane solution of triisobutylaluminum (1 mmol/ml) and 0.36 g of 1-hexene were added to the suspension, and the prepolymerization of ethylene was conducted at 35° C. for 2 hr. After the removal of the supernatant liquid, the precipitate was washed three times with hexane to obtain a prepolymerized catalyst including 2.2 mg of zirconium and with which 3 g of polyethylene was prepolymerized, based on 1 g of the solid catalyst.

[Polymerization of Olefin]

1 liter of purified hexane and 40 ml of purified 1-hexene were placed in a 2-liter stainless steel autoclave purged thoroughly with nitrogen, and nitrogen in the autoclave was replaced with ethylene. The temperature in the autoclave was raised to 60° C., and 1.5 mmol of triisobutylaluminum and 0.24 mg in terms of zirconium atom of the prepolymerized catalyst were added. Ethylene was fed to initiate the polymerization at a pressure of 0.9 MPa. Thereafter, with supplying only ethylene, the polymerization was conducted at a pressure of 0.9 MPa and a temperature of 80° C. for 1.5 hr.

After completion of the polymerization, the polymer was filtered off and was dried at 80° C. overnight. The yield of the obtained polymer was 200 g. The catalytic activity based on a zirconium atom was 77 kg/mmol-Zr·h. The density of the obtained ethylene/1-hexene copolymer (P(Et/Hex)) was 0.925 g/cm$^3$. As a result of IR analysis, the 1-hexene content was 2.5 mol %, and it was confirmed that there was an unsaturated bond in the terminal position of the polymer molecule. Mw measured by GPC was 144,000.

[Transformation in Terminal Position of the Polymer]

In a dry box filled with argon, 20 g of the polymer (P(Et/Hex)), which had an unsaturated bond in the terminal position, was suspended in 100 ml of degassed and dried tetrahydrofuran (THF), and the suspension was placed in a glass flask with a magnetic stirrer. 2.2 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried isopropanol and was dried under reduced pressure.

10 g of the obtained polymer was added to 25 ml of degassed and dried THF. In a nitrogen atmosphere at room temperature, 0.2 g of NaOH dissolved in 1 ml of water and 0.3 ml of methanol were added thereto. 0.8 ml of 30% $H_2O_2$ was added dropwise at 0° C. The reaction was conducted at 40° C. for 6 hr, and then the reaction solution was poured into 2 liters of a methanol solution to precipitate a polymer. The obtained polymer was refluxed with 100 ml of methanol for 2 hr and then was dried under reduced pressure at 50° C. for 8 hr. As a result of IR analysis, it was confirmed that a terminal position of the polymer molecule was modified by a hydroxyl group so that there was no unsaturated bond in the terminal position.

[Polymerization of Ethylene Oxide (Referred to as EO)]

1420 g of the above polymer having a hydroxyl group in the terminal position (referred to as P(Et/Hex)-OH) and 62 mg of tetrakis[tris(dimethylamino)phosphoranylidene-amino]phosphonium hydroxide $\{[(Me_2N)_3P=N]_4P^+OH^-\}$ which was synthesized in the same manner as described on page 32 in European Patent Publication No. 0791600 were placed in a 1500 ml autoclave equipped with a tube for a thermometer, a pressure gage, a stirrer and a inlet tube for ethylene oxide. Air in the autoclave was replaced with dried nitrogen, and the contents of the reactor were heated to a temperature of 125° C. The reaction was conducted at the same temperature for 12 hr with intermittently supplying 9.1 g of ethylene oxide in order to maintain the pressure (absolute pressure) at about 0.5 MPa during the reaction. Residual unreacted ethylene oxide was distilled out under reduced pressure, and 1425 g of a diblock copolymer of polyethylene-O-(polyethylene glycol) (referred to as P(Et/Hex)-O-PEG) was obtained.

With respect to the obtained polymer, the weight-average molecular weight ($Mw_2$) of the polyethylene glycol (PEG) moiety, which was estimated according to the following equation, was 500.

$$Mw_2=Mw_1\cdot(W_2-W_1)/W_1$$

wherein:

$Mw_1$ is a weight-average molecular weight of the P(Et/Hex) moiety, $Mw_2$ is a weight-average molecular weight of the PEG moiety, $W_1$ is an amount of the copolymer of P(Et/Hex)-OH used in the polymerization of EO, and $W_2$ is an yield of the diblock copolymer.

Example 64

[Vacuum Distillation of Methylaluminoxane]

800 ml of a toluene solution of methylaluminoxane (Al: 1.52 mol/liter; and molar ratio of $CH_3$/Al: 2.12) available from Witco Corp. was placed in a glass flask purged thoroughly with nitrogen. With maintaining the temperature in the flask at ranges of 37° C. to 40° C. and the distillation temperature at ranges of 27° C. to 28.5° C., the distillation was conducted at 300 mmHg for 4 hr to distill the liquid entirely. 53.6 g of white methylaluminoxane drying up remained in the flask. The solid methylaluminoxane was redissolved by the addition of 650 ml of toluene. The obtained toluene solution of the distilled methylaluminoxane was a colorless, transparent and homogeneous solution of an aluminum concentration of 1.32 mol/liter, and the molar ratio of $CH_3$/Al in the solution was 1.54.

[Preparation of Solid Catalyst Component]

10 g of silica (F-948, available from Fuji-Davison Chemical Ltd., dried at 200° C. for 4 hr) and 150 ml of toluene were placed in a 400 ml reactor purged thoroughly with nitrogen and were cooled to 0° C. with stirring. 67 mmol in terms of aluminum atom of the toluene solution of the distilled methylaluminoxane (Al: 1.32 mol/liter) was added dropwise in a nitrogen atmosphere over a period of 1 hr. The reaction was conducted at the same temperature for 30 min, followed by reacting at 95° C. for 4 hr. The reaction solution was allowed to cool, and the supernatant liquid was removed by decantation when the temperature dropped to 60° C. The precipitate was washed three times with 150 ml of toluene at room temperature and then was resuspended in toluene to obtain a total amount of 150 ml of the suspension. As a result, the solid catalyst component including 5.5 mmol of aluminum based on 1 g of silica was obtained.

[Preparation of Solid Catalyst Component]

9 mmol in terms of aluminum atom of the above solid catalyst component and 0.03 mmol in terms of zirconium atom of rac-dimethylsilylbis(2-methyl-4,5-benzoindenyl) zirconium dichloride dissolved in toluene were placed in a 200 ml reactor purged thoroughly with nitrogen and were stirred for 5 min. 100 ml of hexane was added, and 1.5 mmol of triisobutylaluminum was added, followed by stirring for 5 min. The prepolymerization of propylene was conducted with flowing a propylene gas (1.6 liter/h) at 20° C. for 2 hr. The supernatant liquid was removed by decantation. The precipitate was washed three times with 150 ml of hexane and then was resuspended in decane. Based on 1 g of silica in the obtained solid catalyst component, 0.0091 mmol of zirconium and 5.0 mmol of aluminum were supported and 3 g of polypropylene was prepolymerized.

[Bulk Polymerization]

400 g of propylene and 6 liters of ethylene were blown through into a 2-liter autoclave purged thoroughly with nitrogen, and the temperature in the autoclave was raised to 50° C. 1.0 mmol of triisobutylaluminum and 0.0005 mmol in terms of zirconium atom of the solid catalyst component were added, and the polymerization was conducted at 60° C. for 1 hr. The yield of the obtained polymer was 133.5 g. The catalytic activity was 267 kg/mmol-Zr·h. With respect to the polymer, the melting point (Tm) was 131° C., and Mw was 200,900. As a result of IR analysis, the ethylene content was 2.1 mol %, and it was confirmed that there was an unsaturated bond in the terminal position of the polymer molecule.

[Hydroboration]

In a dry box filled with argon, 20 g of the above polymer (referred to as rPP), which had an unsaturated bond in the terminal position, was suspended in 100 ml of degassed and dried THF, and the suspension was placed in a glass flask with a magnetic stirrer. 1.6 ml of a THF solution of 9-BBN (0.5 M) was added to the suspension. In the dry box, the slurry was stirred at 55° C. for 5 hr and then was filtered. The filter cake was washed with degassed and dried isopropanol and was dried under reduced pressure, and a propylene copolymer having boron in the terminal position (referred to as rPP-B) was obtained.

[Polymerization of Butylacrylate]

20 g of the copolymer of rPP-B, which had boron in the terminal position, was placed in a sealed flask and was suspended by the addition of 9.8 g of dried butylacrylate (BA) and 80 ml of THF. 1.0 ml of dried oxygen was blown through to initiate the reaction, followed by stirring at room temperature for 3 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of rPP-O-polybutylacrylate (referred to as rPP-O-PBA).

With respect to the obtained diblock copolymer, the weight-average molecular weight ($Mw_2$) of the polybutylacrylate (PBA) moiety, which was estimated according to the following equation, was 5,000.

$$Mw_2 = Mw_1 \cdot (W_2 - W_1)/W_1$$

wherein:

$Mw_1$ is a weight-average molecular weight of the rPP moiety, $Mw_2$ is a weight-average molecular weight of the PBA moiety, $W_1$ is an amount of the copolymer of rPP-B used in the polymerization of BA, and $W_2$ is an yield of the diblock copolymer.

Example 65

[Preactivation of Catalyst]

0.023 mmol in terms of titanium atom of [(N-t-butylamido)(tetramethyl-$\eta^5$-cyclopentadienyl)dimethylsilane]titanium dichloride was weighed and placed in a glass flask purged thoroughly with nitrogen, and a toluene solution of 0.14 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared at a titanium concentration of 0.00046 mmol/ml.

[Polymerization of Olefin]

750 ml of purified heptane and 25 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.00075 mmol in terms of titanium atom of the preactivated catalyst were added. Ethylene was fed to initiate the polymerization at a pressure of 0.9 MPa. Thereafter, the polymerization was conducted for 20 min with supplying only ethylene and maintaining at a pressure of 0.9 MPa and a temperature of 70° C. After the elapse of a prescribed time, isopropanol was added to terminate the reaction. After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained ethylene/octene copolymer (EOR) was 37.4 g. The catalytic activity was 150 kg/mmol-Ti·h. As a result of IR analysis of the copolymer, the 1-octene content was 9.3 mol %, and it was confirmed that there was an unsaturated bond in the terminal position of the polymer molecule. The intrinsic viscosity, [η], was 2.30 dl/g. Mw was 205,400.

[Hydroboration]

In a dry box filled with argon, 20 g of the copolymer of EOR was suspended in 100 ml of degassed and dried THF, and the suspension was placed in a glass flask with a magnetic stirrer. 1.6 ml of a THF solution of 9-BBN (0.5 M) was added to the suspension. In the dry box, the slurry was stirred at 55° C. for 5 hr and then was filtered. The filter cake was washed with degassed and dried isopropanol and was dried under reduced pressure, and an ethylene/octene copolymer having boron in the terminal position (EOR-B) was obtained.

[Polymerization of Methylmethacrylate]

20 g of the copolymer of EOR-B was placed in a sealed flask and was suspended by the addition of 7.5 g of dried MMA and 80 ml of THF. 1.0 ml of dried oxygen was blown through to initiate the reaction, followed by stirring at room temperature for 2 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of EOR-O-polymethylmethacrylate (EOR-O-PMMA).

With respect to the obtained diblock copolymer, the weight-average molecular weight ($Mw_2$) of the polymethylmethacrylate (PMMA) moiety, which was estimated according to the following equation, was 5,000.

$$Mw_2 = Mw_1 \cdot (W_2 - W_1)/W_1$$

wherein:

$Mw_1$ is a weight-average molecular weight of the EOR moiety, $Mw_2$ is a weight-average molecular weight of the PMMA moiety, $W_1$ is an amount of the copolymer of EOR-B used in the polymerization of MMA, and $W_2$ is an yield of the diblock copolymer.

Example 66

[Preactivation of Catalyst]

10.0 mg of bis(1,3-dimethylcyclopentadienyl)zirconium dichloride was weighed and placed in a glass flask purged thoroughly with nitrogen, and a toluene solution of 17.2 mmol in terms of aluminum atom of methylaluminoxane was added thereto. The solution was sonicated at 23° C. for 15 min. An appropriate amount of toluene was added to the solution, and a total amount of 50 ml of the solution was obtained. This solution was used as a catalyst solution.

[Copolymerization of Ethylene/Norbornene]

In a nitrogen atmosphere at room temperature, 600 ml of a cyclohexane solution containing 20 g of norbornene was placed in a 1-liter stainless steel autoclave purged thoroughly with nitrogen. 0.6 mmol of triisobutylaluminum was added, and nitrogen in the autoclave was replaced with ethylene. The inside of the autoclave was pressurized with ethylene, and then the temperature in the autoclave was raised so that the temperature and the pressure in the autoclave were 70° C. and 0.7 MPa, respectively. 12.8 ml of the prepared catalyst solution was forced into the autoclave with pressurized nitrogen to initiate the polymerization. Thereafter, with supplying only ethylene, the polymerization was conducted at a pressure of 0.7 MPa and a temperature of 70° C. for 5 min. After 5 min from the initiation of the polymerization, 5 ml of isopropanol was forced into the autoclave with pressurized nitrogen to terminate the polymerization. After decompression, the polymer solution was taken out. With vigorously agitating by a homomixer, the polymer solution was brought into contact with an aqueous solution prepared by adding 5 ml of concentrated hydrochloric acid based on 1 liter of water at a ratio of 1 to 1, and the catalyst residue was passed into the water phase. The contacted mixed solution was allowed to stand still, and then the water phase was removed. The polymer solution was washed twice with water to purify the same, and the phase of the polymer solution was separated. The purified and separated polymer solution was allowed to contact with acetone, which was three times as much as the polymer solution, with vigorously agitating. After the precipitation of the copolymer, the solid product (copolymer) was collected by filtration and was thoroughly washed with acetone. To extract unreacted norbornene remained in the polymer, the solid product was put in acetone so as to be a concentration of 40 g/liter, and the extraction was conducted at 60° C. for 2 hr. After the extraction, the solid product was collected by filtration and was dried under reduced pressure in flowing nitrogen at 130° C. and 350 mmHg for 12 hr.

The yield of the obtained ethylene/norbornene copolymer (P(Et/NBR)) was 25.7 g. Thus, the catalytic activity was 41.8 kg/mmol-Zr·h. As a result of IR analysis, the norbornene content was 8.5 mol %, and it was confirmed that there was an unsaturated bond in the terminal position of the polymer molecule. According to the measurement by GPC, Mw was 140,000.

[Transformation in Terminal Position of the Polymer]

In a dry box filled with argon, 20 g of the copolymer of P(Et/NBR) was suspended in 100 ml of degassed and dried THF, and the suspension was placed in a glass flask with a magnetic stirrer. 2.3 ml of a THF solution of 9-BBN (0.5 M) was added to the suspension. In the dry box, the slurry was stirred at 55° C. for 5 hr and then was filtered. The filter cake was washed with degassed and dried isopropanol and was dried under reduced pressure, and an ethylene/norbornene copolymer having boron in the terminal position (P(Et/NBR)-B) was obtained.

10 g of the obtained copolymer of P(Et/NBR)-B was suspended in 50 ml of degassed and dried THF. In a nitrogen atmosphere, 1.0 ml of an aqueous solution containing 0.2 g of NaOH and 0.3 ml of methanol were added. The suspension was cooled to 0° C., and 0.8 ml of $H_2O_2$ (30%) aqueous solution was added dropwise. The reaction was conducted at 40° C. for 6 hr, and then 100 ml of methanol was added to terminate the reaction. The obtained polymer was filtered off. The obtained filter cake was heat-refluxed with 100 ml of methanol for 2 hr and then was filtered off again. The filer cake was dried under reduced pressure at 50° C. for 8 hr. The reaction solution was poured into 2 liters of a methanol solution to precipitate a polymer. A copolymer of P(Et/NBR) having a hydroxyl group in the terminal position (referred to as P(Et/NBR)-OH) was obtained.

[Polymerization of Caprolactone]

In a dry box, 3.5 g of the copolymer of P(Et/NBR)-OH was suspended in dried toluene. Excess n-butyllithium was added thereto, and the suspension was stirred for 12 hr. The filtration and washing with toluene were repeated to obtain a corresponding lithium alkoxide. The solid product was resuspended in toluene. 3 equivalents of diethylaluminum chloride was added, and the reaction was conducted for 12 hr to obtain a copolymer of P(Et/NBR)-aluminum alkoxide (referred to as P(Et/NBR)-OAlEt$_2$). The polymer was washed with toluene and hexane and was filtered off. The polymer was suspended in 80ml of toluene. 2.3 g of purified caprolactone was added, and the reaction was conducted at room temperature for 2 hr. 100 ml of methanol was added to terminate the reaction, and then the polymer was precipitated in acidic methanol. The soluble matters in the precipitated polymer were removed by extraction with acetone by the Soxhelt extractor to obtain a diblock copolymer of P(Et/NBR)-O-polycaprolactone (referred to as P(Et/NBR)-O-PCL).

With respect to the obtained polymer, the weight-average molecular weight (Mw$_2$) of the polycaprolactone (PCL) moiety, which was estimated according to the following equation, was 5,000.

$$Mw_2 = Mw_1 \cdot (W_2 - W_1)/W_1$$

wherein:

Mw$_1$ is a weight-average molecular weight of the P(Et/NBR) moiety,

Mw$_2$ is a weight-average molecular weight of the PCL moiety, $W_1$ is an amount of the copolymer of P(Et/NBR)-OH used in the polymerization of caprolactone, and $W_2$ is an yield of the diblock copolymer.

Synthetic Example 1

[Preparation of Propylene/Butene/Ethylene Copolymer]

675 ml of heptane was placed in a 1.5-liter autoclave dried under reduced pressure and purged with nitrogen at ordinary temperature. 0.3 ml of 1.0 mmol/ml toluene solution of triisobutylaluminum was added so as to be an amount of 0.3 mmol in terms of aluminum atom of triisobutylaluminum. With stirring, 28.5 liters of propylene (in terms of a volume at 25° C. and 1 atm) and 10 liters of 1-butene (in terms of a volume at 25° C. and 1 atm) were blown through, and the temperature in the autoclave was raised to 60° C. The inside of the autoclave was pressurized with ethylene so as to be a pressure of 6.0 kg/cm$^2$-G. 7.5 ml of a toluene solution (0.0001 mM/ml) of rac-dimethylsilylenebis(2-methyl-4-phenyl-1-indenyl)zirconium dichloride synthesized in known method and 2.3 ml of a toluene solution of triphenylcarbeniumtetra(pentafluorophenyl)borate were added, and the copolymerization of propylene, ethylene and 1-butene was initiated. The catalyst concentrations of rac-dimethylsilylenebis(2-methyl-4-phenyl-1-indenyl)zirconium dichloride and triphenylcarbeniumtetra(pentafluorophenyl)borate were 0.001 mmol/liter and 0.003 mmol/liter, respectively, based on a total amount of the contents in the autoclave.

During the polymerization, the pressure was maintained at 6.0 kg/cm$^2$-G by continuously supplying ethylene. After 15 min from the initiation of the polymerization, methanol was added to terminate the polymerization. After decompression, the polymer solution was taken out. The polymer solution was washed with "an aqueous solution prepared by adding 5 ml of concentrated hydrochloric acid based on 1 liter of water" at a ratio of 1 to 1 based on the polymer solution, and the catalyst residue was passed into the water phase. The catalyst-mixing solution was allowed to stand still, and then the water phase was removed. The polymer solution was washed twice with distilled water, and the phase of the polymer solution was separated from the water phase. The separated polymer solution was allowed to contact with acetone, which was three times as much as the polymer solution, with vigorously agitating. After the precipitation of the polymer, the solid product (copolymer) was thoroughly washed with acetone and was collected by filtration. The solid product was dried in flowing nitrogen at 130° C. and 350 mmHg for 12 hr. The yield of the obtained propylene/butene/ethylene copolymer was 24 g, and the intrinsic viscosity, [η], measured at 135° C. in Decalin was 1.9 dl/g. The glass transition temperature, Tg, was –31° C., and the quantity of heat of fusion was 49 J/g. The contents of ethylene and butene were 10 mol % and 19 mol %, respectively. Mw/Mn measured by GPC was 2.4.

Example 67

[Preactivation of Catalyst]

0.023 mmol in terms of titanium atom of [(N-t-butylamido)(tetramethyl-η$^5$-cyclopentadienyl)dimethylsilane]titanium dichloride was weight and placed in a glass flask purged thoroughly with nitrogen, and a toluene solution of 0.69 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 50 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.00075 mmol in terms of titanium atom of the preactivated catalyst were added. Ethylene was fed to initiate the polymerization at a pressure of 0.9 MPa. Thereafter, only ethylene was supplied. In the polymerization, the operation such that the supply of ethylene was stopped until the temperature dropped to 70° C. when the temperature rose rapidly was carried out twice. The polymerization was conducted at a pressure of 0.5 to 0.9 MPa and a temperature of 70 to 85° C. for 6 min. After the elapse of a prescribed time, isopropanol was added to terminate the reaction. After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained ethylene/octene copolymer (EOR) was 47.5 g. The catalytic activity was 630 kg/mmol-Zr·h. As a result of IR analysis of the copolymer, the octene content was 18.6 mol %, and it was confirmed that there was an unsaturated bond in the terminal position of the polymer molecule. The intrinsic viscosity, [η], was 1.49 dl/g. Mw was 115,700.

[Hydroboration]

In a dry box filled with argon, 20 g of the copolymer of EOR was suspended in 100 ml of degassed and dried THF, and the suspension was placed in a glass flask with a magnetic stirrer. 2.8 ml of a THF solution of 9-BBN (0.5 M) was added to the suspension. In the dry box, the slurry was stirred at 55° C. for 5 hr and then was filtered. The filter cake was washed with degassed and dried isopropanol and was dried under reduced pressure.

10 g of the obtained polymer was added to 25 ml of degassed and dried THF. In a nitrogen atmosphere at room temperature, 0.2 g of NaOH dissolved in 1 ml of water and 0.3 ml of methanol were added thereto. 0.8 ml of 30% H$_2$O$_2$ was added dropwise at 0° C. The reaction was conducted at 40° C. for 6 hr, and then the reaction solution was poured into 2 liters of a methanol solution to precipitate a polymer. The obtained polymer was refluxed with 100 ml of methanol for 2 hr and then was dried under reduced pressure at 50° C. for 8 hr. As a result of IR analysis, it was confirmed that a terminal position of the polymer molecule was modified by a hydroxyl group so that there was no unsaturated bond in the terminal position.

[Polymerization of Ethylene Oxide (EO)]

574 g of the copolymer of EOR having a hydroxyl group in the terminal position (referred to as EOR-OH) and 31 mg of tetrakis[tris(dimethylamino)phosphoranylideneamino] phosphonium hydroxide were placed in a 1500 ml autoclave equipped with a tube for a thermometer, a pressure gage, a stirrer and a inlet tube for ethylene oxide. Air in the autoclave was replaced with dried nitrogen, and the contents of the reactor were heated to a temperature of 125° C. The reaction was conducted at the same temperature for 12 hr with intermittently supplying 29 g of ethylene oxide in order to maintain the pressure (absolute pressure) at about 0.5 MPa during the reaction. Residual unreacted ethylene oxide was distilled out under reduced pressure, and 599 g of a block copolymer of the copolymer of EOR and polyethylene glycol (referred to as EOR-O-PEG) was obtained.

With respect to the obtained polymer, the weight-average molecular weight (Mw$_2$) of the polyethylene glycol (PEG) moiety, which was estimated according to the following equation, was 5,000.

$$Mw_2 = Mw_1 \cdot (W_2 - W_1)/W_1$$

wherein:

Mw$_1$ is a weight-average molecular weight of the EOR moiety, $Mw_2$ is a weight-average molecular weight of the PEG moiety, $W_1$ is an amount of the copolymer of EOR-OH used in the polymerization of EO, and $W_2$ is an yield of the diblock copolymer.

In Examples 68 to 74, the various properties were measured as follows.

Initial Antifogging Properties

The top of a 100 ml beaker containing 70 ml of water was capped with the sample film. With placing the beaker in a constant temperature water bath of 50° C., the beaker was allowed to stand still in a constant temperature chamber of 20° C. for 24 hr.

The fogging degree of the inside of the sample film was visibly observed to evaluate the degree according to the following scales.

AA: The film has an anti-stick quality, and it is impossible to observe a water drop.

BB: Large water drops attach to the film partially.

CC: Fine water droplets attach to the almost all over the surface of the film.

Transparency (Haze (%))

With respect to the sample film, the haze value was measured by a digital turbidimeter (NDH-20D) manufactured by Nippon Denshoku Industries Co., Ltd.

Modulus in Tension of Film

The modulus in tension was measured at a span of 30 mm, a tensile speed of 50 mm/min and a temperature of 23° C. by the use of JIS No. 3 dumbbell shape in accordance with JIS K6781-1977.

Shrinkage Factor (%)

A sample film was marked at a distance ($L_0$) between two gage marks of 100 mm. The sample film was heated in an air oven at 100° C. for 1 hr. The distance (L) between the two gage marks given after heating was measured, and a shrinkage factor was determined by the following equation.

Shrinkage factor=$(L_0-L)/L_0 \times 100$

Restoring Factor (%)

A sample film was given a displacement of 15 mm by using an ejector rod of a half-inch in diameter at a speed of 100 mm/min. The permanent strain given thereafter was measured, and the restoring factor was determined by the following equation.

Restoring factor (%)=[15 mm−Permanent strain (mm)]/15 mm×100

Melting Point (Tm) and Glass Transition Temperature (Tg)

An endothermic curve was measured by DSC to determine Tm from the temperature at a maximum peak point.

The endothermic curve was measured as follows. The sample was loaded into an aluminum pan, and the temperature was raised to 200° C. at a rate of 100° C./min. The temperature was maintained at 200° C. for 5 min and then was lowered to −150° C. at a rate of 100° C./min. The temperature was raised at a rate of 10° C./min to obtain the endothermic curve.

Viscoelasticity (Tan δ)

A sheet 2 mm thick was prepared. Viscoelasticity test was conducted by a viscoelasticity tester (Model RDS-2) manufactured by Rheometric Scientific F.E. Ltd. under the conditions of a measurement temperature of 25° C., a frequency of 10 Hz and a strain of 1%, and the loss tangent was measured.

Mar Resistance

The appearance of the film given after scratching at 23° C. was evaluated as follows.

AA: Few scratches were observed.

BB: Undistinguished scratches were observed.

CC: Distinguished scratches were observed.

Water Vapor Permeability

The water vapor permeability was measured in accordance with the cup method in JIS Z0208. Water vapor was allowed to permeate through a sample film with a water vapor permeation area of 25 $cm^2$ or above from the atmosphere of a temperature of 40° C. and a relative humidity of 90%. The amount of water vapor permeated for 24 hr was measured to convert into the amount based on 1 $m^2$ of the sample film. The atmosphere on the side of water vapor permeation had been dried with a hygroscopic agent.

[Casting of Film]

The casting of a cast film with a desired thickness was conducted by variation in the extruder output by a single-screw extruder having a screw diameter of 30 mm at a die temperature of 230° C., a roll temperature of 40° C. and a take-off speed of 10 m/min.

Example 68

The diblock copolymer (P(Et/Hex)-O-PEG) obtained in Example 63 was blown-film extruded into a film 60 μm thick. With respect to the obtained film, the antifogging properties and the transparency were evaluated. The evaluated results are shown as follows.

Antifogging properties: AA

Transparency: 1.5%

Example 69

The diblock copolymer (rPP-O-PBA) obtained in Example 64 was blown-film extruded into a film 20 μm thick. With respect to the obtained film, the flexibility, the heat resistance and the restoring factor were evaluated. The evaluated results are shown as follows.

Flexibility: modulus in tension of 250 MPa

Heat resistance: melting point of 130° C.

Restoring factor: 75%

Example 70

80 parts by weight of the diblock copolymer (rPP-O-PBA) obtained in Example 64 and 20 parts by weight of the propylene/butene/ethylene random copolymer obtained in Synthetic Example 1 were melt kneaded at 200° C. and then were blown-film extruded into a film 20 μm thick. With respect to the obtained film, the flexibility, the heat resistance and the restoring factor were evaluated. The evaluated results are shown as follows.

Flexibility: modulus in tension of 150 MPa

Heat resistance: melting point of 128° C.

Restoring factor: 73%

Example 71

The diblock copolymer (rPP-O-PBA) obtained in Example 64 and an ethylene/vinyl acetate copolymer (MFR: 2.5 g/10 min; vinyl acetate content: 25% by weight; and hereinafter, referred to as EVA) were blown-film extruded into a three-layer film under the following conditions.

[Condition of Blown-film Extrusion]

Film component (thickness of each layer (μm)): (rPP-O-PBA)/EVA/(rPP-O-PBA)=10/5/10

Extruder:
an extruder having a screw diameter of 30 mm: 200° C. (for EVA)
an extruder having a screw diameter of 40 mm: 200° C. (for rPP-O-PBA)

With respect to the obtained film, the flexibility and the restoring factor were evaluated. The evaluated results are shown as follows.

Flexibility: modulus in tension of 180 MPa
Restoring factor: 73%

Example 72

The diblock copolymer (EOR-O-PMMA) obtained in Example 65 was blown-film extruded into a film 20 μm thick. With respect to the obtained film, the transparency and the thermal shrinkage factor were evaluated. The evaluated results are shown as follows.

Transparency: 0.9%
Shrinkage factor: 10%

Example 73

The diblock copolymer (P(Et/NBR)-O-PCL) obtained in Example 66 was blown-film extruded into a film 20 μm thick. With respect to the obtained film, the mar resistance and the viscoelasticity were evaluated. The evaluated results are shown as follows.

Mar resistance: AA
Viscoelasticity: tan δ (measured at 25° C.)=0.2

Example 74

The diblock copolymer (EOR-O-PEG) obtained in Example 67 was blown-film extruded into a film 20 μm thick. With respect to the obtained film, the transparency and the water vapor permeability were evaluated. The evaluated results are shown as follows.

Transparency: 0.5%
Water vapor permeability: 1500 g/m²

Example 75

[Preparation of Catalyst Solution]

0.023 mmol in terms of titanium atom of [(N-t-butylamido)(tetramethyl-$\eta^5$-cyclopentadienyl)dimethylsilane]titanium dichloride was weighed and placed in a glass flask purged thoroughly with nitrogen, and a toluene solution of 0.69 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 50 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.00075 mmol in terms of titanium atom of the above catalyst solution were added. Ethylene was fed into the autoclave to initiate the polymerization at a pressure of 0.9 MPa. After the initiation of the polymerization, only ethylene was supplied. During the polymerization, the rapid temperature rising was observed so that the supply of ethylene was stopped twice until the temperature dropped to 70° C. The polymerization was conducted at a pressure of 0.5 to 0.9 MPa and a temperature of 70 to 85° C. for 6 min. After the elapse of a prescribed time, isopropanol (IPA) was added to terminate the reaction. After decompression, the polymer solution was taken out and was poured into 4 liters of methanol. The solution was stirred thoroughly. The solid product was collected by filtration. The filter cake was washed with methanol and then was dried in flowing nitrogen at 120° C. and 500 mmHg for 12 hr.

The yield of the obtained ethylene/octene random copolymer was 47.5 g. The catalytic activity was 630 kg/mmol-Zr·h. As a result of IR analysis of the ethylene/octene random copolymer (EOR), the octene content was 18.6 mol %, and it was confirmed that there was an unsaturated bond in the terminal position of the polymer molecule. [η] was 1.49 dl/g. Mw was 115,700.

[Hydroboration]

In a dry box filled with argon, 20 g of the copolymer of EOR, which had an unsaturated bond in the terminal position was suspended in 100 ml of degassed and dried tetrahydrofuran (THF), and the suspension was placed in a glass flask with a magnetic stirrer. 2.8 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried IPA and was dried under reduced pressure to obtain a copolymer of EOR having boron in the terminal position (EOR-B).

[Polymerization of Methylmethacrylate]

20 g of the copolymer of EOR-B was placed in a sealed flask and was suspended by the addition of 13.3 g of dried methylmethacrylate (MMA) and 80 ml of THF. 1.8 ml of dried oxygen was blown through to initiate the reaction, followed by stirring at room temperature for 46 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of (ethylene/octene random copolymer)-O-polymethylmethacrylate (EOR-O-PMMA).

With respect to the diblock copolymer, the weight-average molecular weight ($Mw_2$) of the polymethylmethacrylate (PMMA) moiety, which was estimated according to the following equation, was 110,000.

$$Mw_2 = Mw_1 \cdot (W_2 - W_1)/W_1$$

wherein:
$Mw_1$ is a weight-average molecular weight of the EOR moiety,
$Mw_2$ is a weight-average molecular weight of the PMMA moiety,
$W_1$ is an amount of the copolymer of EOR-B used in the polymerization of MMA, and
$W_2$ is an yield of the diblock copolymer.

Example 76

[Preparation of Catalyst Solution]

0.023 mmol in terms of zirconium atom of diphenylmethylene(cyclopentadienyl)(fluorenyl)zirconium dichloride was weighed and placed in a glass flask purged thoroughly with nitrogen, and a toluene solution of 0.092 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared in a zirconium concentration of 0.00046 mmol/ml.

[Polymerization of Olefin]

750 ml of dehydrated and purified heptane was placed in a 2-liter stainless steel autoclave dried and purged with nitrogen thoroughly, and a decane solution of 0.225 mmol in terms of aluminum atom of triisobutylaluminum was added. 65.5 liters of propylene was blown through into the autoclave. Ethylene was forced, and when the pressure in the autoclave went up to 0.84 MPa, 0.000375 mmol in terms of zirconium atom of the above catalyst solution was forced from a pot, with maintaining at 20° C. The polymerization was conducted at 0.84 MPa and 20° C. for 10 min, and then IPA was added to terminate the reaction. After decompression, the polymer solution was taken out and was poured into about 3 liter of methanol to precipitate a copolymer. The copolymer was cut by a mixer. The copolymer was washed with 2 liters of methanol. The solid product was collected by filtration and was dried in flowing nitrogen at 120° C. and 500 mmHg for 12 hr.

The yield of the obtained syndiotactic propylene/ethylene copolymer (referred to as sPER) was 48.4 g. The catalytic activity was 774 kg/mmol-Zr·h. As a result of IR analysis, the propylene content was 72 mol %, and it was confirmed that there was an unsaturated bond in the terminal position of the polymer molecule. [η] was 1.91 dl/g. Mw was 201,000. As a result of DSC analysis, the polymer had no melting point (Tm).

[Hydroboration]

In a dry box filled with argon, 20 g of the copolymer of sPER, which had an unsaturated bond in the terminal position, was suspended in 100 ml of degassed and dried THF, and the suspension was placed in a glass flask with a magnetic stirrer. 1.6 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and a copolymer of sPER having boron in the terminal position (referred to as sPER-B) was obtained.

[Polymerization of Styrene]

20 g of the copolymer of sPER-B was placed in a sealed flask and was suspended by the addition of 8.0 g of dried styrene (St) and 80 ml of THF. 1.0 ml of dried oxygen was blown through to initiate the reaction, followed by stirring at room temperature for 27 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of (syndiotactic propylene/ethylene copolymer)-O-polystyrene (referred to as sPER-O-PSt).

With respect to the diblock copolymer, the weight-average molecular weight ($Mw_2$) of the polystyrene (PSt) moiety, which was estimated according to the following equation, was 10,000.

$$Mw_2 = Mw_1 \cdot (W_2 - W_1)/W_1$$

wherein:

$Mw_1$ is a weight-average molecular weight of the sPER moiety, $Mw_2$ is a weight-average molecular weight of the PSt moiety, $W_1$ is an amount of the copolymer of sPER-B used in the polymerization of styrene, and $W_2$ is an yield of the diblock copolymer.

Example 77

[Preparation of Catalyst Solution]

0.23 mmol in terms of zirconium atom of bis(1,3-dimethyl-$\eta^5$-cyclopentadienyl)dimethylzirconium was weighed and placed in a glass flask purged thoroughly with nitrogen, and a toluene solution of 0.92 mmol in terms of boron atom of tris(pentafluorophenyl)borane was added thereto. An appropriate amount of toluene was added to the solution, and a total amount of 50 ml of the solution was obtained. A catalyst solution was prepared in a zirconium concentration of 0.0046 mmol/ml.

[Polymerization of Olefin]

225 ml of purified toluene was placed in a 500 ml glass reactor purged thoroughly with nitrogen, and ethylene was passed through at a rate of 200 liter per hour. With stirring at 600 revolutions per minute, a solution in the reactor was maintained at 45° C. for 10 min. 7.5 mmol in terms of aluminum atom of triisobutylaluminum was placed. 4.5 mmol of 9-BBN was added, and then 0.075 mmol in terms of zirconium atom of the above catalyst solution was added. The polymerization was conducted at 50° C. and ordinary pressure for 5 min. A small amount of absolute methanol was added to terminate the polymerization. After completion of the polymerization, the polymer was washed with absolute THF. The obtained polymer was dried under reduced pressure at 50° C. overnight. The yield of the obtained polyethylene (PE) was 5.8 g. The catalytic activity was 928 g/mmol-Zr·h.

[Hydroxylation]

1.0 g of the obtained polyethylene was added to 25 ml of absolute THF. In a nitrogen atmosphere at room temperature, 0.2 g of NaOH dissolved in 1 ml of water and 0.25 ml of methanol were added thereto. 0.8 ml of 30% $H_2O_2$ was added dropwise at 0° C. The reaction was conducted at 40° C. for 6 hr, and then the reaction solution was poured into 2 liters of a methanol solution to precipitate a polymer. The obtained polymer was refluxed with 50 ml of methanol for 2 hr and then was dried under reduced pressure at 50° C. for 8 hr. As a result of IR analysis of the obtained polymer, the 1-hexene content was 3.5 mol %, and it was confirmed that a terminal position of the polymer molecule was modified by a hydroxyl group so that there was no unsaturated bond in the terminal position. Mw measured by GPC was 12,000.

[Polymerization of Ethylene Oxide]

119 g of the above polyethylene having a hydroxyl group in the terminal position (referred to as PE-OH), and 62.0 mg of tetrakis[tris(dimethylamino)phosphoranylideneamino] phosphonium hydroxide $\{[(Me_2N)_3P=N]_4P^+OH^-\}$ which was synthesized in the same manner as described on page 32 in European Patent Publication No. 0791600 were placed in a 1500 ml autoclave equipped with a tube for a thermometer, a pressure gage, a stirrer and a inlet tube for ethylene oxide. Air in the autoclave was replaced with dried nitrogen, and the contents of the reactor were heated to a temperature of 125° C. The reaction was conducted at the same temperature for 12 hr with intermittently supplying 54 g of ethylene oxide (EO) in order to maintain the pressure (absolute pressure) at about 0.5 MPa during the reaction. Residual unreacted ethylene oxide was distilled out under reduced pressure, and 169 g of a diblock copolymer of polyethylene-O-(polyethylene glycol) (PE-O-PEG) was obtained.

The weight-average molecular weight ($Mw_2$) of the polyethylene glycol (PEG) moiety, which was estimated according to the following equation, was 5,000.

$$Mw_2 = Mw_1 \cdot (W_2 - W_1)/W_1$$

wherein:

$Mw_1$ is a weight-average molecular weight of the PE moiety, $Mw_2$ is a weight-average molecular weight of the PEG moiety, $W_1$ is an amount of the polymer of PE-OH used in the polymerization of EO, and $W_2$ is an yield of the diblock copolymer.

In Examples 78 to 81 and Comparative Example 16, the various properties were measured as follows.

Melting Point (Tm) and Glass Transition Temperature (Tg)

An endothermic curve was measured by DSC to determine Tm from the temperature at a maximum peak point.

The endothermic curve was measured as follows. The sample was loaded into an aluminum pan, and the temperature was raised to 200° C. at a rate of 100° C./min. The temperature was maintained at 200° C. for 5 min and then was lowered to −150° C. at a rate of 10° C./min. The temperature was raised at a rate of 10° C./min to obtain the endothermic curve.

Intrinsic Viscosity [η]

The intrinsic viscosity was measured at 135° C. in Decalin.

Pentad Fraction

The pentad fraction was determined by the ratio of Pmmmm to PW in $^{13}$C-NMR spectra, wherein Pmmmm is an absorption intensity by the methyl group in the third propylene monomeric unit existing in the moiety where 5 propylene monomeric units was subsequently linked by isotactic bonds; and PW is the total absorption intensity by all methyl groups in all propylene monomeric units, by the following equation.

Pentad fraction (%)=Pmmmm/PW×100

Melt Flow Rate (MFR)

The melt flow rate was measured at 230° C. and a load of 2.16 kg.

Hardness (JIS A)

The hardness (JIS A) was measured in accordance with JIS K7215.

Shore D Hardness (SD)

The Shore D hardness was measured by the use of the specimen an eighth inch thick in accordance with ASTM D2240.

Rockwell Hardness (HR)

The Rockwell hardness was measured by the use of a square plate 2 mm thick, 120 mm long and 130 mm wide in accordance with ASTM D785.

Tensile Strength

The tensile strength was measured at a span of 20 mm, a tensile speed of 500 mm/min and a temperature of 23° C. by the use of JIS No. 3 dumbbell shape in accordance with JIS K6251.

Flexural Modulus (FM)

The flexural modulus was measured at a span of 51 mm and a flexure speed of 20 mm/min by the use of the specimen an eighth inch thick in accordance with ASTM D790.

Izon Impact Strength (IZ)

The Izod impact strength was measured at 23° C. by the use of the specimen (post-notch) a quarter inch thick in accordance with ASTM D256.

Heat Distortion Temperature (HDT)

The heat distortion temperature was measured by the use of the specimen a quarter inch thick in accordance with ASTM D648 (at a load of 4.6 kg/cm$^2$).

Modulus in Tension of Film

The modulus in tension was measured at a span of 30 mm, a tensile speed of 50 mm/min and a temperature of 23° C. by the use of JIS No. 3 dumbbell shape in accordance with JIS K6781.

Film Impact

With respect to the specimen 30 μm thick, the film impact strength was measured by a pendulum film impact tester (Film Impact Tester) manufactured by Toyo Seiki Seisakusho, Ltd.

Heat-sealing Strength

Heat sealing was conducted by a heat sealer under the conditions of an upper bar temperature of 115° C., a lower bar temperature of 115° C., a pressure of 1 kg/cm$^2$ and a press time of 2 sec to prepare a laminated sheet. The laminated sheet was cut in a width of 15 mm to prepare a specimen. T-peel test was conducted at a peel atmospheric temperature of 23° C. and a peel rate of 300 mm/min to measure the heat-sealing strength.

Transparency (Haze (%))

With respect to the film, the haze value was measured by a digital turbidimeter (NDH-20D) manufactured by Nippon Denshoku Industries Co., Ltd.

Surface Resistance

The surface resistance was measured in accordance with JIS K6911.

Adhesion Testing

Adhesion testing was conducted in accordance with JIS K6256.

Example 78

22 parts by weight of the diblock copolymer (EOR-O-PMMA) obtained in Example 75, 58 parts by weight of block polypropylene (pentad fraction of the propylene homopolymer moiety: 98.5%; MFR: 210 g/10 min; ethylene content of ethylene/propylene copolymer moiety: 40 mol %; [η]: 6.0 dl/g; and said copolymer content of the block polypropylene: 5%) and 20 parts by weight of talc (trade name: ET-5, available from Matsumura Sangyo) were blended by the Henschel mixer. The pellets were prepared by an extruder equipped with a pelletizer. The pellets were molded by a 55% injection press (IS55EPN, manufactured by Toshiba Machine Co., Ltd.) at a cylinder temperature of 200° C. and a mold temperature of 40° C.

The composition had MFR of 27 g/10 min, a flexural modulus (FM) of 2350 MPa, a surface hardness (HR) of 82, an Izod impact strength (IZ) of 230 J/m and a heat distortion temperature (HDT) of 144° C.

Comparative Example 15

The molding was conducted in the same manner as in Example 78, except that an ethylene/α-olefin copolymer (trade name: TAFMER A0550, available from Mitsui Chemicals Inc.) was used instead of the diblock copolymer (EOR-O-PMMA) obtained in Example 75.

The composition had MFR of 31 g/10 min, a flexural modulus (FM) of 2300 MPa, a surface hardness (HR) of 77, an Izod impact strength (IZ) of 70 J/m and a heat distortion temperature (HDT) of 143° C.

Example 79

30 parts by weight of the diblock copolymer (sPER-O-PSt) obtained in Example 76 and 70 parts by weight of propylene random copolymer (ethylene content: 4.7 mol %; pentad fraction: 1.0%; melting point: 123° C.; and [η]: 2.7 dl/g) were blended by the Henschel mixer. The pellets comprising rubber components were prepared by an extruder equipped with a pelletizer. The composition was extruded by a single-screw extruder having a screw diameter of 30 mm at a die temperature of 230° C., a roll temperature of 40° C. and a take-off speed of 10 m/min, and the extruder output was varied to obtain a cast film with a desired thickness.

The composition had a modulus in tension of 135 MPa, a heat-sealing strength of 250 g/15 mm, a film impact strength of 85 kJ/m and a haze of 2.0%.

Comparative Example 16

The blown-film extrusion was conducted in the same manner as in Example 79, except that an isotactic propylene/ethylene random copolymer (ethylene content: 23 mol %; propylene content: 77 mol %; and Mw: $2.3 \times 10^5$) was used instead of the diblock copolymer (sPER-O-PSt) obtained in Example 76

The composition had a modulus in tension of 220 MPa, a heat-sealing strength of 100 g/15 mm, a film impact strength of 34 kJ/m and a haze of 2.7%.

Example 80

10 parts by weight of the diblock copolymer (PE-O-PEG) obtained in Example 77 and 90 parts by weight of ethylene/hexene random copolymer (ethylene content: 97.5 mol %; hexene content: 2.5 mol %; and Mw: $1.52 \times 10^4$) were blended by the Henschel mixer. The pellets were prepared by an extruder equipped with a pelletizer. The pellets were press molded at a press temperature of 200° C. by the use of a polyimide sheet.

The composition had a flexural modulus (FM) of 203 MPa, a hardness (SD) of 56 and a surface resistance of $1.3 \times 10^{10}$ Ω.

Example 81

30 parts by weight of the diblock copolymer (EPT-O-P(St/VPy)) prepared in Example 2, 70 parts by weight of a styrene/butadiene random copolymer (trade name: Nipol 1502, available from Zeon Corp.), 3 parts by weight of two kinds of zinc oxide, 1 part by weight by stearic acid, 50 parts by weight of HAF carbon black (trade name: SEAST #3, available from Tokai Carbon Co., LTD.), 1.5 parts by weight of N-cyclohexyl-2-benzothiazyl sulfenamide (trade name: Sanceler CM, available from Sanshin Chemical Industry) and 1.75 parts by weight of sulfur were blended and kneaded by an open roll having a roll diameter of 6 inches (F/B=50° C./50° C.) to obtain an unvulcanized rubber sheet. The sheet was vulcanized by press curing at 160° C. for 20 min.

The hardness (JIS A) of the composition was 72. The tensile strength and elongation at break of the composition were 23.1 MPa and 390%, respectively.

The adhesive (trade name: Chemlok607, available from Load Corp.) was applied to the surface of a sheet, 0.5 mm thick and 25 mm wide, comprising nylon 12 (trade name: DAIAMID L2101, available from Daicel Chemical Industries, Ltd.). The adhesive was dried at ordinary temperature and was bonded to the unvulcanized rubber sheet as described above by press curing at 160° C. for 20 min. As a result of evaluating the adhesive properties of the adhesive-bonded specimen, the rubber base material was broken.

Example 82

[Preparation of Catalyst Solution]

Methylaluminoxane and ethylenebis(indenyl)zirconium dichloride were mixed in toluene (an appropriate amount of toluene may be optionally added) so that the concentration of zirconium was 0.00011 mmol/liter and the molar ratio of aluminum to zirconium (Al/Zr) was 350. The solution was preactivated by stirring for 15 min to prepare a catalyst solution.

[Polymerization]

500 ml of purified toluene was placed in a 500 ml glass reactor purged thoroughly with nitrogen, and propylene was passed through at a rate of 100 liters per hour. With stirring by using a magnetic stirrer at 600 revolutions per minute, a solution in the reactor was maintained at 75° C. for 10 min. 24.3 mg in terms of aluminum atom of triisobutylaluminum was placed in the reactor. 0.46 mg in terms of zirconium atom of the above catalyst solution was added. The polymerization was conducted at 80° C. and ordinary pressure for 60 min. A small amount of isopropanol was added to terminate the polymerization. After completion of the polymerization, the reaction solution was poured into 2 liter of a methanol solution of dilute hydrochloric acid to precipitate a polymer. The precipitated polymer was washed twice with methanol, and then the obtained polymer was dried under reduced pressure at 80° C. overnight.

The yield of the obtained polypropylene (PP) was 87.0 g. The catalytic activity was 17.4 kg/mmol·Zr·hr. Mw of the polypropylene was 5,500. As a result of IR analysis, it was confirmed that there was an unsaturated bond in the terminal position of the polymer molecule.

[Hydroboration]

In a dry box filled with argon, 5.0 g of the above polypropylene, which had an unsaturated bond in the terminal position, was suspended in 100 ml of degassed and dried tetrahydrofuran (THF), and the suspension was placed in a glass flask with a magnetic stirrer. 14.5 ml of a THF solution of 9-BBN (0.5 M) was added to the suspension. In the dry box, the slurry was stirred at 55° C. for 5 hr and then was filtered. The filter cake was washed with degassed and dried isopropanol (IPA) and was dried under reduced pressure, and polypropylene having boron in the terminal position (PP-B) was obtained.

[Polymerization of Ethylmethacrylate]

5.0 g of the polymer of PP-B was placed in a sealed flask and was suspended by the addition of 79.3 g of dried ethylmethacrylate (referred to as EMA) and 80 ml of THF. 9.4 ml of dried oxygen was blown through to initiate the reaction, followed by stirring at room temperature for 2 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of polypropylene-O-polyethylmethacrylate (referred to as PP-O-PEMA).

With respect to the diblock copolymer, the weight-average molecular weight ($Mw_2$) of the polyethylmethacrylate (referred to as PEMA) moiety, which was estimated according to the following equation, was 2,000.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the PEMA moiety, $W_1$ is an amount of the polymer of PP-B used in the polymerization of EMA, and $W_2$ is an yield of the diblock copolymer.

Example 83

[Preparation of Catalyst Solution]

Methylaluminoxane and dimethylsilylenebis(2,3,5-trimethylcyclopentadienyl)zirconium dichloride were mixed in toluene (an appropriate amount of toluene may be optionally added) so that the concentration of zirconium was 0.00011 mmol/liter and the molar ratio of aluminum to zirconium (Al/Zr) was 350. The solution was preactivated by stirring for 15 min to prepare a catalyst solution.

[Polymerization]

400 ml of purified toluene was placed in a 500 ml glass reactor purged thoroughly with nitrogen, and propylene was passed through at a rate of 100 liters per hour. With stirring by using a magnetic stirrer at 600 revolutions per minute, a solution in the reactor was maintained at 45° C. for 10 min. 1.8 mg in terms of zirconium atom of the above catalyst solution was placed in the reactor. The polymerization was conducted at 50° C. and ordinary pressure for 60 min. A small amount of isopropanol was added to terminate the polymerization. After completion of the polymerization, the reaction solution was poured into 2 liter of a methanol solution of dilute hydrochloric acid to precipitate a polymer. The polymer was washed twice with methanol, and then the obtained polymer was dried under reduced pressure at 80° C. overnight. The yield of the obtained polypropylene was 39.4 g. The catalytic activity was 2.0 kg/mmol-Zr·hr. Mw of the polypropylene was 13,000. The melting point, Tm, measured by DSC was 141.6° C. As a result of IR analysis, it was confirmed that there was an unsaturated bond in the terminal position of the polymer molecule.

[Hydroboration]

In a dry box filled with argon, 10 g of the above polypropylene, which had an unsaturated bond in the terminal position, was suspended in 100 ml of degassed and dried THF, and the suspension was placed in a glass flask with a magnetic stirrer. 6.2 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and polypropylene having boron in the terminal position (PP-B) was obtained.

[Copolymerization of Styrene/Maleic Anhydride]

20 g of the polymer of PP-B was placed in a sealed flask and was suspended by the addition of 4 g of dried styrene (St) and 4 g of maleic anhydride (MAH). 15.9 ml of dried oxygen was blown through to initiate the reaction. After stirring at 45C for 2 hr, 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of polypropylene-O-(styrene/maleic anhydride copolymer) (PP-O-P(St/MAH)).

With respect to the diblock copolymer, the weight-average molecular weight ($Mw_2$) of the styrene/maleic anhydride copolymer (P(St/MAH)) moiety, which was estimated according to the following equation, was 2,000.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the P(St/MAH) moiety, $W_1$ is an amount of the polymer of PP-B used in the copolymerization of styrene/maleic anhydride, and $W_2$ is an yield of the diblock copolymer.

Example 84

[Preactivation of Catalyst Component]

Methylaluminoxane and meso-dimethylsilylenebis(2-methyl-4-phenylindenyl)zirconium dichloride were mixed in toluene (an appropriate amount of toluene may be optionally added) so that the concentration of zirconium was 0.00011 mmol/liter and the molar ratio of aluminum to zirconium (Al/Zr) was 350. The solution was preactivated by stirring for 15 min to prepare a catalyst solution.

[Polymerization]

250 ml of purified toluene was placed in a 500 ml glass reactor purged thoroughly with nitrogen, and ethylene and propylene were passed through at rates of 90 liter per hour and 110 liter per hour, respectively. With stirring at 600 revolutions per minute, the reactor was maintained at 45° C. for 10 min. 0.045 mg (0.0005 mmol) in terms of zirconium atom of the above catalyst solution was placed in the reactor. The polymerization was conducted at 60° C. and ordinary pressure for 20 min. A small amount of isopropanol was added to terminate the polymerization. After completion of the polymerization, the reaction solution was poured into 2 liter of a methanol solution of dilute hydrochloric acid to precipitate a polymer. The polymer was washed twice with methanol, and then the obtained polymer was dried under reduced pressure at 130° C. overnight. The yield of the obtained ethylene/propylene random copolymer (EPR) was 2.7 g. The catalytic activity was 16.2 kg/mmol-Zr·h. As a result of IR analysis, the ethylene content was 70.7 mol %, and it was confirmed that there was an unsaturated bond in the terminal position of the polymer molecule. Mw was 5,600.

[Hydroboration]

In a dry box filled with argon, 5.0 g of the copolymer of EPR, which had an unsaturated bond in the terminal position, was suspended in 100 ml of degassed and dried tetrahydrofuran (THF), and the suspension was placed in a glass flask with a magnetic stirrer. 14.2 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried isopropanol and was dried under reduced pressure, and a copolymer of EPR having boron in the terminal position (EPR-B) was obtained.

[Polymerization of Ethylmethacrylate]

5.0 g of the polymer of EPR-B was placed in a sealed flask and was suspended by the addition of 77.9 g of dried ethylmethacrylate (EMA) and 80 ml of THF. 9.2 ml of dried oxygen was blown through to initiate the reaction, followed by stirring at room temperature for 2 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of EPR-O-polyethylmethacrylate (referred to as EPR-O-PEMA).

With respect to the diblock copolymer, the weight-average molecular weight ($Mw_2$) of the polyethylmethacrylate (PEMA) moiety, which was estimated according to the following equation, was 2,000.

$$Mw_2 = Mw_1 \cdot (W_2 - W_1)/W_1$$

wherein:

$Mw_1$ is a weight-average molecular weight of the EPR moiety, $Mw_2$ is a weight-average molecular weight of the PEMA moiety, $W_1$ is an amount of the copolymer of EPR-B used in the polymerization of EMA, and $W_2$ is an yield of the diblock copolymer.

Example 85

0.1 part by weight of Irganox™1010, 0.1 part by weight of Irgaphos™168 and 0.1 part by weight of calcium stearate were added to 87 parts by weight of propylene/ethylene block copolymer (B3) (MFR measured at 230° C.: 27 g/10 min; and quantity of a decane-soluble component: 14.3 mol %), 10 parts by weight of talc (C4) (a mean particle diameter of 15 μm) and 3 parts by weight of the diblock copolymer (PP-O-PEMA) obtained in Example 82. In a nitrogen atmosphere, the resin was melt blended by a twin-screw extruder having a screw diameter of 20 mm at a cylinder temperature of 200° C., and pellets were prepared. The obtained pellets were injection molded into specimens for the evaluations of the various properties under the conditions of a cylinder temperature of 200° C., a mold temperature of 40° C. and an injection pressure of 1000 kg/cm². The obtained specimens were maintained at 23° C. for 168 hr, and then the following tests were conducted. The results are shown in Table 13.

Flexural Modulus (FM)

The flexural modulus was measured by the use of the specimen 5 inches long, a half-inch wide and an eighth inch thick, which was obtained by injection molding, in accordance with ASTM D638.

Izon Impact Strength (IZ)

The Izod impact strength was measured at 23° C. by the use of the specimen (post-notch) a quarter inch thick in accordance with ASTM D258.

Heat Distortion Temperature (HDT)

The heat distortion temperature was measured by the use of the specimen 5 inches long, a quarter inch wide and a half-inch thick, which was obtained by injection molding, in accordance with ASTM D648.

Example 86

40 g of sodium type montmorillonite was dispersed in 1000 ml of distilled water of 70° C., and then a solution such that 20 g of 12-aminododecane acid and 2 ml of hydrochloric acid were previously mixed in 100 ml of distilled water poured into the suspension. The suspension was stirred for 2 hr at 70° C. to exchange metallic ions between montmorillonite layers for organic cations. The obtained precipitate was filtered off and was thoroughly washed with warm water to purify the same. The precipitate was freeze dried and was powdered. The yield of the obtained organized montmorillonite (C5) was 27 g.

0.1 part by weight of Irganox™1010, 0.1 part by weight of Irgaphos™168 and 0.1 part by weight of calcium stearate were added to 92 parts by weight of propylene/ethylene block copolymer (B3), 5 parts by weight of the organized montmorillonite (C5) and 3 parts by weight of the diblock copolymer (PP-O-P(St/MAH)) obtained in Example 83. In the same manner as in Example 85, the melt blending and the injection molding were conducted to obtain specimens for the evaluations of the various properties. The obtained specimens were maintained at 23° C. for 168 hr, and then the tests were conducted in the same manner as in Example 85. The results are shown in Table 13.

Comparative Example 17

The melt blending and the injection molding were conducted in the same manner as in Example 85 to obtain specimens for the evaluations of the various properties, except that 90 parts by weight of propylene/ethylene block copolymer (B3), 10 parts by weight of talc (C4), 0.1 part by weight of Irganox™1010, 0.1 part by weight of Irgaphos™168 and 0.1 part by weight of calcium stearate were used. The obtained specimens were maintained at 23° C. for 168 hr, and then the tests were conducted in the same manner as in Example 85. The results are shown in Table 13.

Comparative Example 18

The melt blending and the injection molding were conducted in the same manner as in Example 85 to obtain specimens for the evaluations of the various properties, except that 95 parts by weight of propylene/ethylene block copolymer (B3), 5 parts by weight of the organized montmorillonite (C5), 0.1 part by weight of Irganox™1010, 0.1 part by weight of Irgaphos™168 and 0.1 part by weight of calcium stearate were used. The obtained specimens were maintained at 23° C. for 168 hr, and then the tests were conducted in the same manner as in Example 85. The results are shown in Table 13.

TABLE 13

|  | Ex. 85 | Ex. 86 | Comp. Ex. 17 | Comp. Ex. 18 |
|---|---|---|---|---|
| FM (MPa) | 1720 | 1850 | 1450 | 1250 |
| IZ (J/m) | 43 | 56 | 41 | 52 |
| HDT (° C.) | 125 | 131 | 121 | 115 |

Example 87

To 95 parts by weight of a commercial ethylene/propylene rubber (B4) (trade name: Mitsui EPT3070), 5 parts by weight of zinc oxide, 1 part by weight of stearic acid, 80 parts by weight of talc (a mean particle diameter of 15 μm), 20 parts by weight of titanium oxide, 20 parts by weight of liquid paraffin, 1 part by weight of an aging inhibitor, N-isopropyl-N'-phenyl-p-phenylenediamine, and 5 parts by weight of the diblock copolymer (EPR-O-PEMA) obtained in Example 84 were blended by a 1.7 liters Banbury mixer at a temperature of 140 to 150° C. for 5 min. The Mooney viscosity (ML1+4 (measured at 100° C.)) of the obtained unvulcanized rubber was 44. 0.5 part by weight of a vulcanizing accelerator, methylthiurammonosulfide, 1.2 parts by weight of a vulcanizing accelerator, N-oxydiethylene-2-benzothiazole sulfenamide and 1.5 parts by weight of sulfur were added to the obtained rubber composition. The mixture was blended by a mixing roll having a roll diameter of 6 inches (at temperatures of both front and back roll of 60° C.) for 5 min to obtain a sheet 3 mm thick.

The obtained sheet was press molded into a vulcanized sheet 2 mm thick by a pressing machine at 160° C. for 10 min. With respect to the obtained sheet, tensile test was conducted at a measurement temperature of 23° C. and a tensile speed of 500 mm/min based on JIS K6301 to measure the tensile elongation and strength at break. The results are shown in Table 14.

Comparative Example 19

In the same manner as in Example 87, a vulcanized rubber was produced to measure the tensile elongation and strength at break, except that a unvulcanized rubber was produced by the use of 100 parts by weight of a ethylene/propylene rubber (B4), 5 parts by weight of zinc oxide, 1 part by weight of stearic acid, 80 parts by weight of talc, 20 parts by weight of titanium oxide, 20 parts by weight of liquid paraffin and 1 part by weight of an aging inhibitor, N-isopropyl-N'-phenyl-p-phenylenediamine. The results are shown in Table 14. Compared with the rubber obtained in Example 87, the rubber obtained in Comparative Example 19 had a higher Mooney viscosity and lower tensile strength at break.

TABLE 14

|  | Example 87 | Comp. Ex. 19 |
|---|---|---|
| ML1 + 4 (100° C.) | 46 | 58 |
| Tensile strength at break, TB (MPa) | 15.3 | 12.0 |
| Tensile elongation at break (%) | 520 | 530 |

Example 88

[Preparation of Solid Catalyst Component]

3.0 g of silica dried at 250° C. for 10 hr was suspended in 50 ml of toluene, and then the suspension was cooled to 0° C. 17.8 ml of a toluene solution of methylaluminoxane (Al=1.29 mmol/ml) was added dropwise over a period of 30 min with maintaining at 0° C., followed by reacting at 0° C. for 30 min. The temperature was raised to 95° C. over a period of 30 min, and the reaction was conducted for 4 hr at the same temperature. The temperature was lowered to 60° C., and the supernatant liquid was removed by decantation.

The obtained solid component was washed twice with toluene and then was resuspended in 50 ml of toluene. 11.1 ml of a toluene solution of bis(1-n-butyl-3-methylcyclopentadienyl)zirconium dichloride (Zr=0.0103 mmol/ml) was added dropwise to the suspension at 20° C. over a period of 30 min. The temperature in the reactor was raised to 80° C., and the reaction was conducted for 2 hr at the same temperature. The supernatant liquid was removed, and the precipitate was washed twice with hexane to obtain a solid catalyst. The obtained catalyst included 2.3 mg of zirconium based on 1 g of the solid catalyst.

[Preparation of Prepolymerized Catalyst]

4 g of the obtained solid catalyst was resuspended in 400 ml of hexane. 5.0 ml of a decane solution of triisobutylaluminum (1 mmol/ml) and 0.36 g of 1-hexene were added to the suspension, and the prepolymerization of ethylene was conducted at 35° C. for 2 hr. After the prepolymerization, the supernatant liquid was removed, and the solid product was washed three times with hexane to obtain a prepolymerized catalyst including 2.2 mg of zirconium and with which 3 g of polyethylene was prepolymerized, based on 1 g of the solid catalyst.

[Polymerization of Olefin]

1 liter of purified hexane and 40 ml of purified 1-hexene were placed in a 2-liter stainless steel autoclave purged thoroughly with nitrogen, and nitrogen in the autoclave was replaced with ethylene. The temperature in the autoclave was raised to 60° C., and 1.5 mmol of triisobutylaluminum and 0.24 mg in terms of zirconium atom of the prepolymerized catalyst were added. Ethylene was fed to initiate the polymerization at a pressure of 0.9 MPa. After the initiation of the polymerization, with supplying only ethylene, the polymerization was conducted at a pressure of 0.9 MPa and a temperature of 80° C. for 1.5 hr. After completion of the polymerization, the polymer was filtered off and was dried at 80° C. overnight. The yield of the obtained polymer was 200 g. The catalytic activity based on a zirconium atom was 77 kg/mmol-Zr. The density of the obtained ethylene/1-hexene random copolymer (referred to as P(Et/Hex)) was 0.925 g/cm$^3$. As a result of IR analysis, the 1-hexene content was 2.5 mol %, and it was confirmed that there was an unsaturated bond in the terminal position of the polymer molecule. Mw measured by GPC was 144,000.

[Transformation in Terminal Position of the Polymer]

In a dry box filled with argon, 20 g of the polymer of PE, which had an unsaturated bond in the terminal position, was suspended in 100 ml of degassed and dried tetrahydrofuran (THF), and the suspension was placed in a glass flask with a magnetic stirrer. 2.2 ml of a THF solution of 9-borabicyclo [3.3.1]nonane (9-BBN) (0.5 M) was added to the suspension. In the dry box, the slurry was stirred at 55° C. for 5 hr and then was filtered. The filter cake was washed with degassed and dried isopropanol (IPA) and was dried under reduced pressure.

10 g of the obtained polymer was added to 25 ml of degassed and dried THF. In a nitrogen atmosphere at room temperature, 0.2 g of NaOH dissolved in 1 ml of water and 0.3 ml of methanol were added thereto. 0.8 ml of 30% $H_2O_2$ was added dropwise at 0° C. The reaction was conducted at 40° C. for 6 hr, and then the reaction solution was poured into 2 liters of a methanol solution to precipitate a polymer. The obtained polymer was refluxed with 100 ml of methanol for 2 hr and then was dried under reduced pressure at 50° C. for 8 hr. According to IR analysis, it was confirmed that a terminal position of the polymer molecule was modified by a hydroxyl group so that there was no unsaturated bond in the terminal position.

[Polymerization of Ethylene Oxide]

713 g of the copolymer of P(Et/Hex) having a hydroxyl group in the terminal position (P(Et/Hex)-OH) and 31.0 mg of tetrakis[tris(dimethylamino)phosphoranylideneamino]phosphonium hydroxide $\{[(Me_2N)_3P=N]_4P^+OH^-\}$ which was synthesized in the same manner as described on page 32 in European Patent Publication No. 0791600 were placed in a 1500 ml autoclave equipped with a tube for a thermometer, a pressure gage, a stirrer and a inlet tube for ethylene oxide. Air in the autoclave was replaced with dried nitrogen, and the contents of the reactor were heated to a temperature of 125° C. The reaction was conducted at the same temperature for 12 hr with intermittently supplying 30 g of ethylene oxide in order to maintain the pressure (absolute pressure) at about 0.5 MPa during the reaction. Residual unreacted ethylene oxide was distilled out under reduced pressure, and 738 g of a diblock copolymer of (ethylene/1-hexene copolymer)-O-(polyethylene glycol) (referred to as P(Et/Hex)-O-PEG) was obtained.

With respect to the diblock copolymer, the weight-average molecular weight ($Mw_2$) of the polyethylene glycol (PEG) moiety, which was estimated according to the following equation, was 5,000.

$$Mw_2 = Mw_1 \cdot (W_2 - W_1)/W_1$$

wherein:

$Mw_1$ is a weight-average molecular weight of the P(Et/Hex) moiety, $Mw_2$ is a weight-average molecular weight of the PEG moiety, $W_1$ is an amount of the copolymer of P(Et/Hex)-B used in the polymerization of EO, and $W_2$ is an yield of the diblock copolymer.

Example 89

[Preactivation of Catalyst]

0.023 mmol in terms of titanium atom of [(N-t-butylamido)(tetramethyl-$\eta^5$-cyclopentadienyl)dimethylsilane]titanium dichloride was weighed and placed in a glass flask purged thoroughly with nitrogen, and a toluene solution of 0.69 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 35 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.00075 mmol in terms of titanium atom of the above catalyst solution were added. Ethylene was fed to initiate the polymerization at a pressure of 0.9 MPa. Thereafter, only ethylene was supplied. During the polymerization, when the rapid temperature rising was observed, the supply of ethylene was stopped twice until the temperature dropped to 70° C. The polymerization was conducted at a pressure of 0.5 to 0.9 MPa and a temperature of 70 to 85° C. for 6 min. After the elapse of a prescribed time, isopropanol was added to terminate the reaction. After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained ethylene/octene random copolymer was 66.0 g. The catalytic activity was 880 kg/mmol-Ti·hr. As a result of IR analysis of the ethylene/octene random copolymer (EOR), the octene content was 12.6 mol %, and it was confirmed that there was an unsaturated bond in the terminal position of the polymer molecule. Mw was 132,400.

[Hydroboration]

In a dry box filled with argon, 20 g of the copolymer of EOR, which had an unsaturated bond in the terminal position, was suspended in 100 ml of degassed and dried THF, and the suspension was placed in a glass flask with a magnetic stirrer. 2.4 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and an ethylene/octene random copolymer having boron in the terminal position (EOR-B) was obtained.

[Polymerization of Methylmethacrylate]

20 g of the copolymer of EOR-B was placed in a sealed flask and was suspended by the addition of 11.6 g of dried methylmethacrylate (MMA) and 80 ml of THF. 1.6 ml of dried oxygen was blown through to initiate the reaction, followed by stirring at room temperature for 2 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of EOR-O-polymethylmethacrylate (EOR-O-PMMA).

With respect to the diblock copolymer, the weight-average molecular weight ($Mw_2$) of the polymethylmethacrylate (PMMA) moiety, which was estimated according to the following equation, was 5,000.

$$Mw_2 = Mw_1 \cdot (W_2 - W_1)/W_1$$

wherein:

$Mw_1$ is a weight-average molecular weight of the EOR moiety, $Mw_2$ is a weight-average molecular weight of the PMMA moiety, $W_1$ is an amount of the copolymer of EOR-B used in the polymerization of MMA, and $W_2$ is an yield of the diblock copolymer.

Example 90

[Preactivation of Catalyst Component]

Methylaluminoxane and diphenylsilylenebis(2,7-dimethyl-4-isopropylindenyl)zirconium dichloride were mixed in toluene (an appropriate amount of toluene may be optionally added) so that the concentration of zirconium was 0.00011 mmol/liter and the molar ratio of aluminum to zirconium (Al/Zr) was 350. The solution was preactivated by stirring for 15 min to prepare a catalyst solution.

[Polymerization]

400 ml of purified toluene was placed in a 500 ml glass reactor purged thoroughly with nitrogen, and propylene was passed through at a rate of 100 liters per hour. With stirring at 600 revolutions per minute, a solution in the reactor was maintained at 45° C. for 10 min. 19.4 mg in terms of aluminum atom of triisobutylaluminum was added. 0.36 mg in terms of zirconium atom of the above catalyst solution was added, and the temperature in the reactor was raised to 50° C. The polymerization was conducted at 50° C. and ordinary pressure for 20 min. A small amount of isopropanol was added to terminate the polymerization. After completion of the polymerization, the reaction solution was poured into 2 liters of a methanol solution of dilute hydrochloric acid to precipitate a polymer. The polymer was washed twice with methanol, and then the obtained polymer was dried under reduced pressure at 80° C. overnight.

The yield of the obtained polypropylene (PP) was 21.8 g. The catalytic activity was 16.4 kg/mmol-Zr·h. The melting point (Tm) measured by DSC was 149.1° C. Mw measured by GPC was 106,000. As a result of IR analysis, it was confirmed that there was an unsaturated bond in the terminal position of the polymer molecule.

[Hydroboration]

In a dry box filled with argon, 20 g of the above polymer of PP, which had an unsaturated bond in the terminal position, was suspended in 100 ml of degassed and dried THF, and the suspension was placed in a glass flask with a magnetic stirrer. 3.0 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and polypropylene having boron in the terminal position (PP-B) was obtained.

[Polymerization of 2-hydroxyethylacrylate]

20 g of the polymer of PP-B was placed in a sealed flask and was suspended by the addition of 16.8 g of dried HEA (2-hydroxyethyl acrylate) and 80 ml of THF. 1.9 ml of dried oxygen was blown through to initiate the reaction, followed by stirring at room temperature for 3 hr. 100 ml of methanol was added to terminate the reaction. The precipitated polymer was extracted with a mixed solvent of acetone and heptane by the Soxhelt extractor in a nitrogen atmosphere over a period of 24 hr to obtain an insoluble diblock copolymer of PP-O-(poly-2-hydroxyethyl acrylate) (referred to as PP-O-PHEA).

With respect to the diblock copolymer, the weight-average molecular weight ($Mw_2$) of the poly-2-hydroxyethyl acrylate (PHEA) moiety, which was estimated according to the following equation, was 5,000.

$$Mw_2 = Mw_1 \cdot (W_2 - W_1)/W_1$$

wherein:

$Mw_1$ is a weight-average molecular weight of the PP moiety, $Mw_2$ is a weight-average molecular weight of the PHEA moiety, $W_1$ is an amount of the polymer of PP-B used in the polymerization of HEA, and $W_2$ is an yield of the diblock copolymer.

In Examples 91 to 93, the various properties were measured as follows.

Diameter of Dispersed Particle

The diameter of dispersed particles was measured by the Microtrac particle analyzer manufactured by Honeywell Inc.

Dispersion Stability

Each of the aqueous resin dispersions obtained in the following Examples was placed in a sealable glass bottle, and the bottle was allowed to stand still at room temperature. After 1 month, whether the water phase separated from the resin phase or not was confirmed.

Method of Measuring Heat-sealing Strength to Aluminum

Aluminum foil (50 µm thick) was coated with each of the dispersions by a bar coater and then was air-dried. The above foil was heated for 10 sec in an air oven set at 200° C. to obtain coated foil having a uniform film. The coated foil was heat bonded to LLDPE sheet (available from ASCO Industries, Ltd., 300 µm thick) at a temperature of 100 to 200° C. and a pressure of 1 kg/cm$^2$ for 1 sec in the manner according to JIS Z1707. The heat-bonded foil was cut in a width of 15 mm to obtain a specimen. The specimen was used for 180°-peel test at a measuring temperature of 23° C. to measure the adhesive strength (at a tensile speed of 300 mm/min).

Example 91

40 g of the diblock copolymer (P(Et/Hex)-O-PEG) obtained in Example 88, 4 g of maleic anhydride grafted polypropylene (propylene/ethylene: 98/2 in molar ratio; maleic anhydride content: 4.0% by weight; viscometric average molecular weight: 17,000; density: 0.919 g/cm$^3$; melting point: 136° C.; softening point: 143° C.; and melt viscosity (measured at 180° C.): 500 cps) as a modified polyolefin and 1.2 g of potassium oleate as a surfactant were blended at room temperature and then were melt kneaded by a labo plastomill (at a preset temperature of at 200° C.) for 5 min. 1.4 g of 18.7% potassium hydroxide aqueous solution was added, and the blend was further melt kneaded for 5 min. The contents were taken out, and the solid emulsifiable product was dispersed in warm water of 60° C. to obtain aqueous resin dispersions. With respect to the obtained aqueous resin dispersions, the diameter of dispersed particles, the dispersion stability and the heat-sealing strength to Al were measured. The results are shown in Table 15.

Example 92

The aqueous resin dispersions were prepared in the same manner as in Example 91, except that the diblock copolymer (EOR-O-PMMA) obtained in Example 89 was used. With respect to the obtained aqueous resin dispersions, the diameter of dispersed particles, the dispersion stability and the heat-sealing strength to Al were measured. The results are shown in Table 15.

Example 93

The aqueous resin dispersions were prepared in the same manner as in Example 91, except that the diblock copolymer (PP-O-PHEA) obtained in Example 90 was used. With respect to the obtained aqueous resin dispersions, the diameter of dispersed particles, the dispersion stability and the heat-sealing strength to Al were measured. The results are shown in Table 15.

TABLE 15

|  | Ex. 91 | Ex. 92 | Ex. 93 |
|---|---|---|---|
| Diameter of dispersed particle (μm) | 0.6 | 0.6 | 0.8 |
| Dispersion stability (phase separation after 1 month) | None | None | None |
| Heat-sealing strength to A1 (kg/15 mm) | 2.0 | 1.8 | 1.5 |

Example 94

[Preactivation of Catalyst]

0.023 mmol in terms of titanium atom of [(N-t-butylamido)(tetramethyl-$\eta^5$-cyclopentadienyl)dimethylsilane]titanium dichloride was weighed and placed in a glass flask purged thoroughly with nitrogen, and a toluene solution of 0.69 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 35 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.00075 mmol in terms of titanium atom of the above catalyst solution were added. Ethylene was fed to initiate the polymerization at a pressure of 0.9 MPa. After the initiation of the polymerization, only ethylene was supplied. During the polymerization, when the rapid temperature rising was observed, the supply of ethylene was stopped twice until the temperature dropped to 70° C. The polymerization was conducted at a pressure of 0.5 to 0.9 MPa and a temperature of 70 to 85° C. for 6 min. After the elapse of a prescribed time, isopropanol was added to terminate the reaction. After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained ethylene/octene random copolymer was 66.0 g. The catalytic activity was 880 kg/mmol-Ti·hr. As a result of IR analysis of the ethylene/octene random copolymer (EOR), the octene content was 12.6 mol %, and it was confirmed that there was an unsaturated bond in the terminal position of the polymer molecule. Mw was 132,400.

[Transformation in Terminal Position of the Polymer]

In a dry box filled with argon, 20 g of the copolymer of EOR, which had an unsaturated bond in the terminal position, was suspended in 100 ml of degassed and dried THF, and the suspension was placed in a glass flask with a magnetic stirrer. 2.4 ml of a THF solution of 9-borabicyclo[3.3.1]nonane (9-BBN) (0.5 M) was added to the suspension. In the dry box, the slurry was stirred at 55° C. for 5 hr and then was filtered. The filter cake was washed with degassed and dried isopropanol (IPA) and was dried under reduced pressure, and an ethylene/octene random copolymer having boron in the terminal position (EOR-B) was obtained.

10 g of the copolymer of EOR-B was suspended in 50 ml of degassed and dried THF. In a nitrogen atmosphere, 1.0 ml of an aqueous solution containing 0.2 g of NaOH and 0.3 ml of methanol were added. The suspension was cooled to 0° C., and 0.8 ml of $H_2O_2$ (30%) aqueous solution was added dropwise. The reaction was conducted at 40° C. for 6 hr, and then 100 ml of methanol was added to terminate the reaction. The obtained polymer was filtered off. The obtained filter cake was heat-refluxed with 100 ml of methanol for 2 hr and then was filtered off again. The filer cake was dried under reduced pressure at 50° C. for 8 hr. The reaction solution was poured into 2 liters of a methanol solution to precipitate a polymer. A copolymer of EOR having a hydroxyl group in the terminal position (EOR-OH) was obtained.

[Polymerization of Caprolactone]

In a dry box, 3.5 g of the polymer of EOR-OH was suspended in dried toluene. Excess n-butyllithium was added thereto, and the suspension was stirred for 12 hr. The filtration and washing with toluene were repeated to obtain a corresponding lithium oxide. The solid product was resuspended in toluene. 3 equivalents of diethylaluminum chloride was added, and the reaction was conducted for 12 hr to obtain a polymer of EOR-aluminum oxide (referred to as EOR-OAlEt$_2$). The polymer was washed with toluene and hexane and was filtered off. The polymer was suspended in 80 ml of toluene. 2.4 g of purified caprolactone was added, and the reaction was conducted at room temperature for 2.1 hr. 100 ml of methanol was added to terminate the reaction, and then the polymer was precipitated in acidic methanol. The soluble matters in the precipitated polymer were removed by extraction with acetone by the Soxhelt extractor to obtain a diblock copolymer of EOR-O-polycaprolactone (referred to as EOR-O-PCL).

With respect to the diblock copolymer, the weight-average molecular weight (Mw$_2$) of the polycaprolactone (PCL) moiety, which was estimated according to the following equation, was 5,000.

$$Mw_2 = Mw_1 \cdot (W_2 - W_1)/W_1$$

wherein:

Mw$_1$ is a weight-average molecular weight of the EOR moiety,

Mw$_2$ is a weight-average molecular weight of the PCL moiety,

W$_1$ is an amount of the polymer of EOR-OAlEt$_2$ used in the polymerization of caprolactone, and W$_2$ is an yield of the diblock copolymer.

Example 95

[Preactivation of Catalyst]

0.023 mmol in terms of titanium atom of [(N-t-butylamido)(tetramethyl-$\eta^5$-cyclopentadienyl)dimethylsilane]titanium dichloride was weighed and placed in a glass flask purged thoroughly with nitrogen, and a toluene solution of 0.69 mmol in terms of boron atom of triphenylmethylpentakis(pentafluorophenyl)borate was added thereto. An appropriate amount of toluene was added to the solution, and a total amount of 50 ml of the solution was obtained. A catalyst solution was prepared in a titanium concentration of 0.00046 mmol/ml.

[Polymerization of Olefin]

750 ml of purified heptane and 35 ml of purified 1-octene were placed in a 2-liter stainless steel autoclave purged thoroughly with nitrogen, and nitrogen in the autoclave was replaced with ethylene. The temperature in the autoclave was raised to 60° C., and 0.375 mmol of triisobutylaluminum and 0.00075 mmol in terms of titanium atom of the above catalyst solution were added. Ethylene was fed to initiate the polymerization at a pressure of 0.9 MPa. After the initiation of the polymerization, only ethylene was supplied. During the polymerization, when the rapid temperature rising was observed, the supply of ethylene was stopped twice until the temperature dropped to 70° C. The polymerization was conducted at a pressure of 0.5 to 0.9 MPa and a temperature of 70 to 85° C. for 6 min. After the elapse of a prescribed time, isopropanol was added to terminate the reaction. After decompression, the polymer solution was taken out and was poured into 4 liters of methanol. The solution was stirred thoroughly. The solid product was collected by filtration and was washed with methanol. The solid product was dried in flowing nitrogen at 120° C. and 500 mmHg for 12 hr.

The yield of the obtained ethylene/octene random copolymer was 66.0 g. The catalytic activity was 880 kg/mmol-Ti·h. As a result of IR analysis of the ethylene/octene random copolymer (EOR), the octene content was 12.6 mol %, and it was confirmed that there was an unsaturated bond in the terminal position of the polymer molecule. Mw was 132,400.

[Hydroboration]

In a dry box filled with argon, 20 g of the copolymer of EOR was suspended in 100 ml of degassed and dried THF, and the suspension was placed in a glass flask with a magnetic stirrer. 2.4 ml of a THF solution of 9-BBN (0.5 M) was added to the suspension. In the dry box, the slurry was stirred at 55° C. for 5 hr and then was filtered. The filter cake was washed with degassed and dried IPA and was dried under reduced pressure, and an ethylene/octene random copolymer having boron in the terminal position (EOR-B) was obtained.

[Copolymerization of Styrene/Maleic Anhydride]

20 g of the polymer of EOR-B was placed in a sealed flask and was suspended by the addition of 10 g of dried styrene (St), 10 g of maleic anhydride (MAH) and 80 ml of THF. 1.6 ml of dried oxygen was blown through to initiate the reaction, followed by stirring at 45° C. for 5 hr. 100 ml of methanol was added to terminate the reaction. The precipitated polymer was extracted with acetone and heptane by the Soxhelt extractor in a nitrogen atmosphere over a period of 24 hr to obtain an insoluble diblock copolymer of EOR-O-(styrene/maleic anhydride copolymer) (referred to as EOR-O-P(St/MAH)).

With respect to the diblock copolymer, the weight-average molecular weight ($Mw_2$) of the styrene/maleic anhydride copolymer (P(St/MAH)) moiety, which was estimated according to the following equation, was 5,000.

$$Mw_2 = Mw_1 \cdot (W_2 - W_1)/W_1$$

wherein:

$Mw_1$ is a weight-average molecular weight of the EOR moiety, $Mw_2$ is a weight-average molecular weight of the P(St/MAH) moiety, $W_1$ is an amount of the polymer of EOR-B used in the copolymerization of styrene/maleic anhydride, and $W_2$ is an yield of the diblock copolymer.

In Examples 96 and 97, the various properties were measured as follows.

Diameter of Dispersed Particle

The diameter of dispersed particles was measured by the Microtrac particle analyzer manufactured by Honeywell Inc.

Dispersion Stability

Each of the oily resin dispersions obtained in the following Examples was placed in a sealable glass bottle, and the bottle was allowed to stand still at room temperature. After 1 month, whether the solvent phase separated from the resin phase or not was confirmed.

Method of Measuring Heat-sealing Strength to Aluminum

Aluminum foil (50 µm thick) was coated with each of the dispersions by a bar coater and then were air-dried. The above foil was heated for 10 sec in an air oven set at 200° C. to obtain coated foil having a uniform film. The coated foil was heat bonded to LLDPE sheet (available from ASCO Industries, Ltd., 300 µm thick) at a temperature of 100 to 200° C. and a pressure of 1 kg/cm² for 1 sec in the manner according to JIS Z1707. The heat-bonded foil was cut in a width of 15 mm to obtain a specimen. The specimen was used for 180°-peel test at a measuring temperature of 23° C. to measure the adhesive strength (at a tensile speed of 300 mm/min).

Example 96

55 g of the block copolymer (EOR-O-PCL) obtained in Example 94 and 495 g of toluene were placed in a 1-liter glass autoclave with a stirrer, and the resin was completely dissolved by heating at 130° C. The temperature of the solution was lowered to 85° C. over a period of 1 hr, from 85° C. to 40° C. over a period of 4.5 hr and from 40° C. to 30° C. over a period of 30 min to obtain oily resin dispersions. With respect to the obtained oily resin dispersions, the diameter of dispersed particles, the dispersion stability and the heat-sealing strength to Al were measured. The results are shown in Table 16.

Example 97

The oily resin dispersions were prepared in the same manner as in Example 96, except that the diblock copolymer (EOR-O-P(St/MAH)) obtained in Example 95 was used. With respect to the obtained oily resin dispersions, the diameter of dispersed particles, the dispersion stability and the heat-sealing strength to Al were measured. The results are shown in Table 16.

TABLE 16

| | Example 96 | Example 97 |
|---|---|---|
| Diameter of dispersed particle (µm) | 9 | 12 |
| Dispersion stability (phase separation after 1 month) | None | None |
| Heat-sealing strength to Al (kg/15 mm) | 1.8 | 2.5 |

The invention claimed is:

1. An olefin block copolymer (A-1) represented by the formula (I)

$$PO^1\text{-}g^1\text{-}B^1 \qquad (I)$$

wherein $PO^1$ is a polyolefin segment having a weight average molecular weight of from 500 to 1800, which is obtained by polymerizing or copolymerizing at least one α-olefin selected from linear or branched α-olefins having 2 to 20 carbon atoms, $g^1$ is an ester, ether, amide, imide, urethane, urea, silylether or carbonyl linkage, and $B^1$ is a segment containing an unsaturated hydrocarbon or a hetero atom.

2. The olefin block copolymer (A-1) according to claim 1 wherein the $g^1$ linkage is an ether, ester or amide linkage and the $B^1$ segment is prepared by chain polymerization.

3. An olefin block copolymer (A-1) represented by the formula (I)

$$PO^1\text{-}g^1\text{-}B^1 \qquad (I)$$

wherein $PO^1$ is a polyolefin segment having a weight average molecular weight of at least 2000, which is obtained by polymerizing or copolymerizing at least one α-olefin selected from linear or branched α-olefins having 2 to 20 carbon atoms, $g^1$ is an ester, ether, amide, imide, urethane, urea, silylether or carbonyl linkage, and $B^1$ is a segment containing an unsaturated hydrocarbon or a hetero atom which has a weight-average molecular weight of less than 500.

4. The olefin block copolymer (A-1) according to claim 3 wherein the $g^1$ linkage is an ether, ester or amide linkage and the $B^1$ segment is prepared by chain polymerization.

5. An olefin block copolymer (A-5) represented by the formula (V)

$$POB^5\text{-}g^5\text{-}F^5 \qquad (V)$$

wherein $POB^5$ is a di-block segment derived from an olefin block copolymer (A-2) represented by the formula (II), $$PO^2\text{-}f^2\text{-}R^2\text{—}(X^2)n\text{-}h^2 \qquad (II)$$

wherein $PO^2$ is a polyolefin segment comprised of repeating units derived from an olefin having 2 to 20 carbon atoms, $f^2$ is an ether, ester or amide linkage, $R^2$ is a functional segment prepared by chain polymerization, $X^2$ is an ester, ether, amide, imide, urethane, urea, silylether or carbonyl linkage, $h^2$ is a polar group selected from an amino group, a halogen atom, and an isocyanate, aldehyde, hydroxyl, carboxyl, acid anhydride, silanol, sulfonic acid and epoxy groups, and n is 0 or 1 and wherein $g^5$ is an ester, ether, amide, imide, urethane, urea, silylether or carbonyl linkage, and $F^5$ is a polar segment containing an unsaturated hydrocarbon or hetero atom, which is prepared by condensation reaction, ion reaction or addition reaction.

6. An olefin block copolymer (A-6) represented by the formula (VI)

$$POB^6\text{-}g^6\text{-}F^6\text{-}g^{16}\text{-}POB^{16} \qquad (VI)$$

wherein $POB^6$ and $POB^{16}$, which may be the same or different, are each a di-block segment derived from an olefin block copolymer (A-2) represented by the formula (II), $$PO^2\text{-}f^2\text{-}R^2\text{—}(X^2)n\text{-}h^2 \qquad (II)$$

wherein $PO^2$ is a polyolefin segment comprised of repeating units derived from an olefin having 2 to 20 carbon atoms, $f^2$ is an ether, ester or amide linkage, $R^2$ is a functional segment prepared by chain polymerization, $X^2$ is an ester, ether, amide, imide, urethane, urea, silylether or carbonyl linkage, $h^2$ is a polar group selected from an amino group, a halogen atom, and an isocyanate, aldehyde, hydroxyl, carboxyl, acid anhydride, silanol, sulfonic acid and epoxy groups, and n is 0 or 1, and wherein $g^6$ and $g^{16}$, which may be the same or different, are each an ester, ether, amide, imide, urethane, urea, silylether or carbonyl linkage, and $F^6$ is a polar segment composed of a hydrocarbon or a polar segment containing an unsaturated hydrocarbon or hetero atom, which is prepared by condensation reaction, ion reaction or addition reaction.

7. An olefin block copolymer (A-7) represented by the formula (VII);

$$(POB^7_i\text{-}g^7_i)_k\text{-}G^7 \qquad (VII)$$

wherein $POB^7_i$, which may be the same or different, are each a di-block segment derived from an olefin block copolymer (A-2) represented by the formula (II), $$PO^2\text{-}f^2\text{-}R^2\text{—}(X^2)n\text{-}h^2 \qquad (II)$$

wherein $PO^2$ is a polyolefin segment comprised of repeating units derived from an olefin having 2 to 20 carbon atoms, $f^2$ is an ether, ester or amide linkage, $R^2$ is a functional segment prepared by chain polymerization, $X^2$ is an ester, ether, amide, imide, urethane, urea, silylether or carbonyl linkage, $h^2$ is a polar group selected from an amino group, a halogen atom, and an isocyanate, aldehyde, hydroxyl, carboxyl, acid anhydride, silanol, sulfonic acid and epoxy groups, and n is 0 or 1 or a di-block segment derived from an olefin block copolymer (A-3) represented by the formula (III)

$$PO^3\text{-}g^3\text{-}F^3 \qquad (III)$$

wherein $PO^3$ is a polyolefin segment comprised of repeating units derived from an olefin having 2 to 20 carbon atoms, $g^3$ is an ester, ether, amide, imide, urethane, urea, silylether or carbonyl linkage, and $F^3$ is a polar segment containing an unsaturated hydrocarbon or hetero atom, which is prepared by condensation reaction, ion reaction or addition reaction, and wherein $g^7_i$, which may be the same or different, are each an ester, ether, amide, imide, urethane, urea, silylether or carbonyl linkage, and $G^7$ is a polyvalent group containing an unsaturated hydrocarbon or hetero atom, i is an integer of 1 to 5 and k is an integer of 2 to 500.

8. A hot melt adhesive comprising an olefin block copolymer (A-1) of formula (I)

$$PO^1\text{-}g^1\text{-}B^1 \qquad (I)$$

wherein $PO^1$ is a polyolefin segment having a weight average molecular weight of at least 2000, which is obtained by polymerizing or copolymerizing at least one α-olefin selected from linear or branched α-olefins having 2 to 20 carbon atoms, $g^1$ is an ester, ether, amide, imide, urethane, urea, silylether or carbonyl linkage, and $B^1$ is a segment containing an unsaturated hydrocarbon or a hetero atom which has a weight-average molecular weight of less than 500.

9. A hot melt adhesive composition comprising:
10 to 90 parts by weight of an olefin block copolymer (A-1) represented by the formula (I)

$$PO^1\text{-}g^1\text{-}B^1 \qquad (I)$$

wherein $PO^1$ is a polyolefin segment having a weight average molecular weight of from 500 to 1800, which is obtained by polymerizing or copolymerizing at least one olefin selected from linear or branched α-olefins having 2 to 20 carbon atoms, $g^1$ is an ester, ether, amide, imide, urethane, urea, silylether or carbonyl linkage, and $B^1$ is a segment containing an unsaturated hydrocarbon or a hetero atom and 90 to 10 parts by weight of a tackifier resin (B)
based on the total amount 100 parts by weight of the olefin block copolymer (A-1) and the tackifier resin (B).

\* \* \* \* \*